(12) United States Patent
Fukae et al.

(10) Patent No.: US 7,461,318 B2
(45) Date of Patent: Dec. 2, 2008

(54) COMMUNICATION SYSTEM REALIZING USB COMMUNICATIONS BETWEEN A HOST COMPUTER AND ITS PERIPHERAL DEVICE AND A COMMUNICATION CONTROLLER TRANSMITTING A USB SIGNAL UNDER THE USB STANDARD

(75) Inventors: Fumihiro Fukae, Sakurai (JP); Hitoshi Naoe, Nara (JP); Koji Sakai, Osaka (JP); Shohei Osawa, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 537 days.

(21) Appl. No.: 10/950,563

(22) Filed: Sep. 28, 2004

(65) Prior Publication Data
US 2005/0071733 A1    Mar. 31, 2005

(30) Foreign Application Priority Data
Sep. 29, 2003   (JP)   ............................. 2003-337797
Sep. 29, 2003   (JP)   ............................. 2003-337867
Sep. 29, 2003   (JP)   ............................. 2003-337913
Jul. 22, 2004   (JP)   ............................. 2004-214715

(51) Int. Cl.
*H04L 1/18* (2006.01)
(52) U.S. Cl. ........................... 714/749; 710/300
(58) Field of Classification Search ........... 710/300; 714/749
See application file for complete search history.

(56) References Cited

U.S. PATENT DOCUMENTS

| | | | |
|---|---|---|---|
| 6,040,792 A * | 3/2000 | Watson et al. | 341/100 |
| 6,173,355 B1 | 1/2001 | Falik et al. | |
| 6,353,866 B1 * | 3/2002 | Fensore et al. | 710/104 |
| 6,381,666 B1 | 4/2002 | Kejser et al. | |
| 6,496,481 B1 | 12/2002 | Wu et al. | |
| 6,603,744 B2 * | 8/2003 | Mizutani et al. | 370/310 |
| 6,622,172 B1 | 9/2003 | Tam et al. | |
| 6,697,372 B1 * | 2/2004 | McAlear | 370/402 |
| 6,718,412 B2 * | 4/2004 | Purcell et al. | 710/109 |
| 6,889,262 B1 * | 5/2005 | Gulick | 710/5 |
| 7,149,833 B2 * | 12/2006 | McLeod | 710/300 |
| 2003/0149785 A1 | 8/2003 | Gerla et al. | |
| 2005/0033877 A1 * | 2/2005 | McLeod | 710/33 |

FOREIGN PATENT DOCUMENTS

| | | |
|---|---|---|
| JP | 2-61721 A | 3/1990 |
| JP | 2000-132498 A | 5/2000 |
| JP | 2000-209251 A | 7/2000 |
| JP | 2000-284872 A | 10/2000 |
| JP | 2002-542527 A | 12/2002 |

* cited by examiner

*Primary Examiner*—Mujtaba K Chaudry
(74) *Attorney, Agent, or Firm*—Birch, Stewart, Kolasch & Birch, LLP

(57) ABSTRACT

A two-way transmission system of the present invention is arranged in such a manner that, when a host-side controller confirms the receipt of an IN packet from a USB host, the host-side controller transfers the IN packet to a function-side controller, and receives a DATA packet from the function side. The received DATA packet is temporarily stored in a FIFO. At the time of the receipt of the IN packet again, the host-side controller supplies, to the USB host, the DATA packet stored in the FIFO.

95 Claims, 49 Drawing Sheets

| Transfer speed / Transfer mode | High speed (byte) | Full speed (byte) | Low speed (byte) |
|---|---|---|---|
| Isochronous transfer | 3072 | 1023 | — |
| Interrupt transfer | 3072 | 64 | 8 |
| Bulk transfer | 512 | 8,16,32,64 | — |
| Control transfer | 64 | 8,16,32,64 | 8 |

| PID type | PID name | PID[3:0] | Definition |
|---|---|---|---|
| Token | OUT | 0001 | Transfer to function (device) |
| | IN | 1001 | Transfer to host |
| | SOF | 0101 | Start of frame |
| | SETUP | 1101 | Setup |
| Data | DATA0 | 0011 | Data packet PIDeven |
| | DATA1 | 1011 | Data packet PIDodd |
| | DATA1 | 0111 | Data packet high-speed |
| | MDATA | 1111 | Data packet high-speed |
| Handshake | ACK | 0010 | Data reception succeeded |
| | NAK | 1010 | Data transfer impossible |
| | STALL | 1110 | End point stalled |
| | NYET | 0110 | Still no response from receiving end |
| Special | PRE | 1100 | Low-speed transfer enabled |
| | ERR | 1100 | Split transaction error |
| | SPLIT | 1000 | Split transaction |
| | PING | 0100 | High-speed flow control |

Conventional Art

Conventional Art

Conventional Art

Conventional Art

COMMUNICATION SYSTEM REALIZING USB COMMUNICATIONS BETWEEN A HOST COMPUTER AND ITS PERIPHERAL DEVICE AND A COMMUNICATION CONTROLLER TRANSMITTING A USB SIGNAL UNDER THE USB STANDARD

This Nonprovisional application claims priority under 35 U.S.C. § 119(a) on Patent Applications No. 2004/214715 filed in Japan on Jul. 22, 2004, No. 2003/337867 filed in Japan on Sep. 29, 2003, No. 2003/337797 filed in Japan on Sep. 29, 2003, and No. 2003/337913 filed in Japan on Sep. 29, 2003, the entire contents of which are hereby incorporated by reference.

FIELD OF THE INVENTION

The present invention relates to a USB system which is a communication system for realizing USB communications (data communications under the USB standard) between a host computer (host) and its peripheral device (device/function device), and also relates to a communication controller which transmits a USB signal under the USB standard.

BACKGROUND OF THE INVENTION

Universal Serial Bus (hereinafter, USB) is a standard of an interface, which has been developed for enhancing the expandability of a peripheral device (device/function device) connected to a host such as a personal computer. USB is a serial interface standard which allows communications between a host and various USB-compliant devices to be performed via a common bus line.

Under USB standard, in principle, one host (USB host) can be connected with up to 127 devices via a common bus, in one system. These devices are, in physical terms, networked in a tree. In logical terms, meanwhile, it is considered that a host (client software) and a device (USB function) perform one-to-one communications with each other. To maintain such connection, each device (more specifically, a protocol of the bottom layer of each device) communicates with the host in a time sharing fashion. The host performs scheduling in a time sharing fashion.

USB 1.x defines two modes having different data transfer rates, i.e. low-speed mode (LS) of 1.5 Mbps and full-speed mode (FS) of 12 Mbps.

In recent years, devices (applications) requiring high-speed data transmission (e.g. hard disks and DVD (Digital Versatile Disc)) have also employed USB. On this account, the above-mentioned transfer rates are not sufficient for such devices. To solve this problem, a new standard termed USB 2.0 was developed. In this USB 2.0, high-speed mode (HS) achieving 480 Mbps data transmission is added.

Now, how data communication (data transmission) is performed under USB standard is briefly described. The data transmission under USB standard is performed between a host and a buffer of each device.

The buffer on the device side is a FIFO (First In First Out) buffer termed an end point. Each device can have 16 end points at the maximum. Each end point has a number for identification purposes.

To perform the data transmission, the host accesses to a desired end point, with reference to an address of a device and an end point number.

Note that, an end point 0 (which has a number 0) exists immediately after USB-connecting the device (i.e. before configuration), and is used for communication to transfer control to the host (e.g. communication for initialization). Each USB function must have one end point 0.

The data transmission between the host and device is performed using communication "frame". This frame is repeatedly transferred between the host and device at predetermined intervals (in a 1 ms cycle in the LS and FS modes, while in a 125 us cycle in the HS mode). All sorts of data are exchanged by this frame.

The frame is made up of a plurality of transactions, and one transaction is made up of a plurality of packets.

A packet is the minimum communication unit constituting the transaction, and is a basic unit of data which is actually exchanged. Packets are classified into some different types, in accordance with the contents. Examples of such types include token packet, data packet, and handshake packet. The transaction includes a plurality of such packets and is a meaningful unit of data transmission.

That is to say, the data transmission under USB is, in one frame, performed by transactions, and in one transaction, a plurality of packets are exchanged between the host and device.

The above-mentioned token packet includes an address of each device and an end point number, allowing the host to identify the counterpart of the data communication.

FIG. 42 illustrates the types of USB packets. As shown in this figure, packets are classified into token packet, data (DATA) packet, handshake packet, and special packet.

The token packet is further divided into IN packet, OUT packet, SETUP packet, and SOF packet. These packets are used for the objectives shown in FIG. 42. The data packet is further divided into DATA0 packet, DATA1 packet, and the like. The handshake packet is further divided into ACK packet, NAK packet, STALL packet, and NYET packet. The special packet is PING packet and the like.

FIG. 43 illustrates formats of USB packets. PID in the figure is an identifier of the packets and is 8 bits in length. To the token packet, CRC5 is added. Meanwhile, to the data packet, CRC16 is added. These CRCs are used for identifying the existence of an error in a received packet.

The SOF (Start of Frame) packet, which is one type of the token packet, indicates the start of a frame supplied from the host. The SOF packet is supplied from the host, at intervals of 1 ms (in the LS and MS modes) or at intervals of 125 us (in the HS mode).

[IN Transaction]

In transaction is a method that, under USB 2.0, a USB host read out data from a USB function. The following will discuss this IN transaction in reference to FIG. 44.

First, at a timing t2201, an IN packet is supplied from the USB host to the USB function. At the instant of receiving the IN packet, the USB function has no data to be transferred. Therefore, the USB function sends a NAK packet, which indicates that there is no data to be transferred, to the USB host, at a timing t2202. Upon receiving the NAK packet, the USB host recognizes that in the USB function there is no data to be transferred, so that the USB host again supplies an IN packet to the USB function, at a timing t2203. Receiving the IN packet, the USB function in this instance has data to be transferred, so as to supply a DATA packet to the USB host at a timing t2204. If the USB host unerringly receives the DATA packet within a predetermined period of time, an ACK packet indicating correct receipt is dispatched to the USB function, at a timing t2205.

Since the CRC16 has been added to the DATA packet, the data receiving side can judge whether or not the received data has an error, by checking the added CRC. If the judgment by the CRC reveals that the data has an error, the USB host returns no packet to the USB function. In other words, the receipt of the ACK packet from the USB host makes the USB function recognize that the data transmission to the SUB host has successfully been carried out. If the USB function cannot receive the ACK packet from the USB host within a predetermined period of time, the USB function recognizes that the data transmission to the USB host is not successfully carried out and the IN transaction has failed.

In this manner, the IN transaction is carried out and the USB host can read out data from the USB function.

[OUT Transaction]

OUT transaction is a method that, under USB 2.0, a USB host writes data into a USB function. The following will discuss the OUT transaction in reference to FIG. 46.

First, at a timing t1901, the USB host supplies an OUT packet to the USB function, so as to notify the start of the OUT transaction. Then at a timing t1902, the USB packet outputs a DATA packet. The USB function conducts the CRC-check of the OUT packet and the DATA packet supplied from the USB host, so as to check the existence of an error in the received packets. If no error is found in the received packets, the USB function returns, to the USB host, either: an ACK packet if the USB function is ready to process the received DATA packet; or a NAK packet if the USB function is not ready to process the received DATA packet. If the received packets includes an error, nothing is returned to the USB host. In FIG. 46, no error is found in the received packets but the USB function is not ready to process the received DATA packet, so that the NAK packet is returned at a timing t1903.

Receiving the NAK packet, the USB host recognizes that the USB function is not ready to process the received packet. Therefore, to grasp the state of the USB function, the USB host outputs a PING packet at a timing t1904. Receiving this PING packet, the USB function supplies, to the USB host, either: an ACK packet if ready to process data; or a NAK packet if not ready to process data. In FIG. 46, the USB function is ready to process data at a timing t1905, so as to return the ACK packet.

Since the ACK packet is returned in response to the PING packet, the USB host recognizes that the USB function is ready to process data. If, meanwhile, the USB host receives the NAK packet, the USB host recognizes that the USB function is not ready to process data, so as to continually transmit the PING packet until the USB function becomes ready to process data. In FIG. 46, the ACK packet is returned in response to the PING packet, so that it is confirmed that the USB function is ready to process data. Therefore, the USB host outputs the OUT packet again at a timing t1906, and outputs the DATA packet again at a timing t1907. Receiving these packets, the USB function on this occasion is ready to process data, so as to CRC-check the received packets. If no error is found, the USB function outputs the ACK packet. Receiving this ACK packet, the USB host recognizes that the OUT packet and the DATA packet have successfully been transmitted to the USB function and have been processed. On this account, the OUT transaction finishes.

By the OUT transaction carried out in the manner above, the USB host can write data into the USB function.

[Time Constraint Regarding USB]

In USB 2.0, the time for propagating data signal is under constraints.

In the LS mode or FS mode, the turn-around time from the USB host to the USB function must be 16 bit times (1333 ns) or less. That is to say, if, within 1333 ns, the USB function does not return a reply packet to the USB host in response to a packet supplied from the USB host to the USB function, the USB host judges that the packet outputted from the USB host did not successfully reach the USB function, so as to retransmit the packet.

In the HS node, the turn-around time (TA time) from the USB host to the USB function must be 721 bit times (1502 ns) or less. If, within 1502 ns, the USB function does not return a reply packet to the USB host in response to a packet supplied from the USB host to the USB function, the USB host judges that the packet outputted from the USB host did not successfully reach the USB function, so as to retransmit the packet.

In the above-mentioned IN transaction, how long the USB host waits after sending the IN packet and how long the USB function waits after sending the DATA packet are determined in advance, as the time constraint of USB. The time constraint is 1333 ns in the LS and FS modes and 1502 ns in the HS mode. In each transaction mode, the IN transaction does not properly finishes unless the DATA packet or the ACK packet is supplied within the time constraint.

In the OUT transaction, meanwhile, how long the USB host waits after sending the DATA packet is determined in advance as the time constraint of USB: 1333 ns in the LS and FS modes and 1502 ns in the HS mode. In each transfer mode, the OUT transaction does not properly finishes unless the ACK packet (or other types of the handshake packet) is supplied within the time constraint.

[SETUP Transaction]

The following will discuss a SETUP transaction under USB.

The SETUP transaction is carried out, under USB 2.0, for establishing the connection between a host and a device in a systematic sense (i.e. for establishing a configuration), on the occasion of connecting a device with a host. This transaction is performed in such a manner that the host transmits data to the end point 0 of the device. Referring to FIG. 48, this SETUP transaction is described below.

In the SETUP transaction, at a timing T301, the host transmits a SETUP packet to the device, so as to notify the start of the SETUP transaction. Then at a timing T302, the host outputs a DATA packet. The device checks the CRC of the SETUP packet and the CRC of the DATA packet having been received.

If it is judged that the received packets include no error, the device supplies an ACK packet to the host at a timing T303. Meanwhile, if it is judged that the received SETUP and DATA packets include an error, the device returns nothing to the host.

Receiving the ACK packet, the host recognizes that the SETUP packet and the DATA packet have successfully been transmitted to the device, so as to finish the SETUP transaction.

If the ACK packet is not returned within a predetermined time (maximum turn-around time) after sending the DATA packet, the host recognizes that the SETUP packet or the DATA packet has not properly been transmitted to the device, i.e. recognizes that the SETUP transaction has failed. On this account, the host supplies the SETUP packet and the DATA packet to the device again. In this manner, the SETUP transaction between the host and device is carried out.

Note that, the aforesaid maximum turn-around time (maximum TA time) is the above-mentioned constraint for the propagation of a data signal under USB 2.0. That is to say, the turn-around time (TA time) starts when one of the host and the device sends a packet to the other, and finishes when said one of the host and the device receives a reply packet from the other. The maximum TA time indicates the upper limit of the TA time. If a reply packet is not returned within the maximum TA time, the host judges that the packet transmission to the device has failed, so as to retransmit the packets.

The maximum TA time in the LS and FS modes is 16 bit times (1333 ns). In the HS mode, the maximum TA time is 721 bit times (1502 ns).

For instance, in the SETUP transaction, if, after sending the DATA packet, the host does not receive the ACK packet from the device until 1333 ns (LS and FS) or 1502 ns (HS) has past, the host retransmits the SETUP packet and the DATA packet to the device.

Incidentally, in recent years, mobile devices such as digital cameras and PDAs (Personal Digital Assistants) have increasingly been provided with USB terminals, so as to support USB.

The connection between such a mobile device and a host is typically done by utilizing a cradle. That is to say, a USB connector of a cradle connected to a host is connected to a USB connector of a mobile device, so that the USB transmission is realized.

Such USB connectors physically contact each other. For this reason, repeating connection/disconnection deteriorates the connector and hence high-quality data transmission may become inexecutable.

To do away with such a physical connection, there is a technique which allows a host and a mobile device to perform free-space optical communications with each other. This type of technique is disclosed by, for instance, Patent Document 1 (Japanese Laid-Open Patent Application No. 2000-284872 (Tokukai 2000-284872; published on Oct. 13, 2000)).

However, to fully support the high speed mode of USB 2.0, it is necessary to conduct free-space transmission of data while keeping the transfer rate of 480 Mbps. For this reason, an optical communication section (optical system and two-way transmission section) provided in each of the host and the device has to have high CDR (Clock Data Recovery) properties, and this increases the costs.

To restrain this cost rise, the data transmission under USB 2.0 can be performed with a lower transfer rate of optical communication. However, this induces the following problems.

[IN Transaction]

FIG. 45 illustrates how the IN transaction is carried out on condition that the transfer rate on an optical communication path is 100 Mbps so as to be slower than the native rate (480 Mbps) under USB 2.0.

An IN packet dispatched from the USB host at a timing t2301 is converted to an optical signal by a host-side controller, and is supplied to a function-side controller. The function-side controller extracts a USB packet from the received optical signal, and supplies the USB packet to the USB function. Note that, the function-side controller starts the transmission to the USB function at a timing t2302, because the transmission to the USB function is carried out at the USB-native rate of 480 Mbps.

Finishing the receipt of the IN packet at a timing t2303, the USB function sends a DATA packet to the USB host at a timing t2304. The function-side controller converts this DATA packet to an optical signal, and supplies the optical signal to the host-side controller. As in the case of the function-side controller, after the receipt of the DATA packet finishes, the host-side controller transmits the DATA packet to the USB host at a timing t2305. At a timing t2306, the USB host can finally receive the DATA packet from the USB function.

When the rate of data transmission between the host and function is slower than the native rate of USB 2.0 (especially when the length of the DATA packet is long), the time (turn-around time) from t2301 to t2306 is long and exceeds the maximum turn-around time (1502 ns in the HS mode). For this reason, the IN transaction does not properly finish.

[OUT Transaction]

FIG. 47 illustrates how the OUT transaction is carried out on condition that the transfer rate on an optical communication path is 100 Mbps so as to be slower than the native rate (480 Mbps) under USB 2.0.

The USB host outputs an OUT packet at a timing t2001 and a DATA packet at a timing t2002, and these packets are converted to optical signals by the host-side controller, and the optical signals are then supplied to the function-side controller. The function-side controller extracts a USB packet from the received optical signal, and supplies this USB packet to the USB function. The function-side controller starts the transmission to the USB function at a timing t2003, because the transmission to the USB function is performed at the USB native rate (480 bps).

If the USB function can receive the OUT packet and DATA packet with no error and process them, the ACK packet is supplied to the USB host. The function-side controller converts this ACK packet to an optical signal, and supplies the optical signal to the host-side controller. As in the case of the function-side controller, after the receipt of the ACK packet finishes, the host-side controller transmits the ACK packet to the USB host at a timing t2005. At a timing t2006, the USB host can finally receive the ACK packet from the USB function.

When the rate of data transmission between the host and function is slower than the native rate of USB 2.0 (especially when the length of the DATA packet is long), the time (turn-around time) from t2001 to t2006 is long and exceeds the maximum turn-around time (1502 ns in the HS mode). For this reason, the OUT transaction does not properly finish.

FIG. 47 illustrates a case that the USB function returns the ACK packet in response to the OUT packet and the DATA packet supplied from the USB host. However, in the OUT transaction, a handshake packet (e.g. NAK packet) rather than the ACK packet may be returned, when the USB function is in a certain state on the occasion of receiving the OUT packet and the DATA packet. Also in the case that the USB function returns a handshake packet rather than the ACK packet, the OUT transaction is not properly carried out if the receipt of this handshake packet by the USB host exceeds the maximum turn-around time, so that a problem similar to the above occurs.

[SETUP Transaction]

FIG. 49 is a timing chart illustrating the SETUP transaction on condition that: the rate of the communication between the host and the optical communication section of the host (i.e. host optical communication section) is 480 Mbps; the rate of the communication between the host optical communication section and the optical communication section of the device (i.e. device optical communication section) is 100 Mbps; and the rate of the communication between the device optical communication section and the device is 480 Mbps.

As shown in FIG. 49, at T401 and T402, a SETUP packet and a DATA packet which are supplied from the host are converted to optical signals by the host optical communication section, and the optical signals are supplied to the device optical communication section at the rate of 100 Mbps.

The device optical communication section extracts the SETUP packet and the DATA packet from the received optical signals, and supplies the packets to the device at the rate of 480 Mbps (T403).

Note that, taking account of the difference of communication rates, the device optical communication section transmits the SETUP packet and the DATA packet to the device, after completely receiving both of these packets.

Subsequently, if the device has successfully received the SETUP packet and the DATA packet and has successfully processed these packets, the device supplies an ACK packet to the host at T404. This ACK packet is supplied to the host optical communication section at the rate of 100 Mbps, via the device optical communication section.

The host optical communication section extracts the ACK packet from the received optical signal, and transmits this ACK packet to the host at the rate of 480 Mbps (T405). Then the host receives this ACK packet from the device at T406.

In this arrangement, however, since the rate of the transmission between the optical communication sections is low, the time (TA time) between T491 to T406 is long.

In particular, when the size (packet length) of the DATA packet supplied from the host is large (long), the TA time may exceed a predetermined value (maximum TA time).

In such a case, the host keeps sending the SETUP packet and the DATA packet to the device, even if these packets are successfully received by the device, and hence the SETUP transaction cannot finish.

SUMMARY OF THE INVENTION

The present invention was done to solve the above-described problem. The objective of the present invention is thus to realize a two-way transmission circuit when can. successfully carry out data transmission by an IN transaction under USB 2.0 or data transmission by an OUT transaction under USB 2.0, even if the rate of a communication path between a host and a function is lower than the native rate of USB 2.0. The present invention also aims for providing a USB system which can perform a SETUP transaction even when a communication path with which data transmission takes time is adopted.

To solve the problem above, a communication controller of the present invention acts, when an IN transaction is performed as data communication under USB standard, as a host-side controller that (i) transfers an IN packet, which is supplied from a host device, to a function device side, while (ii) transfers a DATA packet, which is a response to the IN packet, to the host device, the communication controller comprising: receipt acknowledgement means for acknowledging receipt of the IN packet from the host device; storage means for storing the DATA packet supplied from the function device side; storage acknowledgement means for checking if the DATA packet is stored in the storage means when the receipt acknowledgement means acknowledges the receipt of the IN packet from the host device; and transmission control means for (I) transmitting, to the function device side, the IN packet which is supplied from the host device, and transmitting a NAK packet to the host device, when the storage acknowledgement means confirms that the DATA packet is not stored, and for (II) transmitting the DATA packet to the host device, when the data storage acknowledgement means confirms that the DATA packet is stored.

Therefore, the DATA packet, which is supplied from the function device side in response to the IN packet initially supplied from the host device, is stored in the storing section, and on the occasion of the retransmission of the IN packet from the host device, the DATA packet stored in the storing section is transmitted to the host device.

For this reason, it is unnecessary to cause the function device side to retransmit the DATA packet, in response to the IN packet retransmitted from the host device, so that the IN transaction successfully ends before a time limit defined by USB standard, even if the transfer rate between the host and function is low or the transfer path between the host and function is long.

To solve the problem above, a communication system of the present invention comprises: a communication controller acting as the above-mentioned host-side controller; and a communication controller acting as a function-side controller that (1) transferring the USB-compliant IN packet, which is supplied from the host device side, to the function device, while (2) transfers the DATA packet, which is a response to the IN packet, to the host device side.

Therefore, it is unnecessary to cause the function device side to retransmit the DATA packet, in response to the IN packet retransmitted from the host device, so that the IN transaction successfully ends before a time limit defined by USB standard, even if the transfer rate between the host and function is low or the transfer path between the host and function is long.

To solve the above-described problem, a communication equipment of the present invention includes the above-mentioned communication controller.

With this, it is possible to obtain a communication equipment which can exert effects similar to those of the aforesaid communication controller.

To solve the above-described problem, a communication method of the present invention is characterized by comprising the steps of: when receipt of an IN packet from a host device is confirmed, checking whether or not a DATA packet which will be a response to the IN packet has been supplied; if the DATA packet has been supplied, transmitting the DATA packet to the host device, in response to the received IN packet; and if the DATA packet has not been supplied, transferring the received IN packet to a function device side, and transmitting a NAK packet to the host device.

According to this method, it is unnecessary to cause the function device side to retransmit the DATA packet, in response to the IN packet retransmitted from the host device, so that the IN transaction successfully ends before a time limit defined by USB standard, even if the transfer rate between the host and function is low or the transfer path between the host and function is long.

To solve the above-described problem, a communication controller acts, when an OUT transaction is performed as data communication under USB standard, as a host-side controller that (i) transfers an OUT packet and a DATA packet, which are supplied from a host device, to a function device side, while (ii) transfers a handshake packet, which is a response to the OUT packet and the DATA packet, to the host device, the communication controller comprising: receipt acknowledgement means for acknowledging receipt of the OUT packet and the DATA packet from the host device; storage means for storing the handshake packet supplied from the function device side; storage acknowledgement means for checking if the handshake packet is stored in the storage means when the receipt acknowledgement means acknowledges the receipt of the OUT packet and the DATA packet from the host device; and transmission control means for (I) transmitting a NAK packet a NAK packet to the host device, when the storage acknowledgement means confirms that the handshake packet is not stored, and for (II) transmitting the handshake packet to the host device, when the storage acknowledgement means confirms that the handshake packet is stored.

According to this arrangement, the handshake packet, which is supplied from the host device in response to the OUT packet and the DATA packet initially supplied from the host device, is stored in the storing section, and on the occasion of the retransmission of the OUT packet and the DATA packet from the host device, the handshake packet stored in the storing section is transmitted to the host device.

For this reason, it is unnecessary to cause the function device side to retransmit the handshake packet, in response to the OUT packet and the DATA packet retransmitted from the host device, so that the OUT transaction is successfully carried out before a time limit defined by USB standard, even if the transfer rate between the host and function is low or the transfer path between the host and function is long.

To solve the above-described problem, a communication system of the present invention comprises: a communication controller acting as the aforesaid host-side controller; and a communication controller acting as the function-side controller (1) transferring USB-compliant OUT packet and DATA packet, which are supplied from the host device side, to the function device, while (2) transferring the handshake packet, which is a response to the USB-compliant OUT packet and DATA packet, to the host device side.

According to this arrangement, it is unnecessary to cause the function device side to retransmit the handshake packet, in response to the OUT packet and the DATA packet retransmitted from the host device, so that the OUT transaction is successfully carried out before a time limit defined by USB standard, even if the transfer rate between the host and function is low or the transfer path between the host and function is long.

To solve the above-described problem, a communication equipment of the present invention comprises the aforementioned communication controller.

With this, it is possible to obtain a communication equipment which can exert effects similar to those of the aforesaid communication controller.

To solve the above-described problem, a communication method comprises the steps of: when receipt of an OUT packet and a DATA packet from a host device is confirmed, checking whether or not a handshake packet which will be a response to the OUT packet and the DATA packet has been supplied; if the handshake packet has been supplied, transmitting the handshake packet to the host device, in response to the OUT packet and the DATA packet having been supplied; and if the handshake packet has not been supplied, transferring a NAK packet to the host device.

According to this communication method, it is unnecessary to cause the function device side to retransmit the handshake packet, in response to the OUT packet and the DATA packet retransmitted from the host device, so that the OUT transaction is successfully carried out before a time limit defined by USB standard, even if the transfer rate between the host and function is low or the transfer path between the host and function is long.

A packet-based communication system of the present invention causes a computer to perform as the means of the above-mentioned communication controller.

Loading this packet-based communication system into a computer system enables the user to use the above-described communication controller.

A storage medium of the present invention stores the aforesaid packet-based communication program.

Loading the packet-based communication system stored in the storage medium into a computer system enables the user to use the above-described communication controller.

To solve the above-described problem, a host-side controller (present host-side controller) is provided in a host of a USB system and relays communications between the host and a device, at a time of performing a SETUP transaction, the host-side controller supplying, to a device side, a SETUP packet and a DATA packet supplied from the host, and storing the SETUP packet and the DATA packet on receipt of an ACK packet which is supplied from the device side towards the host, and the host-side controller comprising a host-side control section which supplies the ACK packet to the host on receipt of the SETUP packet and the DATA packet retransmitted from the host towards the device.

The present host-side controller is adopted to a USB system. The USB system is a communication system for realizing USB communications (data communications under the USB standard) between a host computer (host) and its peripheral device (device; USB function).

The present host-side controller is provided in the host of the USB system and relays the communications between the host and device. In other words, the present host-side controller receives a packet from the host and transmits this packet to the device, while receives a packet supplied toward the host and transmits this packet to the host. The packet is a basic unit of data exchanged in the USB system.

As described above, the present host-side controller is provided with the host-side control section, and on the occasion of the SETUP transaction, the host-side control section supplies, to the device side, the SETUP packet and the DATA packet supplied from the host. Correctly (properly) receiving these packets, the device transmits the ACK packet toward the host.

The ACK packet is a reply packet from the device, which indicates that the SETUP packet and the DATA packet are properly received. If this ACK packet is not supplied within the maximum TA time, the host recognizes that the SETUP transaction was not properly carried out (i.e. failed). Then the host retransmits the SETUP packet and the DATA packet towards the device.

In particular, when the host-side control section of the present host-side controller receives the ACK packet supplied from the device side towards the host, the host-side control section stores the packet in a storing section which is controlled by the host-side control section. Subsequently, when the SETUP packet and the DATA packet are retransmitted from the host, the host-side control section transmits the stored ACK packet to the host.

In this manner, in the USB system adopting the present host-side controller, the host receives the ACK packet immediately after the host retransmits the SETUP packet and the DATA packet. Therefore, the SETUP transaction is completed even if the communication between the host and device takes time and the maximum TA time elapses before the host directly receives the ACK packet transmitted from the device side.

Note that, the aforementioned case where the communication (data transfer) between the host and device takes time occurs when the communication rate therebetween is low or the communication path therebetween is long. On this account, adopting the present host-side controller significantly increases the degree of freedom regarding the communication path between the host and device.

After receiving the ACK packet from the device side and storing the same, the host-side control section may transfer the ACK packet to the host before the retransmission of the SETUP packet and the DATA packet. In this case, if the host receives the ACK packet within the maximum TA time, the SETUP transaction finishes at the time of the receipt of the packet. If the host receives the ACK packet after the maximum TA time has passed, the SETUP packet and the ACK packet are retransmitted from the host, and the host-side control section transmits the ACK packet to the host.

After storing the ACK packet supplied from the device side, the host-side control section may avoid the transmission of the ACK packet to the host. In this case, the host-side control section transmits the ACK packet to the host after the retransmission of the packets from the host.

To solve the above-described problem, a USB system (present system) of the present invention includes a host, a device, the present host-side controller, and a device-side controller which is provided in the device and relays the communications between the host and device.

Therefore, in the above-described USB system, the SETUP transaction is completed even if the communication between the host and device takes time and the maximum TA time elapses before the host directly receives the ACK packet transmitted from the device side.

To solve the above-described problem, a communication controller relays communications between a host and a device and can act both as a controller on a host side and a controller on a device side, when the communication controller acts as the controller on the host side and a SETUP transaction is performed, the communication controller supplying, to the device side, a SETUP packet and a DATA packet supplied from the host, and storing an ACK packet transmitted from the device side towards the host, at a time of supply of this ACK packet to the communication controller, and the communication controller including a control section which supplies the ACK packet to the host, when the SETUP packet and the DATA packet which are retransmitted from the device side towards the host is supplied to the communication controller.

The present communication controller relays the communications between the host and device. Also, the present communication controller can act both as a controller on the host side and a controller on the device side. In other words, the communication controller can act as a controller of either on the host side or on the device side.

When the present communication controller acts as a controller on the host side, at the time of the SETUP transaction, the control section of the present communication controller supplies, to the device side, the SETUP packet and the DATA packet supplied from the host. Correctly (properly) receiving these packets, the device supplies the ACK packet toward the host.

The ACK packet is a reply packet from the device, which indicates that the SETUP packet and the DATA packet are properly received. If this ACK packet is not supplied within the maximum TA time, the host recognizes that the SETUP transaction was not properly carried out (i.e. failed). Then the host retransmits the SETUP packet and the DATA packet towards the device.

Upon the receipt of the ACK packet supplied from the device side towards the host, the control section of the present communication controller stores this packet in the storing section controlled by the control section. Subsequently, the control section transmits the stored ACK packet to the host, when the SETUP packet and the DATA packet are retransmitted from the host.

In this manner, with the present communication controller, it is possible to cause the host to receive the ACK packet immediately after the retransmission of the SETUP packet and the DATA packet from the host. Therefore, the SETUP transaction is completed even if the communication between the host and device takes time and the maximum TA time elapses before the host directly receives the ACK packet transmitted from the device side.

Note that, the aforementioned case where the communication (data transfer) between the host and device takes time occurs when the communication rate therebetween is low or the communication path therebetween is long. On this account, adopting the present communication controller significantly increases the degree of freedom regarding the communication path between the host and device.

After storing the ACK packet supplied from the device side, the control section may transfer the ACK packet to the host before the retransmission of the SETUP packet and the DATA packet. In this case, if the host receives the ACK packet within the maximum TA time, the SETUP transaction finishes at the time of the receipt of the packet. Meanwhile, if the host receives the ACK packet after the maximum TA time elapses, the SETUP packet and the ACK packet are retransmitted from the host, and the control section transmits the ACK packet to the host.

After storing the ACK packet supplied from the device side, the control section may avoid the transmission of the ACK packet to the host. In this case, the control section transmits the ACK packet to the host, after the retransmission of the packets from the host.

Since the communication controller can act as both the host-side controller and the device-side controller, the communication controller can be used not only as the controller on the host side but also as the controller on the device side. For this reason, the present communication controller can be used under USB-OTG (USB On-The-Go) standard which allows devices to communicate each other without a host.

To solve the above-described problem, a packet-based communication method (present communication method) of the present invention, which is for exchanging packets between a host and a device of a USB system, comprises the steps of: at a time of performing a SETUP transaction, (i) transmitting, to a device side, a SETUP packet and a DATA packet supplied from the host; (ii) avoiding transfer of an ACK packet to a host side, the ACK packet being transmitted from the device side towards the host; and (iii) when the SETUP packet and the DATA packet are retransmitted from the host to the device, supplying the ACK packet to the host.

The present communication method is realized by the aforesaid present host-side controller. On this account, with the present communication method, the SETUP transaction is completed even if the communication between the host and device takes time and the maximum TA time elapses before the host directly receives the ACK packet transmitted from the device side. Also, the present communication method significantly increases the degree of freedom regarding the communication path between the host and device.

To solve the above-described problem, a packet-based communication program of the present invention causes a computer provided in a USB system to execute the steps (i), (ii), and (iii) of the present communication method.

Causing the computer to read this program, the steps of the present. communication method can be realized by the computer.

It is possible to easily preserve and distribute the program by storing the program in a computer-readable storage medium.

For a fuller understanding of the nature and advantages of the invention, reference should be made to the ensuing detailed description taken in conjunction with the accompanying drawings.

BRIEF DESCRIPTION OF THE DRAWINGS

FIG. 7 illustrates the maximum length of a DATA packet in each transfer mode of USB 2.0.

FIG. 42 shows the types of packets in USB 2.0.

DESCRIPTION OF THE EMBODIMENTS

Embodiments 1 through 9 as below illustrate a two-way transmission system which can successfully carry out data transmission by an IN transaction under USB 2.0. Embodiments 10 through 18 illustrate a two-way transmission system which can successfully carry out data transmission by an OUT transaction under USB 2.0. Embodiment 19 illustrates a USB system which can carry out a SETUP transaction even when a communication path with which data transmission takes time is adopted.

It is also noted that descriptions of more than one embodiment refer to FIGS. 7 and 18-20.

Embodiment 1

Figure 1:
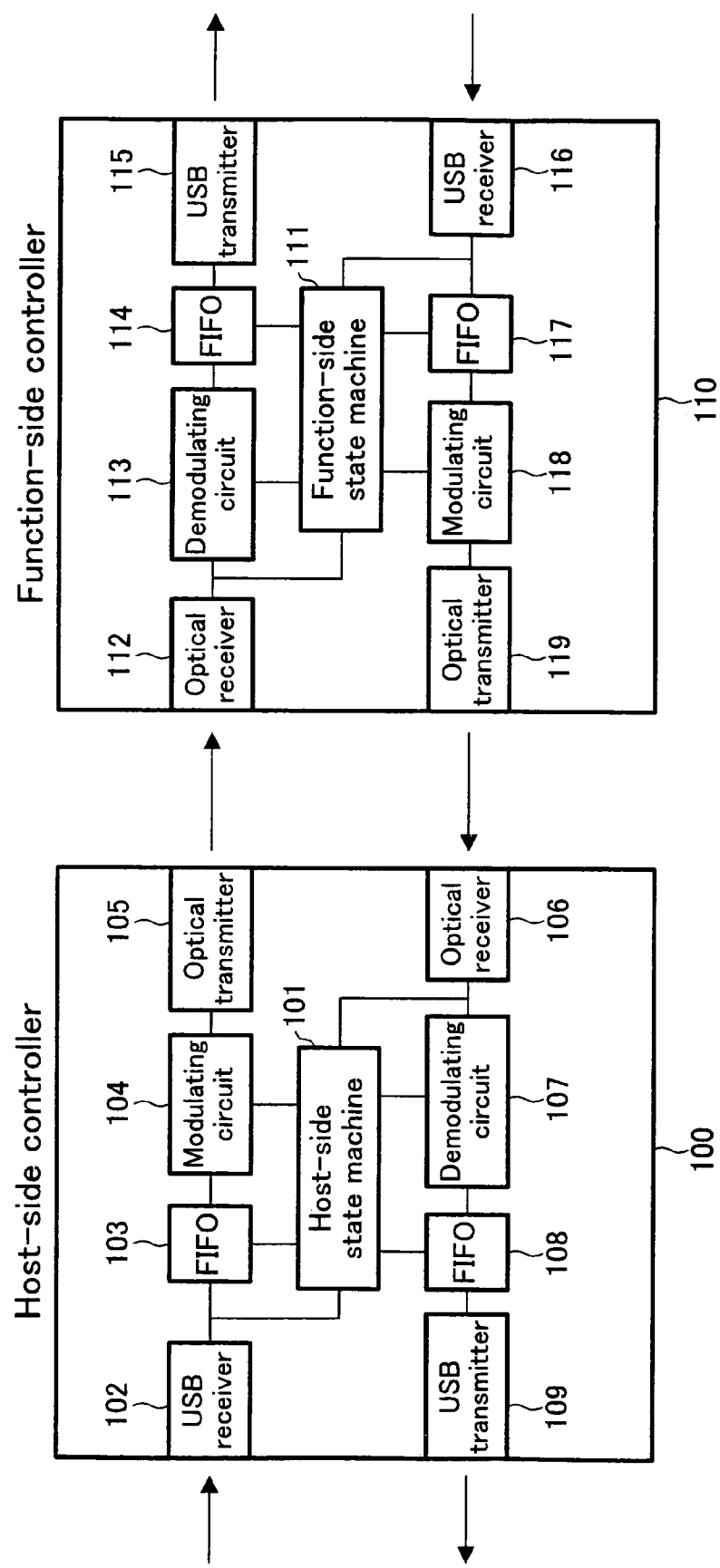
FIG. 1 is a block diagram relates to one embodiment of the present invention, and is a block diagram showing a substantial part of a two-way transmission system of Embodiment 1.
Figure 2:
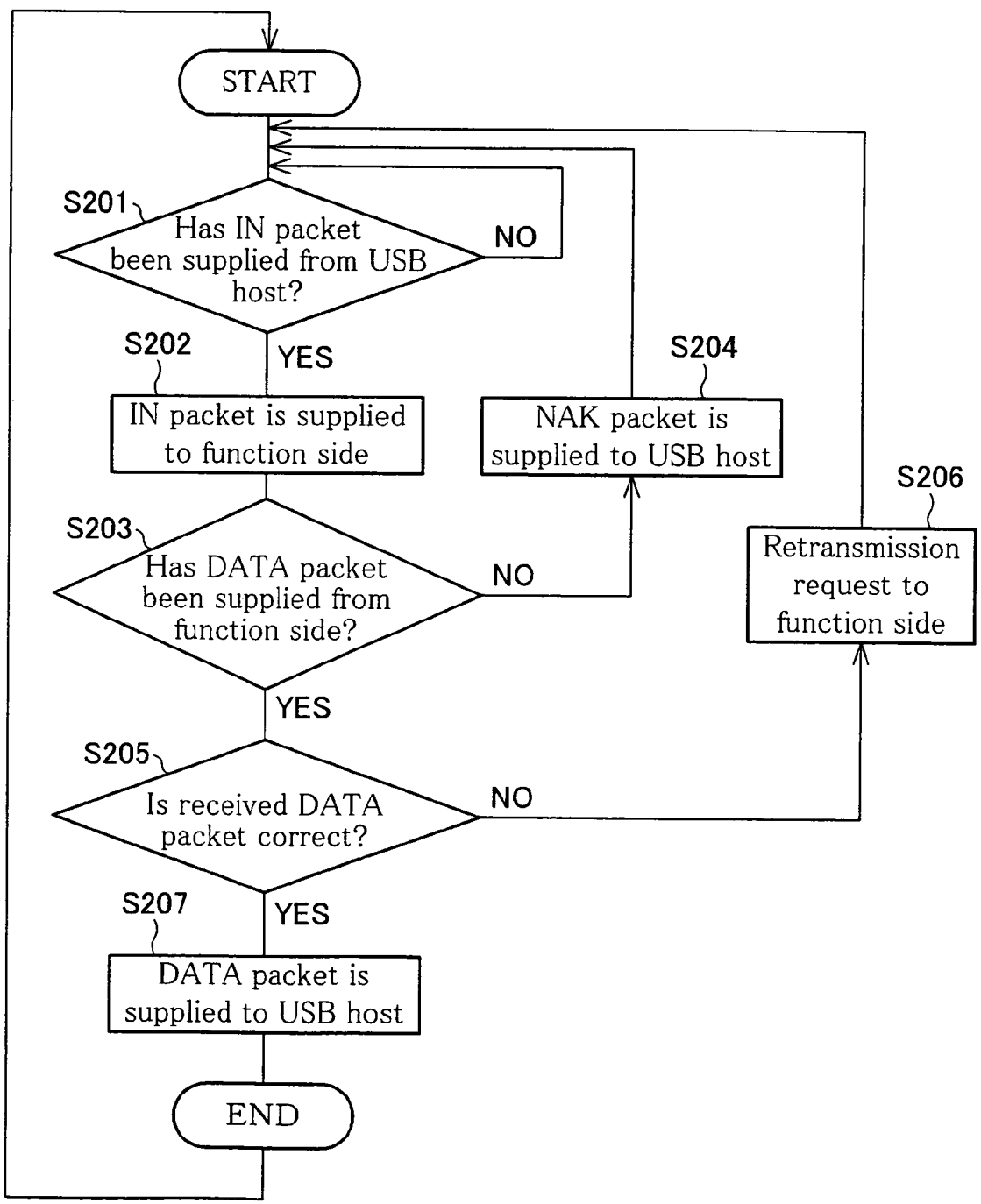
FIG. 2 is a flow chart showing the operation of a state machine of a host-side controller of the two-way transmission system of Embodiment 1.
Figure 3:
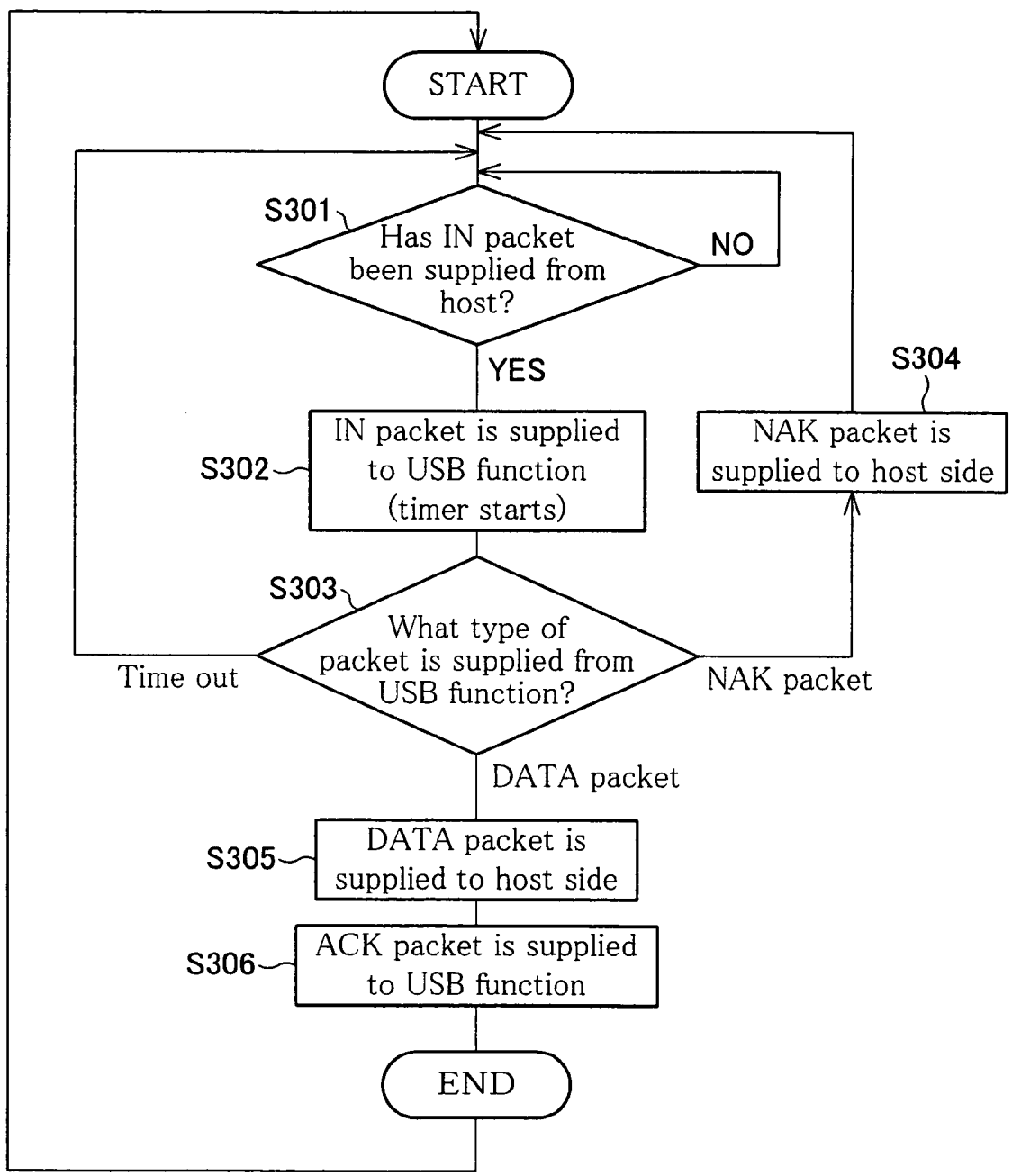
FIG. 3 is a flow chart showing the operation of a state machine of a function-side controller of the two-way transmission system of Embodiment 1.

The following will discuss an embodiment of the present invention with reference to FIGS. 1-3.

First, FIG. 1 outlines a two-way transmission system of Embodiment 1. This two-way transmission system shown in FIG. 1 is made up of a host-side controller 100 and a function-side controller 110. Communications between an equipment which is a USB host (host device) and an equipment which is a USB function (function device) are performed between the host-side controller 100 connected on the USB host side and the function-side controller 110 connected on the USB function side.

The host-side controller 100 and the function-side controller 110 in FIG. 1 communicate with each other by optical communication means. The transfer rate of this optical communication means is not higher than the transfer rate defined by the USB standard.

Receiving a signal from the USB host, the host-side controller 100 transmits this signal to the function-side controller 110. Meanwhile, receiving a signal from the function-side controller 110, the host-side controller 100 transmits this signal to the USB host. Apart from the connection with the USB host via a USB cable, the host-side controller 100 may be connected with a downstream port of a USB hub via a USB cable. Furthermore, the host-side controller 100 may be a part of the USB host or the USB hub.

Receiving a signal from the host-side controller 100, the function-side controller 110 transmits this signal to the USB function. Meanwhile, receiving a signal from the USB function, the function-side controller 110 transmits this signal to the host-side controller 100. Apart from the connection with the USB function via a USB cable, the function-side controller 110 may be connected with an upstream port of the USB hub via a USB cable. Furthermore, the function-side controller 110 may be a part of the USB host or the USB hub.

The following will describe components of the host-side controller 100 and the function-side controller 110.

The host-side controller 100 includes: a host-side state machine 101; a USB receiver 102; a FIFO 103; a modulating circuit 104; an optical transmitter 105; an optical receiver 106; a demodulating circuit 107; a FIFO (storage means) 108; and a USB transmitter 109. The function-side controller 110 includes: a function-side state machine 111; an optical receiver 112; a demodulating circuit 113; a FIFO 114; a USB transmitter 115; a USB receiver 116, a FIFO 117; a modulating circuit 118; and an optical transmitter 119. Note that, the host-side state machine 101 corresponds to receipt acknowledgement means, data storage means, transmission control means, and retransmission request means recited in claims.

In the host-side controller 100, a USB signal supplied from the USB host to the USB receiver 102 is subjected to a signal analysis and a packet analysis in the host-side state machine 101, and the FIFO 103 stores the packet. This FIFO 103 adjusts a timing of transferring a packet to a communication path between the host-side controller 100 and the function-side controller 110, because the transfer rate on this communication path is identical with or lower than that of the USB communication path.

If a packet supplied from the USB host is either an IN packet or an ACK packet, the host-side state machine 101 transfers the packet to the function-side controller 110. That is to say, when the host-side controller 100 receives, from the USB host, a packet which is judged to be transferable, the host-side state machine 101 notifies the modulating circuit 104 of the transmission of the packet and the start of modulation. Thereafter, the packet stored in the FIFO 103 is modulated by the modulating circuit 104, and transmitted to the function-side controller 110 by the optical transmitter 105.

In the present embodiment, the communication path between the host-side controller 100 and the function-side controller 110 (hereinafter, between the host and function) is an optical communication path. On this account, the optical transmitter 105 is, for instance, a light-emitting diode or a laser. Alternatively, the optical communication path may be a wired fiber-optic communication path or free-space communication. Adopting fiber optic realizes long-distance communications, while free-space communication is convenient because wiring is unnecessary.

When the communication path between the host and function is an optical communication path, the modulating circuit 104 adopts a modulating method such as 8B10B. Besides, the communication path may be, for instance, a wireless communication path. In such a case, the modulating circuit 104 can adopt a different modulating method. The communication between the host and function is either half-duplex or full-duplex. In the case of the full-duplex communication, the optical transmitter 105 always emits light, so that it is unnecessary to add a preamble to a packet and hence the efficiency of the communication path is improved.

When the host-side controller 100 initially receives, from the USB host, an IN packet or an ACK packet, the host-side controller 100 at this moment has not received a DATA packet from the function-side controller 110. On this account, the host-side state machine 101 transmits a NAK packet to the USB host, via the FIFO 108 and the USB transmitter 109. With this, the host-side controller 100 notifies the USB host of the absence of a DATA packet supplied from the function-side controller 110.

In the meanwhile, an optical signal supplied from the host-side controller 100 to the function-side controller 110 is received by the optical receiver 112 of the function-side controller 110. This optical signal is subjected to, for instance, 8B10B demodulation by the demodulating circuit 113, and then the function-side state machine 111 analyzes the content of the packet in the optical signal. The optical receiver 112 in this case is, for instance, a photodiode. As described above, the type of the optical receiver 112 varies depending on the type of the communication path between the host and function. When the communication path is wireless, the optical receiver 112 is a receiving antenna. If the aforesaid packet is identified as an IN packet or an ACK packet from the host-side controller 100, the packet is stored in the FIFO 114. After the completion of the receipt of the packet from the host-side controller 100, the function-side state machine 111 transmits, as a USB signal, the packet to the USB function.

In this manner, when the USB function receives the IN packet from the USB transmitter 115 of the function-side controller 110, the USB function transmits, to the function-side controller 110, either: a DATA packet if there is data to be transmitted; or a NAK packet if there is no data to be transmitted. The content of the DATA packet or the NAK packet received by the USB receiver 116 of the function-side controller 110 is analyzed by the function-side state machine 111, and the packet is stored in the FIFO 117. Subsequently, the packet is, for instance, subjected to the 8B10B modulation by the modulating circuit 118, and transmitted, as an optical signal, to the host-side controller 100 via the optical transmitter 119.

The signal received by the optical receiver 106 of the host-side controller 100 is subjected to, for instance, the 8B10B demodulation by the demodulating circuit 107. If the host-side state machine 101 recognizes that the received signal is either a DATA packet or a NAK packet, the packet of the signal is stored in the FIFO 108.

As described above, to the USB host, the host-side 100 returns the NAK packet in response to the transmission of the initial IN packet. Therefore, the USB host retransmits an IN packet to the host-side controller 100. On the occasion of the receipt of the IN packet again by the USB receiver 102, the host-side controller 100 transmits this packet to the USB host, if the DATA packet or the NAK packet is stored in the FIFO 108.

With regard to the NAK packet, even if, at the moment of receiving the IN packet from the USB host, the host-side controller 100 has not received the DATA packet from the function-side controller 110, the NAK packet is supplied from the host-side controller 100 to the USB host, regardless of the supply of the NAK packet from the function-side controller 110.

As described above, in the host-side controller 100, the DATA packet or the NAK packet which is supplied in response to the IN packet initially transmitted from the USB host is stored in the FIFO 108. When the IN packet is retransmitted from the USB host, the DATA packet or the NAK packet which has been stored in the FIFO 108 is transmitted to the USB host. With this, even if the rate on the communication path between the host and function is lower than the rate defined by the USB standard, the DATA packet or the NAK packet is certainly transmitted to the USB host within the time limit, in response to the retransmitted IN packet, without carrying out the communication between the host and function again. For this reason, the IN transaction is successfully carried out.

Referring to FIG. 2, the operation of the host-side state machine 101 of the host-side controller 100 of Embodiment 1 is described.

S201 is a step for telling whether or not a packet transmitted from the USB host is an IN packet. If the packet is the IN packet, the operation goes on to S202. If the packet is a packet other than the IN packet, the operation returns to S201.

S202 is a step for transmitting the IN packet to the function-side controller 110. After the completion of the transmission, the operation goes on to S203.

S203 is a step for telling whether or not a DATA packet has been supplied from the function-side controller 110. If the DATA packet has been supplied, the operation goes on to S205. If the DATA packet has not been supplied, the operation goes on to S204.

S204 is a step for transmitting a NAK packet to the USB host. After transmitting the NAK packet, the operation goes on to S201.

S205 is a step for judging that the received DATA packet is correct or not. If the DATA packet is not correct, the operation goes on to S206. If the DATA packet is correct, the operation goes on to S207.

S206 is a step for requesting the USB function to retransmit the DATA packet. After this request of retransmission, the operation goes on to S201.

S207 is a step for transmitting the DATA packet to the USB host. After transmitting this DATA packet, the IN transaction finishes.

Next, referring to FIG. 3, the operation of the function-side state machine 111 of the function-side controller 110 of Embodiment 1 is described.

S301 is a step for telling whether or not a packet supplied from the host-side controller 100 is an IN packet. If the packet is the IN packet, the operation goes on to S302. If the packet is not the IN packet, the operation returns to S301.

S302 is a step for transmitting the IN packet to the USB function. After the IN packet is transmitted, a timer starts, and the operation goes on to S303.

S303 is a step for identifying a packet supplied from the USB function. If the packet is a DATA packet, the operation goes on to S305. If the packet is a NAK packet, the operation goes on to S304. If a timeout occurs as a predetermined period of time has passed, the operation returns to S301.

S304 is a step for transmitting the NAK packet to the host-side controller 100. After transmitting the NAK packet, the operation goes on to S301.

S305 is a step for transmitting the DATA packet to the host-side controller 100. After transmitting the DATA packet to the host-side controller 100, the operation goes on to S306.

S306 is a step for transmitting the ACK packet to the USB function. After transmitting the ACK packet, the IN transaction finishes.

As described above, the host-side controller 100 includes the state machine which operates as shown in FIG. 2, while the function-side controller 110 includes the state machine which operates as shown in FIG. 3. With this, even if the rate on the communication path between the host-side controller 100 and the function-side controller 110 is identical with or lower than the rate defined by USB standard, the IN transaction is successfully carried out.

Note that, in the operation shown in FIG. 2, in S202, the host-side controller 100 transfers, to the function-side controller 110, the IN packet which has been transmitted from the USB host. However, if the host-side controller 110 is ready to transmit the DATA packet to the USB host, it is unnecessary to transmit the IN packet to the function-side controller 110. In the strict sense, the USB function may output a new DATA packet if the IN packet is supplied to the USB function. In such a case, it is considered that the ON packet should not be transferred to the USB function.

Therefore, if, at the moment of receiving the IN packet from the USB host, the host-side controller 100 has received the DATA packet from the function-side controller 110, for instance, the following control may be carried out: The IN packet is not transmitted to the function-side controller 110, or the IN packet from the host-side controller 100 is ignored until the ACK packet is supplied from the host-side controller 100 after the function-side controller 110 outputs the DATA packet.

Embodiment 2

The following will discuss another embodiment of the present invention in reference to FIGS. 4-7.

A two-way transmission system of Embodiment 2 is basically identical with the system of Embodiment 1 shown in FIG. 1. The components of the two-way transmission system of Embodiment 2 have same functions as those of the two-way transmission system of Embodiment 1, so that detailed descriptions thereof are omitted.

Figure 4:
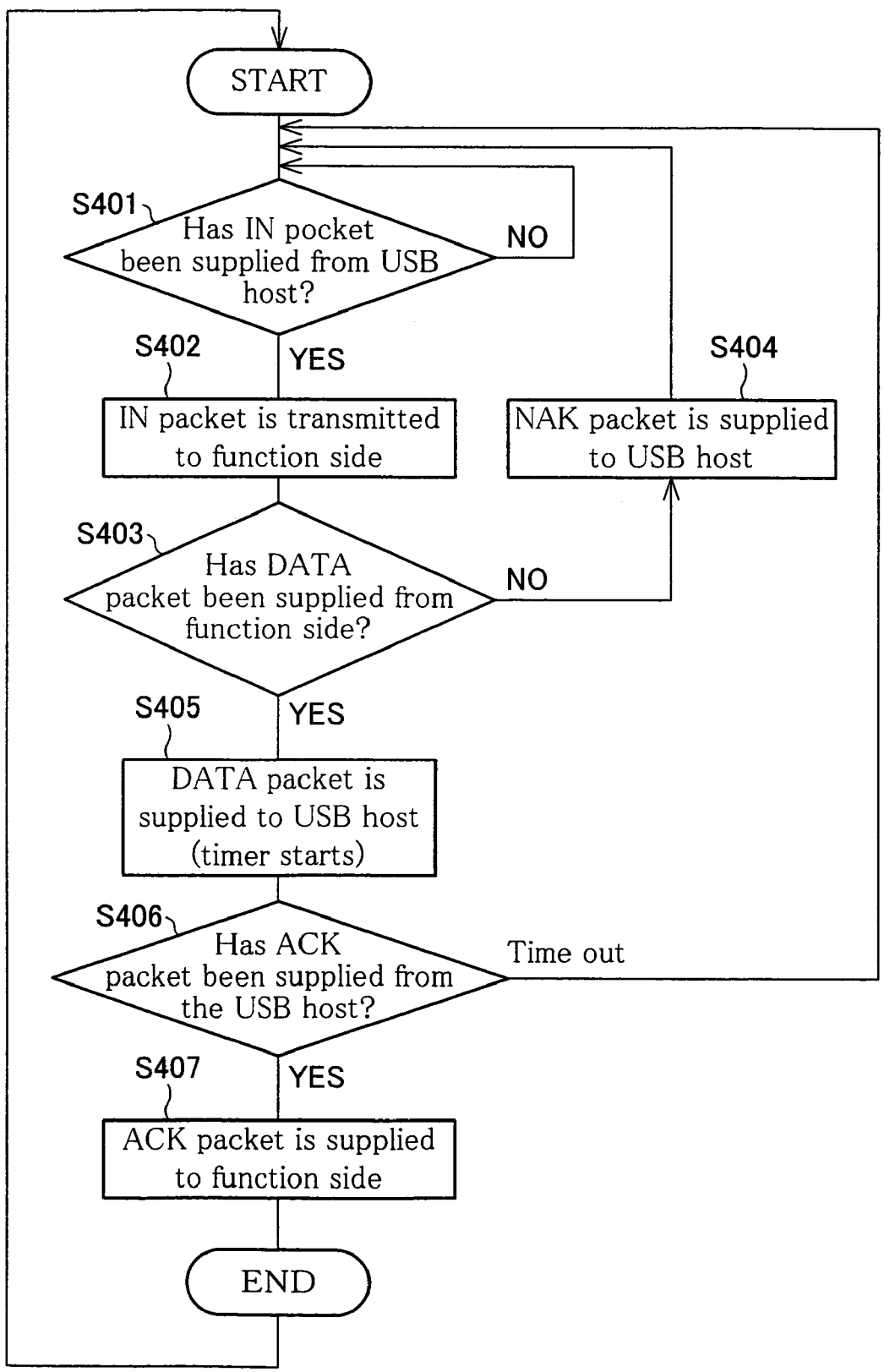
FIG. 4 is a flow chart showing the operation of a state machine of a host-side controller of a two-way transmission system of Embodiment 2.

First, referring to FIG. 4, the operation of the host-side state machine 101 of the host-side controller 100 of Embodiment 2 is described.

S401 is a step for telling whether or not a packet supplied from the USB host is an IN packet. If the packet is the IN packet, the operation goes on to S402. If the packet is not the IN packet, the operation returns to S401.

S402 is a step for transmitting the IN packet to the function-side controller 110. After the completion of the transmission of the IN packet, the operation goes on to S403.

S403 is a step for telling whether or not a DATA packet has been supplied from the function-side controller 110. If the DATA packet has been supplied, the operation goes on to S405. If the DATA packet has not been supplied, the operation goes to S404.

S404 is a step for transmitting a NAK packet to the USB host. After finishing the transmission of the NAK packet, the operation returns to S401.

S405 is a step for transmitting the DATA packet to the USB host. After finishing the transmission of the DATA packet, a timer starts, and the operation goes on to S406.

S406 is a step for judging whether or not an ACK packet has been supplied from the USB host. If the ACK packet has been supplied, the operation goes to S407. If the ACK packet has not been supplied and a timeout occurs as a predetermined period of time has passed, the operation returns to S401.

S407 is a step for transmitting the ACK packet to the function-side controller 110. After transmitting the ACK packet, the IN transaction finishes.

Figure 5:
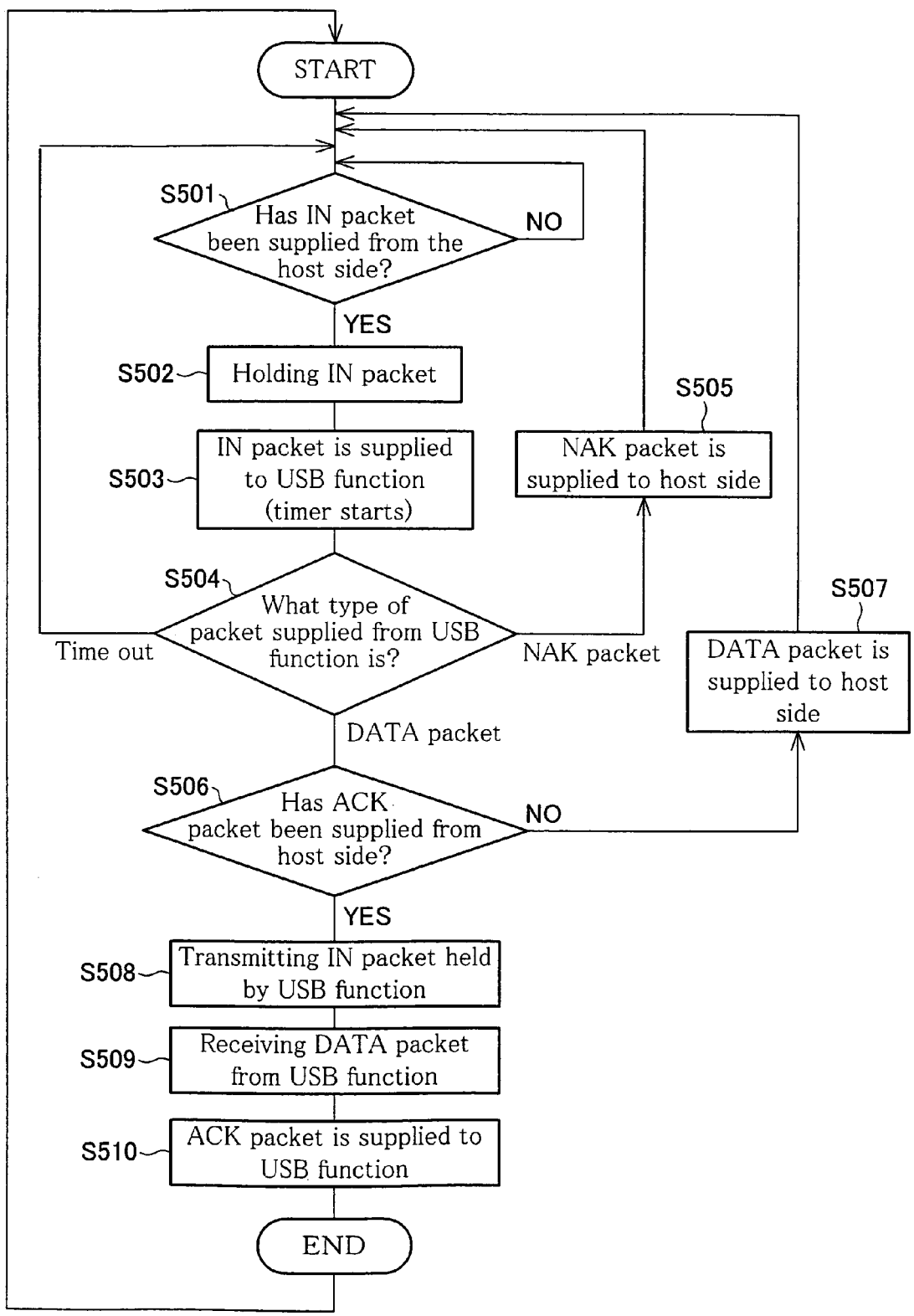
FIG. 5 is a flow chart showing the operation of a state machine of a function-side controller of the two-way transmission system of Embodiment 2.
Figure 6:
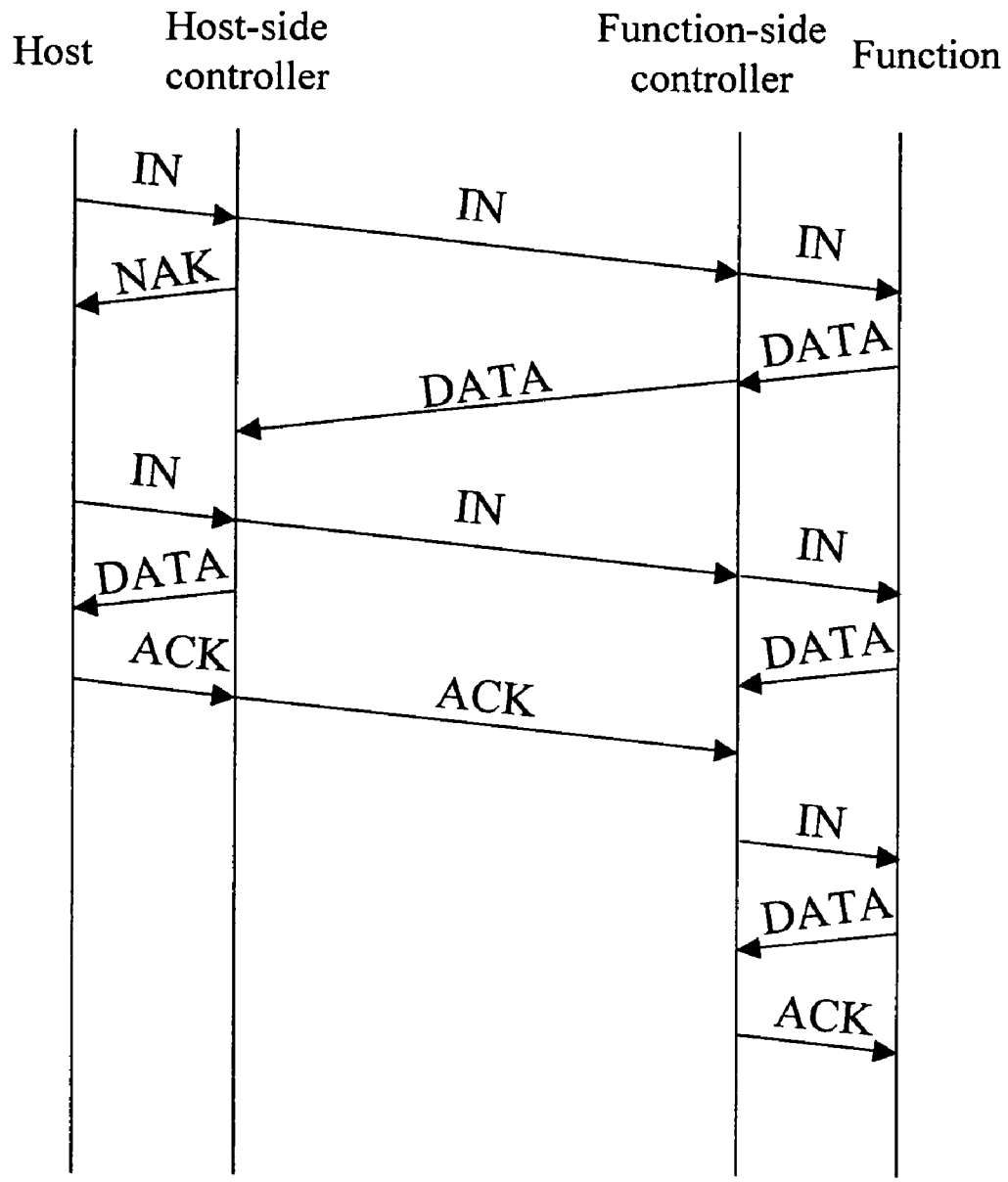
FIG. 6 is a timing chart showing an IN transaction by the two-way transmission system of Embodiment 2.

Next, referring to FIG. 5, the operation of the function-side state machine 111 of the function-side controller 110 of Embodiment 2 is described.

S501 is a step for telling whether or not a packet supplied from the host-side controller 100 is an IN packet. If the packet is the IN packet, the operation goes on to S502. If the packet is not the IN packet, the operation returns to S501.

S502 is a step for holding the IN packet. After holding the IN packet, the operation goes on to S503.

S503 is a step for transmitting the IN packet to the USB function. After the completion of the transmission of the IN packet, a timer starts, and the operation goes on to S504.

S504 is a step for identifying a packet supplied from the USB function. If the packet is a DATA packet, the operation goes on to S506. If the packet is a NAK packet, the operation goes on to S505. If neither the DATA packet nor the NAK packet is supplied and a timeout occurs as a predetermined period of time has passed, the operation returns to S501.

S505 is a step for transmitting the NAK packet to the host-side controller 100. After the completion of the transmission of the NAK packet, the operation goes on to S501.

S506 is a step for judging whether or not the ACK packet has been supplied from the host-side controller 100. If the ACK packet has been supplied, the operation goes on to S508. If the ACK packet has not been supplied, the operation goes on to S507.

S507 is a step for transmitting the DATA packet to the host-side controller 100. After the completion of the transmission of the DATA packet, the operation returns to S501.

S508 is a step for transmitting, to the USB function, the IN packet which has been held. After the completion of the transmission of the IN packet, the operation goes on to S522.

S509 is a step for receiving the DATA packet from the USB function. After the receipt of the DATA packet, the operation goes on to S510.

S510 is a step for transmitting the ACK packet to the USB function. After the completion of the transmission of the ACK packet to the USB function, the IN transaction finishes.

As described above, the host-side controller 100 includes the state machine which operates as shown in FIG. 4, while the function-side controller 110 includes the state machine which operates as shown in FIG. 5. With this, even if the rate on the communication path between the host-side controller 100 and the function-side controller 110 is identical with or lower than the rate defined by USB standard, the IN transaction is successfully carried out. The processes shown in FIGS. 4 and 5 are summarized by a timing chart shown in FIG. 6.

If the DATA packet supplied from the function-side controller 110 and transmitted to the USB host has an error, the host-side controller 100 does not receive the ACK packet from the USB host. Therefore, the ACK packet is not transmitted to the USB function, and the IN transaction can be properly finished only when the DATA packet is correctly transferred. That is to say, in the above-described operation, the function-side controller 110 does not transmit the ACK packet to the USB function when an error occurs in the DATA packet on the communication path between the host and function. On this account, abnormal termination of the IN transaction is prevented and stable packet transfer is realized.

In Embodiments 1 and 2, upon the receipt of the IN packet from the USB host, the host-side controller 100 can transmit the DATA packet to the USB host, only when the host-side controller 100 has completely received the DATA packet from the function-side controller 110. This is because the packet format of the DATA packet does not include a field indicating the length of the packet, and also for the purpose of securely transfer the data from the low-speed communication path to the USB high-speed communication path, with no dropouts of data. Note that, the maximum length of the DATA packet under USB 2.0 is determined in each transfer mode as shown in FIG. 7.

Embodiment 3

Figure 8:
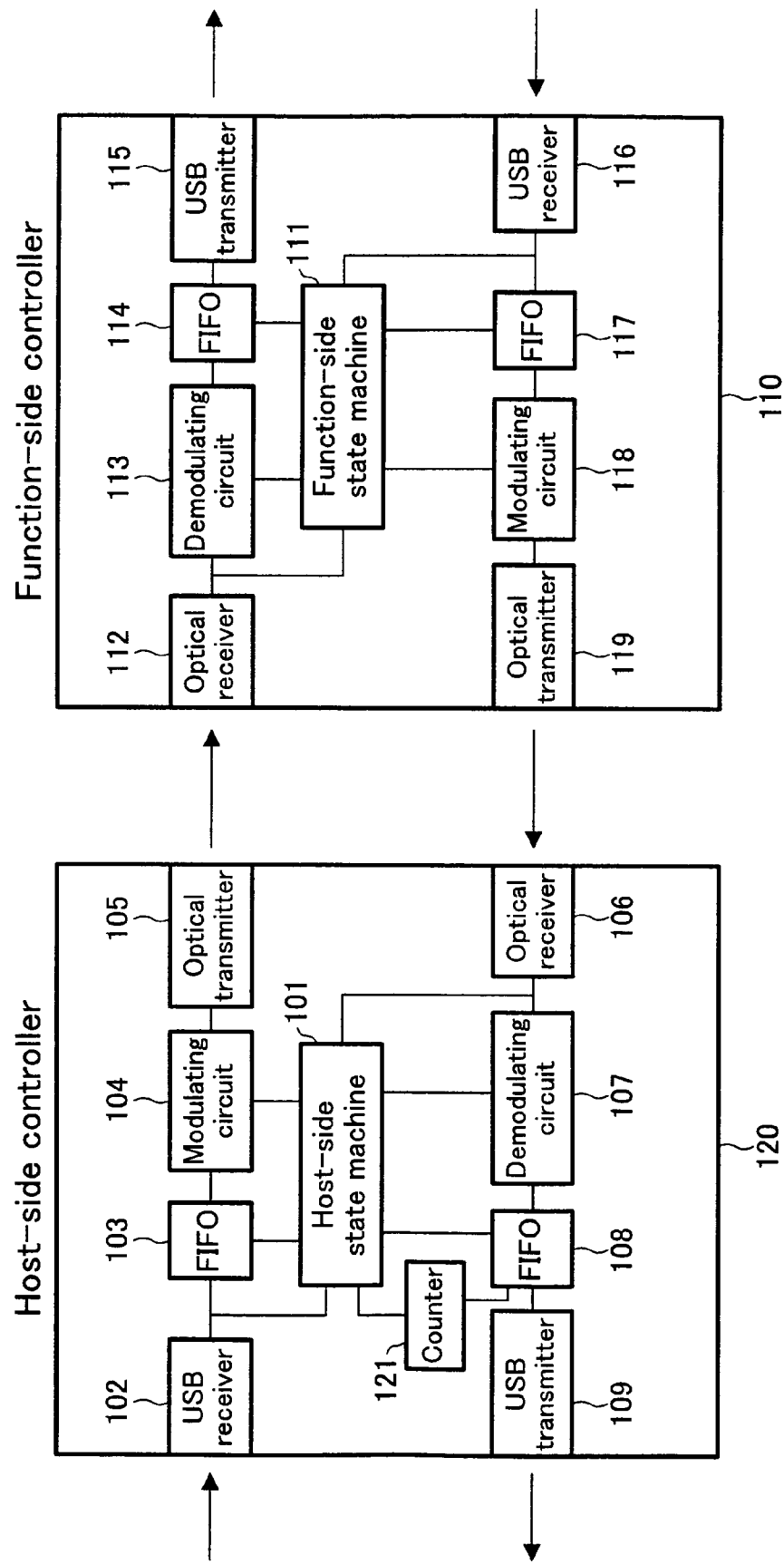
FIG. 8 is a block diagram showing a substantial part of a two-way transmission system of Embodiment 3.

The following will discuss a further embodiment of the present invention with reference to FIG. 8.

FIG. 8 outlines a two-way transmission system of Embodiment 3. The two-way transmission system in FIG. 8 is made up of a host-side controller 120 and a function-side controller 110. The host-side controller 120 includes: a host-side state machine 101; a USB receiver 102; a FIFO 103; a modulating circuit 104; an optical transmitter 105; an optical receiver 106; a demodulating circuit 107; a FIFO 108; a USB transmitter 109; and a counter (data amount confirming means) 121. Apart from the counter 121, the components of the host-side controller 120 have same arrangements and features as those of the host-side controller 100 shown in FIG. 1, so that the descriptions thereof are omitted. Furthermore, the function-side controller 110 in FIG. 8 is identical with the function-side controller 110 shown in FIG. 1, so that the descriptions thereof are also omitted.

The counter 121 counts up how many times DATA packets transmitted from the function-side controller 110 are written into the FIFO 108.

In Embodiments 1 and 2, the transmission of the DATA packet from the host-side controller 100 to the DATA host starts after the host-side controller 100 completes the receipt of the DATA packet. This is because, when the transfer rate on the communication path between the host and function is lower than the (USB-compliant) transfer rate between the host-side controller 100 and the USB host, the transfer of the DATA packet to the USB host may not be correctly carried out if the transfer starts before finishing the transmission of the DATA packet from the function-side controller 110. That is to say, the following problem may occur in the case above: In the host-side controller 100, the FIFO 108 for storing a DATA packet indicates EMPTY before the completion of the transmission of the DATA packet from the function-side controller 110, making it impossible to successively transfer DATA packets to the USB host.

However, for instance, assume that the transfer between the host-side controller 100 and the USB host is isochronous transfer, and the transmission of the DATA packet to the USB 2.0-compliant communication path starts on condition that an amount of data of the DATA packet stored in the FIFO 108 is less than a value corresponding to 3072 bytes which is the maximum packet length on the occasion of the isochronous transfer shown in FIG. 7. In this case, unless the FIFO 108 indicates EMPTY in the subsequent transmission, the above-mentioned problem does not occur even if the DATA packet is transmitted to the USB communication path before the completion of the transmission of the DATA packet from the function-side controller 110.

For this reason, the host-side controller 120 of Embodiment 3 is arranged such that, when the DATA packet is supplied from the function-side controller 119 and stored in the FIFO 108, and an amount of data of the stored DATA packet is managed using the counter 121. If the value of the counter 121 indicates that the FIFO 108 will not be EMPTY even if the transfer of the DATA packet to the USB host is started, the transmission of the DATA packet to the USB host can start before the completion of the transmission of the DATA packet to the function-side controller 110. This makes it possible to move a timing of the transmission of the DATA packet ahead, so that the overall transfer rate is improved.

In the meanwhile, when the transfer between the host-side controller 100 and the USB host is bulk transfer with which the maximum data length is shorter than that of the isochronous transfer, the preset value of the counter is lowered, so that the overall transfer rate is further improved.

Embodiment 4

Figure 9:
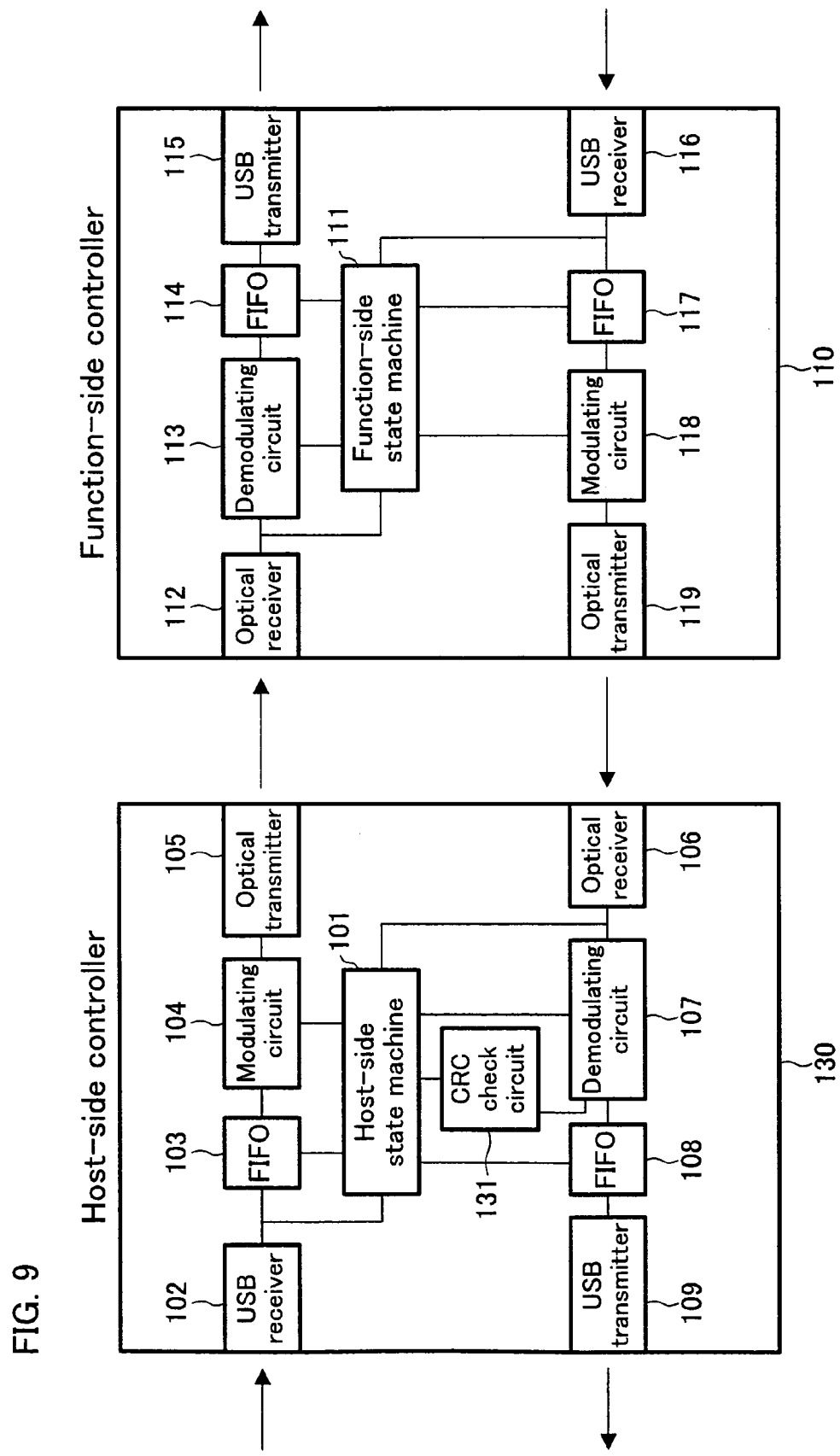
FIG. 9 is a block diagram showing a substantial part of a two-way transmission system of Embodiment 4.

The following will discuss yet another embodiment of the present invention in reference to FIG. 9.

FIG. 9 outlines a two-way transmission system of Embodiment 4. The two-way transmission system shown in FIG. 9 is made up of a host-side controller 130 and a function-side controller 110. The host-side controller 130 includes: a host-side state machine 101; a USB receiver 102; a FIFO 103; a modulating circuit 104; an optical transmitter 105; an optical receiver 106; a demodulating circuit 107; a FIFO 108; a USB transmitter 109; and a CRC-check circuit (error analyzing means) 131. Apart from the CRC-check circuit 131, the components of the host-side controller 130 have same arrangements and features as those of the host-side controller 100 shown in FIG. 1, so that the descriptions thereof are omitted. Furthermore, the function-side controller 110 in FIG. 9 is identical with the function-side controller 110 shown in FIG. 1, so that the descriptions thereof are also omitted.

The CRC-check circuit 131 can calculate CRC (Cyclic Redundancy Check) 16 in the DATA packet supplied from the function-side controller 110, and judge whether or not an error is included in the received DATA packet. The DATA packet which is supposed to include an error according to the CRC-check circuit 131 is discarded by the host-side state machine 101. Not transmitting the erroneous DATA packet as a USB packet makes it possible to reduce amounts of power for the transmission, and it is possible to restrain the occurrence of an abnormal operation on account of the receipt of an erroneous packet by the USB host.

Embodiment 5

Figure 10:
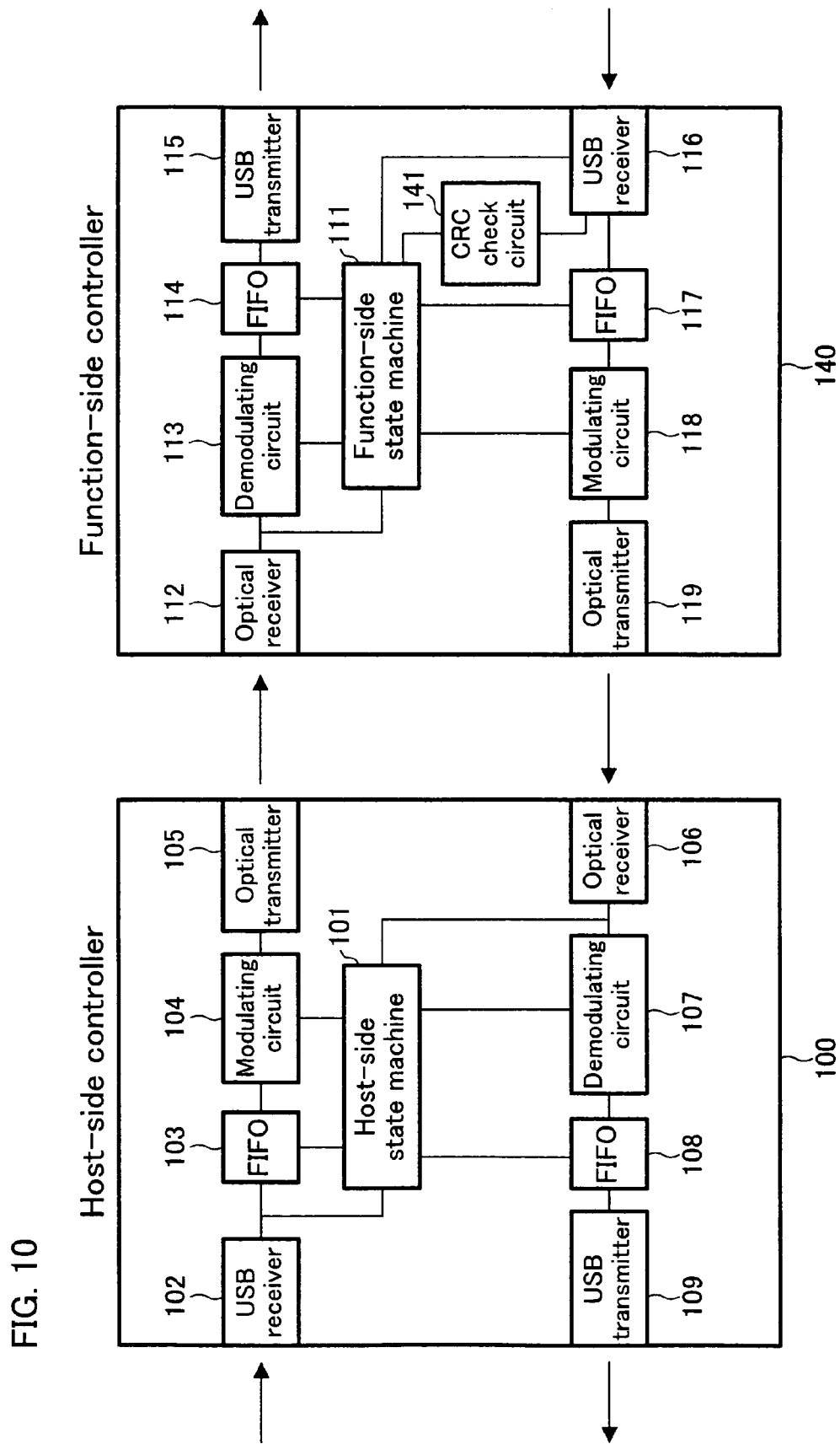
FIG. 10 is a block diagram showing a substantial part of a two-way transmission system of Embodiment 5.

The following will discuss still another embodiment of the present invention in reference to FIG. 10.

FIG. 10 outlines a two-way transmission system of Embodiment 5. The two-way transmission system shown in FIG. 10 is made up of a host-side controller 100 and a function-side controller 140. The function-side controller 140 includes: a function-side state machine 111; an optical receiver 112; a demodulating circuit 113; a FIFO 114; a USB transmitter 115; a USB receiver 116, a FIFO 117; a modulating circuit 118; an optical transmitter 119; and a CRC-check circuit (error analyzing means) 141. Apart from the CRC-check circuit 141, the components of the function-side controller 140 have same arrangements and features as those of the function-side controller 110 shown in FIG. 1, so that the descriptions thereof are omitted. Furthermore, the host-side controller 100 in FIG. 10 is identical with the host-side controller 100 shown in FIG. 1, so that the descriptions thereof are also omitted.

The CRC-check circuit 141 can calculate CRC 16 in the DATA packet transmitted from the USB function, and judge whether or not the received DATA packet includes an error. If an error exists in the DATA packet supplied from the USB function, it is of no use to transfer such DATA packet to the host-side controller 100, so that the transfer of the DATA packet to the low-speed communication path between the host and function is pointless in this case. On this account, the transmission of the DATA packet supposed to include an error according to the CRC-check circuit 141 is stopped even after the start of the transmission, so that the deterioration of the efficiency of the transfer to the low-speed communication path is restrained.

Embodiment 6

Figure 11:
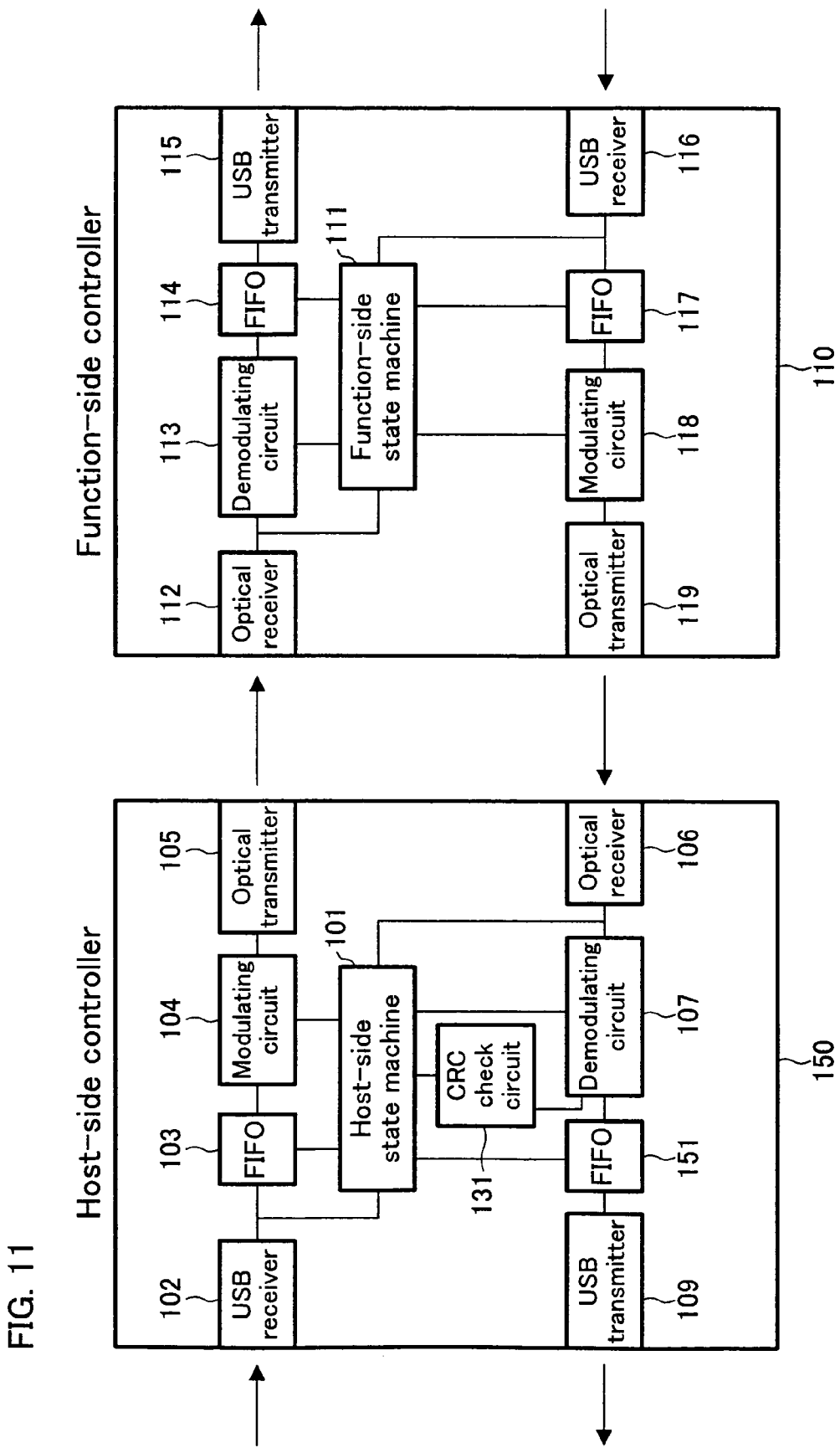
FIG. 11 is a block diagram showing a substantial part of a two-way transmission system of Embodiment 6.
Figure 12:
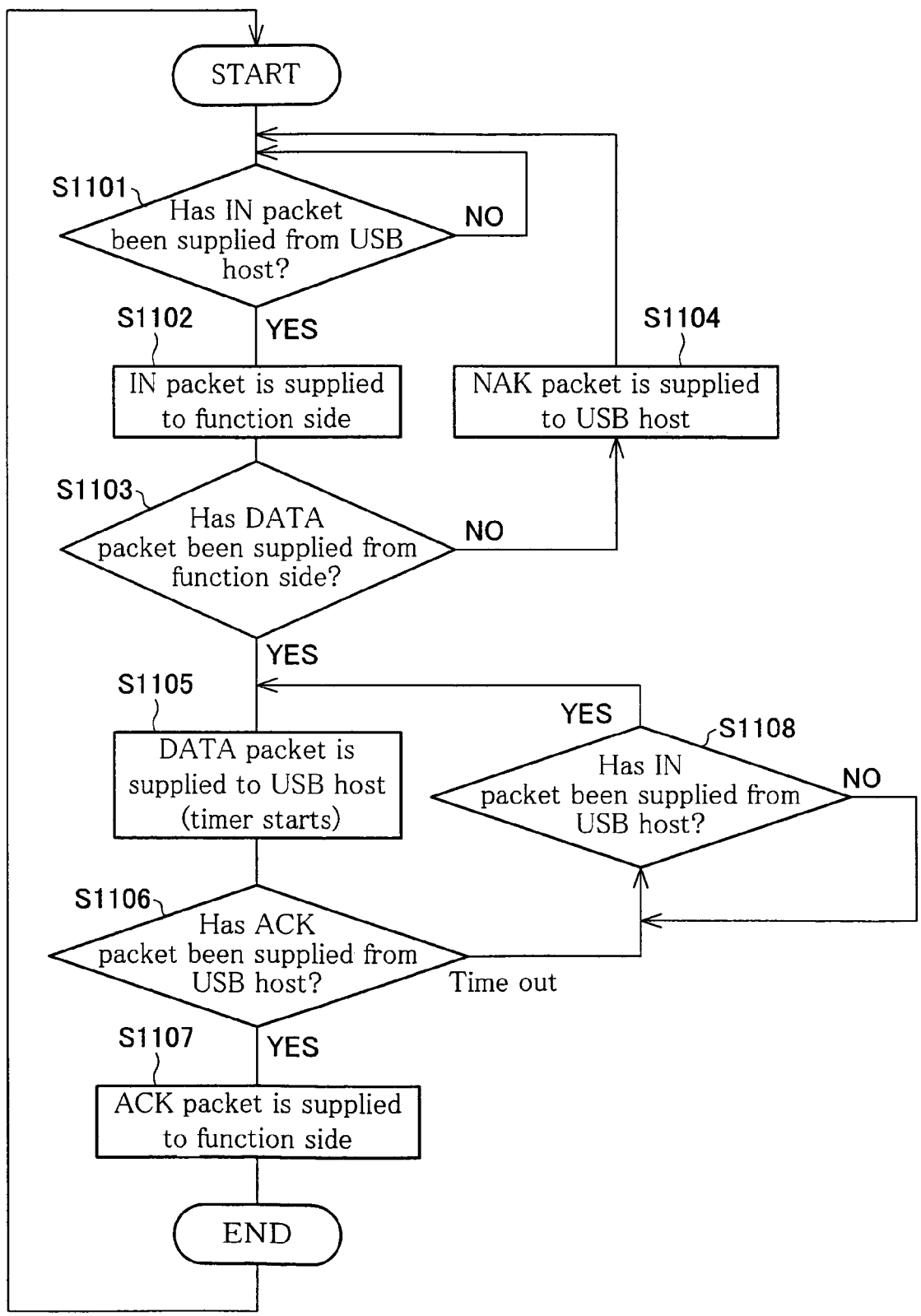
FIG. 12 is a flow chart showing the operation of a state machine of a host-side controller of the two-way transmission system of Embodiment 6.

The following will discuss still another embodiment of the present invention in reference to FIGS. 11 and 12.

FIG. 11 outlines a two-way transmission system of Embodiment 6. The two-way transmission system shown in FIG. 11 is made up of a host-side controller 150 and a function-side controller 110. The host-side controller 150 includes: a host-side state machine 101; a USB receiver 102; a FIFO 103; a modulating circuit 104; an optical transmitter 105; an optical receiver 106; a demodulating circuit 107, a FIFO (storage means) 151; a USB transmitter 109; and a CRC-check circuit 131. Apart from the FIFO 151, the components of the host-side controller 150 have same arrangements and features as those of the host-side controller 130 shown in FIG. 9, so that the descriptions thereof are omitted. Furthermore, the function-side controller 110 in FIG. 11 is identical with the function-side controller 110 shown in FIG. 1, so that the descriptions thereof are also omitted.

Receiving the DATA packet from the function-side controller 110, the host-side controller 150 causes the DATA packet received by the host-side state machine 101 to be written into the FIFO 151. When the host-side controller 110 again receives the IN packet from the USB host while the FIFO 151 stores the DATA packet, the DATA packet stored in the FIFO 151 is supplied to the USB host.

This FIFO 151 is holding a predetermined value of a read pointer, at the time of transmitting the DATA packet. After transmitting the DATA packet to the USB host, the host-side state machine 101 judges that a data error occurs on the communication path between the USB host and the host-side controller 150, when an ACK packet is not supplied from the USB host within a predetermined period of time. The host-side state machine 101 then sets the read pointer to the aforesaid predetermined value. After receiving the next IN packet from the USB host, the host-side state machine 101 transmits the same DATA packet to the USB host again.

In this case, the retransmission of the DATA packet is realized with the control of the read pointer in the FIFO 151. Alternatively, the retransmission may be realized by storing a start address in a RAM and the like. When the CRC-check circuit 131 is provided, it is possible to judge whether or not the DATA packet transmitted from the function-side controller 110 is correct, using the CRC-check circuit 131. This makes it possible to implement such an arrangement that the retransmission is carried out only when the received DATA packet is judged as correct.

Referring to FIG. 12, the operation of the host-side state machine 101 of the host-side controller 150 of Embodiment 6 is described.

S1101 is a step for telling whether or not an IN packet has been supplied from the USB host. If the IN packet has been supplied, the operation goes on to S1102. If a packet other than the IN packet has been supplied, the operation returns to S1101.

S1102 is a step for transmitting the IN packet to the function-side controller 110. After the completion of the transmission of the IN packet, the operation goes on to S1103.

S1103 is a step for judging whether or not a DATA packet has been supplied from the function-side controller 110. If the DATA packet has been supplied, the operation goes on to S1105. If the DATA packet has not been supplied, the operation goes on to S1104.

S1104 is a step for transmitting a NAK packet to the USB host. After the completion of the transmission of the NAK packet, the operation goes on to S101.

S1105 is a step for transmitting the DATA packet to the USB host. After the transmission of the DATA packet, a timer starts and the operation goes on to S1106.

S1106 is a step for judging whether or not an ACK packet has been supplied from the USB host. If the ACK packet has been supplied, the operation goes on to S1107. If the ACK packet has not been supplied and a timeout occurs as a predetermined period of time has passed, the operation goes on to S1108.

S1107 is a step for transmitting the ACK packet to the USB function. After finishing the transmission of the ACK packet, the IN transaction finishes.

S1108 is a step for judging whether or not the IN packet has been supplied from the USB host. If the IN packet has been supplied, the operation goes on to S1105. If a packet other than the IN packet has been supplied, the operation goes on to S1108.

The state machine of the host-side controller 150 operates in this manner, making it possible to retransmit the DATA packet even if a data error occurs between the USB host and the host-side controller 150, on the occasion of supplying the DATA packet from the host-side controller 150 to the USB host.

Embodiment 7

Figure 13:
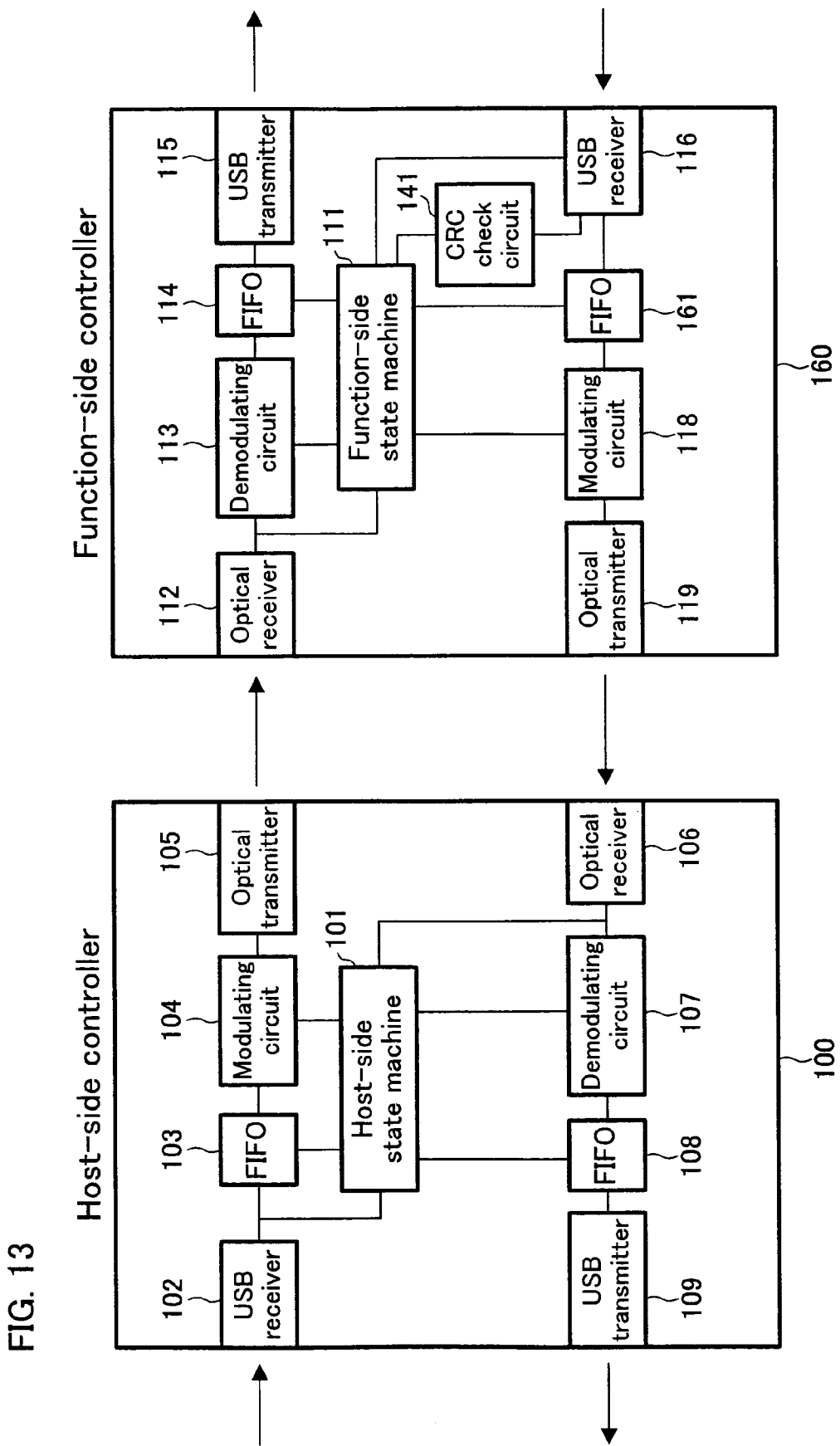
FIG. 13 is a block diagram showing a substantial part of a two-way transmission system of Embodiment 7.
Figure 14:
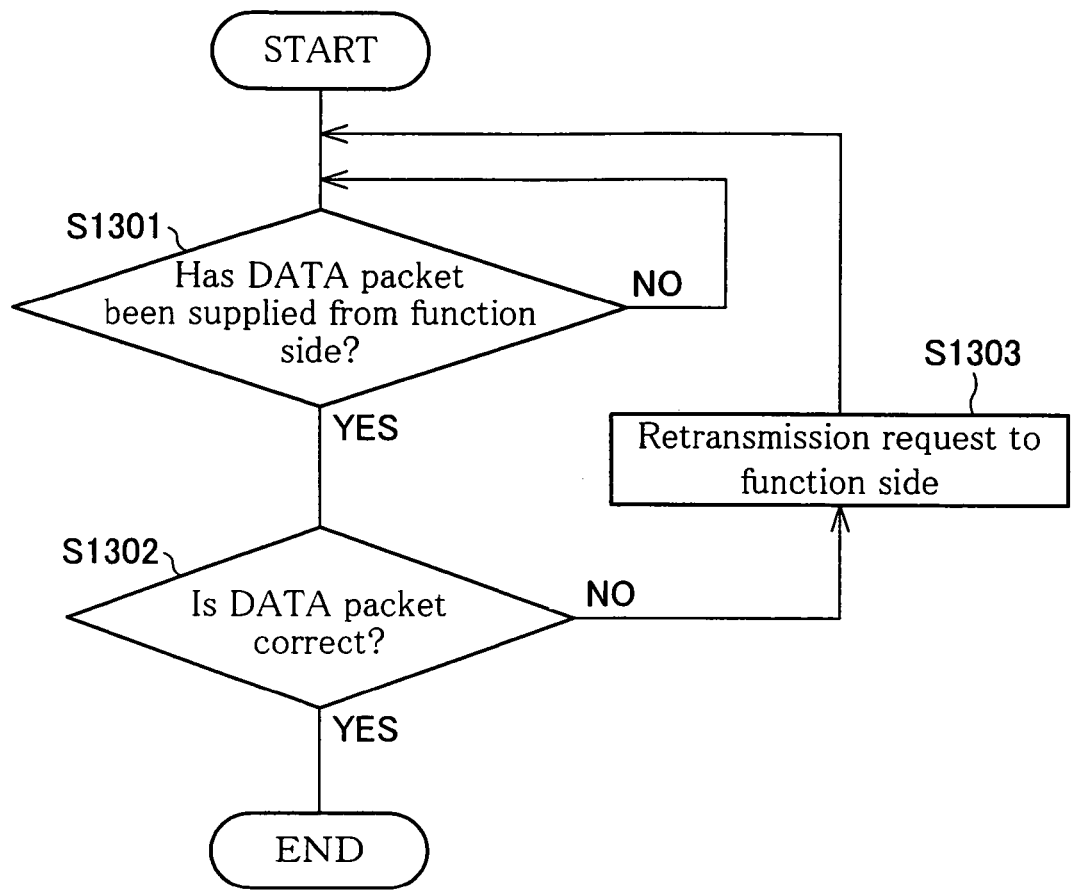
FIG. 14 is a flow chart showing the operation of a state machine of a host-side controller of the two-way transmission system of Embodiment 7.
Figure 15:
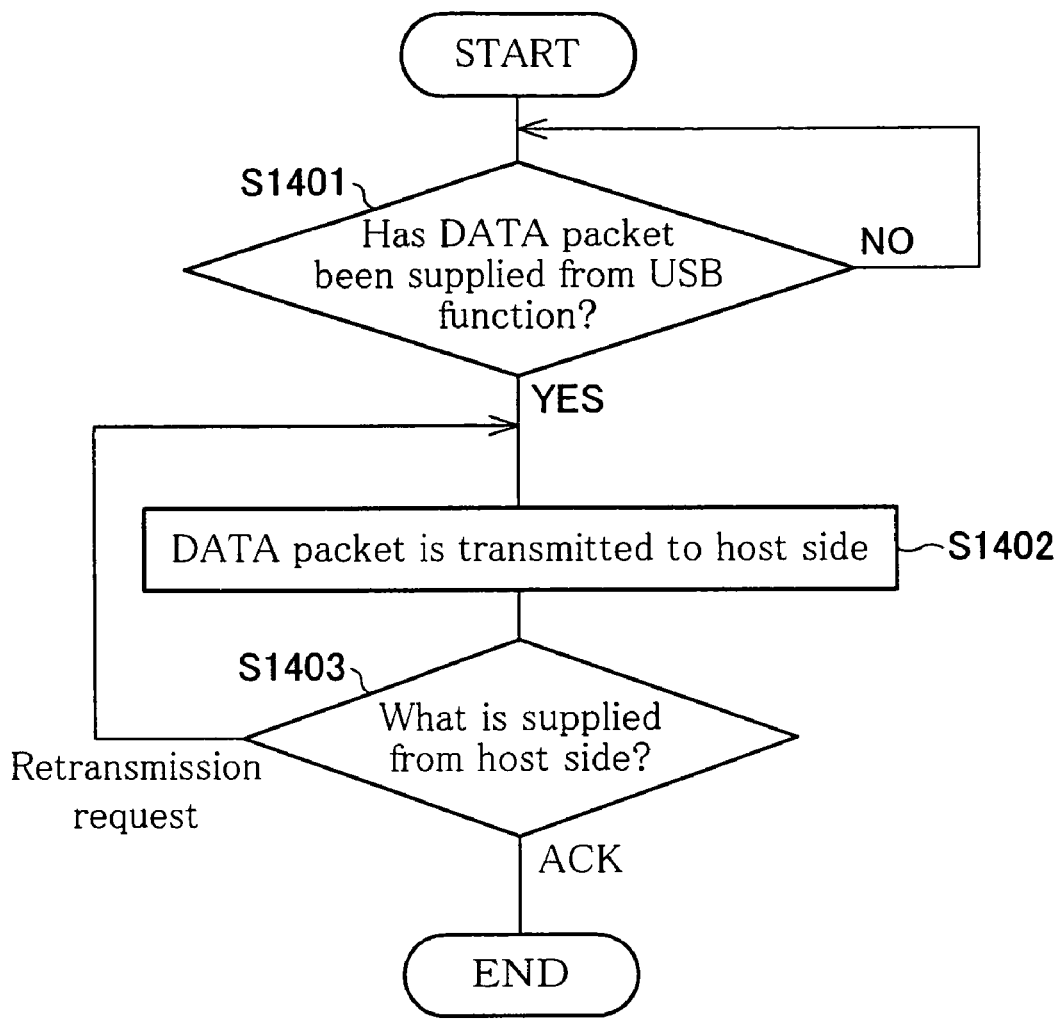
FIG. 15 is a flow chart showing the operation of a state machine of a function-side controller of the two-way transmission system of Embodiment 7.

The following will discuss still another embodiment of the present invention in reference to FIGS. 13 through 15.

FIG. 13 outlines a two-way transmission system of Embodiment 7. The two-way-transmission system shown in FIG. 13 is made up of a host-side controller 100 and a function-side controller 160. The function-side controller 160 includes: a function-side state machine 111; an optical receiver 112; a demodulating circuit 113; a FIFO 114; a USB transmitter 115; a USB receiver 116; a FIFO 161; a modulating circuit 118; an optical transmitter 119; and a CRC-check circuit 141. Apart from the FIFO 161, the components of the function-side controller 160 have same arrangements and features as those of the function-side controller 140 shown in FIG. 10, so that the descriptions thereof are omitted. Furthermore, the host-side controller 100 in FIG. 13 is identical with the host-side controller 100 shown in FIG. 1, so that the descriptions thereof are also omitted.

Upon the receipt of a DATA packet from the USB function, the function-side controller 160 causes the function-side state machine 111 to write the received DATA packet into the FIFO 161. The DATA packet is subjected to, for instance, 8B10B modulation by the modulating circuit 118, and is supplied to the host-side controller 100.

The FIFO 161 is holding a predetermined value of a read pointer, at the time of transmitting the DATA packet. When the function-side state machine 111 receives a retransmission request from the host-side controller 100, the function-side state machine 111 sets the read pointer to the aforesaid predetermined value, and transmits the same DATA packet to the host-side controller 100 again.

In this case, the retransmission of the DATA packet is realized with the control of the read pointer in the FIFO 161. Alternatively, the retransmission may be realized by storing a start address in a RAM and the like. When the CRC-check circuit 141 is provided, it is possible to judge whether or not the DATA packet transmitted from the USB function is correct, using the CRC-check circuit 141. This makes it possible to implement such an arrangement that the retransmission is carried out only when the received DATA packet is judged as correct.

Referring to FIG. 14, the operation of the host-side state machine 101 of the host-side controller 100 of Embodiment 7 is described. Note that, this host-side state machine 101 regarding the retransmission may be included in the state machine of the host-side controller 100 illustrated in Embodiment 1 or 2, or may be independently provided.

S1301 is a step for telling whether or not a packet transmitted from the function-side controller 160 is a DATA packet. If the packet is the DATA packet, the operation goes on to S1302. If the packet is not the DATA packet, the operation returns to S1301.

S1302 is a step for judging if the received DATA packet includes an error. If no error is included, the operation finishes without requesting the retransmission. If the DATA packet includes an error, the operation goes on to S1303.

S1303 is a step for requesting the function-side controller 160 to retransmit the DATA packet. After the completion of the retransmission request, the operation returns to S1301.

With the operation above, when an error occurs in the DATA packet on the communication path between the host-side controller 100 and the function-side controller 160, the host-side controller 100 can notify the function-side controller 160 of the occurrence of the error.

Now, referring to FIG. 15, the operation of the function-side state machine 111 of the function-side controller 160 of Embodiment 7 is described. Note that, this function-side state machine 111 regarding the retransmission may be included in the state machine of the function-side controller 160 illustrated in Embodiment 1 or 2, or may be independently provided.

S1401 is a step for telling whether or not a packet supplied from the USB function is a DATA packet. If the packet is the DATA packet, the operation goes on to S1402. If the packet is not the DATA packet, the operation returns to S1401.

S1402 is a step for transmitting the DATA packet to the host-side controller 100. After the completion of the transmission of the DATA packet, the operation goes on to S1403.

S1403 is a step for identifying a signal supplied from the host-side controller 100. If the signal is a retransmission request, the operation goes on to S1402. If the signal is an ACK packet, the operation finishes without carrying out the retransmission.

With this operation, the retransmission is realized in such a manner that the function-side controller 160 performs, for instance, reconfiguration of the read pointer in the FIFO 161 in reference to the retransmission request from the host-side controller 100.

Upon the receipt of the retransmission request from the host-side controller 100, the function-side controller 160 may transmit the DATA packet, which has been transmitted to the function-side controller 160 as a response to the transmission of the IN packet to the USB function, to the USB host.

Embodiment 8

Figure 16:
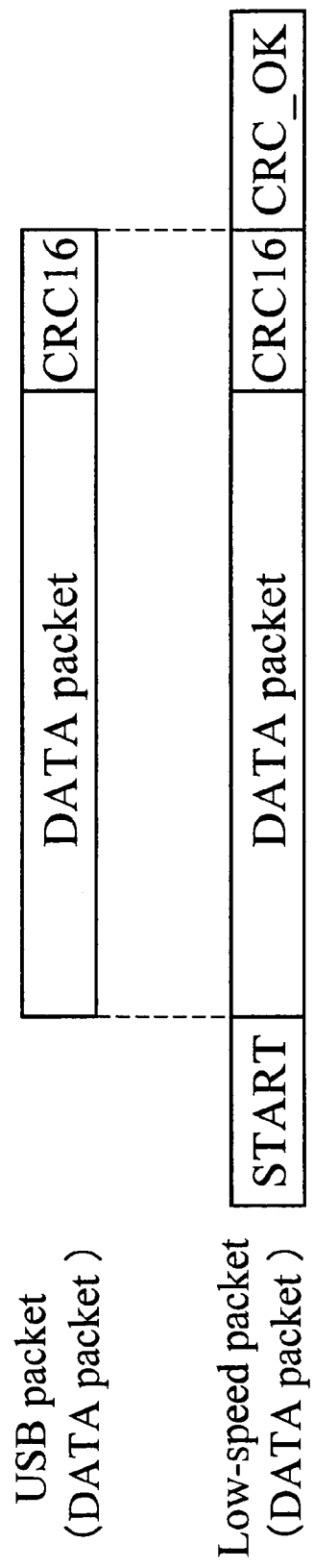
FIG. 16 illustrates a USB packet and a packet format in a low-speed communication path of Embodiment 8.

The following will discuss still another embodiment of the present invention in reference to FIG. 16.

FIG. 16 shows a packet format concerning Embodiment 8. In this figure, a USB packet is a packet format of a data packet exchanged at a transfer rate defined by USB standard, while a low-speed packet is a packet format designed for a low-speed communication path. In other words, the low-speed packet is a packet format used when a function-side controller transmits a DATA packet to a host-side controller.

As shown in FIG. 16, the low-speed packet is arranged such that a CRC_OK field is provided after a CRC 16 of a USB packet. If a DATA packet in the function-side controller has no error, a value indicating the absence of an error is entered in the CRC_OK field (i.e. a flag indicating the absence of an error is set). If the DATA packet has an error, a value indicating the presence of an error is entered in the CRC_OK field. Subsequently, this DATA packet is supplied to the host-side controller. With this, it is possible to notify the host-side controller of information regarding whether or not the DATA packet in the function-side controller is re-transmittable. The host-side controller checks the CRC_OK field so that the host-side controller can decide whether or not a retransmission request to the function-side controller is carried out, when it is judged that the received DATA packet includes an error.

Embodiment 9

The following will discuss still another embodiment of the present invention in reference to FIGS. 17-20.

Figure 17:
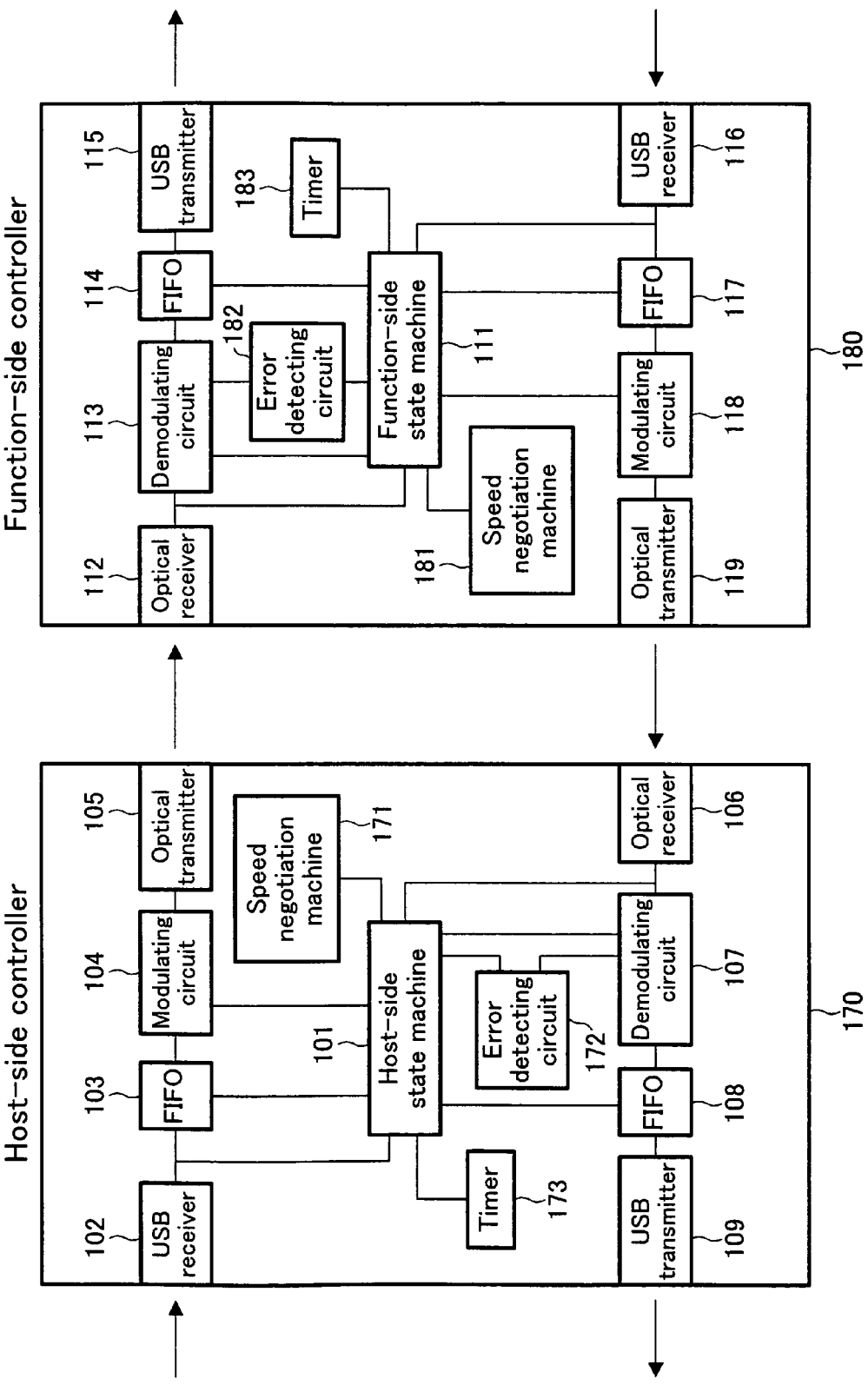
FIG. 17 is a block diagram showing a substantial part of a two-way transmission system of Embodiment 9.

FIG. 17 outlines a two-way transmission system of Embodiment 9. The two-way transmission system shown in FIG. 17 is made up of a host-side controller 170 and a function-side controller 180. The host-side controller 170 includes: a host-side state machine 101; a USB receiver 102; a FIFO 103; a modulating circuit 104; an optical transmitter 105; an optical receiver 106; a demodulating circuit 107; a FIFO 108; a USB transmitter 109; a speed negotiation state machine 171; an error detecting circuit 172; and a timer 173. Apart from the speed negotiation state machine 171 and the error detecting circuit 172, the components of the host-side controller 170 have same arrangements and features as those of the host-side controller 100 shown in FIG. 1, so that the descriptions thereof are omitted. In the meanwhile, the function-side controller 180 includes: a function-side state machine 111; an optical receiver 112; a demodulating circuit 113; a FIFO 114; a USB transmitter 115; a USB receiver 116; a FIFO 117; a modulating circuit 118; an optical transmitter 119; a speed negotiation state machine 181; an error detecting circuit 182; and a timer 183. Apart from the speed negotiation state machine 181 and the error detecting circuit 182, the components of the function-side controller 180 have same arrangements and features as those of the function-side controller 110 shown in FIG. 1, so that the descriptions thereof are omitted.

The speed negotiation state machines 171 and 181 are provided for selecting one transfer rate from a plurality of transfer rates, by performing speed negotiation (transfer rate adjustment) between the host-side controller 170 and the function-side controller 180. The error detecting circuits 172 and 182 detect an error on the low-speed communication path (in FIG. 17, the optical communication path between the host and function). Note that, the speed negotiation is performed before the IN transaction.

Figure 18:
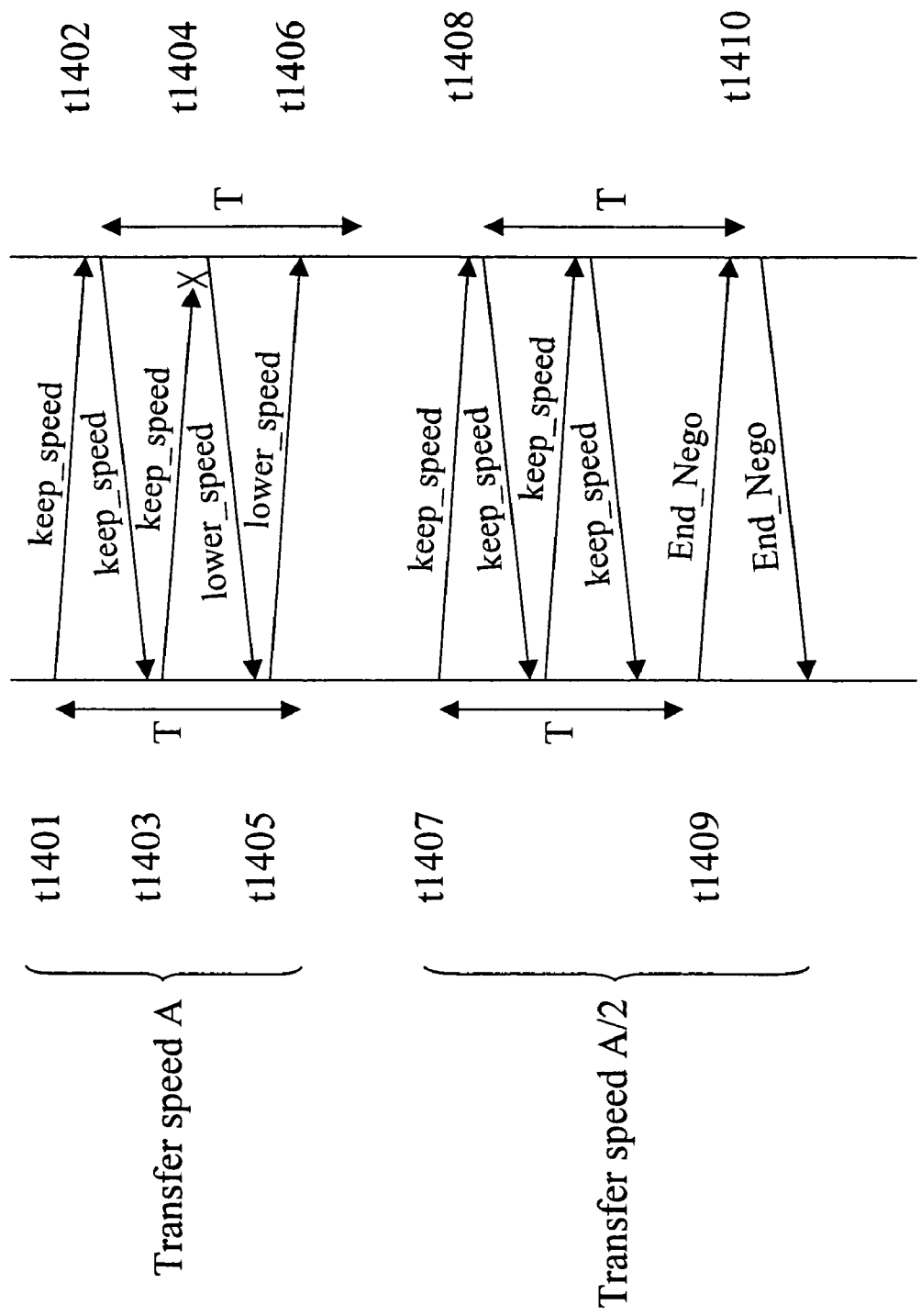
FIG. 18 is a timing chart illustrating a speed negotiation process in Embodiments 9 and 18.

How the speed negotiation is performed is described in reference to FIG. 18. Note that, the present invention is not limited to a protocol of the speed negotiation shown in FIG. 18.

The speed negotiation state machine 171 of the host-side controller 170 starts, at a timing t1401, the transmission of a keep_speed signal at a predetermined transfer rate A, and starts the timer concurrently with the transmission of the keep_speed signal. This keep_speed signal is one of transmission codes (request signals) for determining the transfer rate, and requests the function-side controller 180 to keep a current transfer rate.

Meanwhile, when, on account of a signal-detect signal, the function-side controller 180 recognizes the receipt of the keep_speed signal, the function-side controller 180 starts the timer at a timing t1402, and also starts the transmission of the keep_speed signal to the host-side controller 170.

Each of the host-side controller 170 and the function-side controller 180 keeps transmitting a particular transmission code, during a predetermined period T.

If, on the optical communication path, a bit error occurs in the keep_speed signal outputted from the host-side controller 170 at a timing t1403 so that the function-side controller 180 cannot properly receive the keep_speed signal, the function-side controller 180 supplies, at a timing t1404, a lower_speed signal to the host-side controller 170, in place of the keep_speed signal. This lower_speed signal is one of the request signals for determining the transfer rate, and requests a receiving end (host-side controller 170) to lower the transfer rate.

Receiving the lower_speed signal from the function-side controller 180, the host-side controller 170 recognizes that, at a current transfer rate A, the function-side controller 180 cannot properly carry out the receipt. The host-side controller 170 then transmits the lower_speed signal to the function-side controller 180. (At a timing t1405, the transmission code is switched to lower_speed.)

The function-side controller 180 receives, at a timing t1406, the lower_speed signal from the host-side controller 170, so as to judge that the lower_speed signal supplied from the function-side controller 180 has been recognized by the host-side controller 170.

After the predetermined period T has passed in each of the host-side controller 170 and the function-side controller 180, the host-side controller 170 and the function-side controller 180 lower the transfer rate to half (A/2), because a signal transmitted at this moment is the lower_speed signal.

That is to say, the host-side controller 170 starts, at a timing t1407, the transmission of the keep_speed signal at a transfer rate A/2, and simultaneously re-starts the timer. In the meanwhile, the function-side controller 180 also starts, at a timing t1408, the transmission of the keep_speed signal at the transfer rate A/2, and simultaneously re-starts the timer.

If, during the predetermined period T, no error is detected by both the host-side controller 170 and the function-side controller 180, the host-side controller 170 and the function-side controller 180 start to transmit an End_Nego signal (end request) which indicates the end of the speed negotiation, at a timing t1409 and a timing t1410, respectively. Then each of the host-side controller 170 and the function-side controller 180 terminates the speed negotiation and changes to an active state, when the End_Nego signal is supplied from the counterpart.

Figure 19:
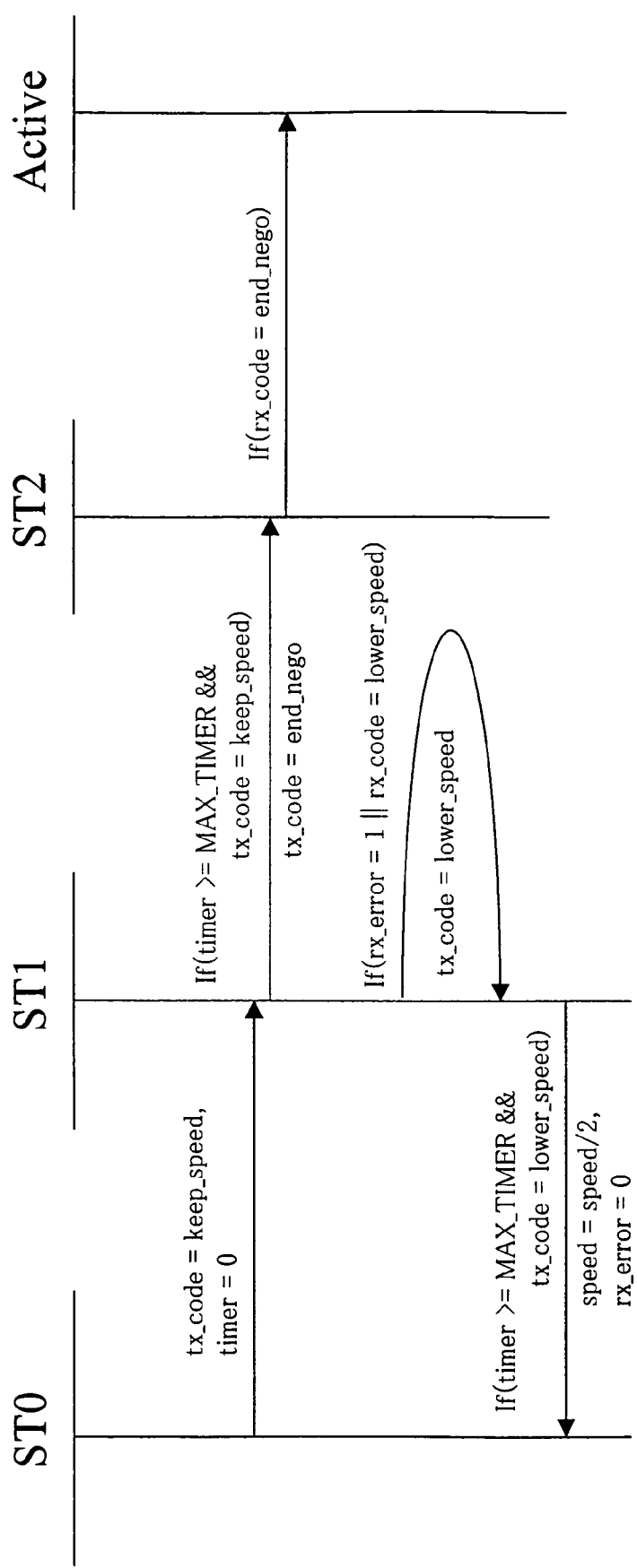
FIG. 19 is a timing chart showing the operation of a speed negotiation state machine (SNSM) of a host-side controller of the two-way transmission system of Embodiments 9, 18, and 19.

Referring to FIG. 19, the operation of the speed negotiation state machine 171 of the host-side controller 170 is described.

A state ST0 is a state for starting the speed negotiation. In this state, the speed negotiation state machine 171 sets the transmission code to the keep_speed signal, restarts the timer, and then changes to a state ST1.

The state ST1 is a state for carrying out the speed negotiation. In this state, the speed negotiation state machine 171 switches the transmission code to lower_speed, if the received code includes an error or the lower_speed signal is supplied from the counterpart (function-side controller 180).

After the predetermined period T has passed, the speed negotiation state machine 171 changes to the state ST0 if the transmission code is the lower_speed signal, or changes to a state ST2 if the transmission code is the keep_speed.

In the case of the transition to the state STO, the current transfer rate is, for instance, reduced to half. (The degree of the reduction of the transfer rate can be arbitrarily set by the user, and the degree of the reduction is recorded in the speed negotiation state machine 171 in advance.) Meanwhile, in the case of the transition to the state ST2, the transmission code is switched to the End_Nego signal. This state ST2 is a state for confirming the end of the speed negotiation. Receiving the End_Nego signal from the counterpart (function-side controller 180), the speed negotiation state machine 171 terminates the speed negotiation and changes to an active state.

Figure 20:
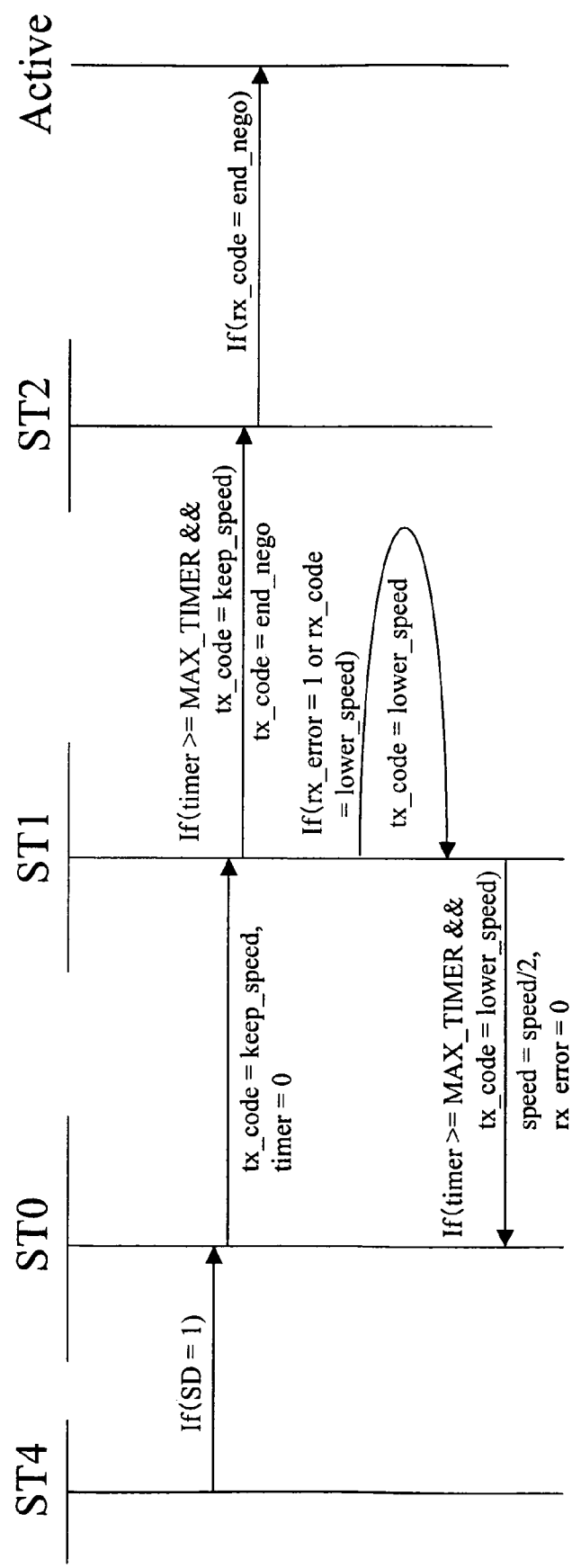
FIG. 20 is a timing chart showing the operation of a speed negotiation state machine (SNSM) of a function (device) -side controller of the two-way transmission system of Embodiments 9, 18, and 19.

Referring to FIG. 20, the operation of the speed negotiation state machine 181 of the function-side controller 180 is described.

The operations in states ST0, ST1, and ST2 are identical with those of the speed negotiation state machine 171.

A state ST4 before the state ST0 is a state for judging whether or not a request signal has been supplied from the host-side controller 170. If a signal-detect signal is supplied from the optical receiver 112 (or another received signal detecting circuit), the speed negotiation state machine 181 changes to the state ST0.

The aforementioned state machines are made up of the host-side controller 170 and the function-side controller 180, respectively, so that a transfer rate can be selected from a plurality of transfer rates.

The error detecting circuits 172 and 182 detect a bit error on the optical communication path between the host and function. More specifically, for instance, a table is referred to on the occasion of the 8B10B demodulation, and the receipt of a character not on the table is recognized as an error. The error is not specifically defined here.

When the active state starts after the end of the speed negotiation, the number of errors (i.e. error rate) in a predetermined period of time can be measured according to the number of errors obtained by the error detecting circuits 172 and 182 and the values of the timers 173 and 183. When the error rate is higher than a predetermined value, it is determined that the quality of the communication path is deteriorated (for example, the communication distance between a mobile device and a PC (Personal Computer) has changed). In this case, the communication at a current transfer rate is relinquished, the speed negotiation is carried out again, and a transfer rate at which the communication is properly done is determined, and then the IN transaction is carried out. In this manner, proper data transmission is realized.

The present embodiment assumes that the transfer rate on the optical communication path between the host and function is lower than the native rate of USB. However, it may be possible in future to adopt communication means which realizes data transmission at the native rate of USB on the optical communication path between the host and function, if a cheap and high-speed optical transceiver becomes available. In such a case, at first the speed negotiation is carried out at a rate equivalent to the native rate of USB (600 Mbps in the case of 8B10B modulation). If the error rate is not bad, fully-optical communication under USB 2.0 is realized by carrying out normal repeating instead of the packet control by the state machine of the present invention. This can prevent the slowdown of the data transfer rate.

If the communication cannot be properly carried out at 600 Mbps, the transfer rate is lowered and the packet control is carried out by the state machine of the present invention, so that the IN transaction is realized. In other words, the most efficient packet transfer is realized by turning on/off the packet control by the state machine in accordance with the result of the speed negotiation.

In Embodiments 1-9, it is assumed that the communication rate between the host and function is lower than the native rate of USB, so that, if a conventional transmission method is adopted, the communication cannot be finished before the time limit defined by USB standard. However, even if the communication rate between the host and function is as fast as the native rate of USB, the turn-around time is long when the communication path between the host and function is very long (e.g. an optical fiber which is several hundred meters long), so that the IN transaction may not be finished before the time limit. This is because the USB standard defines the maximum turn-around time in accordance with the repeating time for the stages (6 at the maximum) of a USB hub and the length of a USB cable (5 meters at the maximum). The transmission method of the present invention is also useful for such a case that the communication path between the host and function is very long as above, so that, when a conventional transmission method is adopted, the communication cannot be finished before the time limit defined by USB standard.

Embodiments 1-9 have been discussed on the premise of adopting USB 2.0. Under USB 2.0, the features on the host side and the features on the function side are both fixed. That is to say, data exchange under USB 2.0 is performed on condition that devices (e.g. digital camera and printer) which are USB functions are connected to a PC which is a USB host.

In recent years, a standard termed USB-OTG (USB-On-The-Go) has been developed. Under this standard, a PC (USB host) which has been required in a conventional USB system is no longer necessary. That is to say, USB-OTG is so convenient that two-way data transmission between USB devices is realized without a PC (USB host). Under USB-OTG, a device operates as a USB host or a USB function, according to the type of a connector of a cable connected to the device.

As in USB 2.0, USB-OTG supports three types of transfer rate: LS (1.5 Mbps); FS (12 Mbps); and HS (480 Mbps). A USB-OTG-compliant device can operate both as a USB host and a USB function. Under USB-OTG, a new type of connector termed miniAB is available. To a miniAB connector, both a cable with a miniA plug and a cable with a MiniB plug can be connected. As described above, a device can operate as a USB host or a USB function, according to the type of a connector of a cable connected to the device. The device operates as a USB host when a miniA plug is connected thereto, while the device operates as a USB function when a miniB plug is connected thereto. Furthermore, USB-OTG supports such a new feature that a host and a function which are connected with each other via a cable can actively swap roles, on ground of a new protocol termed HNP (Host Negotiation Protocol). In other words, under USB-OTG, to which type a device to be connected is assigned, USB host or USB function, is determined in accordance with the type of a connector of a cable or HNP defined in USB-OTG.

Figure 21:
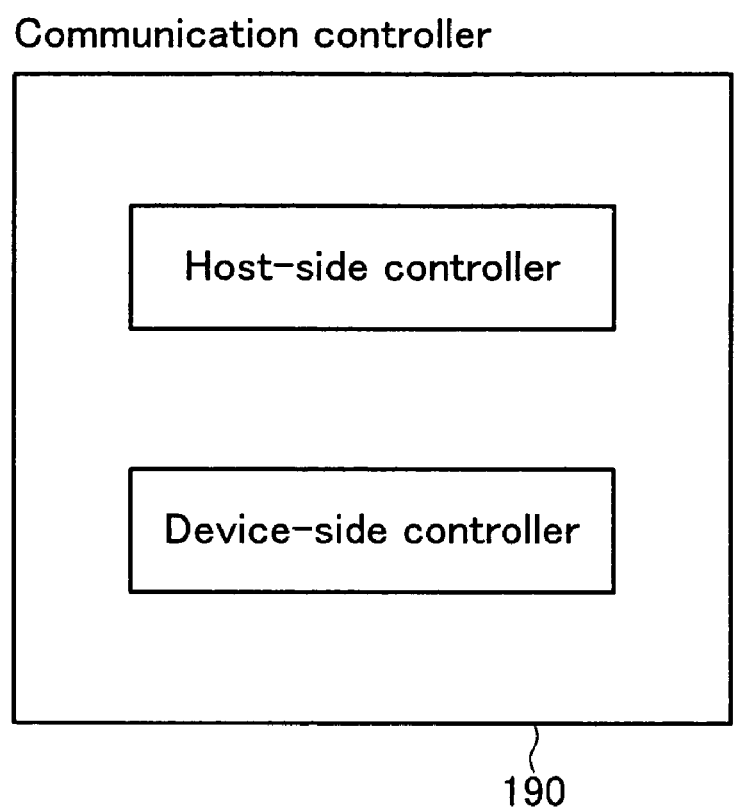
FIG. 21 illustrates a communication controller which has a function of a host-side controller and a function of a device-side controller.

That is, when the present invention is applied to USB-OTG, the roles of USB host and USB function are not fixed, so that the roles may be swapped in accordance with the direction of data to be transmitted. Also, the roles of host-side controller and function-side controller are not fixed, so that the roles may be swapped in accordance with the direction of data to be transmitted. Therefore, for instance, as shown in FIG. 21, it is preferable that one communication controller 190 can perform both as the host-side controller and the function-side controller. To realize this, a state machine of each controller includes a program which allows the controller to operate as both the host-side controller and the function-side controller.

In Embodiments 1-9, the communication between the host-side controller and the function-side controller is full-duplex. This makes it possible to do away with a preamble necessary for a half-duplex communication between the host and function, thereby improving the efficiency of the communication path. As a matter: of course, no problem occurs when a system is constructed with a half-duplex communication.

As described in the foregoing embodiments, in the two-way transmission system of the present invention, even when the data transmission among a USB host, a host-side controller, a function-side controller, and a USB function is carried out at a rate (e.g. 100 Mbps) which is lower than the USB native rate, the overall transfer rate may be, in some cases, as fast as the transfer rate in the case of data transfer between a USB host and a USB function at the USB native rate (480 Mbps).

For instance, when successively carrying out the IN transactions, time intervals between the IN transactions in the case of adopting a device with low-speed data transfer (50 Mbps), such as a flash memory, are longer than the time intervals in the case of adopting a device with high-speed data transfer (about 200 Mbps), such as a HDD. In other words, the time intervals between the transactions are short when a device with a high-speed data transfer is adopted. Meanwhile, the time intervals between the transactions are long when a device with a low-speed data transfer is adopted.

Therefore, when the IN transactions are carried out in accordance with the method of the present invention, the time required for one IN transaction is longer than the time required for one IN transaction in the data transfer between the host and function at the USB native transfer rate. However, provided that one IN transaction in accordance with the method of the present invention finishes during the time interval between the transactions, the start time of the next IN transaction does not fall behind the start time of the IN transaction in the case of the USB native rate. In other words, the overall transfer rate in the case of adopting a low-speed communication path between the host and function is similar to the overall transfer rate in the case of the communication at the USB native rate.

To realize fully-optical communication under USB 2.0, an optical transceiver with a bandwidth of 480×10/8=600 Mbps is required, when a 8B10B modulation method is adopted. An optical transceiver including an LD (Laser Diode) can fulfill the condition above. Meanwhile, when communications under USB 2.0 on a low-speed communication path are realized by the present invention, if the low-speed communication path is 100 Mbps, an optical transceiver including an LED (Light-Emitting Diode) can fulfill this condition. Since LEDs are significantly cheaper than LDs, the present invention makes it possible to reduce the costs for the optical transceiver.

Furthermore, with regard to the controller, when the host-side controller is integrated with the USB host so that metal ports are eliminated and the USB host includes only optical ports, a bandwidth required by the controller is significantly lowered from 600 Mbps to 100 Mbps. This indicates that the arrangement above makes it possible to manufacture the controller by an inexpensive manufacturing process. For this reason, the present invention contributes to the cost reduction.

In this manner, the cost reduction is realized by the present invention when a low-speed device is adopted. It is considered that the present invention is effective for a low-speed device such as a mobile phone including a flash memory and digital camera.

In the two-way transmission system in Embodiments 1-9, when the host-side controller 100 recognizes the receipt of the IN packet from the USB host, the host-side controller 100 transfers the IN packet to the function-side controller 110, and receives the DATA packet from the function side. The received DATA packet is temporarily stored in the FIFO 108. On the receipt of the IN packet from the USB host again, the DATA packet stored in the FIFO 108 is transmitted to the USB host.

With this two-way transmission system, the data transfer by the IN transaction under USB 2.0 is successfully carried out even when, between the host and function, a communication path whose transfer rate is lower than the native rate of USB 2.0 is adopted.

The present invention described in reference to Embodiments 1-9 provides a two-way transmission system which allows an IN transaction to be properly performed without taking into consideration of a turn-around time, even if the transfer rate between the host and function is slow. This kind of two-way transmission system can be used for various types of communication equipments conducting data communications under USB standard.

Embodiment 10

The following will discuss an embodiment of the present invention in reference to FIGS. 22-25 and FIG. 7.

Figure 22:
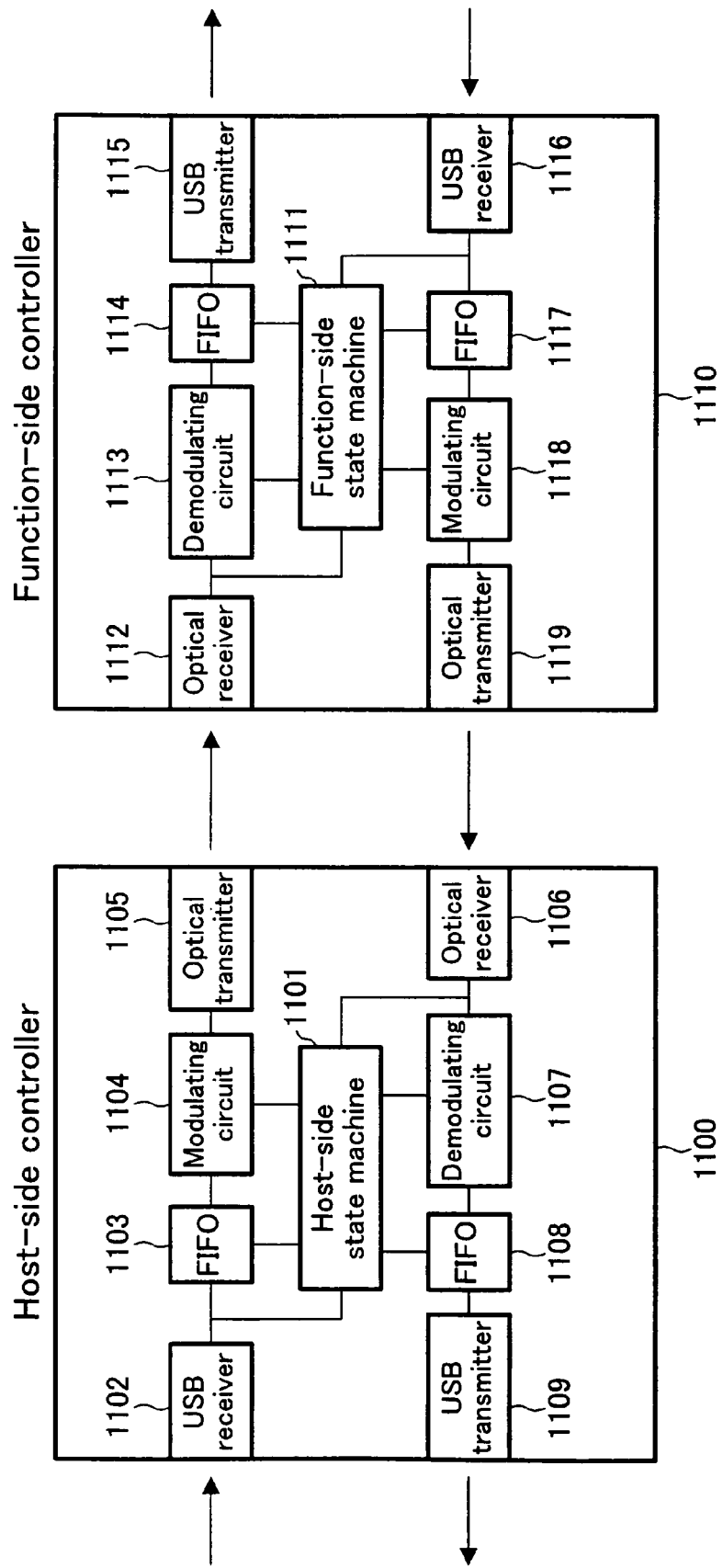
FIG. 22 relates to an embodiment of the present invention and is a block diagram showing a substantial part of a two-way transmission system of Embodiment 10.

FIG. 22 outlines a two-way transmission system (communication system) of Embodiment 10. The two-way transmission system shown in FIG. 22 is made up of a host-side controller 1100 and a function-side controller 1110. The communications between a USB host (host device) and a USB function (function device) are performed between the host-side controller 1100 on the USB host side and the function-side controller 1110 on the USB function side.

The communications between the host-side controller 1100 and the function-side controller 1110 shown in FIG. 22 are performed by optical communication means. The transfer rate of this optical communication means is identical with or lower than the transfer rate defined by the USB standard.

Upon the receipt of a signal from the USB host, the host-side controller 1100 transmits this signal to the function-side controller 1110, while upon the receipt of a signal form the function-side controller 1110, the host-side controller 1100 transmits the signal to the USB host. Apart from the connection with the USB host via a USB cable, the host-side controller 1100 may be connected to a downstream port of a USB hub via a USB cable. Furthermore, the host-side controller 1100 may be a part of the USB host or the USB hub.

Upon the receipt of a signal from the host-side controller 1100, the function-side controller 1110 transmits the signal to the USB function, while upon the receipt of a signal from the USB function, the function-side controller 1110 transmits the signal to the host-side controller 1100. Apart from the connection with the USB function via a USB cable, the function-side controller 1110 may be connected to an upstream port of a USB hub via a USB cable. Furthermore, the function-side controller 1110 may be a part of the USB host or the USB hub.

The following will describe components of the host-side controller 1100 and the function-side controller 1110.

The host-side controller 1100 includes: a host-side state machine 1101; a USB receiver 1102; a FIFO 1103; a modulating circuit 1104; an optical transmitter 1105; an optical receiver 1106; a demodulating circuit 1107; a FIFO (storage means) 1108; and a USB transmitter 109. The function-side controller 1110 includes: a function-side state machine (re-transmission request means) 111 1; an optical receiver 1112; a demodulating circuit 1113; a FIFO 1114; a USB transmitter 1115; a USB receiver 1116; a FIFO 1117; a modulating circuit 1118; and an optical transmitter 1119. The host-side state machine 1101 corresponds to receipt acknowledgement means, storage acknowledgement means, and transmission control means recited in claims.

In the host-side controller 1100, a USB signal supplied from the USB host to the USB receiver 1102 is subjected to a signal analysis and a packet analysis by the host-side state machine 1101, and a packet of the signal is stored in the FIFO 1103. Since the rate of the communication path between the host-side controller 1100 and the function-side controller 1110 is identical with or lower than the rate of the USB communication path, the FIFO 1103 adjusts a timing at which the packet is transferred to the communication path between the host-side controller 1100 and the function-side controller 1110.

If a packet supplied from the USB host to the host-side state machine 1101 is an OUT packet or a DATA packet, the packet is transferred to the function-side controller 1110. That is to say, when the host-side controller 1100 receives, from the USB host, a packet which is judged to be transferable, the host-side state machine 1101 notifies the modulating circuit 1104 of the transmission of the packet and the start of modulation. In response to this, the packet stored in the FIFO 1103 is modulated by the modulating circuit 1104, and transmitted toward the function-side controller 1110 by the optical transmitter 1105.

In the present embodiment, the communication path between the host-side controller 1100 and the function-side controller 1110 (hereinafter, between the host and function) is an optical communication path. On this account, the optical transmitter 1105 is, for instance, a light-emitting diode or a laser. Alternatively, the optical communication path may be a wired fiber-optic communication path or free-space communication. Adopting fiber optic realizes long-distance communications, while free-space communication is convenient because wiring is unnecessary.

When the communication path between the host and function is an optical communication path, the modulating circuit 1104 adopts a modulating method such as 8B10B. Besides, the communication path may be, for instance, a wireless communication path. In such a case, the modulating circuit 1104 can adopt a different modulating method. The communication between the host and function is either half-duplex or full-duplex. In the case of the full-duplex communication, the optical transmitter 1105 always emits light, so that it is unnecessary to add a preamble to a packet and hence the efficiency of the communication path is improved.

When the host-side controller 1100 initially receives, from the USB host, an OUT packet and a DATA packet, the host-side controller 1100 at this moment has not received an ACK packet from the function-side controller 1110. On this account, the host-side state machine 1101 transmits a NAK packet to the USB host, via the FIFO 1108 and the USB transmitter 109. With this, the host-side controller 1100 notifies the USB host of the failure of the USB function to process the DATA packet, thereby causing the USB host not to end the OUT transaction.

Meanwhile, an optical signal supplied from the host-side controller 1100 to the function-side controller 1110 is received by the optical receiver 1112 of the function-side controller 1110. Then the optical signal is subjected to, for instance, 8B10B demodulation by the demodulating circuit 1113, and subsequently the content of a packet of the optical signal is analyzed by the function-side state machine 1111. The optical receiver 1112 in this case is, for instance, a photodiode. However, the type of the optical receiver 1112 varies in accordance with the type of the communication path between the host and function. For instance, the optical receiver 1112 is a receiving antenna when the communication path is a wireless communication path. If the above-mentioned packet is identified as an OUT packet or DATA packet from the host-side controller 1100, the packet is stored in the FIFO 1114. After the completion of the receipt of a packet from the host-side controller 1100, the function-side state machine 1111 transmits the packet, as a USB signal, to the USB function via the USB transmitter 1115.

When the USB function receives the OUT packet and DATA packet from the USB transmitter 1115 of the function-side controller 1110, the USB function operates in one of the following manners, in accordance with the state on the occasion of the receipt.

If the DATA packet is properly received, the received DATA packet has no error, the processing of the DATA packet has been finished, and there is still an available end point, the USB function transmits an ACK packet to the function-side controller 1110. If the DATA packet is properly received, the received DATA packet has no error, the processing of the DATA packet has been finished, and there is no available end point, the USB function transmits a NYET packet to the function-side controller 1110. If the DATA packet is properly received and the received DATA packet has no error, but the processing of the DATA packet could not be performed because the USB function had no available end point, the USB function transmits a NAK packet to the function-side controller 1110. If the USB function cannot process the received packet (the USB function is in an abnormal state so that data transmission such as an IN transaction and an OUT transaction cannot be performed from then on), the USB function supplies a STALL packet to the function-side controller 1110. When the received DATA packet has an error, the USB function returns nothing to the function-side controller 1110.

The content of each of the ACK packet, NYET packet, the NAK packet, and the STALL packet received by the USB receiver 1116 of the function-side controller 1110 is analyzed by the function-side state machine 1111, and the packet is stored in the FIFO 1117. The packet is then subjected to, for instance, the 8B10B modulation by the modulating circuit 1118, and supplied, as an optical signal, to the host-side controller 1100 via. the optical transmitter 1119.

A signal received by the optical receiver 1106 of the host-side controller 1100 is subjected to the 8B10B demodulation by the demodulating circuit 1107. If the host-side state machine 1101 recognizes that the received signal is a handshake packet which is one of the ACK packet, the NYET packet, the NAK packet, and the STALL packet, the FIFO 1108 stores the packet.

As described above, to the USB host, the host-side controller 1100 returns the NAK packet in response to the initial transmission of the OUT packet and the DATA packet, the USB host has to re-transmit the OUT packet and the DATA packet to the host-side controller 1100. If, at the time of the receipt of the OUT packet and the DATA packet again by the USB receiver, the FIFO 1108 stores a handshake packet, the host-side controller 1100 transmits this handshake packet to the USB host.

When the host-side controller 1100 receives the OUT packet and the DATA packet from the USB host, even if no handshake packet has been supplied from the function-side controller 1110, the NAK packet is transmitted from the function-side controller 1110 to the USB host, regardless of the supply of the NAK packet from the function-side controller 1110 to the USB host.

The following is an example of the operation to allow the USB host to retransmit the OUT packet and the DATA packet to the host-side controller 1100, after the initial transmission of the OUT packet and the DATA packet.

That is to say, to the USB host, the host-side controller 1100 returns a NAK packet in response to the initial transmission of the OUT packet and the DATA packet. For this reason, in response to this NAK packet, the USB host transmits a PING packet to the host-side controller 1100. Then the host-side controller 1100 returns the ACK packet to the USB host, in response to the PING packet. Receiving this ACK packet, the USB host retransmits the OUT packet and the DATA packet to the host-side controller 1100.

Receiving the OUT packet and the DATA packet being retransmitted, the host-side controller 1100 transmits these packets to the USB host, if the host-side controller 1100 has been received a handshake packet from the function-side controller 1110 at the moment of the receipt of the OUT packet and the DATA packet. If the host-side controller 1100 has not received a handshake packet, the host-side controller 1100 transmits the NAK packet to the USB host again. Until the host-side controller 1100 receives a handshake packet from the function-side controller 1110, the process above is repeated.

As described above, the host-side controller 1100 stores the handshake packet (ACK packet, NYET packet, NAK packet, or STALL packet) in the FIFO 1108, the hand shake packet having been supplied in response to the OUT packet and the DATA packet initially supplied from the USB host. On the occasion of the retransmission of the OUT packet and the DATA packet from the USB host, the host-side controller 1100 transmits, to the USB host, the handshake packet stored in the FIFO 1108. With this, the handshake packet is surely transmitted to the USB host before the time limit without carrying out the communication between the host and function once again, even if the rate on the communication path between the USB host and the USB function is lower than the rate defined by the USB standard. For this reason, the OUT transaction is carried out with no problem.

Figure 23:
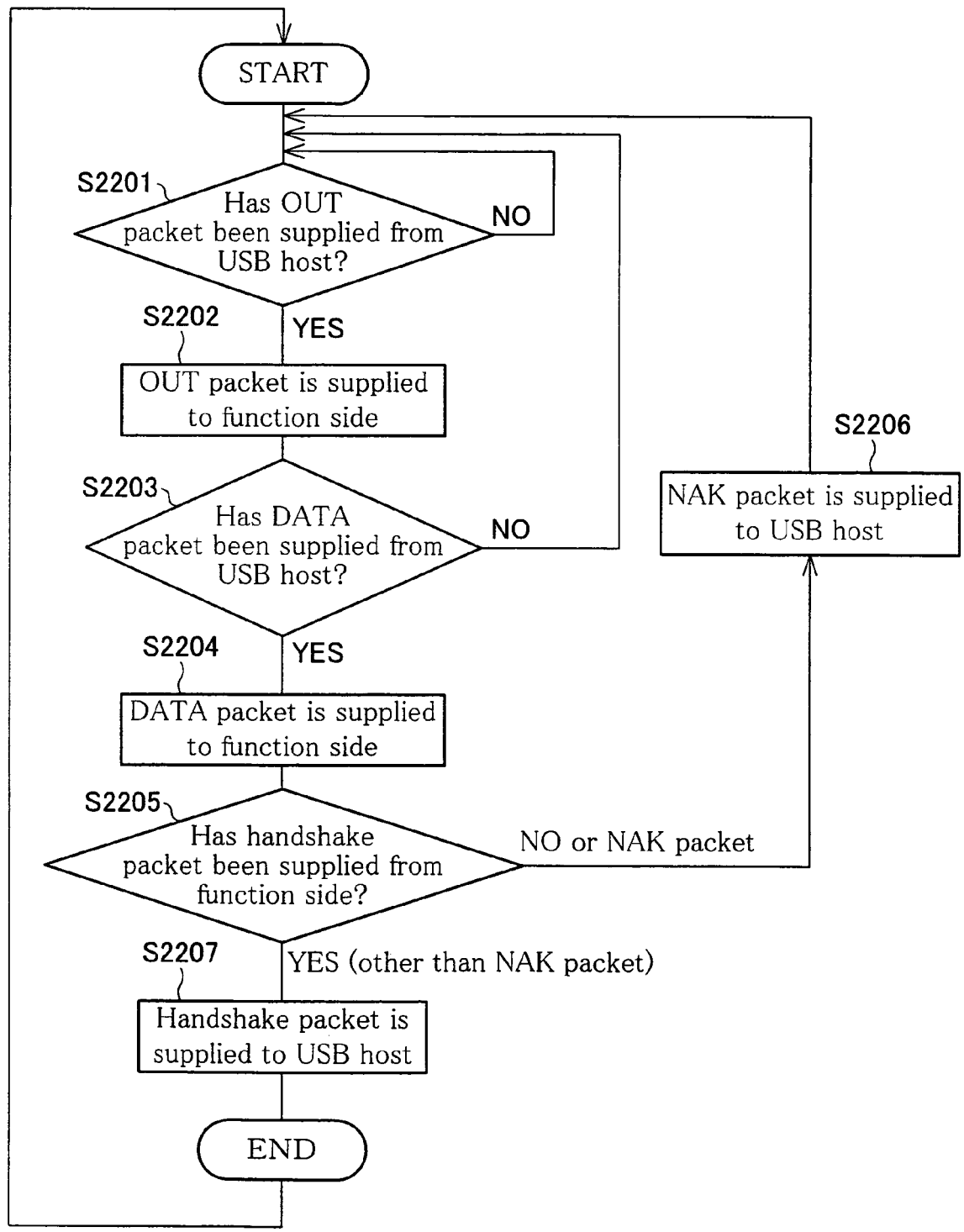
FIG. 23 is a flow chart illustrating the operation of a state machine of a host-side controller of the two-way transmission system of Embodiment 10.

Referring to FIG. 23, the operation of the host-side state machine 1101 of the host-side controller 1100 of Embodiment 10 is described.

S2201 is a step for telling whether or not an OUT packet has been supplied from the USB host. If the OUT packet has been supplied, the operation goes on to S2202. If a packet other than the OUT packet has been supplied, the operation returns to S2201.

S2202 is a step for transmitting the OUT packet to the function-side controller 1110. After finishing the transmission of the OUT packet, the operation goes on to S2203.

S2203 is a step for judging whether or not the DATA packet has been supplied. If the DATA packet has been supplied, the operation goes on to S2204. If a packet other than the DATA packet has been supplied, the operation returns to S2201. The operation returns to S2201 when a packet other than the DATA packet has been supplied, because, after receiving the OUT packet in S2201, the host-side state machine 1101 has to immediately receive the DATA packet, so that the receipt of a packet other than the DATA packet is judged as an abnormal operation.

S2204 is a step for transmitting the DATA packet to the function-side controller 1110. After the start of the transmission of the DATA packet, the operation goes on to S2205.

S2205 is a step for checking the presence of a handshake packet supplied from the function-side controller 1110, at the moment of the supply of the OUT packet and the DATA packet from the USB host. If any one of the ACK packet, the NYET packet, and the STALL packet has been supplied, the operation goes on to S2207. If the NAK packet has been supplied or nothing has been supplied, the operation goes on to S2206.

S2206 is a step for transmitting the NAK packet to the USB host. After finishing the transmission of the NAK packet, the operation goes on to S2201.

S2207 is a step for transmitting, to the USB host, the handshake packet (ACK packet, NYET packet, or STALL packet) having been supplied. After finishing the transmission, the OUT transaction finishes.

Note that, if the handshake packet supplied in S2207 is the NYET packet, the USB function can properly end the DATA packet of the OUT transaction of this time, but an end point is no longer available, so that, in the next OUT transaction, the DATA packet may not be processed at some timings. For this reason, in the case that the USB host receives the NYET packet, the following flow control is performed: The PING packet is initially transmitted in the next OUT transaction so that the availability of the end point of the USB function is checked, and then the OUT packet and the DATA packet are transmitted. With this, the OUT transaction properly finishes even if the handshake packet is the NYET packet.

Meanwhile, when the handshake packet supplied in S2297 is the STALL packet, it is indicated that the USB function is in an abnormal state for some reason. Therefore, when the USB host receives the STALL packet, the USB host recognizes that the USB function is in an abnormal state, so as to abort the OUT transaction. Subsequently, a packet for releasing the abnormal state is supplied from the USB host to the USB function, and the USB function is caused to be in a packet-transferable state. In other words, the OUT transaction may be forcibly terminated when the STALL packet is supplied.

Figure 24:
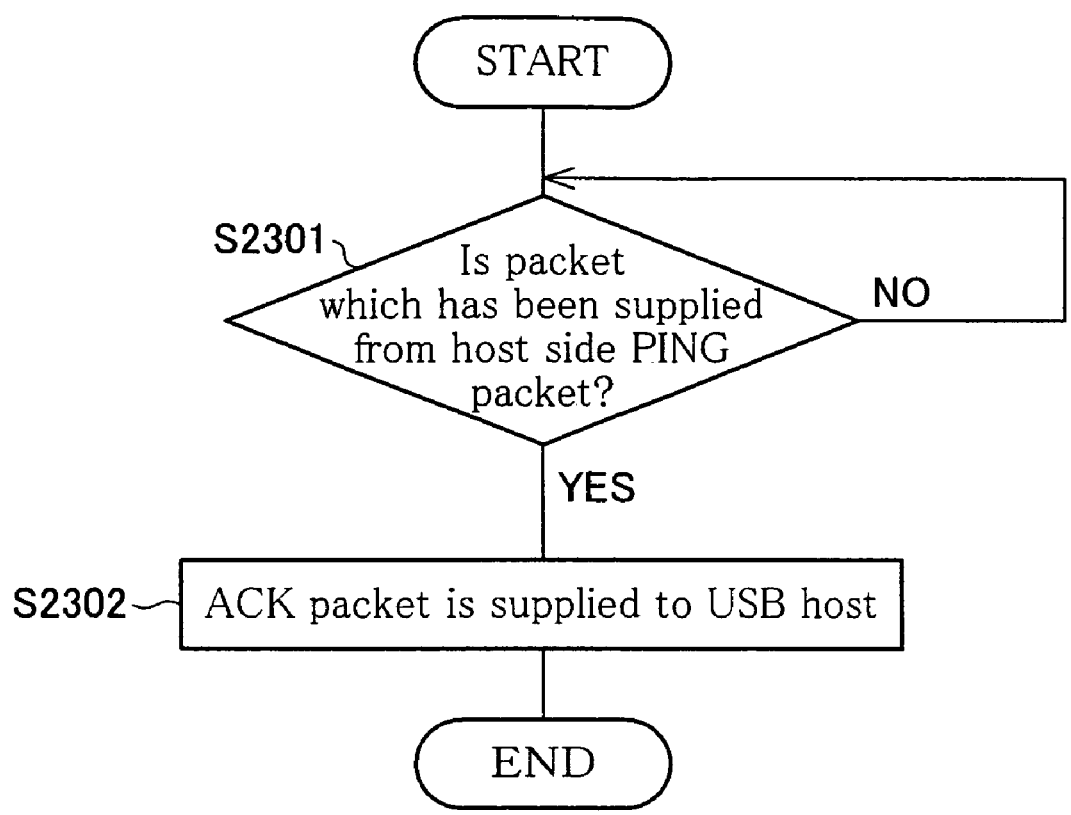
FIG. 24 is a flow chart illustrating the operation of the state machine of the host-side controller of the two-way transmission system of Embodiment 10, the operation relating to the receipt of a PING packet.

In S2206 shown in FIG. 23, when the host-side controller 1100 supplies the NAK packet to the USB host, the USB host either transmits the PING packet to the host-side controller 1100 or retransmits the OUT packet and the DATA packet. When the PING packet is transmitted, in the host-side controller 1100, the host-side state machine 1101 receiving the PING packet operates as shown in FIG. 24. Note that, the description regarding the operation of the state machine only relates to the transition of the state in connection to the PING packet. Thus, this state machine may be provided in the state machine for the OUT transaction shown in FIG. 23, or may be independently provided.

S2301 is a step for judging whether or not a packet supplied from the USB host is the PING packet. If the packet is the PING packet, the operation goes on to S2302. If the packet is not the PING packet, the operation returns to S2301.

S2302 is a step for transmitting an ACK packet to the USB host. After finishing the transmission of the ACK packet, the operation concerning the PING packet finishes. The received PING packet may be or may not be transmitted to the function-side controller.

Including the above-described state machine in the host-side controller 1100, it is possible to cause the USB host to retransmit the OUT packet and the DATA packet by constantly returning the ACK packet, even if the host-side controller 1100 receives the PING packet during the OUT transaction.

Figure 25:
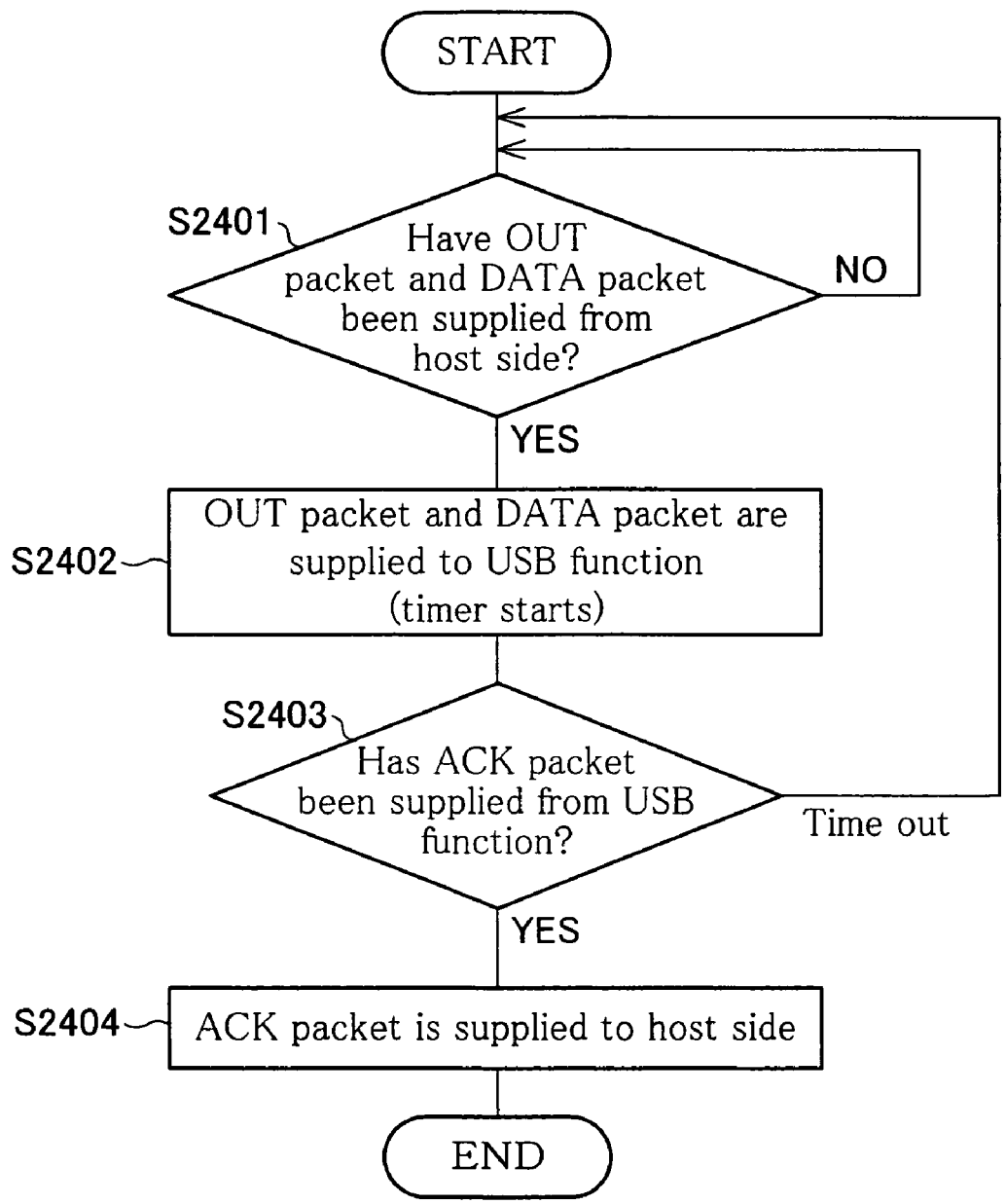
FIG. 25 is a flow chart showing the operation of a state machine of a function-side controller of the two-way transmission system of Embodiment 10.

Now, referring to FIG. 25, the operation of the function-side state machine 1111 of the function-side controller 1110 of Embodiment 10 is described.

S2401 is a step for telling whether or not packets supplied from the host-side controller 1100 are the OUT packet and the DATA packet. If the packets are the OUT packet and the DATA packet, the operation goes on to S2402. If the packets are not the OUT packet and the DATA packet, the operation returns to S2401.

S2402 is a step for transmitting the OUT packet and the DATA packet to the USB function. After finishing the transmission of the OUT packet and the DATA packet, the timer starts, and the operation goes on to S2403.

S2403 is a step for checking if a handshake packet (ACK packet, NYET packet, STALL packet, or NAK packet) has been supplied form the USB function. If the handshake packet has been supplied, the operation goes on to S2404. If the handshake packet has not been supplied and a timeout occurs as a predetermined period of time has passed, the operation returns to S2401.

S2404 is a step for transmitting the handshake packet to the host-side controller. After finishing the transmission of the handshake packet, the OUT transaction finishes.

As described above, the host-side controller 1100 includes the state machine which operates as shown in FIGS. 23 and 24, while the function-side controller 1110 includes the state machine which operations as shown in FIG. 25. Therefore, even if the rate on the communication path between the host-side controller 1110 and the function-side controller 1110 is identical with or lower than the rate defined by USB standard, the OUT transaction is carried out with no problem.

Note that, in the process shown in FIG. 2, the host-side controller 1100 transfers the OUT packet and the DATA packet, which have been supplied from the USB host, to the function-side controller 1110, in S2202 and S2204, respectively. However, if the host-side controller 1100 can transmit the ACK packet to the USB host, it is unnecessary to transmit the OUT packet and the DATA packet to the function-side controller 1110. To be exact, since the USB function recognizes that the OUT transaction finishes at the moment of transmitting the ACK packet in response to the OUT packet and the DATA packet, it is considered that the OUT packet and the DATA packet are preferably not transferred to the USB function.

For this reason, when the host-side controller 1100 receives the OUT packet and the DATA packet from the USB host, if the ACK packet has been supplied from the function-side controller 1110, it is possible not to transmit the OUT packet and the DATA packet to the function-side controller 1110.

In embodiment 10, upon the receipt of the OUT packet and the DATA packet from the USB host, the function-side controller 1110 transmits the OUT packet and the DATA packet to the USB function, only after completely receiving these packets. This is because the format of the DATA packet does not include a field indicating the length of the packet, and to surely transmit the received data from the low-speed communication path to the USB high-speed communication path, with no dropouts of data. Note that, the maximum length of the DATA packet under USB 2.0 is determined in each transfer mode as shown in FIG. 7.

Embodiment 11

Figure 26:
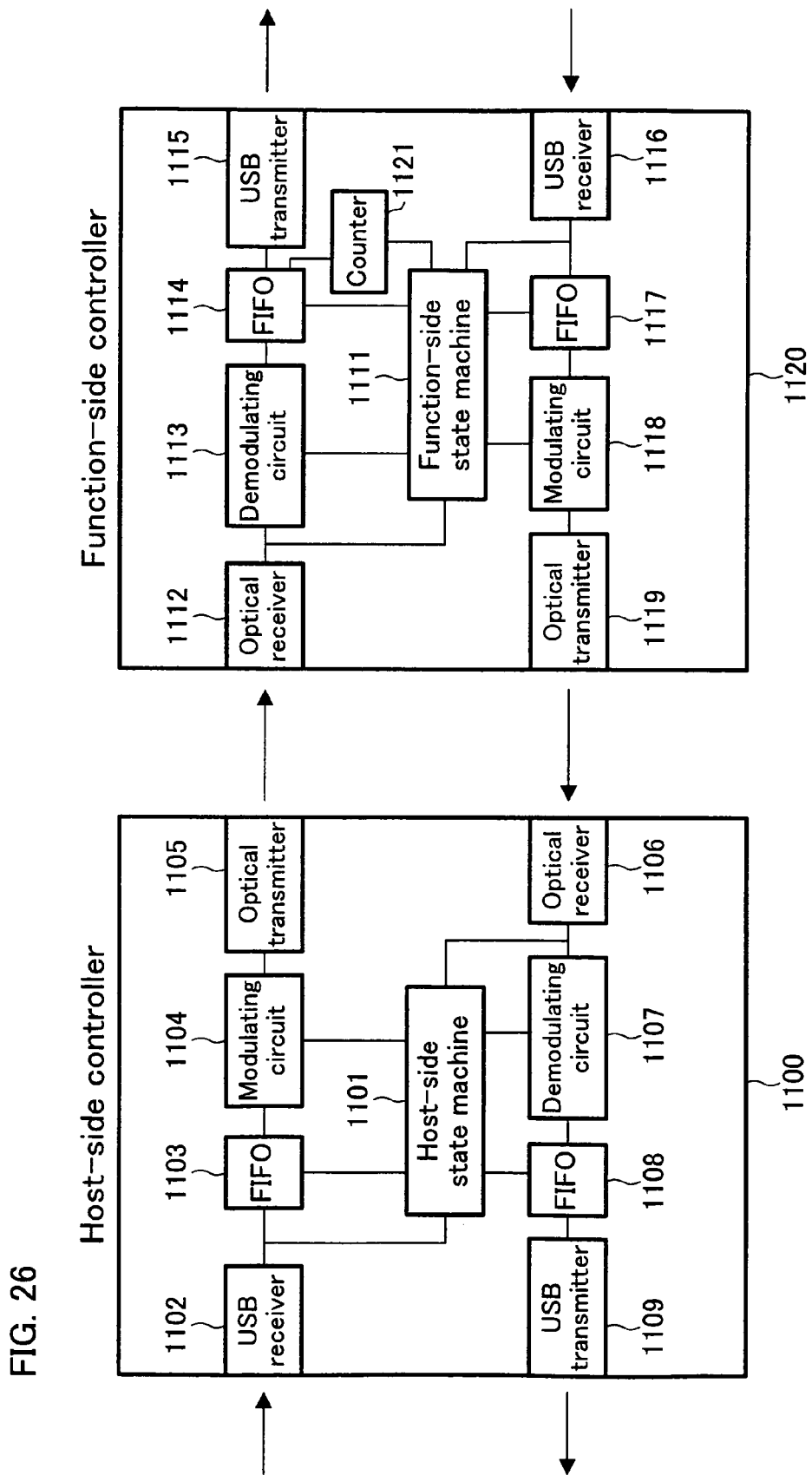
FIG. 26 is a block diagram showing a substantial part of a two-way transmission system of Embodiment 11.

The following will discuss another embodiment of the present invention in reference to FIG. 26.

FIG. 26 outlines a two-way transmission system of Embodiment 11. The two-way transmission system shown in FIG. 26 is made up of a host-side controller 1100 and a function-side controller 1120. The function-side controller 1120 includes: a function-side state machine 1111; an optical receiver 1112; a demodulating circuit 1113; a FIFO 1114; a USB transmitter 1115; a USB receiver 1116; a FIFO 1117; a modulating circuit 1118; an optical transmitter 1119; and a counter (data amount confirming means) 121. Apart from the counter 121, the components of the function-side controller 1120 have same arrangements and features as those of the function-side controller 1110 shown in FIG. 22, so that the descriptions thereof are omitted. Furthermore, the host-side controller 1100 in FIG. 26 is identical with the host-side controller 1100 shown in FIG. 22, so that the descriptions thereof are also omitted.

The counter 121 counts up how many times DATA packets transmitted from the host-side controller 1100 are written into the FIFO 1114.

In Embodiment 10, the transmission of the DATA packet from the function-side controller 1110 to the USB function starts after the completion of the receipt of the DATA packet by the function-side controller 1110. This is because, when the transfer rate on the communication path between the host and function is lower than the transfer rate (defined by the USB standard) between the function-side controller 1110 and the USB function, the transfer of the DATA packet to the USB function may not be properly carried out, if the transfer starts before the completion of the receipt of the DATA packet from the host-side controller 1100. That is to say, in the case above, the following problem may occur: The FIFO 1114 of the function-side controller 1110, the FIFO 1114 being provided for storing the DATA packet, goes EMPTY, after the receipt of the DATA packet from the host-side controller 1100, so that it is impossible to successively transfer the DATA packets to the USB function.

However, for instance, assume that the transfer between the function-side controller 1110 and the USB function is isochronous transfer, and the transmission of the DATA packet to the USB 2.0-compliant communication path starts on condition that an amount of data of the DATA packet stored in the FIFO 1114 is less than a value corresponding to 3072 bytes which is the maximum packet length on the occasion of the isochronous transfer shown in FIG. 7. In this case, unless the FIFO 1114 indicates EMPTY in the subsequent transmission, the above-mentioned problem does not occur even if the DATA packet is transmitted to the USB communication path before the completion of the transmission of the DATA packet from the host-side controller 1100.

For this reason, the function-side controller 1120 of Embodiment 11 is arranged such that, when the DATA packet is supplied from the host-side controller 1100 and stored in the FIFO 1114, an amount of data of the stored DATA packet is managed using the counter 121. If the value of the counter 121 indicates that the FIFO 1114 will not be EMPTY even if the transfer of the DATA packet to the USB function is started, the transmission of the DATA packet to the USB function can start before the completion of the transmission of the DATA packet from the host-side controller 1100. This makes it possible to move a timing of the transmission of the DATA packet ahead, so that the overall transfer rate is improved.

In the meanwhile, when the transfer between the function-side controller 1120 and the USB function is bulk transfer with which the maximum data length is shorter than that of the isochronous transfer, the preset value of the counter is lowered, so that the overall transfer rate is further improved.

Embodiment 12

Figure 27:
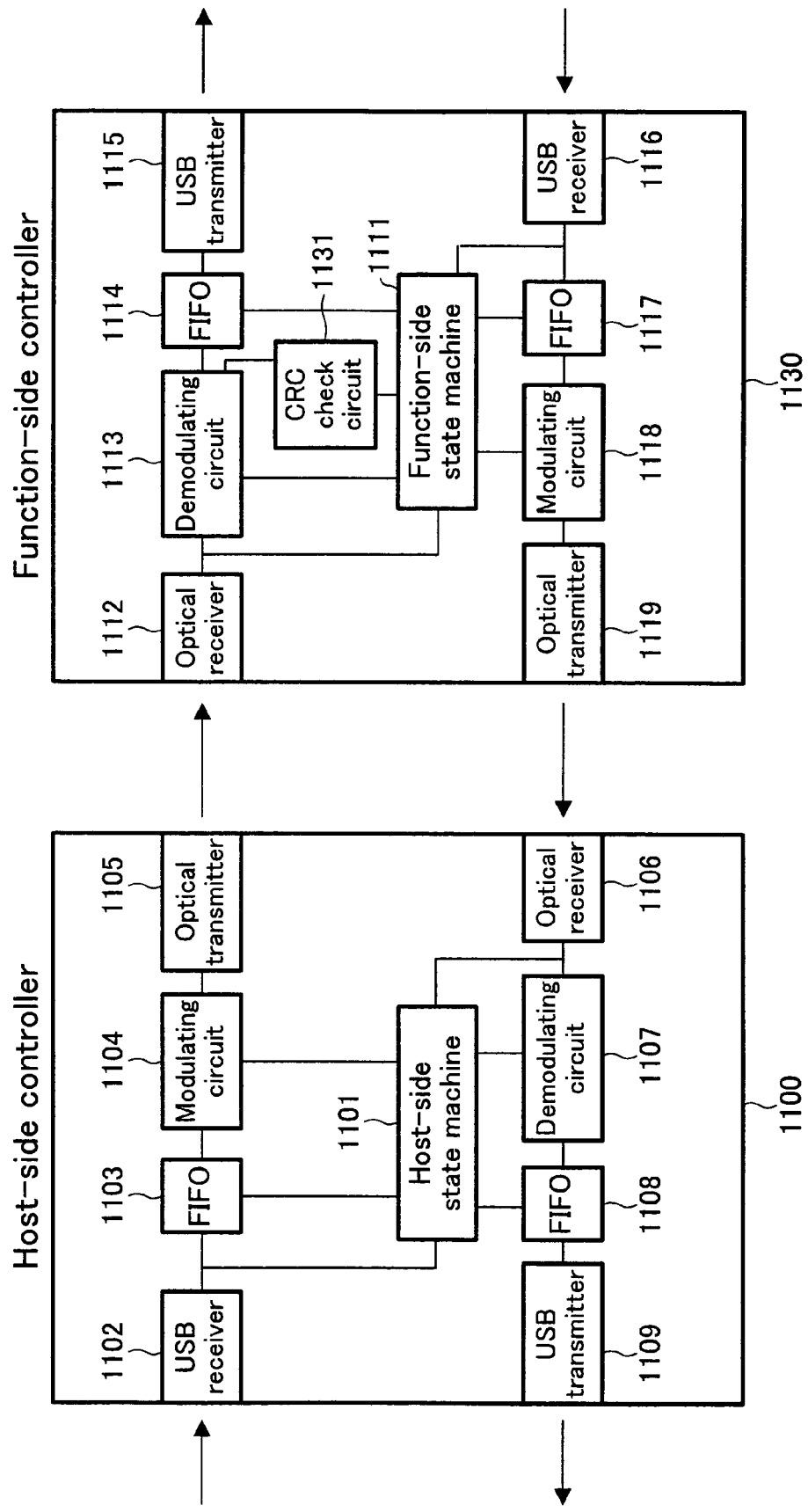
FIG. 27 is a block diagram showing a substantial part of a two-way transmission system of Embodiment 12.

The following will discuss yet another embodiment of the present invention in reference to FIG. 27.

FIG. 27 outlines a two-way transmission system of Embodiment 12. The two-way transmission system shown in FIG. 27 is made up pf a host-side controller 1100 and a function-side controller 1130. The function-side controller 1130 includes: a function-side state machine 1111; an optical receiver 1112; a demodulating circuit 1113; a FIFO 1114; a USB transmitter 1115; a USB receiver 1116; a FIFO 1117; a modulating circuit 1118; an optical transmitter 1119; and a CRC-check circuit (error analyzing means) 131. Apart from the CRC-check circuit 131, the components of the function-side controller 1130 have same arrangements and features as those of the function-side controller 1110 shown in FIG. 22, so that the descriptions thereof are omitted. Furthermore, the host-side controller 1100 in FIG. 27 is identical with the host-side controller 1100 shown in FIG. 22, so that the descriptions thereof are also omitted.

The CRC-check circuit 131 can calculate CRC (Cyclic Redundancy Check) 16 in the DATA packet supplied from the host-side controller 1100, and judge whether or not an error is included in the received DATA packet. The DATA packet which is supposed to include an error according to the CRC-check circuit 131 is discarded by the function-side state machine 1111. Not transmitting the DATA packet as a USB packet makes it possible to reduce amounts of power for the transmission, and it is possible to restrain the occurrence of an abnormal operation on account of the receipt of an erroneous packet by the USB function.

Embodiment 13

Figure 28:
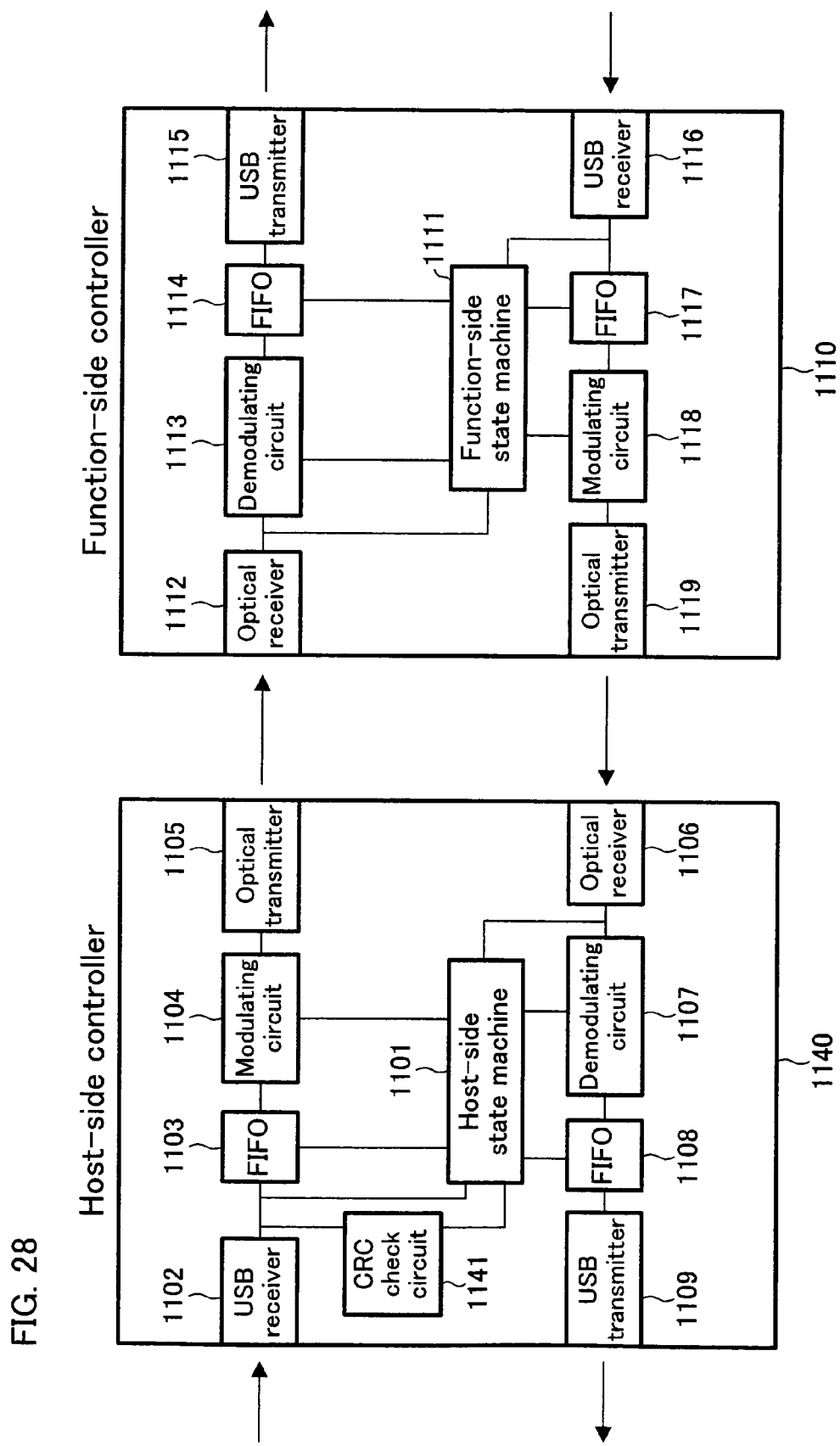
FIG. 28 is a block diagram showing a substantial part of a two-way transmission system of Embodiment 13.

The following will discuss still another embodiment of the present invention in reference to FIG. 28.

FIG. 28 outlines a two-way transmission system of Embodiment 13. The two-way transmission system shown in FIG. 28 is made up of a host-side controller 1140 and a function-side controller 1110. The host-side controller 1140 includes: a host-side state machine 1101; a USB receiver 1102; a FIFO 1103; a modulating circuit 1104; an optical transmitter 1105; an optical receiver 1106; a demodulating circuit 1107; a FIFO 1108; a USB transmitter 109; and a CRC-check circuit (error analyzing means) 141. Apart from the CRC-check circuit 141, the components of the host-side controller 1140 have same arrangements and features as those of the host-side controller 1100 shown in FIG. 22, so that the descriptions thereof are omitted. Furthermore, function host-side controller 1110 in FIG. 28 is identical with the function-side controller 1110 shown in FIG. 22, so that the descriptions thereof are also omitted.

The CRC-check circuit 141 can calculate CRC 16 in the DATA packet transmitted from the USB host, and judge whether or not the received DATA packet includes an error. If an error exists in the DATA packet transmitted from the USB host, it is of no use to transfer such DATA packet to the function-side controller 1110, so that the transfer of the DATA packet to the low-speed communication path between the host and function is pointless in this case. On this account, the transmission of the DATA packet supposed to include an error according to the CRC-check circuit 141 is stopped even after the start of the transmission, so that the deterioration of the efficiency of the transfer to the low-speed communication path is restrained.

Embodiment 14

Figure 29:
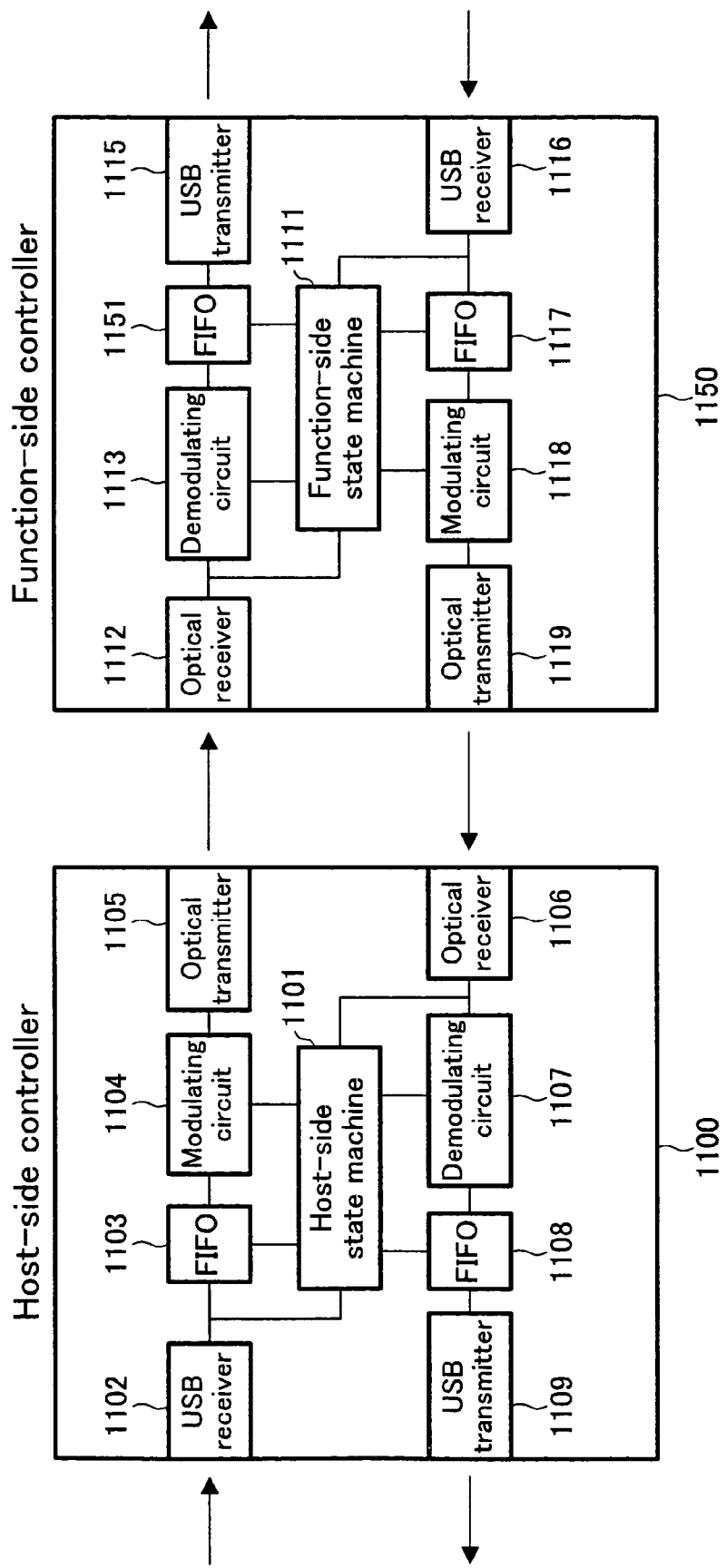
FIG. 29 is a block diagram showing a substantial part of a two-way transmission system of Embodiment 14.

The following will discuss still another embodiment of the present invention in reference to FIG. 29.

FIG. 29 outlines a two-way transmission system of Embodiment 14. The two-way transmission system shown in FIG. 29 is made up of a host-side controller 1100 and a function-side controller 1150. The function-side controller 1150 includes: a function-side state machine 1111; an optical receiver 1112; a demodulating circuit 1113; a FIFO 1151; a USB transmitter 1115; a USB receiver 1116; a FIFO 1117; a modulating circuit 1118; and an optical transmitter 1119. Apart from the FIFO 151, the components of the function-side controller 1150 have same arrangements and features as those of the function-side controller 1110 shown in FIG. 22, so that the descriptions thereof are omitted. Furthermore, the host-side controller 1100 in FIG. 29 is identical with the host-side controller 1100 shown in FIG. 22, so that the descriptions thereof are also omitted.

Receiving a DATA packet from the host-side controller 1100, the function-side controller 1150 causes the function-side state machine 1111 to write the received DATA packet into the FIFO 1151.

This FIFO 1151 is holding a predetermined value of a read pointer, at the time of transmitting the OUT packet and the DATA packet. After transmitting the OUT packet and the DATA packet to the USB function, the function-side state machine 1111 judges that a data error occurs on the communication path between the USB function and the function-side controller 1150, if an ACK packet is not supplied from the USB function within a predetermined period of time. The function-side state machine 1111 then sets the read pointer to the aforesaid predetermined value. After a predetermined period of time has passed, the function-side state machine 1111 transmits the same OUT packet and DATA packet again.

In this case, the retransmission of the DATA packet is realized with the control of the read pointer in the FIFO 1151. Alternatively, the retransmission may be realized by storing a start address in a RAM and the like. When the CRC-check circuit 131 shown in FIG. 27 is provided in the function-side controller, it is possible to judge whether or not the DATA packet transmitted from the function-side controller 1110 is correct, using the CRC-check circuit 131. This makes it possible to implement such an arrangement that the retransmission is carried out only when the received DATA packet is judged as correct.

Embodiment 15

Figure 30:
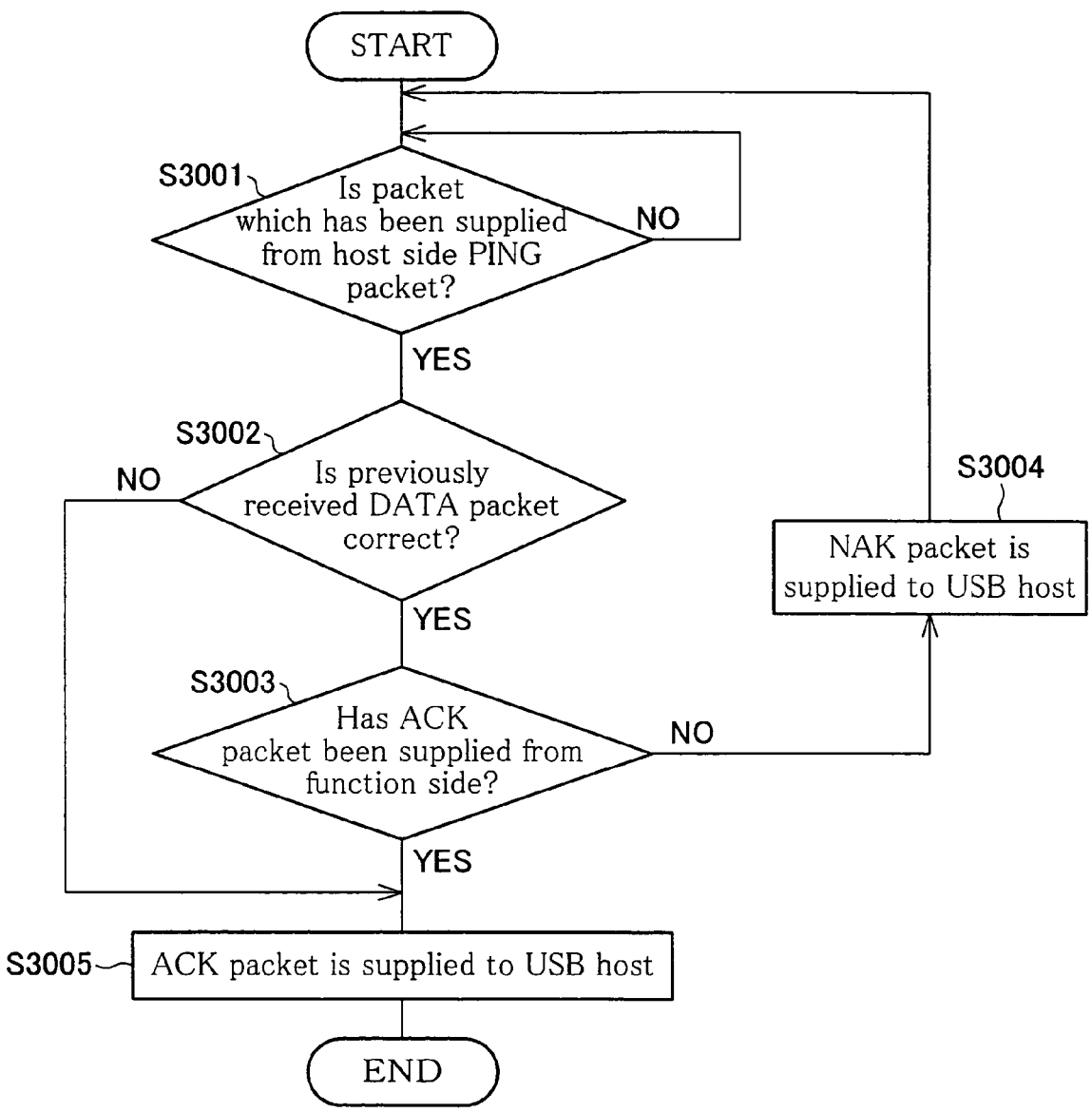
FIG. 30 is a flow chart illustrating the operation of a state machine of a host-side controller of a two-way transmission system of Embodiment 15, the operation concerning the receipt of a PING packet.

The following will discuss still another embodiment of the present invention in reference to FIG. 30.

In Embodiment 10 shown in FIG. 24, the host-side controller 1100 returns an ACK packet in response to a PING packet supplied from the USB host, in order to cause the USB host to retransmit the OUT packet and the DATA packet.

However, in this case, even if the host-side controller 1100 receives the OUT packet and the DATA packet retransmitted from the USB host in response to the ACK packet, the host-side controller 1100 cannot return the ACK packet to the USB host, if the ACK packet has not been supplied from the function side at the moment of the receipt of the retransmitted OUT packet and DATA packet. For this reason, when, for instance, the length of the DATA packet is long, the efficiency of the USB communication path between the USB host and the host-side controller 1100 is lowered.

When the DATA packet having been supplied to the host-side controller 1100 before the host-side controller 1100 receives the PING packet is erroneous, the host-side controller 1100 never receives the ACK packet from the function-side controller 1110, in response to this erroneous DATA packet. In this case, the host-side controller 1100 has to cause the USB host to retransmit the OUT packet and the DATA packet. However, Embodiment 10 does not provide a process for such a case.

Embodiment 15 provides such a method that the efficiency of the USB communication path is improved and the OUT packet and the DATA packet are retransmitted to the USB host when the DATA packet received by the host-side controller 1100 is erroneous.

A two-way transmission system of Embodiment 15 is basically identical with the two-way transmission system of Embodiment 13 shown in FIG. 28. The components of the two-way transmission system of Embodiment 15 have same functions as those of the two-way transmission system of Embodiment 13, so that detailed descriptions thereof are omitted.

First of all, referring to FIG. 30, the operation of the host-side state machine 1101 of the host-side controller 1140 of Embodiment 15 is described. Note that, the description on this state machine for the state transition only relates to the state transition regarding the PING packet. On this account, the state machine may be provided in the above-mentioned state machine for the OUT transaction or may be independently provided.

S3001 is a step for telling whether or not a packet supplied from the USB host is a PING packet. If the packet is the PING packet, the operation goes on to S3002. If the packet is not the PING packet, the operation returns to S3001.

S3002 is a step for judging if the received DATA packet is erroneous, by the CRC-check circuit 141. If the received DATA packet is not erroneous, the operation goes onto S3003. If the DATA packet is erroneous, the operation goes o to S3005.

S3003 is a step for judging whether or not an ACK packet has been supplied from the function-side controller 1100, at the time of the receipt of the PING packet. If the ACK packet has been supplied, the operation goes on to S3005. If the ACK packet has not been supplied, the operation goes on to S3004.

S3004 is a step for transmitting a NAK packet to the USB host. After finishing the transmission of the NAK packet, the operation goes on to S3001.

S3005 is a step for transmitting the ACK packet to the USB host. After finishing the transmission of the ACK packet, the operation regarding the PING packet finishes. The received PING packet may be or may not be supplied to the function-side controller.

As described above, the host-side controller 1140 includes the state machine which operates as shown in FIG. 30, so that the host-side controller 1140 can instruct the USB host to supply the OUT packet and the DATA packet, as need arises. That is to say, when the host-side controller 1140 has received the ACK packet from the function-side controller 1110, or when the host-side controller 1140 receives the PING packet from the USB host while the previously-received DATA packet is erroneous, the host-side controller 1140 returns the ACK packet to the USB host so as to cause the USB host to transmit the OUT packet and the DATA packet to the host-side controller 1140. Meanwhile, in. a state other than the above, the host-side controller 1140 returns the NAK packet in response to the PING packet. With this, it is possible to avoid an unnecessary transmission of the OUT packet and the DATA packet.

Embodiment 16

Figure 31:
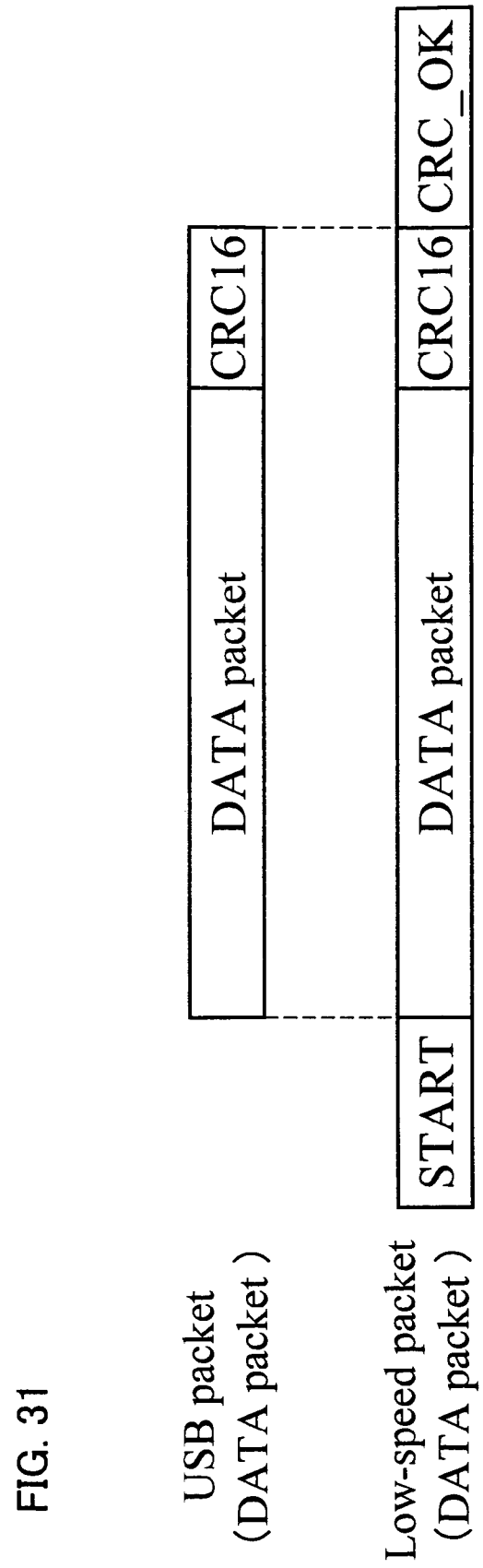
FIG. 31 illustrates a USB packet and a packet format of a low-speed communication path of Embodiment 16.

The following will discuss still another embodiment of the present invention in reference to FIG. 31.

FIG. 31 illustrates a packet format of Embodiment 16. In the figure, a USB packet indicates a format of a data packet exchanged at the transfer rate defined by USB standard, while a low-speed packet indicates a packet format for a low-speed communication path. In other words, the low-speed packet is a packet format for transmitting a DATA packet from a host-side controller to a function-side controller.

As shown in FIG. 31, the low-speed packet is arranged such that a CRC_OK field is provided after a CRC 16 of a USB packet. If a DATA packet in the host-side controller has no error, a value indicating the absence of an error is entered in the CRC_OK field (i.e. a flag indicating the absence of an error is set). If the DATA packet has an error, a value indicating the presence of an error is entered in the CRC_OK field. Subsequently, this DATA packet is supplied to the function-side controller. With this, it is possible to notify the function-side controller of information regarding whether or not the DATA packet in the host-side controller is re-transmittable. The function-side controller checks the CRC_OK field so that the function-side controller can decide whether or not a retransmission request to the host-side controller is carried out, when it is judged that the received DATA packet includes an error.

Embodiment 17

Figure 32:
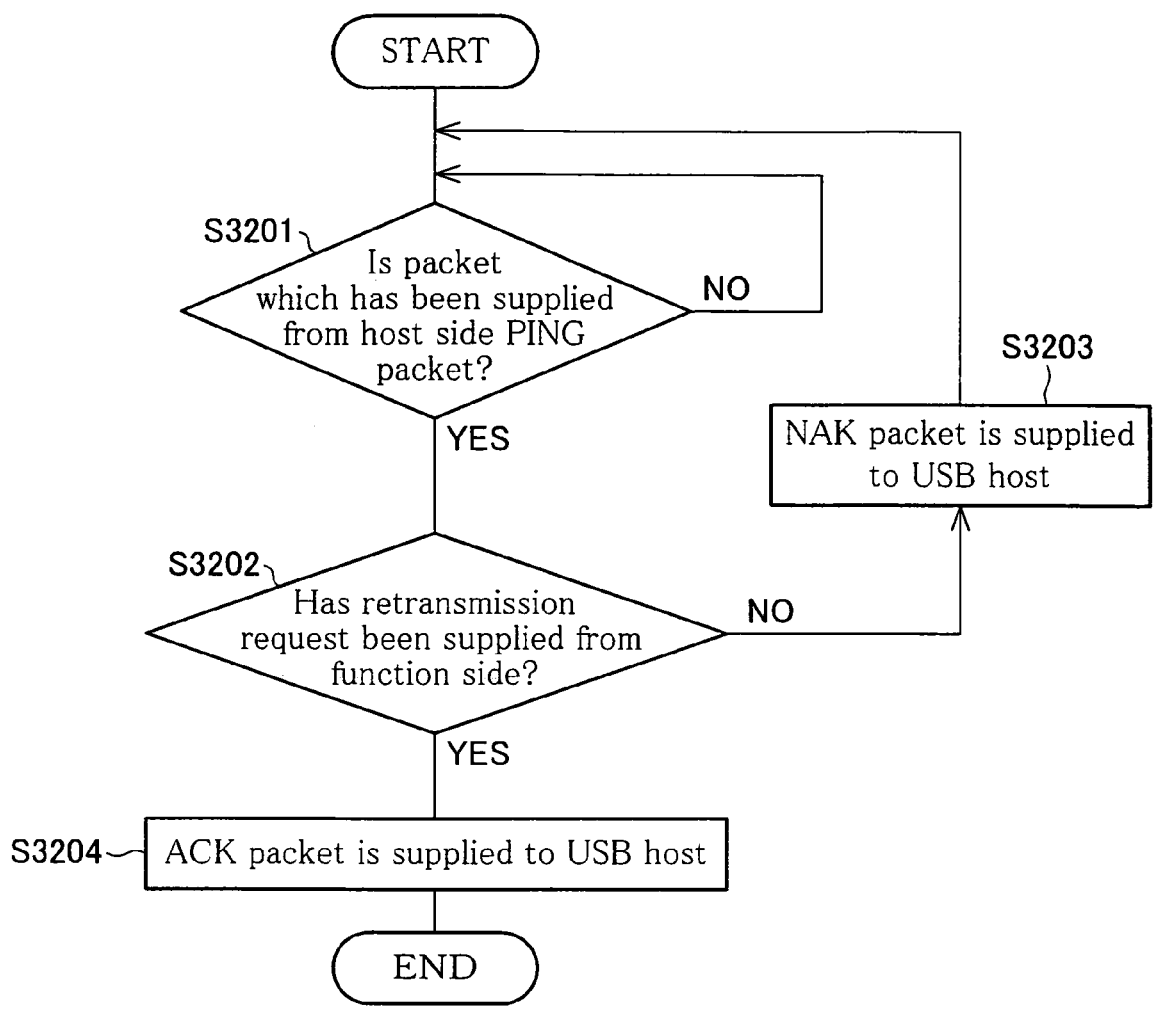
FIG. 32 is a flow chart illustrating the operation of a state machine of a host-side controller of a two-way transmission system of Embodiment 17, the operation concerning the receipt of a PING packet.

The following will discuss still another embodiment of the present invention in reference to FIG. 32.

Embodiment 17 illustrates such a method that the host-side controller prepares a correct DATA packet when a data error occurs between the host-side controller and the function-side controller, and the host-side controller receives a retransmission request from the function-side controller.

A two-way transmission system of Embodiment 17 is basically identical with the two-way transmission system of Embodiment 12 shown in FIG. 27. The components of the two-way transmission system of Embodiment 17 have same functions as those of the two-way transmission system of Embodiment 12, so that detailed descriptions thereof are omitted.

First of all, referring to FIG. 32, the operation of the host-side state machine 1101 of the host-side controller 1100 of Embodiment 17 is described. Note that, the description on this state machine for the state transition only relates to the state transition regarding a PING packet. On this account, the state machine may be provided in the above-mentioned state machine for the OUT transaction or may be independently provided.

S3201 is a step for telling whether or not a packet supplied from the USB host is a PING packet. If the packet is the PING packet, the operation goes on to S3202. If the packet is not the PING packet, the operation returns to S3201.

S3202 is a step for judging whether or not a DATA packet retransmission request has been supplied from the function-side controller. If the retransmission request has been supplied, the operation goes on to S3204. If the retransmission request has not been supplied, the operation goes on to S3203.

S3203 is a step for transmitting a NAK packet to the USB host. After finishing the transmission of the NAK packet, the operation goes on to S3201.

S3204 is a step for transmitting an ACK packet to the USB host. After finishing the transmission of the ACK packet, the operation regarding the PING packet finishes.

As described above, the host-side controller 1100 includes the state machine which operates as shown in FIG. 32, so that, when a data error occurs between the host-side controller and the function-side controller, the host-side controller 1100 can cause the USB host to transmit the OUT packet and the DATA packet by returning the ACK packet to the USB host in response to the PING packet supplied from the USB host. Therefore, the host-side controller 1100 can retransmit the OUT packet and the DATA packet to the function-side controller.

Embodiment 18

The following will discuss still another embodiment of the present invention in reference to FIGS. 33 and 18-20.

Figure 33:
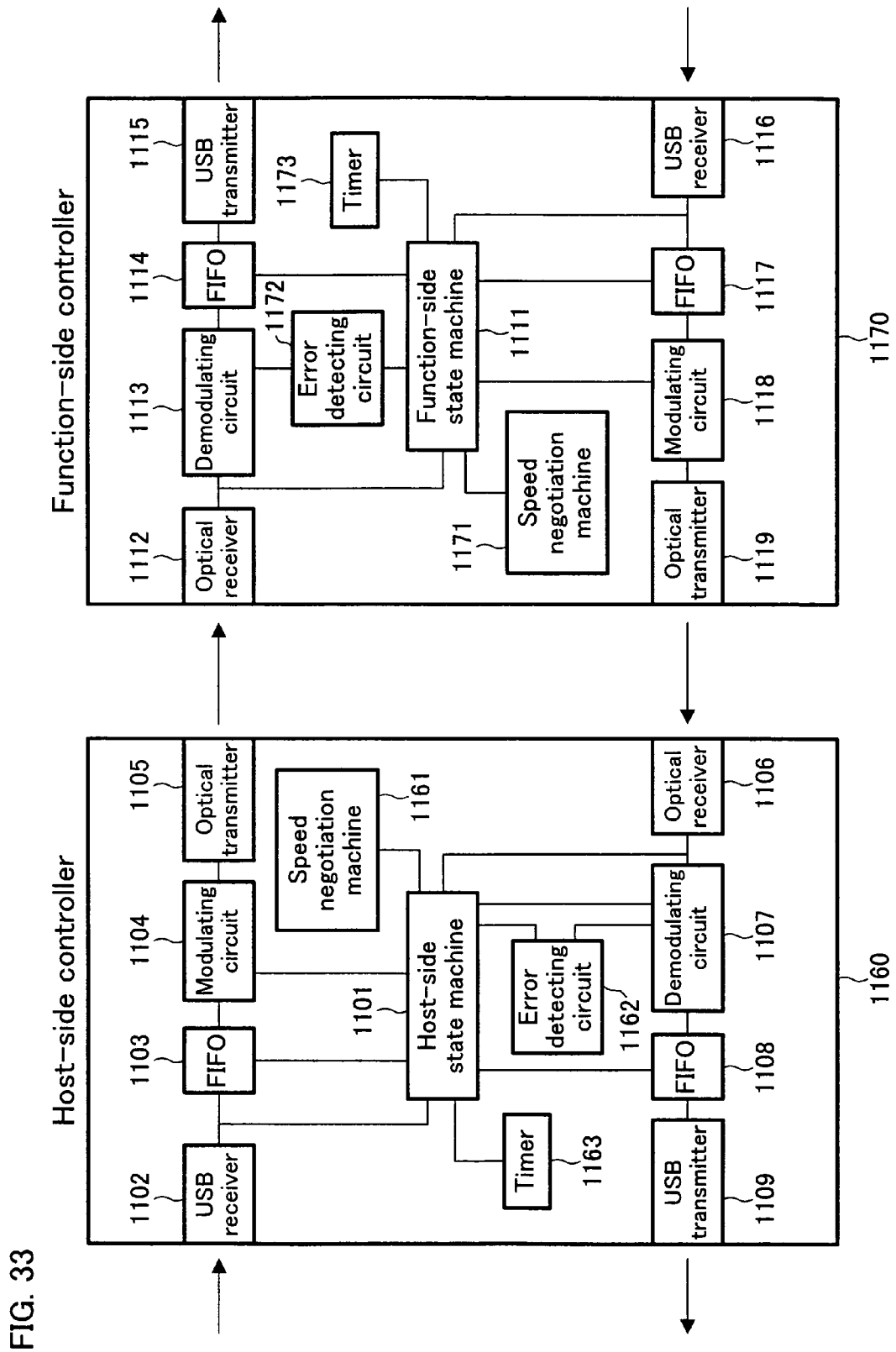
FIG. 33 is a block diagram showing a substantial part of a two-way transmission system of Embodiment 18.

FIG. 33 outlines a two-way transmission system of Embodiment 18. The two-way transmission system shown in FIG. 33 is made up of a host-side controller 1160 and a function-side controller 1170. The host-side controller 1160 includes: a host-side state machine 1101; a USB receiver 1102; a FIFO 1103; a modulating circuit 1104; an optical transmitter 1105; an optical receiver 1106; a demodulating circuit 1107; a FIFO 1108; a USB transmitter 109; a speed negotiation state machine 1161; and an error detecting circuit 1162. Apart from the speed negotiation state machine 1161 and the error detecting circuit 1162, the components of the host-side controller 1160 have same arrangements and features as those of the host-side controller 1100 shown in FIG. 22, so that the descriptions thereof are omitted. The function-side controller 1170 includes: a function-side state machine 1111; an optical receiver 1112; a demodulating circuit 1113; a FIFO 1114; a USB transmitter 1115; a USB receiver 1116; a FIFO 1117; a modulating circuit 1118; an optical transmitter 1119; a speed negotiation state machine 1171; and an error detecting circuit 1172. Apart from the speed negotiation state machine 1171 and the error detecting circuit 1172, the components of the function-side controller 1170 have same arrangements and features as those of the function-side controller 1110 shown in FIG. 22, so that the descriptions thereof are omitted.

The speed negotiation state machines 1161 and 1171 are provided for selecting one transfer rate from a plurality of transfer rates, by performing speed negotiation (transfer rate adjustment) between the host-side controller 1160 and the function-side controller 1170. The error detecting circuits 1162 and 1172 detect an error on the low-speed communication path (in FIG. 33, the optical communication path between the host and function). Note that, the speed negotiation is performed before the OUT transaction. Also, the following discussion is given in reference to FIGS. 18-20 which has been referred to in Embodiment 9.

How the speed negotiation is performed is described in reference to FIG. 18. Note that, the present invention is not limited to a protocol of the speed negotiation shown in FIG. 18.

The speed negotiation state machine 1161 of the host-side controller 1160 starts, at a timing t1401, the transmission of a keep_speed signal at a predetermined transfer rate A, and starts the timer concurrently with the transmission of the keep_speed signal. This keep_speed signal is one of transmission codes (request signals) for determining the transfer rate, and requests the function-side controller 1170 to keep a current transfer rate.

Meanwhile, when, on account of a signal-detect signal, the function-side controller 1170 recognizes the receipt of the keep_speed signal, the function-side controller 1170 starts the timer at a timing t1402, and also starts the transmission of the keep_speed signal to the host-side controller 1160.

Each of the host-side controller 1160 and the function-side controller 1170 keeps transmitting a particular transmission code, during a predetermined period T.

If, on the optical communication path, a bit error occurs in the keep_speed signal outputted from the host-side controller 1160 at a timing t1403 so that the function-side controller 1170 cannot properly receive the keep_speed signal, the function-side controller 1170 supplies, at a timing t1404, a lower_speed signal to the host-side controller 1160, in place of the keep_speed signal. This lower_speed signal is one of the request signals for determining the transfer rate, and requests a receiving end (host-side controller 1160) to lower the transfer rate.

Receiving the lower_speed signal from the function-side controller 1170, the host-side controller 1160 recognizes that, at a current transfer rate A, the function-side controller 1170 cannot properly carry out the receipt. The host-side controller 1160 then transmits the lower_speed signal to the function-side controller 1170. (At a timing t1405, the transmission code is switched to lower_speed.)

The function-side controller 1170 receives, at a timing t1406, the lower_speed signal from the host-side controller 1160, so as to judge that the lower_speed signal supplied from the function-side controller 1170 has been recognized by the host-side controller 1160.

After the predetermined period T has passed in each of the host-side controller 1160 and the function-side controller 1170, the host-side controller 1160 and the function-side controller 1170 lower the transfer rate to half (A/2), because a signal transmitted at this moment is the lower_speed signal.

That is to say, the host-side controller 1160 starts, at a timing t1407, the transmission of the keep_speed signal at a transfer rate A/2, and simultaneously re-starts the timer. In the meanwhile, the function-side controller 1170 also starts, at a timing t1408, the transmission of the keep_speed signal at the transfer rate A/2, and simultaneously re-starts the timer.

If, during the predetermined period T, no error is detected by both the host-side controller 1160 and the function-side controller 1170, the host-side controller 1160 and the function-side controller 1170 start to transmit an End_Nego signal (end request) which indicates the end of the speed negotiation, at a timing t1409 and a timing t1410, respectively. Then each of the host-side controller 1160 and the function-side controller 1170 terminates the speed negotiation and changes to an active state, when the End_Nego signal is supplied from the counterpart.

Referring to FIG. 19, the operation of the speed negotiation state machine 1161 of the host-side controller 1160 is described.

A state ST0 is a state for starting the speed negotiation. In this state, the speed negotiation state machine 1161 sets the transmission code to the keep_speed signal, restarts the timer, and then changes to a state ST1.

The state ST1 is a state for carrying out the speed negotiation. In this state, the speed negotiation state machine 1161 switches the transmission code to lower_speed, if the received code includes an error or the lower_speed signal is transmitted from the counterpart (function-side controller 1170).

After the predetermined period T has passed, the speed negotiation state machine 1161 changes to the state ST0 if the transmission code is the lower_speed, or changes to a state ST2 if the transmission code is the keep_speed.

In the case of the transition to the state ST0, a current transfer rate is, for instance, reduced to half. (The degree of reduction of the transfer rate can be arbitrarily set by the user, and the degree of the reduction is recorded in the speed negotiation state machine in advance.)

Meanwhile, in the case of the transition to the state ST2, the transmission code is switched to the End_Nego signal. This state ST2 is a state for confirming the end of the speed negotiation. Receiving the End_Nego signal from the counterpart (function-side controller 1170), the speed negotiation state machine 1161 terminates the speed negotiation and changes to an active state.

Referring to FIG. 20, the operation of the speed negotiation state machine 1171 of the function-side controller 1170 is described.

The operations in states ST0, ST1, and ST2 are identical with those of the speed negotiation state machine 1161.

A state ST4 before the state ST0 is a state for judging whether or not a request signal has been supplied from the host-side controller 1160. If a signal-detect signal is supplied from the optical receiver 1112 (or from another received signal detecting circuit), the speed negotiation state machine 1171 changes to the state ST0.

The aforementioned state machines are made up of the host-side controller 1160 and the function-side controller 1170, respectively, so that a transfer rate can be selected from a plurality of transfer rates.

The error detecting circuits 1162 and 1172 detect a bit error on the optical communication path between the host and function. More specifically, for instance, a table is referred to on the occasion of the 8B10B demodulation, and the receipt of a character not on the table is recognized as an error. The error is not specifically defined here.

When the active state starts after the end of the speed negotiation, the number of errors (i.e. error rate) can be measured according to the number of errors obtained by the error detecting circuits 1162 and 1172 and the values of the timers 1163 and 1173. When the error rate is higher than a predetermined value, it is determined that the quality of the communication path is deteriorated (for example, the communication distance between a mobile device and a PC (Personal Computer) has been changed). In this case, the communication at a current transfer rate is relinquished, the speed negotiation is carried out again, and a transfer rate at which the communication is properly done is determined, and then the OUT transaction is carried out. In this manner, proper data transmission is realized.

The present embodiment assumes that the transfer rate on the optical communication path between the host and function is lower than the native rate of USB. However, it may be possible in. future to adopt communication means which realizes data transmission at the native rate of USB on the optical communication path between the host and function, if a cheap and high-speed optical transceiver becomes available. In such a case, at first the speed negotiation is carried out at a rate equivalent to the native rate of USB (600 Mbps in the case of 8B10B modulation). If the error rate is not bad, fully-optical communication under USB 2.0 is realized by carrying out normal repeating instead of the packet control by the state machine of the present invention. This can prevent the slowdown of the data transfer rate.

If the communication cannot be properly carried out at 600 Mbps, the transfer rate is lowered and the packet control is carried out by the state machine of the present invention, so that the OUT transaction is realized. In other words, the most efficient packet transfer is realized by turning on/off the packet control by the state machine, in accordance with the result of the speed negotiation.

In Embodiments 10-18, it is assumed that the communication rate between the host and function is lower than the native rate of USB, so that, if a conventional transmission method is adopted, the communication cannot be finished before the time limit defined by USB. However, even if the communication rate between the host and function is as fast as the native rate of USB, the turn-around time is long when the communication path between the host and function is very long (e.g. an optical fiber which is several hundred meters long), so that the OUT transaction may not be finished before the time limit. This is because the USB standard defines the maximum turn-around time in accordance with the repeating time for the stages (6 at the maximum) of a USB hub and the length of a USB cable (5 meters at the maximum). The transmission method of the present invention is also useful for such a case that the communication path between the host and function is very long as above, so that, when a conventional transmission method is adopted, the communication cannot be finished before the time limit defined by USB standard.

Embodiments 10-18 have been discussed on the premise of adopting USB 2.0. Under USB 2.0, the features on the host side and the features on the function side are both fixed. That is to say, data exchange under USB 2.0 is performed on condition that devices (e.g. digital camera and printer) which are USB functions are connected to a PC which is a USB host.

In recent years, a standard termed USB-OTG (USB-On-The-Go) has been developed. Under this standard, a PC (USB host) which has been required in a conventional USB system is no longer necessary. That is to say, USB-OTG is so convenient that two-way data transmission between USB devices is realized without a PC (USB host). Under USB-OTG, a device can operate as a USB host or a USB function, according to the type of a connector of a cable connected to the device.

As in USB 2.0, USB-OTG supports three types of transfer rate: LS (1.5 Mbps); FS (12 Mbps); and HS (480 Mbps). A USB-OTG-compliant device can operate both as a USB host and a USB function. Under USB-OTG, a new type of connector termed miniAB is available. To a miniAB connector, both a cable with a miniA plug and a cable with a miniB plug can be connected. As described above, a device can operate as a USB host or a USB function, according to the type of a connector of a cable connected to the device. The device operates as a USB host when a miniA plug is connected thereto, while the device operates as a USB function when a miniB plug is connected thereto. Furthermore, USB-OTG supports such a new feature that a host and a function which are connected with each other via a cable can actively swap roles, on ground of a new protocol termed HNP (Host Negotiation Protocol). In other words, under USB-OTG, to which type a device to be connected is assigned, USB host or USB function, is determined in accordance with the type of a connector of a cable or HNP defined in USB-OTG.

Figure 34:
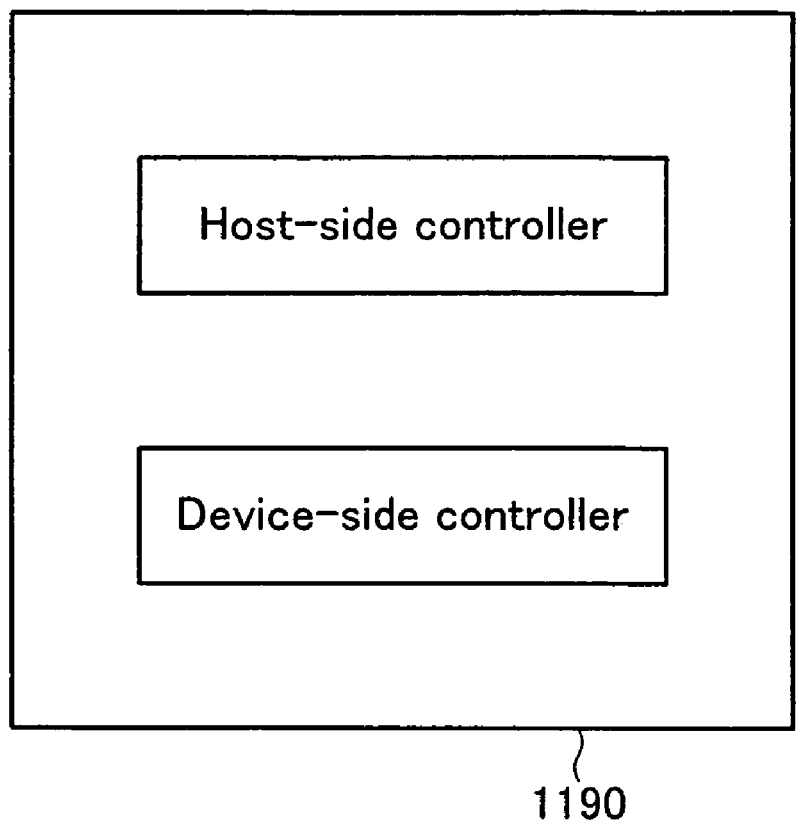
FIG. 34 illustrates a communication controller which can operate as a host-side controller and a device-side controller.

That is, when the present invention is applied to USB-OTG, the roles of USB host and USB function are not fixed, so that the roles may be swapped in accordance with the direction of data to be transmitted. Also, the roles of host-side controller and function-side controller are not fixed, so that the roles may be swapped in accordance with the direction of data to be transmitted. Therefore, for instance, as shown in FIG. 34, it is preferable that one communication controller 1190 can perform both as the host-side controller and the function-side controller. To realize this, a state machine of each controller includes a program which allows the controller to operate as both the host-side controller and the function-side controller.

In Embodiments 10-18, the communication between the host-side controller and the function-side controller is full-duplex. This makes it possible to do away with a preamble necessary, for a half-duplex communication between the host and function, thereby improving the efficiency of the communication path. As a matter of course, no problem occurs when a system is constructed with a half-duplex communication.

As described in the foregoing embodiments, in the two-way transmission system of the present invention, even when the data transmission among a USB host, a host-side controller, a function-side controller, and a USB function is carried out at a rate (e.g. 100 Mbps) lower than the USB native rate, the overall transfer rate may be, in some cases, as fast as the transfer rate in the case of data transfer between a USB host and a USB function at the USB native rate (480 Mbps).

For instance, when successively carrying out the OUT transactions, time intervals between the OUT transactions in the case of adopting a device with low-speed data transfer (50 Mbps), such as a flash memory, are longer than the time intervals in the case of adopting a device with high-speed data transfer (about 200 Mbps), such as a HDD. In other words, the time intervals between the transactions are short when a device with a high-speed data transfer is adopted. Meanwhile, the time intervals between the transactions are long when a device with a low-speed data transfer is adopted.

Therefore, when the OUT transactions are carried out in accordance with the method of the present invention, the time required for one OUT transaction is longer than the time required for one OUT transaction in the data transfer between the host and function at the USB native transfer rate. However, provided that one OUT transaction in accordance with the method of the present invention finishes during the time interval between the transactions, the start time of the next OUT transaction does not fall behind the start time of the OUT transaction in the case of the USB native rate. In other words, the overall transfer rate in the case of adopting a low-speed communication path between the host and function is similar to the overall transfer rate in the case of the communication at the USB native rate.

To realize fully-optical communication under USB 2.0, an optical transceiver with a bandwidth of 480×10/8=600 Mbps is required, when a 8B10B modulation method is adopted. An optical transceiver including an LD (Laser Diode) can fulfill the condition above. Meanwhile, when communications under USB 2.0 on a low-speed communication path are realized by the present invention, if the low-speed communication path is 100 Mbps, an optical transceiver including an LED (Light-Emitting Diode) can fulfill this condition. Since LEDs are significantly cheaper than LDs, the present invention makes it possible to reduce the costs for the optical transceiver.

Furthermore, with regard to the controller, when the host-side controller is integrated with the USB host so that metal ports are eliminated and the USB host includes only optical ports, a bandwidth required by the controller is significantly lowered from 600 Mbps to 100 Mbps. This indicates that the arrangement above makes it possible to manufacture the controller by an inexpensive manufacturing process. For this reason, the present invention contributes to the cost reduction.

In this manner, the cost reduction is realized by the present invention when a low-speed device is adopted. It is considered that the present invention is effective for a low-speed device such as a mobile phone including a flash memory and digital camera.

In the two-way transmission system in Embodiments 10-18, when the host-side controller 1100 recognizes the receipt of the OUT packet and the DATA packet from the USB host, the host-side controller 100 transfers the OUT packet and the DATA packet to the function-side controller 1110, and receives the ACK packet from the function side. The received ACK packet is temporarily stored in the FIFO 1108. On the receipt of the OUT packet and the DATA packet from the USB host again, the DATA packet stored in the FIFO 1108 is transmitted to the USB host.

With this two-way transmission system, the data transfer by the OUT transaction under USB 2.0 is successfully carried out even when, between the host and function, a communication path whose transfer rate is lower than the native rate of USB 2.0 is adopted.

The present invention described in reference to. Embodiments 10-18 provides a two-way transmission system which allows an OUT transaction to be properly performed without taking into consideration of a turn-around time, even if the transfer rate between the host and function is slow. This kind of two-way transmission system can be used for various types of communication equipments conducting data communications under USB standard.

Embodiment 19

The following will discuss still another embodiment of the present invention with reference to FIGS. 35-41.

A USB system of the present embodiment is a communication system for realizing USB communications (data communications under USB 2.0) between a host computer (host) and its peripheral device (device).

Figure 35:
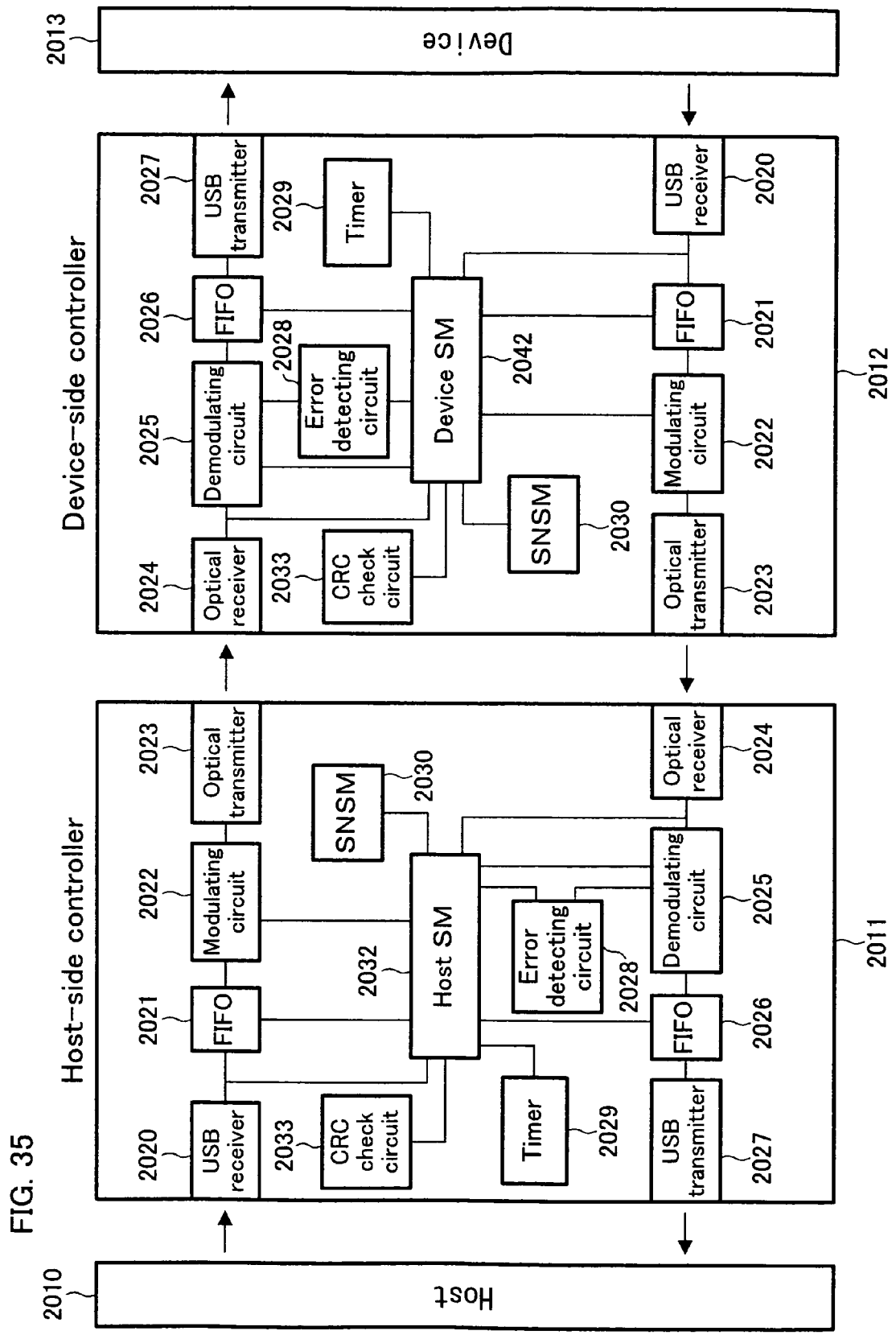
FIG. 35 is a block diagram showing the structure of a USB system of an embodiment of the present invention.

FIG. 35 is a block diagram illustrating the USB system.

As in the figure, the present system includes a host 2010, a host-side controller 2011, a device-side controller 2012, and a device 2013.

The host (USB host) 2010 is a personal computer acting as a master terminal of the present system and controlling all USB communications.

The device (USB function, USB device) 2013 is a slave terminal (node) and functions as a peripheral device of the host. Examples of such peripheral device include a printer and a DVD driver.

The host-side controller 2011 is connected to the host 2010 via a USB cable, and relays the USB communications between the host 2010 and an external device (device 2013). In other words, the host-side controller 2011 receives a packet from the host 2010 and sends the packet to the outside, and receives a packet supplied toward the host 2010 and sends the packet to the host 2010.

The device-side controller 2012 is connected to the device 2013 via a USB cable, and relays the USB communications between the device 2013 and the host 2010. In other words, the device-side controller 2012 receives a packet from the device 2013 and sends the packet to the host 2010, and receives a packet supplied toward the device 2013 and transmits the packet to the device 2013.

Further, the controllers 2011 and 2012 in the present system are connected with each other by optical wireless communications under USB standard. In other words, the present system realizes the USB communications between the host 2010 and the device 2013 by the optical wireless communications using the controllers 2011 and 2012. Note that, a data transfer rate of the optical wireless communications between the controllers 2011 and 2012 is 100 Mbps, so as to be slower than the data transfer rate (480 Mbps) in the high-speed (HS) mode under USB 2.0.

The controllers 2011 and 2012, which are characteristic features of the present system, are described. As shown in FIG. 35, the host-side controller 2011 includes an USB receiver 2020, a transmission FIFO 2021, a modulating circuit 2022, an optical transmitter 2023, an optical receiver 2024, a demodulating circuit 2025, a receipt FIFO 2026, a USB transmitter 2027, an error detecting circuit 2028, a timer 2029, a speed negotiation state machine (SNSM) 2030, a CRC-check circuit 2033, and a host-side state machine (host SM) 2032.

The device-side controller 2012 is identical with the host-side controller 2011, except that a device-side state machine (device SM) 2042 is provided instead of the host SM 2032.

The USB receiver 2020 is connected with the host 2010 or the device 2013 via an USB cable, and receives a USB signal (signal including a packet) from the host 2010 or the device 2013.

The transmission FIFO 2021 temporarily stores the packet received by the USB receiver 2020. As described above, the communication rate between the controllers 2011 and 2012 (100 Mbps) is lower than the maximum communication rate on a USB cable (HS; 480 Mbps). Therefore, the transmission FIFO 2021 is used for adjusting a timing for transferring (repeating) a packet by the optical communications.

The modulation circuit 2022 modulates (optically modulates) a packet in order to transmit the packet to the outside by optical communications. The modulating circuit 2022 can employ a modulating method such as 8B10B, for example. The optical transmitter 2023 sends, to the outside, the packet modulated by the modulating circuit 2022. The optical transmitter 2023 is made up of a light-emitting diode or a laser.

The optical receiver 2024 receives an optically-modulated packet from the outside, and is composed of a photodiode, for example. Note that, when the optical receiver 2024 receives an optical signal from the outside, the optical receiver 2024 sends a signal-detect signal to the host SM 2032 (device SM 2042) or SNSM 2030. The signal-detect signal is used for judging whether or not a signal has been supplied. The demodulating circuit 2025 demodulates the packet received by the optical receiver 2024, in order to demodulate the packet to be transmittable via a USB cable. The demodulating circuit 2025 can adopt a modulating method such as 8B10B.

The receipt FIFO (storing section) 2026 temporarily stores the demodulated packet. As in the transmission FIFO 2021, the receipt FIFO 2026 is used for adjusting a timing for transferring (repeating) a packet via a USB cable in order to compensate the difference in rate between the data transmission via the USB cable and the data receipt by optical communications.

The error detecting circuit 2028 is a circuit for judging whether or not an error (optical error) due to the optical modulation or demodulation is included in a packet (or another type of signal) demodulated by the demodulating circuit 2025.

The CRC-check circuit 2033 analyzes an error detecting code (CRC 5 or CRC 16) in a packet so as to check whether or not a packet (DATA packet, in particular) demodulated by the demodulating circuit 2025 includes a packet error (an irregular part that does not conform to the USB standards).

The USB transmitter 2027 is connected to the host 2010 or device 2013 via a USB cable, and sends, to the host 2010 or device 2013, the packet (USB signal including a packet) stored in the receipt FIFO 2026. The timer 2029 is a timer (time measuring device) used by the host SM 2032 or device SM 2042. The SNSM (speed setting section) 2030 is a control section for performing speed negotiation to be described later.

The host SM (host-side control section) 32 is a core part of the controller 11, controlling all processes of the host-side controller 2011. Likewise, the device SM (device-side control section) 2042 of the device-side control section 2012 is a core part for controlling all processes of the controller 12.

The operation of data communications in the present system is described. First, the operation when the device 2013 is connected will be explained. When the device 2013 is connected to the present system via the controllers 2011 and 2012, the host 2010 detects a power supply of the device 2013. The host 2010 performs the detection by checking a VBUS signal among signals that flow through four signal lines (D+, D−, power supply (VBUS), and GND) of the USB cable.

Next, the host 2010 detects the rate (supported mode) of the device 2013. Then if the device 2013 supports to full-speed mode (FS) or high-speed mode (HS), the host 2010 pulls up the signal to the D+ signal line. On the other hand, if the device 2013 only supports low-speed mode (LS), the host 2010 pulls up a signal to the D− signal line.

Note that, the following will explain a case where the device corresponds to the HS mode.

Next, the host 2010 sets both the D+ signal line and the D− signal line to not less than 10 ms, i.e. low level (SE0 state), and resets the bus of the device 2013. Subsequently, the device 2013 sends a signal particular to the HS mode (the signal is termed CHIRP) to the host 2010 via the controllers 2011 and 2012. Further, the host 2010 also sends a signal particular to the HS mode to the device 2013 via the controllers 2011 and 2012.

With this, the host SM 2032 and the device SM 2042 confirm that the host 2010 and the device 2013 are in the HS mode. Then, the host SM 2032 and the device SM 2042 control the SNSM 2030 so as to perform speed negotiation between the controller 2011 and 2012. This speed negotiation will be described later. As a result, the connection (bus) between the host 2010 and the device 2013 is established (completed).

After the device 2013 is connected to the present system, data transmission is performed between the host 2010 and the device 2013 via the controllers 2011 and 2012.

The following will explain SETUP transaction which is a characteristic operation of the present system.

In this transaction, the host 2010 sends, to the host-side controller 2011, a USB signal including a SETUP packet and a DATA packet. In the host-side controller 2011, the USB receiver 2020 receives this signal.

In response to this, the host SM 2032 controls the CRC-check circuit 2033 so as to cause the CRC-check circuit 2033 to judge whether or not a packet error is included in the SETUP packet and the DATA packet included in the received USB signal. Then, if the CRC-check circuit 2033 judges that a packet error is included, the host SM 2032 discards the received packet. On the other hand, If the CRC-check circuit 2033 judges that no packet error is included, the host SM 2032 stores the received SETUP packet and DATA packet in the transmission FIFO 2021.

Then, the host SM 2032 controls the modulating circuit 2022 so as to cause the modulating circuit 2022 to generate (optically modulate) an optical signal including the SETUP packet and DATA packet stored in the transmission FIFO 2021. Then, the host SM 2032 controls the optical transmitter 2023 so as to send the generated optical signal to the device-side controller 2012.

The optical signal from the host-side controller 2011 is received by the optical receiver 2024 of the device-side controller 2012. In response to this, the device SM 2042 controls and causes the demodulating circuit 2025 to demodulate the SETUP packet and DATA packet in the optical signal, and then stores the modulated packets in the receipt FIFO 2026.

After demodulating all of the received packet and storing the same in the receipt FIFO 2026, the device SM 2042 controls and causes the error detecting circuit 2028 to judge whether or not the SETUP packet and DATA packet include an optical error. Note that, if the error detecting circuit 2028 judges that the received packets include an optical error, the device SM 2042 deletes (discards) the packet from the receipt FIFO 2026. Further, the device SM 2042 controls the CRC-check circuit 2033 so as to judge whether or not a packet error is included in the SETUP packet and DATA packet stored in the receipt FIFO 2026. If it is judged that there is no packet error, the device SM 2042 controls the USB transmitter 2027 so as to send a USB signal including these packets to the device 2013 at a predetermined timing.

The device 2013 which has received the SETUP packet and DATA packet judges whether or not the DATA packet includes a packet error. If the device 2013 judges that the DATA packet does not include an error, the device sends an ACK packet (USB signal including this ACK packet) to the device-side controller 2012. On the other hand, if the device 2013 judges that the DATA packet includes an error, the device 2013 sends nothing.

The ACK packet transmitted to the device-side controller 2012 is received by the USB receiver 2020. In response to this, the device SM 2042 recognizes that the content of the received packet (recognizes that the packet is an ACK packet), and stores the packet in the transmission FIFO 2021.

Subsequently, the device SM 2042 controls and causes the modulating circuit 2022 to generate (optically modulate) an optical signal including the ACK packet stored in the transmission FIFO 2021.

Then, the device SM 2042 controls and causes the optical transmitter 2023 to send the generated optical signal to the host-side controller 2011.

The optical signal transmitted from the device-side controller 2012 is received by the optical receiver 2024 of the host-side controller 2011. In response to this, the host SM 2032 controls and causes the demodulating circuit 2025 to demodulate the packet of the optical signal and store the demodulated packet in the receipt FIFO 2026. After demodulating all of the received packet, the host SM 2032 controls and causes the error detecting circuit 2028 to judge whether or not the demodulated packet includes an optical error, and discards, from the FIFO 2026, the packet having an optical error.

After this, if the host SM 2032 recognizes that the packet stored in the receipt FIFO 2026 is an ACK packet, the host SM 2032 avoids sending the packet to the host 2010.

The host 2010 cannot receive an ACK packet after the maximum TA time has passed, even though the host 2010 has sent the SETUP packet and DATA packet to the device 2013. Accordingly, the host 2010 judges that the SETUP transaction failed, and retransmits the SETUP packet and DATA packet.

When the host SM 2032 of the host-side controller 2011 receives the SETUP packet and DATA packet to be retransmitted, the host SM 2032 discards these packets without storing them in the transmission FIFO 2021. Then, the host SM 2032 sends, to the host 2010, the ACK packet stored in the receipt FIFO 2026.

Figure 36:
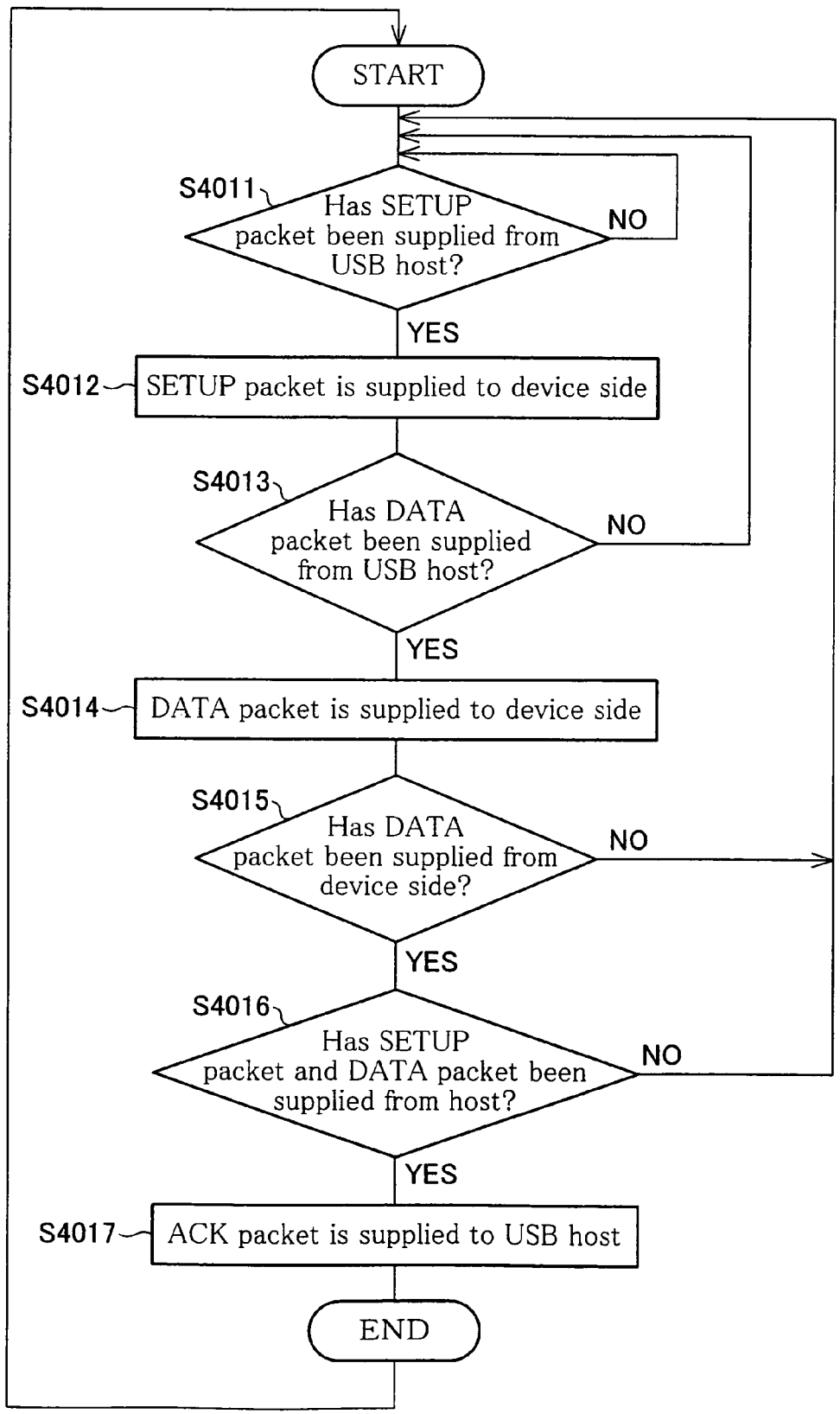
FIG. 36 is a flow chart showing the operation of a host SM of a host-side controller of the USB system shown in FIG. 35, on the occasion of performing a SETUP transaction.

FIG. 36 is a flowchart showing the operation of the host SM 2032 in the SETUP transaction. As shown in this figure, if the host SM 2032 receives a SETUP packet from the host 2010 (S4011), the host SM 2032 sends the packet to the device-side controller 2012 (S4012). Note that, if the host SM 2032 receives a packet other than the SETUP packet, the SETUP transaction is not carried out, so that the host SM 2032 performs another processing in accordance with the USB rules.

Then, the host SM 2032 judges whether or not the host 2032 has received a DATA packet from the host 2010, following the SETUP packet (S4013). If the host SM 2032 receives a packet other than the DATA packet, the host SM 2032 judges that the SETUP transaction is erroneous, and the operation returns to S4011. Meanwhile, if the DATA packet is received in S4013, the host SM 2032 transmits this packet to the device-side controller 2012 (S4014).

Subsequently, the host SM 2032 waits the supply of an ACK packet from the device-side controller 2012. If (according to the timer 2029) the waiting period exceeds a predetermined period of time, the host SM 2032 judges that the SETUP packet and the DATA packet were not properly transmitted to the device 2013, so that the operation returns to S4011.

On the other hand, if the host SM 2032 receives the ACK packet during a predetermined period of time, the host SM 2032 waits a SETUP packet and a DATA packet to be retransmitted from the host 2010 (S4016). If the waiting period exceeds the predetermined period of time (according to the timer 2029), the host SM 2032 judges that an error (trouble) occurred in the SETUP transaction, so that the operation returns to S4011.

If the host SM 2032 receives the SETUP packet and DATA packet during the predetermined period of time, the host SM 2032 transits the ACK packet, which has been stored in the receipt FIFO 2026, to the host 2010 (S4017), and the operation is terminated.

Figure 37:
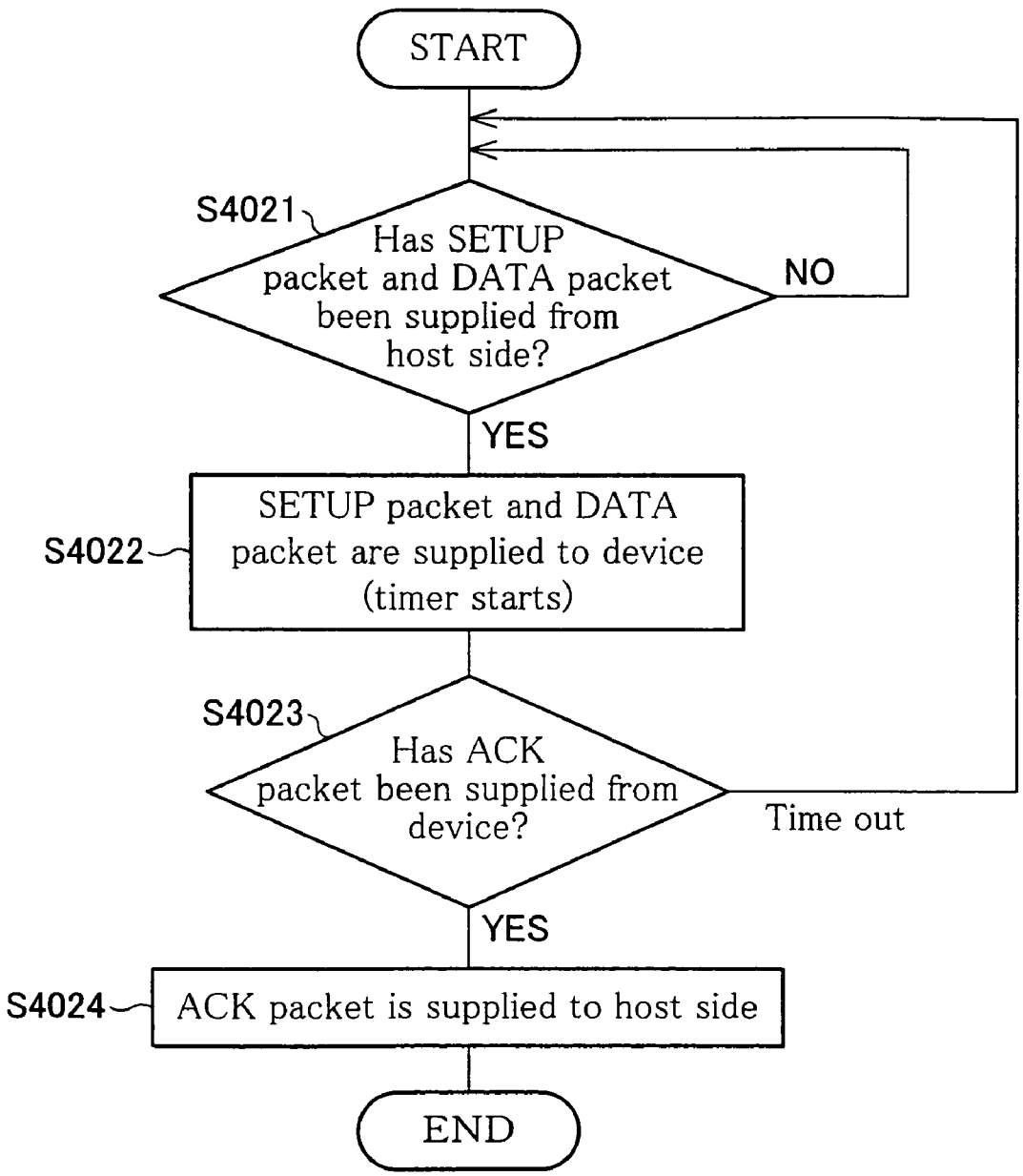
FIG. 37 is a flow chart showing the operation of a data SM of a device-side controller of the USB system shown in FIG. 35, on the occasion of performing a SETUP transaction.

FIG. 37 is a flowchart showing the operation of the device SM 2042 in the SETUP transaction. As shown in this figure, if the device SM 2042 receives the SETUP packet and DATA packet from the host-side controller 2011 (S4012), the device SM 2042 sends these packets to the device 2013 (S4022). Note that, if the device SM 2042 receives a packet other than the packets above, the SETUP transaction is not carried out, so that the host SM 2042 performs another processing in accordance with the USB rules.

Then, the device SM 2042 starts the timer 2029, and waits for an ACK packet to be sent from the device 2013 (S4023). When the waiting period exceeds a predetermined period of time (according to the timer 2029), the device SM 2042 judges that the SETUP packet and DATA packet could not be properly sent to the device 2013 (i.e. the transmission between the device-side controller 2012 and the device 2013 failed), and the operation returns to S4021 (because of timeout).

On the other hand, if the device SM 2042 receives the ACK packet within the predetermined period of time, the device SM 2042 sends the ACK packet to the host-side controller 2011 (S4024), and the operation ends.

As described above, when the host SM 2032 of the host-side controller 2011 receives the ACK packet which is transmitted from the device-side controller 2012 to the host 2010, the host SM 2032 stores the ACK packet in the receipt FIFO 2026 that the host SM 2032 controls.

Subsequently, the host SM 2032 transmits the stored ACK packet to the host 2010 when the SETUP packet and DATA packet are retransmitted from the host 2010.

In this manner, in the USB system that employs the host-side controller 2011, the host 2010 can receive an ACK packet immediately after retransmitting the SETUP packet and DATA packet. Therefore it is possible to finish the SETUP transaction even if the communications between the host 2010 and the device 2013 take time and the maximum TA time passes if the ACK packet sent from the device-side controller 2012 is directly supplied to the host 2010.

Note that, the communications between the host 2010 and the device 2012 take time as above, in cases such as the rate of communications between the controllers 2011 and 2012 is slow and the communication paths between the controllers 2011 and 2012 are long. Therefore by using the host-side controller 2011, it is possible to remarkably increase the choice of the communication paths between the host 2010 and the device 2013.

Further, the host SM 2032 of the host-side controller 2011 is arranged so as to judge whether or not the DATA packet includes an error, on the occasion of transmitting, to the device-side controller 2012, the SETUP packet and the DATA packet which have been supplied from the host 2010. The host SM 2032 avoids the transmission of the DATA packet if the DATA packet includes an error.

With this, it is possible to avoid transmitting a packet including an error (optical error, packet error) to the device-side controller 2012, thereby preventing an unnecessary transmission of the packet.

Further, in the present system, the device SM 2042 prevents the DATA packet, which has been supplied from the host-side controller 2011, from being transferred to the device 2013, if the DATA packet includes an error (optical error, packet error).

With this, it is possible to avoid transmitting, to the device 2013, a packet including an error, so that an unnecessary transmission of the packet is prevented.

As described above, the host SM 2032 and device SM 2042 avoid transmitting an erroneous packet to the device side. With this, it is possible to reduce the costs for the transmission (e.g. electric power), and it is also possible to restrain an unexpected occurrence of an abnormal operation of the device 2013.

Further, the host SM 2032 and device SM 2042 are arranged so as to discard a received packet if the received packet includes an error. That is to say, the host SM 2032 and device SM 2042 store the received packet in the receipt FIFO 2026. Discarding the packet including an error, it is possible to avoid unnecessarily consuming storage capacity of the receipt FIFO 2026.

The following will discuss the above-mentioned speed negotiation.

Figure 38:
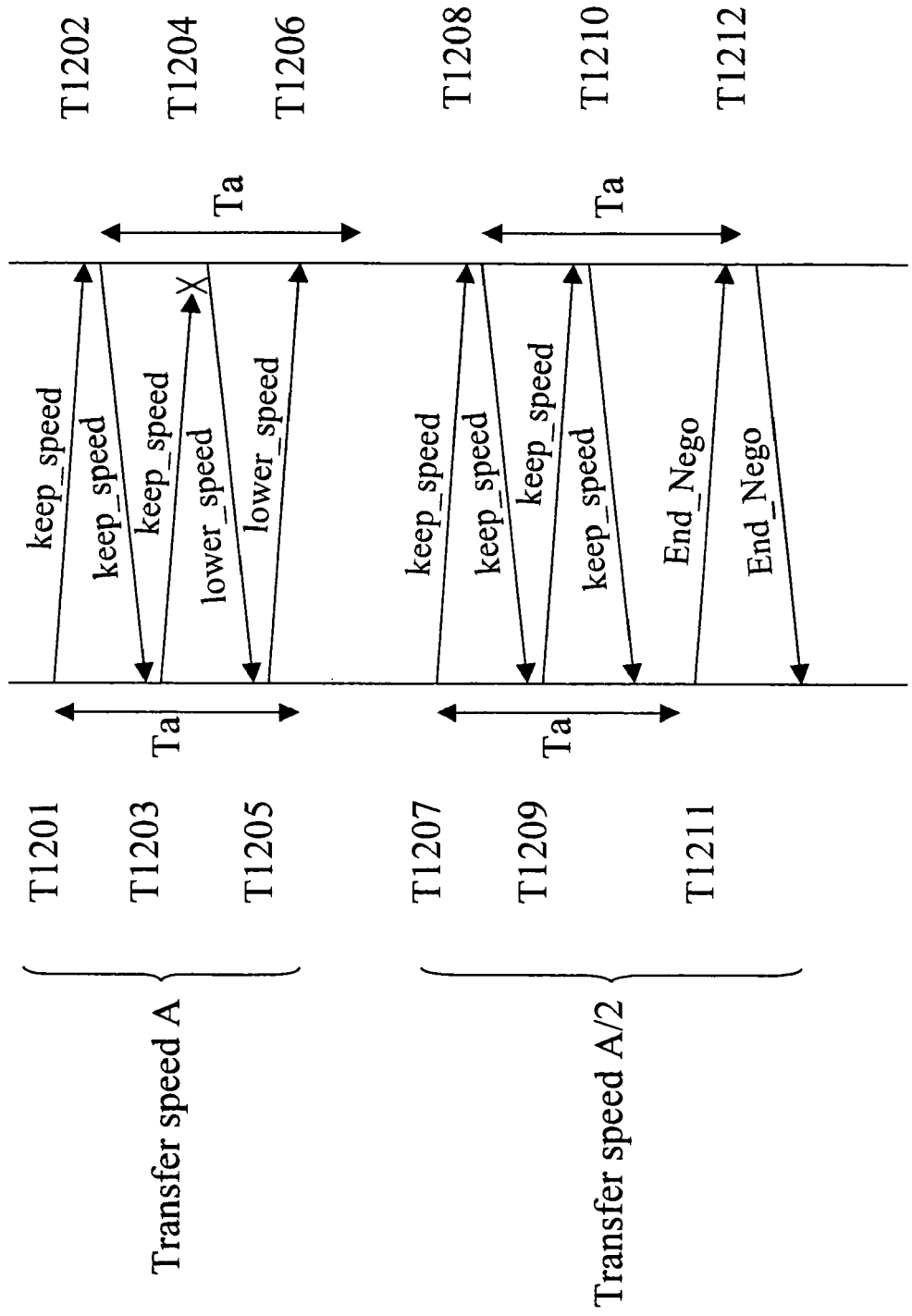
FIG. 38 is a timing chart showing an example of a speed negotiation in the USB system shown in FIG. 35.

The speed negotiation is a process to determine the data transfer rate of optical wireless communications between the controllers 2011 and 2012. FIG. 38 is a timing chart showing an example of this process.

FIG. 19 illustrates the operation of the SNSM 2030 of the host-side controller 2011 involved in the process. FIG. 20 illustrates, meanwhile, the operation of the SNSM 2030 of the device-side controller 2012 involved in the process.

At T1201, the SNSM 2030 of the host-side controller 2011 controls the optical transmitter 2023 so as to start the transmission of a keep_speed signal at a predetermined transfer rate A, and restart the timer 2029 (i.e. start the timer 2029 immediately after resetting the same).

The keep_speed signal is one of transmission codes (request signals) for determining the transfer rate, and used for requesting the receiving end (device-side controller 2012) to keep a current transfer rate.

In the meanwhile, in the device-side controller 2012, the optical receiver 2024 having received the keep_speed signal transmits a signal-detect signal to the SNSM 2030. Receiving this signal-detect signal, the SNSM 2030 restarts the timer 2029, and controls the optical transmitter 2023 so as to start the transmission of the keep_speed signal to the host-side controller 2011. The SNSM 2030 controls the demodulating circuit 2025 and the error detecting circuit 2028 so as to judge the presence of an error in the received keep_speed signal.

Subsequently, as shown in FIG. 38, if, on the optical wireless communication path, a bit error occurs in the keep_speed signal supplied from the host-side controller 2011 at T1203 so that the device-side controller cannot properly receive the signal, the SNSM 2030 of the device-side controller 2012 supplies a lower_speed signal to the host-side controller 2011 at T1204, instead of the keep_speed signal.

This lower_speed signal is one of the request signals for determining the transfer rate, and requests the receiving end (host-side controller 2011) to lower the transfer rate. Receiving the lower_speed signal, the SNSM 2030 of the device-side controller 2012 recognizes that the device transfer cannot be properly carried out at the current transfer rate A. Then the lower_speed signal is supplied to the device-side controller 2012 (i.e. the transmission code is switched to lower_speed).

The SNSM 2030 of the device-side controller 2012 receives the lower-speed signal from the host-side controller 2011, so as to recognize that the lower_speed signal supplied from the SNSM 2030 of the device-side controller 2012 has been recognized by the host-side controller 2011.

After a predetermined period Ta has passed, the SNSMs 2030 of the controllers 2011 and 2012 reduce the transfer rates to, for instance, half (A/2), because the signal being transmitted at this moment is the lower_speed signal. That is to say, at T1207, the SNSM 2030 of the host-side controller 2011 starts to transmit the keep_speed signal at the transfer rate A/2, and also restarts the timer 2029.

Meanwhile, in response to a signal-detect signal from the optical receiver 2024, the SNSM 2030 of the device-side controller 2012 starts to transmit the keep_speed signal, and restarts the timer 2029.

If the predetermined period Ta has passed while an error is detected neither in the controller 2011 nor in the controller 2012, the SNSMs 2030 of the controllers 2011 and 2012 start to exchange an End_Nego signal which is a signal (end request) indicating the end of the speed negotiation. Then each of the SNSMs 2030 terminates the speed negotiation upon the receipt of the End_Nego signal from the communication counterpart, and changes to an active state.

Referring to FIG. 19, the operation of the SNSM 2030 of the host-side controller 2011 is described.

A state ST0 is a state for starting the speed negotiation. In this state, the STSM 2030 of the host-side controller 2011 sets the transmission code to the keep_speed signal, restarts the timer 2029, and then changes to a state ST1.

The state ST1 is a state for carrying out the speed negotiation.

The SNSM 2030 of the host-side controller 2011 switches the transmission code to the lower_speed, if the received code includes an error or the lower_speed signal is supplied from the communication counterpart (device-side controller 2012).

After the predetermined period Ta has passed, the SNSM 2030 of the host-side controller 2011 (i) changes to the state ST0 if the transmission code is the lower_speed signal, while (ii) changes to the state ST2 if the transmission code is keep_speed.

In the case of the transition to the state ST0, a current transfer rate is, for instance, reduced to half. (The degree of reduction of the transfer rate can be arbitrarily set by the user, and the degree of the reduction is recorded in the SNSM 2030 in advance.)

In the meanwhile, in the case of the transition to the state ST2, the transmission code is switched to the End_Nego signal. This state ST2 is a state for confirming the end of the speed negotiation. Receiving the End_Nego signal from the communication counterpart (device-side controller 2012), the SNSM 2030 of the host-side controller 2011 ends the speed negotiation and changes to the active state.

Next, referring to FIG. 20, the operation of the SNSM 2030 of the device-side controller 2012 is described.

The operations in the states ST0, ST1, and ST2 are identical with those of the SNSM 2030 of the host-side controller 2011.

A state ST4 before the state ST0 is a state for checking whether or not a request signal has been supplied from the host-side controller 2011.

If a signal-detect signal has been supplied from the optical receiver 2024 (or another received signal detecting circuit), the SNSM 2030 changes to the state ST0.

Note that, the above-mentioned keep_speed signal, lower_speed signal, and End_Nego signal may be packets (character strings corresponding to a particular format) or may be made up of certain characters.

In the description above, after the communication mode (rate) between the host 2010 and the device 2013 is confirmed, the speed negotiation is carried out. The speed negotiation, however, may be carried out at any timings before the start of the communications between the host 2010 and the device 2013.

Furthermore, in the descriptions above, the speed negotiation is carried out in such a situation that the host 2010 and the host-side controller 2011 are connected by a USB cable and the device-side controller 2012 and the device 2013 are connected by a USB cable.

However, on condition that the controllers 2011 and 2012 can communicate each other, the speed negotiation can be carried out before connecting the controllers 2011 and 2012 with the host 2010 and the device 2013 using USB cables.

In the present embodiment, the host SM 2032 avoids the transmission of the ACK packet, which is supplied from the device-side controller 2012, to the host 2010, and the host SM 2032 transmits the ACK packet to the host 2010 when the SETUP packet and the DATA packet are retransmitted from the host 2010.

However, upon the receipt of the ACK packet from the device-side controller 2012, the host SM 2032 may judge whether or not the ACK packet can be transferred to the host 2010 within the maximum TA time.

In this case, if it is judged that the ACK packet cannot be transferred within the maximum TA time, the host SM 2032 avoids the transfer of the ACK packet to the host 2010 and waits for the retransmission of the SETUP packet and the DATA packet, as described above. In the meantime, when it is judged that the ACK packet can be transferred within the maximum TA time, the host SM 2032 transfers the ACK packet to the host 2010, without waiting for the retransmission of the SETUP packet and the DATA packet from the host 2010.

The host SM 2032 may be arranged in such a manner that, when the ACK packet is supplied from the device-side controller 2012, the host SM 2032 transfers this ACK packet directly to the host 2010. In this case, when the ACK packet is received by the host 2010, the SETUP transaction ends if the maximum TA time has not passed.

Meanwhile, if the maximum TA time has already passed, the host 2010 retransmits the SETUP packet and the DATA packet. In accordance with this retransmission, the host SM 2032 transmits, to the host 2010, the ACK packet stored in the receipt FIFO 2026.

In the above-described speed negotiation, the host SM 2032 does not have to avoid the transfer of the ACK packet as above, if the rate of the optical wireless communications between the controllers 2011 and 2012 is as fast as the rate (480 Mbps) on a USB cable.

That is, in such a case, the ACK packet is likely to be transferred to the host 2010 within the maximum TA time. For this reason, the host SM 2032 can complete the SETUP transaction even if the ACK packet supplied from the device-side controller 2012 is directly transferred (repeated) to the host 2010. However, as a matter of course, the following may be carried out also in this case: The host SM 2032 avoids the transmission of the ACK packet, which has been supplied from the device-side controller 2012, to the host 2010, and transmits the ACK packet to the host 2010 when the SETUP packet and the DATA packet are retransmitted from the host 2010.

Furthermore, after the above-described speed negotiation, at least either one of the host SM 2032 and the device SM 2042 figures out an error rate of the packet transmission between the controllers 2011 and 2012, using the error detecting circuit 2028 (or CRC-check circuit 2033). The error rate (error occurrence rate) is calculated by dividing the number of errors by the number of transmission and receipt.

When this error rate exceeds a predetermined value, it is preferable that each of the host SM 2032 and the device SM 2042 controls the SNSM 2030 so as to lower the communication rate between the controllers 2011 and 2012. With this, it is possible to lower the error rate owing to the excessively high communication rate.

In the present embodiment, the host SM 2032 controls and causes the CRC-check circuit 2033 to check whether or not the SETUP packet and the DATA packet in the USB signal include an error.

Alternatively, the host SM may cause the CRC-check circuit 2033 to only check the presence of an error in the DATA packet. In this case, the SETUP packet and the DATA packet are discarded only when the DATA packet has a packet error. Since the SETUP packet is shorter than the DATA packet, a packet error rarely occurs in the SETUP packet. On this account, the communications are properly carried out even if the existence of a packet error is checked only in the DATA packet.

In the present embodiment, when the SETUP packet and the DATA packet are supplied from the host-side controller 2011, the device SM 2042 controls the error detecting circuit 2028 so as to check the presence of an optical error, and then controls the CRC-check circuit 2033 so as to check the presence of a packet error.

On this occasion, however, it is possible to omit the check of an optical error by the error detecting circuit 2028. That is to say, generally speaking, when an error occurs on the occasion of optically modulating a packet, the packet does not comply with the USB standard. Such an error can also be conceived as a packet error by the CRC-check circuit 2033.

As in the case of the host SM 2032, the device SM 2042 may be arranged such that the check of the presence of a packet error by the CRC-check circuit 2033 is carried out only with respect to the DATA packet.

In the present embodiment, the host SM 2032 of the host-side controller 2011 controls and causes the CRC-check circuit 2033 so as to check whether or not the SETUP packet and the DATA packet in the USB signal supplied from the host 2010 include an error, and after this check, the host SM 2032 transits the packets to the device-side controller 2012.

Alternatively, the host SM 2032 may be arranged in such a manner that the SETUP packet and the DATA packet, which have been supplied from the host 2010, are serially supplied to the device-side controller 2012 on a first-come, first-served basis, before checking the presence of a packet error.

In this case, furthermore, during the transmission of the packets to the device-side controller 2012, the host SM 2032 may control the error detecting circuit 2028 and the CRC-check circuit 2033 so as to cause the error detecting circuit 2028 and the CRC-check circuit 2033 to check the presence of an error in the packets. When an error is found, it is preferable that the host SM 2032 immediately discontinues the transmission.

With this, an unnecessary packet transfer between the controllers 2011 and 2012 is restrained, so that the decline of the transfer efficiency on the low-speed communication path between the controllers 2011 and 2012 is restrained.

When a packet being supplied from the host 2010 is serially transmitted to the device-side controller 2012, the host SM 2032 may operate in the following manner: When the packet has completely been received (i.e. a part of the packet has already been transmitted), the host SM 2032 causes the CRC-check circuit 2033 to check the presence of a packet error, and add the result of the check to the end of the packet to be transmitted.

Figure 39:
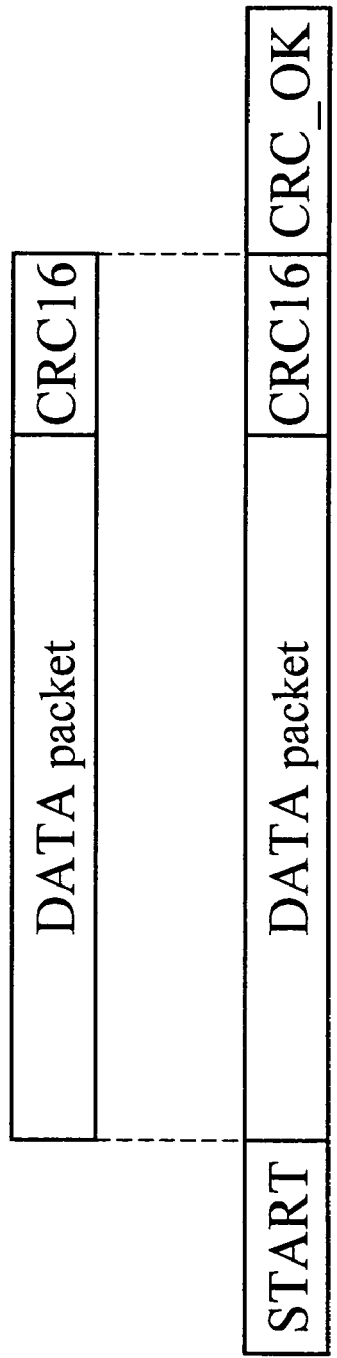
FIG. 39 illustrates how a data packet transferred in the USB system shown in FIG. 35 is structured.

FIG. 39(*a*) illustrates a regular DATA packet, and FIG. 39(*b*) illustrates a DATA packet (low-speed packet) transmitted to the device-side controller 2012 in the case above. As shown in the figures, in the case above, the host SM 2032 adds the information regarding the presence of a packet error to the end of the packet (i.e. a field after the CRC 16). That is to say, when there is no packet error, the host SM 2032 sets (adds) a "CRC_OK" flag (non-error flag). Meanwhile, when there is a packet error, the host SM 2032 adds a "CRC_NG" flag (error flag) to the end of the DATA packet.

With this, the device SM 2042 of the device-side controller 2012 can recognize that the received packet has a packet error. Furthermore, the device SM 2042 can recognize that the packet error has already occurred when the packet was in the host-side controller 2011.

In the present system, it is preferable that, when it is judged that a packet supplied from the host-side controller 2011 includes a packet error, the device SM 2042 of the device-side controller 2012 can request the host-side controller 2011 to retransmit the packet.

According to this arrangement, the host SM 2032 of the host-side controller 2011 receiving such a retransmission request retransmits, to the device-side controller 2012, a packet stored in the transmission FIFO 2021. With this, the DATA packet can be transmitted to the device side without waiting for the retransmission from the host 2010.

Note that, in the arrangement above, it is preferable that the host SM 2032 sets a flag (non-error flag or error flag, illustrated with reference to FIG. 39(*b*)) to a packet transmitted to the host-side controller 2011. That is to say, in this case, the device SM 2042 can understand that, in a packet having an error flag, a packet error has already occurred at the time of the transmission to the host-side controller 2011 from the host 2010. On this account, it is preferable that the device SM 2042 does not make a retransmission request for such a packet with an error flag, and makes a retransmission request only for a packet with a non-error flag. With this, unnecessary packet transmission is restrained.

In the operation shown in FIG. 37, when the ACK packet is not supplied from the device 2013 within a predetermined period (S4023), the device SM 2042 judges that the SETUP packet and the DATA packet were not properly supplied to the device 2013 (i.e. the communication between the device-side controller 2012 and the device 2013 failed), and the operation returns to S4021 (because of timeout). Alternatively, the device SM 2042 may retransmit the SETUP packet and the DATA packet to the device 2013.

According to this arrangement, on the occasion of storing the SETUP packet and the DATA packet, which have been supplied from the host-side controller 2011, in the receipt FIFO 2026, the device SM 2042 stores the location of these packets in the receipt FIFO 2026 (i.e. a read pointer value). Note that, the location may be stored in the receipt FIFO 2026 or in another memory (not illustrated).

After transmitting the SETUP packet and the DATA packet to the device 2013, the device SM 2042 sets the read pointer (not illustrated) of the receipt FIFO 2026 to the stored location (read pointer value) of the packets in the receipt FIFO 2026. The device SM 2042 reads out the SETUP packet and the DATA packet from this location, and retransmits them to the device 2013.

In this manner, even if the communications between the device-side controller 2012 and the device 2013 are defected, the SETUP packet and the DATA packet are retransmitted to the device 2013, without operating the host 2010 and the host-side controller 2011.

Note that, in the above, the retransmission is realized by controlling the read pointer of the receipt FIFO 2026. Alternatively, the device SM 2042 may carry out the retransmission in such a manner that the location (start address) of the packet stored in the receipt FIFO 2026 is stored in another storage device (e.g. RAM) of the device-side controller 2012, and the packet is read out using this stored location.

In the present embodiment, the device SM 2042 judges the presence of a packet error in the packet supplied from the host-side controller 2011, using the CRC-check circuit 2033, and only transmits an errorless packet to the device 2013. Alternatively, the device SM 2042 may transmit all packets stored in the receipt FIFO 2026 to the device 2013, without carrying out the above-mentioned packet error checking. Also in this case, the device 2013 having received a packet with an error does not return the ACK packet to the device-side controller 2012.

In the arrangement above, the retransmission of a packet between the device-side controller 2012 and the device 2013 may be carried out. In doing so, it is preferable that, before the retransmission, the device SM 2042 checks the presence of an error in a packet read out from the receipt FIFO 2026, using the CRC-check circuit 2033. It is also preferable that the device SM 2042 avoids the retransmission of a packet with a packet error.

In the present embodiment, the device SM 2042 of the device-side controller 2012 demodulate the entirety of the packet supplied from the host-side controller 2011, and then transmits this packet to the device 2013. This is partly because, if parts of a packet transmitted through the low-speed communication path (between the controllers 2011 and 2012; 100 Mbps) are transferred to the device 2013 at a high rate (480 Mbps) on a first-come, first-served basis, dropouts may occur in the transmission (i.e. the receipt FIFO 2026 may become empty), because the rate of transmission is higher than the rate of receipt.

For this reason, it is preferable to figure out "stable received amount", i.e. a received amount with which dropouts do not occur in the transmission even if the packet transfer to the device 2013 is carried out at a high rate, based on the size of the received packet. It is therefore preferable that the transfer to the device 2013 starts when an amount of the received packet reaches the stable received amount.

Under USB 2.0, as shown in FIG. 7, the maximum length of a packet is defined for each transfer mode and each transfer rate. However, the size of the SETUP packet received by the device-side controller 2012 in the SETUP transaction is determined in advance. Also, the size of the DATA packet received after the SETUP packet is determined to 8 bytes. On this account, the device SM 2042 can figure out the above-mentioned stable received amount, in the case of the SETUP transaction.

Figure 40:
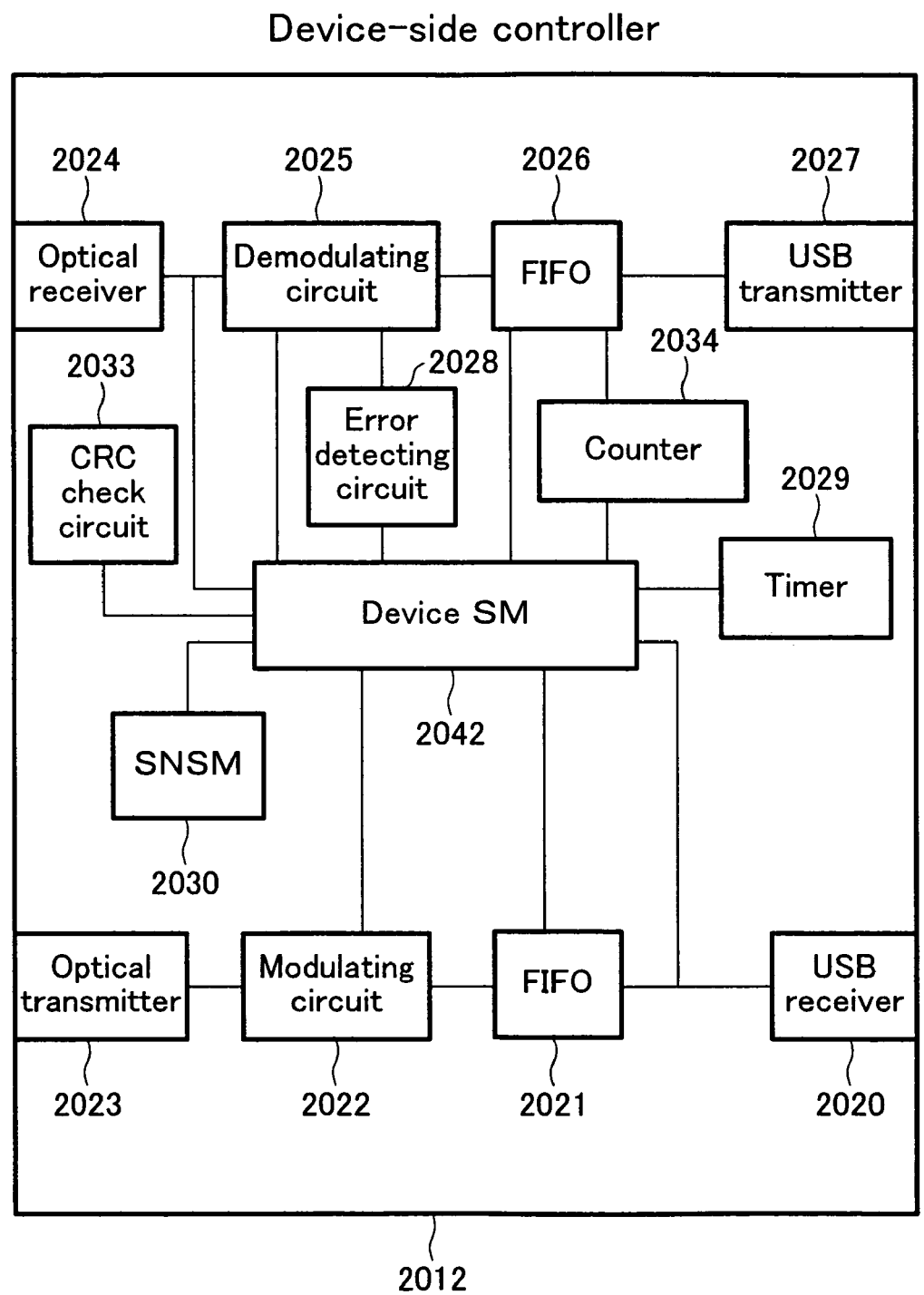
FIG. 40 is a block diagram showing another arrangement of the device-side controller of the USB system shown in FIG. 35.

FIG. 40 illustrates the device-side controller 2012 which can transmit a packet to the device 2013 in line with the stable received amount. As in the figure, the device-side controller 2012 is identical with the device-side controller 2012 shown in FIG. 35 except that a counter 2034 is further provided.

In this arrangement, first, the device SM 2042 figures out the stable received amount regarding the SETUP transaction. Subsequently, when the packet (especially DATA packet) supplied from the host-side controller 2011 is stored in (written into) the receipt FIFO 2026, the value of the counter 2034 is increased in accordance with the amount of the stored data. When the value of the counter 2034 reaches a value corresponding to the above-described stable received amount, the device SM 2042 starts the packet transfer to the device 2013.

Therefore, in the SETUP transaction above, the device SM 2042 can start the packet transfer to the device 2013, without waiting for the receipt of the whole packet from the host-side controller 2011. This makes it possible to increase the rate of the whole SETUP transaction.

As described above, in the SETUP transaction, the size of the DATA packet is 8 bytes. The stable received amount can therefore be set to be low, so that the transfer rate in this SETUP transaction is higher than the rates in other transactions. Note that, in the case above, if an error is found in the DATA packet when the DATA packet is being transmitted to the device 2013, the device SM 2042 preferably discontinues the transfer of the DATA packet. With this, unnecessary packet transmission is restrained.

In the present embodiment, the data transfer rate of the optical wireless communications between the controllers 2011 and 2012 is 100 Mbps. However, the transfer rate between the controllers 2011 and 2012 can be arbitrarily determined (the transfer rate may be identical with or higher than the transfer rate on the USB cable).

Even if the transfer rate between the controllers 2011 and 2012 is higher than the transfer rate (transfer rate on the USB cable) between the host 2010 and the host-side controller 2011 and between the device-side controller 2012 and the device 2013, the ACK packet may not be transferred to the host 2010 within the maximum TA time, if the communication path between the host 2010, and the device 2013 is long (for instance, an optical cable which is several hundred meters long is adopted as the communication path between the controllers 2011 and 2012).

Also in this case, as in the present system, the host SM 2032 transfers the ACK packet to the host 2010 in accordance with the retransmission of the SETUP packet and the DATA packet from the host 2010, so that the SETUP transaction is properly completed. Note that, the USB standard defines the maximum TA time in accordance with the repeating time for the stages (6 at the maximum) of a USB hub and the length of a USB cable (5 meters at the maximum).

When the transfer rate between the controllers 2011 and 2012 is higher than the transfer rate between the host 2010 and the host-side controller 2011, it is preferable that, after completely receiving the packet (especially DATA packet) from the host 2010, the transfer to the device-side controller 2012 starts. With this, it is possible to restrain the dropout of data to be transmitted, when the packet is transmitted to the device-side controller 2012.

Also in this case, it is possible to figure out "stable received amount", i.e. a received amount with which dropouts do not occur in the transmission even if the packet transfer to the host-side controller 2011 is carried out at a high rate, based on the size of the DATA packet supplied from the host 2010. It is therefore preferable that the transfer to the host-side controller 2011 starts when an amount of the received packet reaches the stable received amount.

In the present embodiment, the controllers 2011 and 2012 are connected to each other by an optical wireless communication path. Alternatively, the controllers 2011 and 2012 may be connected to each other by an optical cable. Adopting an optical cable realizes long-distance packet transmission, and the optical wireless communication (free-space communication) can improve the convenience because wiring is unnecessary.

The communications between the controllers 2011 and 2012 is either half-duplex or full-duplex. By the full-duplex, the transmission from the host to device and the transmission from the device to host can be simultaneously carried out. When the full-duplex is adopted, the optical transmitter 2023 made up of a light-emitting diode or a laser diode always emits light. On this account, it is unnecessary to add a preamble to the packet, so that the efficiency of the communications on the communication path (i.e. the efficiency of the use of the communication path) is improved.

The optical transmitter 2023 always emits light in the case of the full-duplex communication, in order to immediately repeat a packet supplied from the host 2010 or the device 2013 to the USB receiver 2020.

Since the optical transmitter 2023 always emits light, the connection/disconnection of the controllers 2011 and 2012 is easily done. That is to say, in the case of the half-duplex communication, it is judged that the controller 2011 is disconnected from the controller 2012, when the optical receiver 2024 does not receive light for a certain period of time. Meanwhile, in the full-duplex communication, when the controllers are connected to each other, the optical transmitter 2023 is caused to always emit light and the optical receiver 2024 of the controller of the receiving end is caused to always receive light. On the occasion of disconnection, the optical transmitter 2023 is caused to stop the emission of light. This makes it possible to judge that the disconnection is carried out when the optical receiver 2024 no longer receives light. Therefore, a time required for the disconnection in the full-duplex communication is shorter than that of the half-duplex communication.

The controllers 2011 and 2012 may be connected so as to perform wireless communications using a regular electric wave, rather than optical communications. In this case, it is preferable that the modulation and demodulation method of the modulating circuit 2022 and the demodulating circuit 2025 are properly set. The optical receiver 2024 in this case is an antenna for receiving electric waves.

The aforesaid preamble is a signal required by a clock data recovery circuit (not illustrated) of the packet receiving side to synchronize the clock. Generally, the preamble is a series of "1010" patterns. Since it is impossible to transmit the DATA packet during the preamble, the preamble produces wasting time. In the full-duplex communication, the host-side controller and the device-side controller always transmit signals, so that it is unnecessary to carry out the clock synchronization for each packet. In short, the preamble is unnecessary. For this reason, the transfer efficiency is improved by the full-duplex communication.

In the present embodiment, the controllers 2011 and 2012 are connected to the host 2010 or the device. 2013, via USB cables. Alternatively, the host-side controller 2011 may be connected to a port on the downstream of a USB hub connected to the host 2010, or the host-side controller 2011 may be a part of the host 2010 or the USB hub. Also, the device-side controller 2012 may be connected to a port on the upstream of the USB hub, via a USB cable. The device-side controller 2012 may be a part of the device or the USB hub.

In the present system, the host SM 2032 is practically identical with device SM 2042, and the host-side controller 2011 is arranged so as to be practically identical with the device-side controller 2012. For this reason, the present system can be constructed only by providing one type of controllers to the host 2010 and the device 2013, respectively.

In the present embodiment, each of the controllers 2011 and 2012 is provided with the error detecting circuit 2028 and the CRC-check circuit 2033. However, in an arrangement that an error in a supplied packet is not detected, the controller does not have to include the error detecting circuit 2028 and the CRC-check circuit 2033. Also, the error detection may be carried out using the host SM 2032 and the device SM 2042.

In the present embodiment, each of the controllers 2011 and 2012 includes the timer 2029. However, if each of the host SM 2032 and the device SM 2042 does not use the timer 2029, it is unnecessary to provide the timer 2029 in each of the controllers 2011 and 2012. This occurs, for instance, when the upper limit of the waiting period of the host SM 2032 regarding the receipt of the packet is not set in S4015 and S4016 shown in FIG. 36, and when the upper limit of the waiting period of the device SM 2042 concerning the receipt of the ACK packet is not set (i.e. no timeout occurs) in S4023 shown in FIG. 37.

In the present embodiment, each of the controllers 2011 and 2012 is provided with the SNSM 2030. However, if the above-described speed negotiation is not carried out and the communication rate between the controllers 2011 and 2012 is constant, it is unnecessary to provide the SNSM 2030 in each of the controllers 2011 and 2012.

In the present embodiment, the host 2010 is a personal computer. The host 2010 may be, however, any types of equipments on condition that the equipment can use the device 2013 and can act as a master terminal under USB standard.

In the present embodiment, each of the controllers 2011 and 2012 is provided with the SNSM 2030. However, if the above-described speed negotiation is not carried out and the communication rate between the controllers 2011 and 2012 is constant, it is unnecessary to provide the SNSM 2030 in each of the controllers 2011 and 2012.

In the present embodiment, the device SM 2042 of the device-side controller 2012 supplies the SOF packet to the device 2013, after the connection between the host 2010 and the device 2013 is established. Also, when the host SM 2032 of the host-side controller 2011 receives the SOF packet which is supplied from the host 2010 towards the device 2013, the host SM 2032 avoids the transmission of this packet to the device-side controller 2012.

Alternatively, being similar to a conventional USB system, the present system may be arranged in such a manner that, the host SM 2032 of the host-side controller 2011 repeats the SOF packet supplied from the host 2010 to the device-side controller 2012, while the device SM 2042 of the device-side controller 2012 repeats the SOF packet to the host 2010.

That is to say, the present system performs the communications between the host 2010 and the host-side controller 2011 and between the device-side controller 2012 and the device 2013, in the high speed mode (HS; 480 Mbps which is the maximum native rate of USB). The communications between the controllers 2011 and 2012 are carried out by 100 Mbps optical communication (optical wireless or optical-cable communication) which is slower than the rate on the high speed mode.

When the data transfer rate of the optical communication between the controllers 2011 and 2012 is 480 Mbps, an optical transmitter and an optical receiver (i.e. optical transceiver) which have the following frequency band are required, when, for instance, the 8B10B modulating method is adopted.

$$480 \times 10/8 = 600 \text{ Mbps}$$

Such an optical transmitter has to adopt an LD (laser diode).

Meanwhile, when the data transfer rate of the optical communication between the controllers 2011 and 2012 is 100 Mbps, the optical transmitter 2023 can be made up of an LED (light-emitting diode). An LED is significantly cheaper than an LD.

For this reason, decreasing the rate of the optical communication between the controllers 2011 and 2012, it is possible to manufacture the controllers 2011 and 2012 (optical transmitter 2023) at low cost. Furthermore, adopting the optical communication makes it possible to avoid the limitations regarding the USB cable (e.g. cable length).

It is preferable that the members involved in the data communication between the controllers 2011 and 2012 are only the optical transmitter 2023 and the optical receiver 2024, and the ports (communication terminals) for these members are limited to optical ports for the optical transmitter 2023 and the optical receiver 2024 (i.e. metal ports are not used). Also, it is preferable that the controllers 2011 and 2012 are integrated into the host 2010 or the device 2013. With this, a frequency band required by the controllers 2011 and 2012 is significantly lowered from 600 Mbps to 100 Mbps. This makes it possible to manufacture the controllers 2011 and 2012 through a low-cost manufacturing process.

It is noted that, if a member whose data transfer rate is low (e.g. a flash memory whose data transfer rate is about 50 Mbps) is adopted as the device 2013, the time required for completing the transaction significantly varies in accordance with the transfer rate of the device 2013. On this account, as long as the data transfer rate between the controllers 2011 and 2012 is higher than the rate of the device 2013, the variation of the data transfer rate between the controllers 2011 and 2012 does not significantly influence on the time required for completing the transaction.

The characteristic of the USB system of the present invention can be rephrased as follows: The USB system includes a host, a device, a host-side controller which relays the communication between the host and device, and a device controller which is provided in the device and relays the communication between the host and device, the data transfer between the controllers is carried out as optical communication, and the data transfer rate of the optical communication is lower than the data transfer rate in a high speed mode of USB 2.0. Further, when the communication path between the controllers 2011 and 2012 is not optical (e.g. wireless communication using an electric wave), the manufacturing costs of the controllers 2011 and 2012 can be reduced by lowering the transfer rate. Therefore, the characteristic of the USB system of the present invention can also be rephrased as follows: The USB system includes a host, a device, a host-side controller which relays the communication between the host and device, and a device controller which is provided in the device and relays the communication between the host and device, and in this USB system, the data transfer rate between the controllers is lower than the data transfer rate in a high speed mode of USB 2.0.

The above-described embodiment has been discussed on the premise of adopting USB 2.0. Under USB 2.0, the features on the host side and the features on the function side are both fixed. That is to say, data exchange under USB 2.0 is performed on condition that devices (e.g. digital camera and printer) which are USB devices are connected to a PC which is a USB host.

In recent years, a standard termed USB-OTG (USB-On-The-Go) has been developed. Under this standard, a PC (USB host) which has been required in a conventional USB system is no longer necessary. That is to say, USB-OTG is so convenient that two-way data transmission between USB devices is realized without a PC (USB host). Under USB-OTG, a device operates as a USB host or a USB device, according to the type of a connector of a cable connected to the device.

As in USB 2.0, USB-OTG supports three types of transfer rate: LS (1.5 Mbps); FS (12 Mbps); and HS (480 Mbps). A USB-OTG-compliant device can operate both as a USB host and a USB device. Under USB-OTG, a new type of connector termed miniAB is available. To a miniAB connector, both a cable with a miniA plug and a cable with a miniB plug can be connected. As described above, a device can operate as a USB host or a USB device, according to the type of a connector of a cable connected to the device. The device operates as a USB host when a miniA plug is connected thereto, while the device operates as a USB device when a miniB plug is connected thereto. Furthermore, USB-OTG supports such a new feature that a host and a function which are connected with each other via a cable can actively swap roles, on ground of a new protocol termed HNP (Host Negotiation Protocol). In other words, under USB-OTG, to which type a device to be connected is assigned, USB host or USB device, is determined in accordance with the type of a connector of a cable or HNP defined in USB-OTG.

Figure 41:
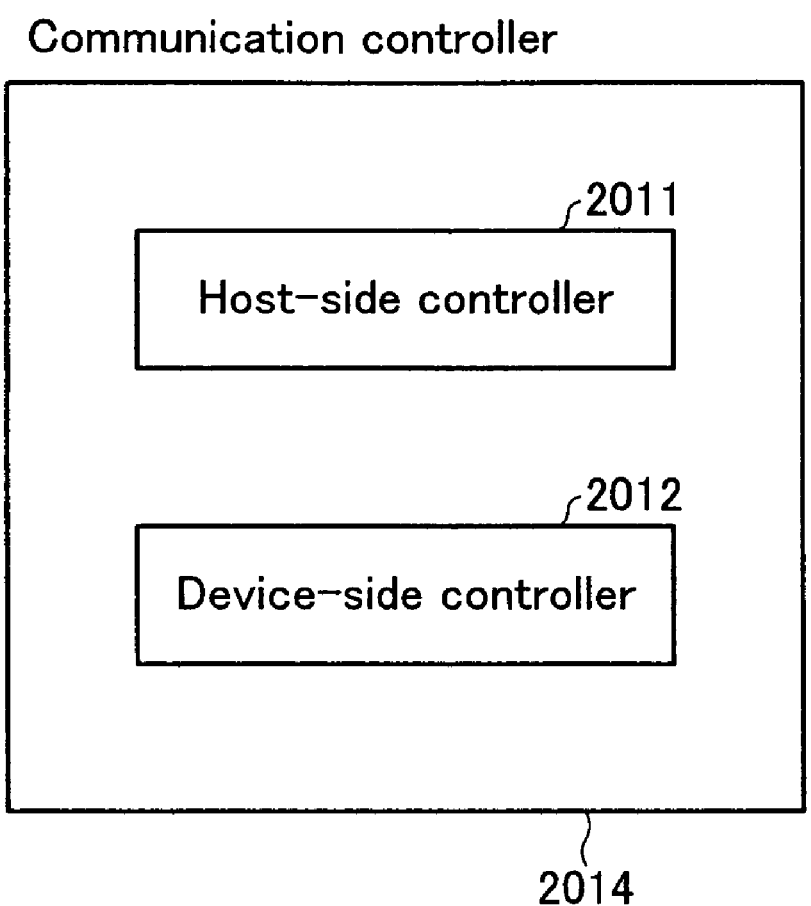
FIG. 41 illustrates a communication controller which can operate as a host-side controller and a device-side controller.
Figure 43:
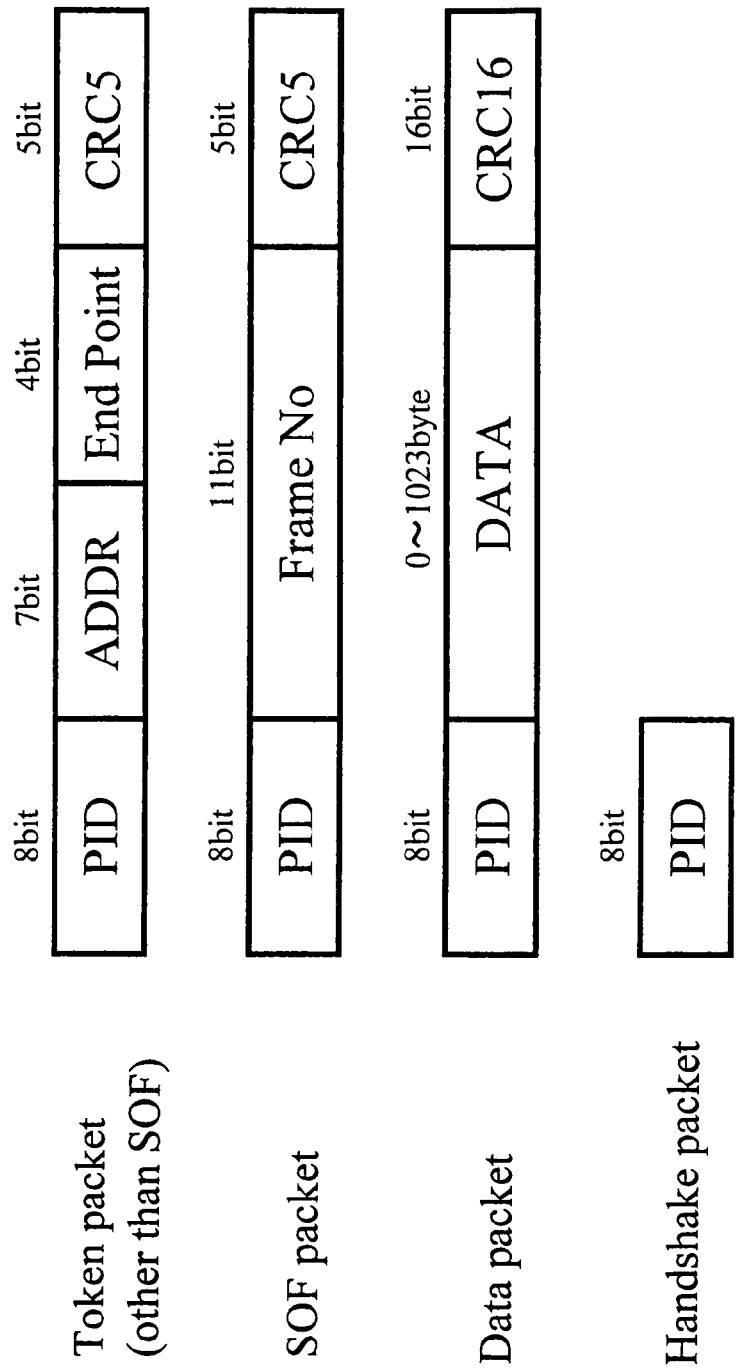
FIG. 43 illustrates formats of typical packets in USB 2.0.
Figure 44:
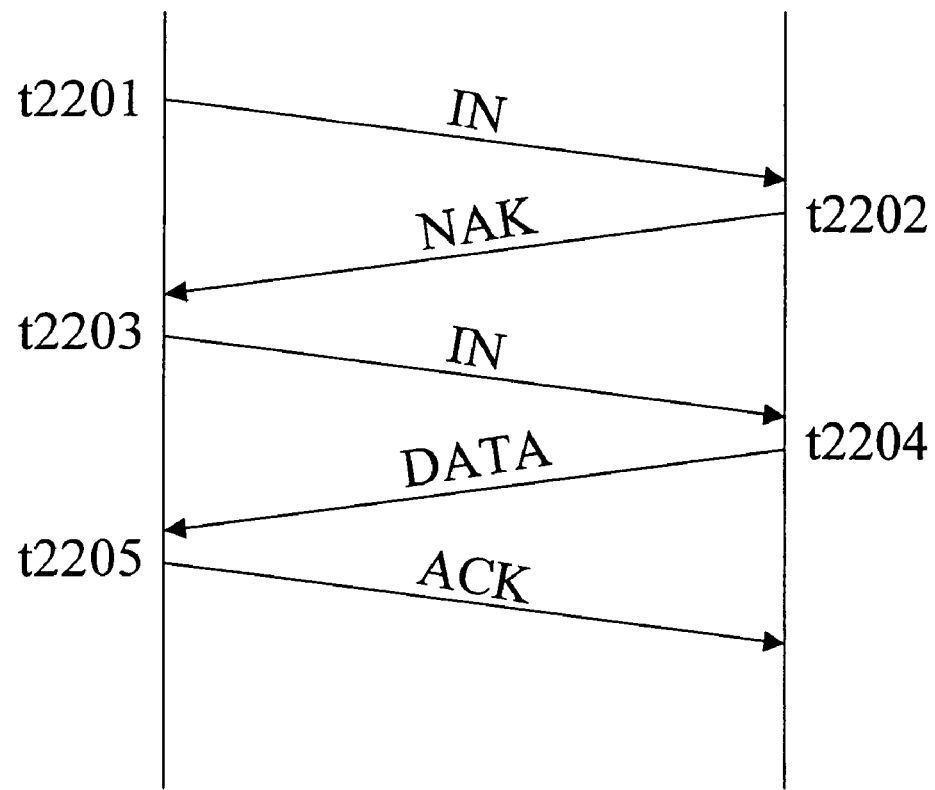
FIG. 44 is a timing chart showing an IN transaction under USB 2.0.
Figure 45:
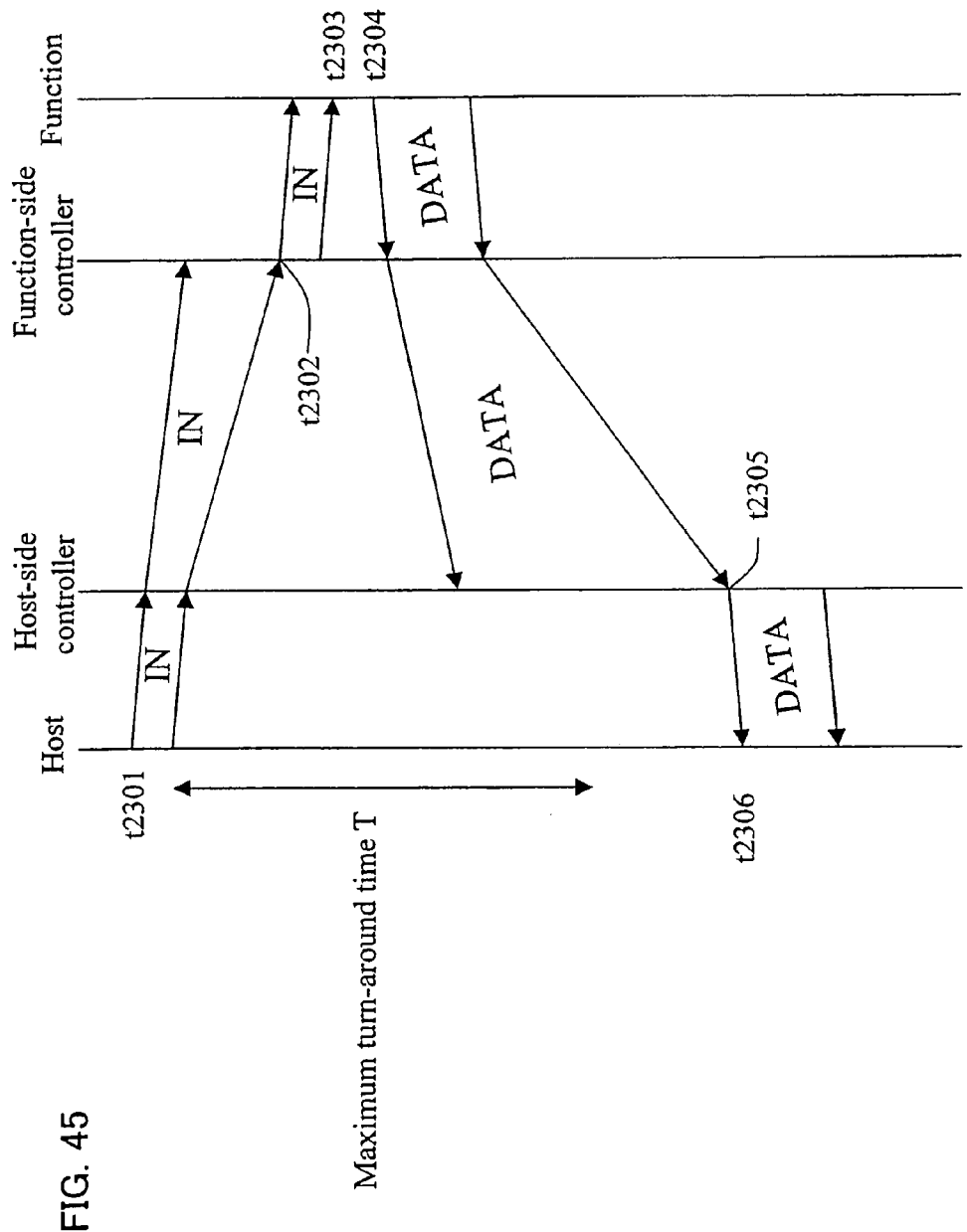
FIG. 45 is a timing chart showing how a packet transfer is carried out when the IN transaction under USB 2.0 is performed with a low-speed communication path.
Figure 46:
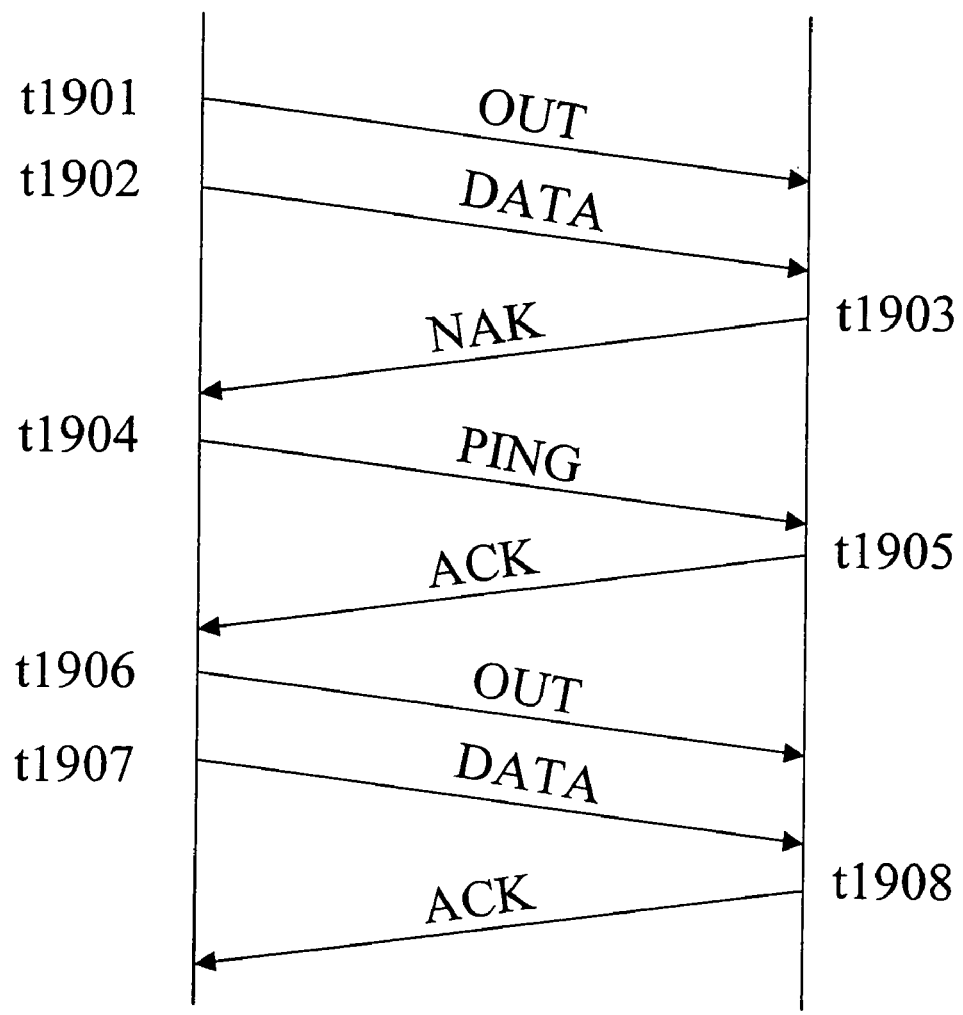
FIG. 46 is a timing chart showing an OUT transaction under USB 2.0.
Figure 47:
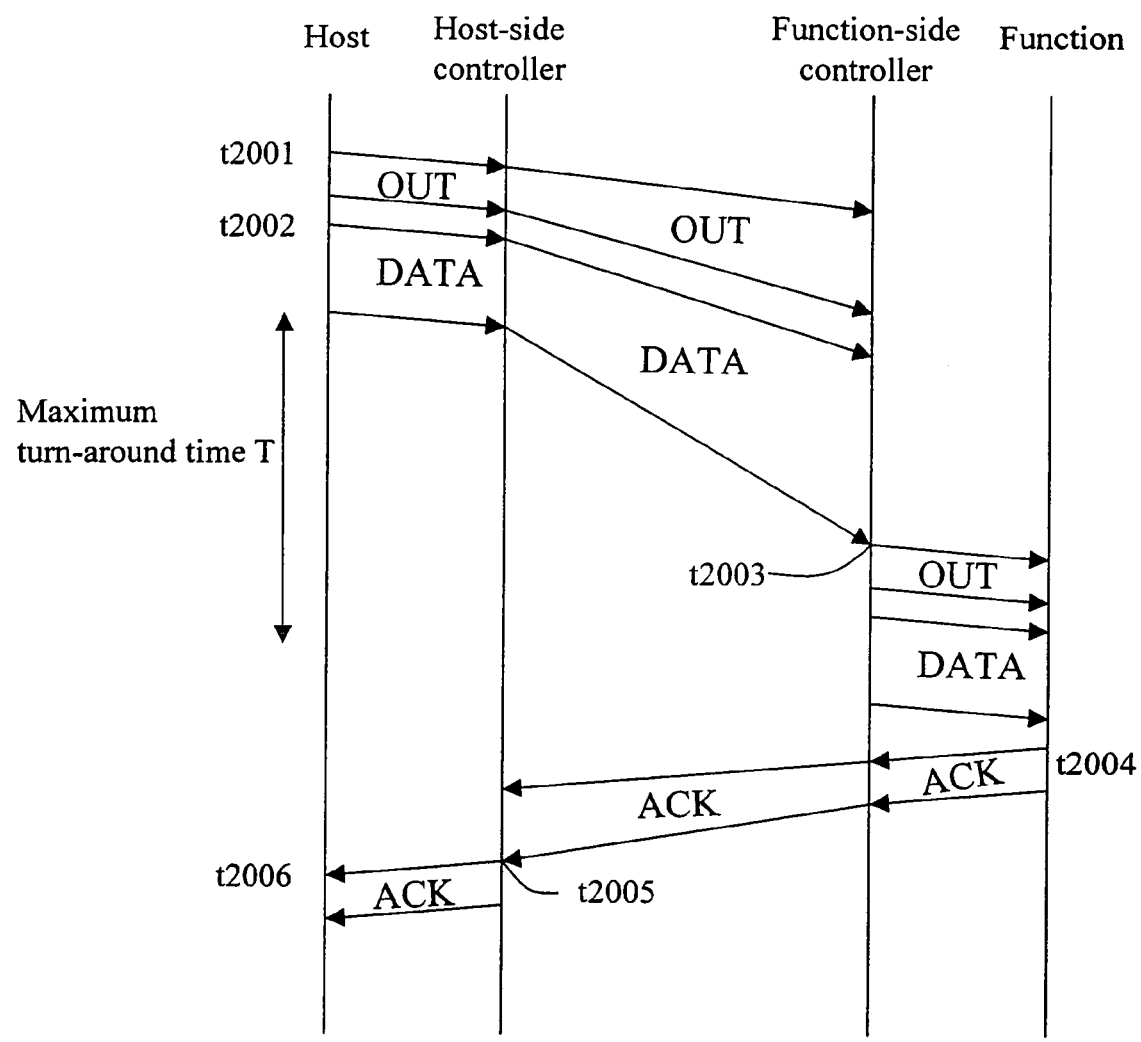
FIG. 47 is a timing chart showing how a packet transfer is carried out when the OUT transaction under USB 2.0 is performed with a low-speed communication path.
Figure 48:
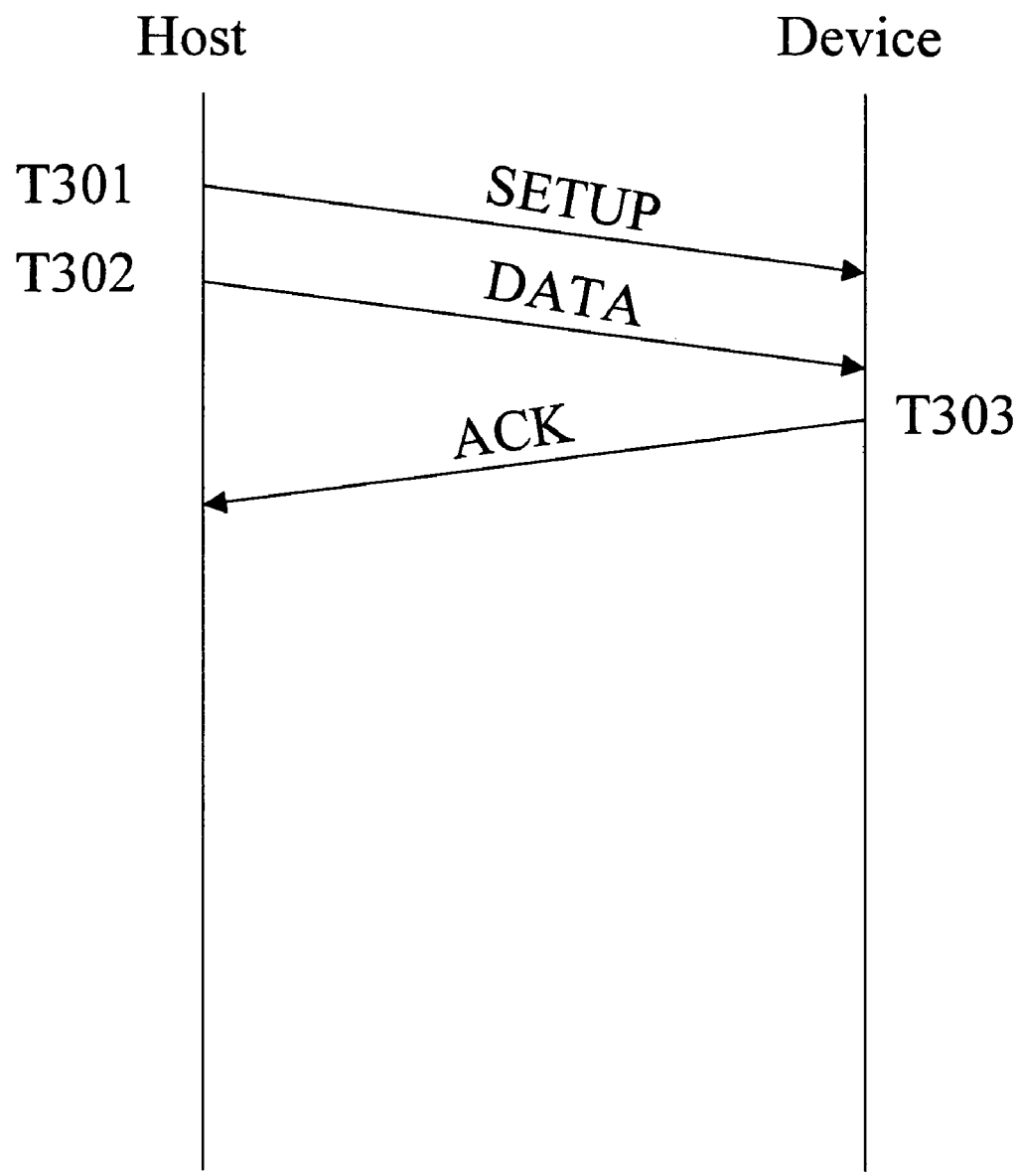
FIG. 48 is a timing chart showing an example of a SETUP transaction.
Figure 49:
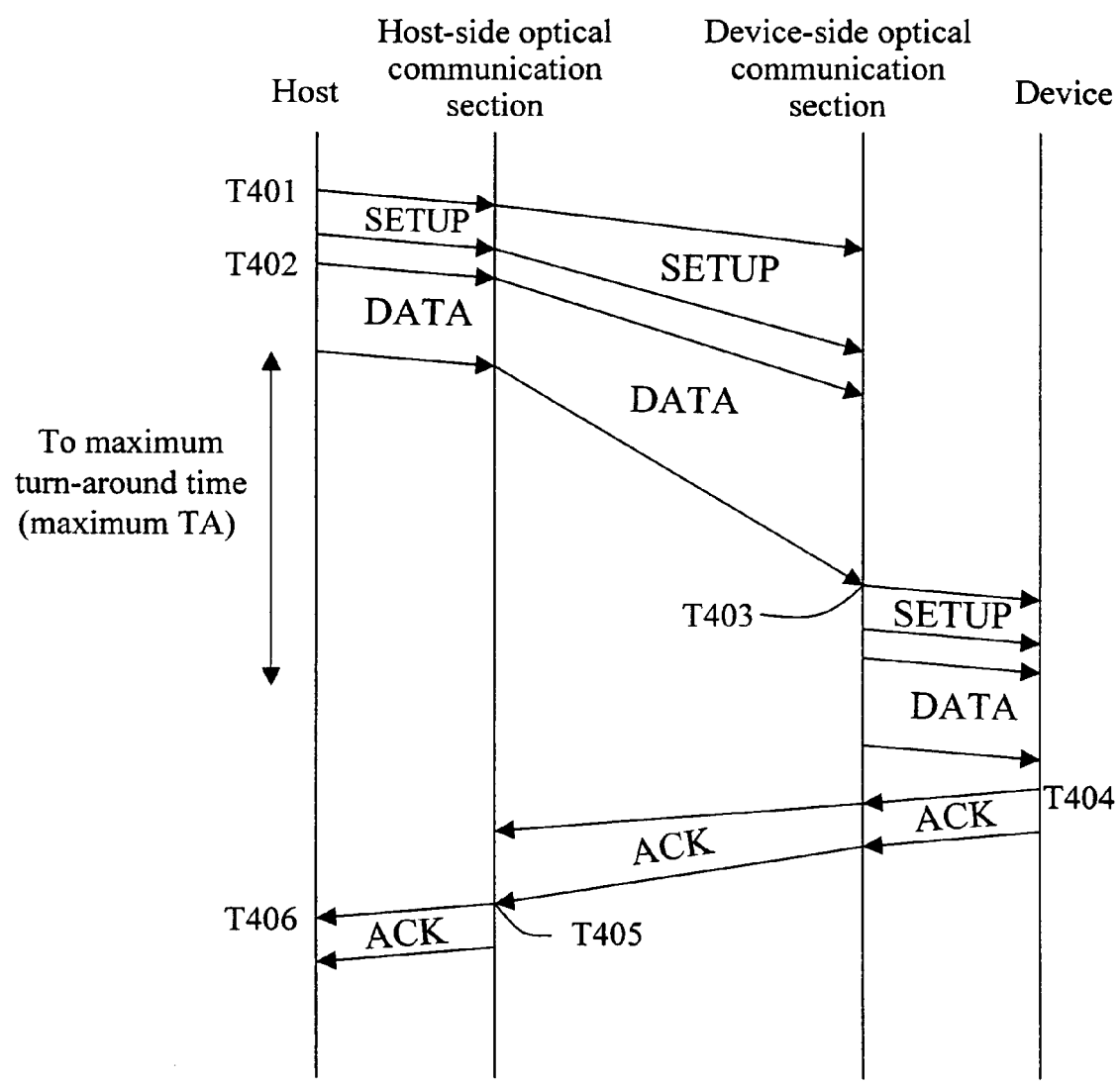
FIG. 49 is a timing chart showing a SETUP transaction in a conventional USB system.

That is, when the present invention is applied to USB-OTG, the roles of USB host and USB device are not fixed, so that the roles may be swapped in accordance with the direction of data to be transmitted. Also, the roles of host-side controller and device-side controller are not fixed, so that the roles may be swapped in accordance with the direction of data to be transmitted. Therefore, for instance, as shown in FIG. 41, it is preferable that one communication controller 2014 can perform both as the host-side controller and the device-side controller. To realize this, a state machine of each controller includes a program which allows the controller to operate as both the host-side controller and the device-side controller. In the present case, the host-side state machine and the device-side state machine correspond to the control section defined in claims.

In the present embodiment, all processes in the device-side controller 2012 are carried out under the control of the device SM 2042. Alternatively, a program for carrying out the processes is stored in a storage medium, and an information processing device (which is may be a part of the device 2013) which can read the program may be adopted instead of the device SM 2042.

Also, in a similar manner, all processes in the host-side controller 2011 are carried out by the host SM 2032. Alternatively, a program for carrying out the processes is stored in a storage medium, and an information processing device (which is may be a part of the host 2010) which can read the program may be adopted instead of the device SM 2042.

In this arrangement, a computing unit (e.g. CPU and MPU) of the information processing device reads out the program stored in the storage medium, and executes the processes. In other words, it is possible to say that the processes are realized by the program.

The above-mentioned information processing device may be a common computer (e.g. work station and personal computer), or an expansion board and an expansion unit attached to a computer.

The above-mentioned program is program code (e.g. an executable code program, intermediate code program, and source program) of software that realizes the processes. The program may be used by itself or may be used in conjunction with another program (e.g. OS). The program may be temporarily stored in a memory (e.g. RAM) in the device after being read out from the storage medium, and then read out and executed.

The storage medium for storing the program may be easily detached from the information processing device or may be fixed to (attached to) the device. Moreover, the storage medium may be connected to the device, as an external storage device.

The storage medium may be a magnetic tape such as a video tape or cassette tape; a magnetic disc such as Floppy® disc or hard disk; an optical disc (magneto-optical disc) such as CD-ROM, MO, MD, DVD, and CD-R; a memory card such as an IC card and an optical card; or a semiconductor memory, such as a mask ROM, EPROM, EEPROM, and a flash ROM. The storage medium is connected to the information processing device through the intermediary of a network (e.g. intranet and Internet). In this case, the information processing device downloads the program from the network. That is to say, the program may be obtained through a medium (a medium which holds the program in a flowing manner) such as a (wired or wireless) network. Note that, it is preferred if the download program is either stored in a main body device in advance or installed from another storage medium.

It is possible to rephrase that the present invention is a technique for appropriately carrying out data transfer in the SETUP transaction under USB 2.0, when a communication path whose transfer rate is lower than the native rate of USB 2.0 is adopted (i.e. in such a case that, if a conventional method is adopted, the data transfer cannot be properly finished because of the temporal restriction of USB).

Therefore, the technique of the present invention can be rephrased as follows: If, on the occasion of the receipt of the SETUP packet and the DATA packet from the USB host, the host-side controller has not received the ACK packet from the device-side controller, the host-side controller stores, in storage means (FIFO), the ACK packet supplied from the device-side controller later, and after the receipt of the ACK packet, the host-side controller supplies the ACK packet stored in the storage means to the USB host, upon the receipt of the SETUP packet and the DATA packet from the USB host again.

In the SETUP transaction of conventional USB transmission, after the transmission of the SETUP packet and the DATA packet from the USB host, the USB host has to receive a response packet (ACK packet) from the USB device within a predetermined period of time (maximum TA time). On this account, if the communication rate on the communication path between the host and device is lower than the native rate of USB, the USB host cannot receive the response packet within the predetermined period of time, so that the SETUP transaction does not properly finish.

Also, in the conventional arrangement, each time the host-side controller receives the SETUP packet, the host-side controller transfers the received SETUP packet to the USB device and carries out the process after the receipt of the response packet. For this reason, if the process does not finish within the predetermined period on account of the communication rate between the host and device, the SETUP transaction does not properly finish even if the USB host repeatedly transmits the SETUP packet.

On the other hand, in the arrangement above, the host-side controller stores, in the storage means, the ACK packet supplied in response to the initially-transmitted SETUP packet, and on the occasion of the retransmission of the SETUP packet from the USB host, the host-side controller supplies the ACK packet, which has been stored in the storage medium, to the USB host. With this, the SETUP transaction is properly carried out without taking into consideration of the TA time (turn-around time).

It can be said that the present invention relates to a transmission method and a transmission device of a USB signal under the USB standard. Under USB, in order to maintain the connection, the bottom protocol carries out communications in a time sharing fashion, and the host performs the scheduling. The data communication under USB is performed in units of transactions. The transaction is made up of a token packet, a data packet, and a handshake packet. The transaction always starts with the token packet issued by the host at the time of the start of the transaction, and a corresponding device responds in reference to an address and an end point included in the token packet.

The end point indicates a FIFO buffer for storing transferred data, and the data exchange between the USB host and the USB device always goes through the end point. The USB device can have 16 end points at the maximum, and numbers are assigned to the end points in order to distinguish one from another. On the occasion of the data transfer, the USB host carries out an access with reference to the USB address and the end point of the USB device. An end point with number 0 is termed an end point 0, and each USB device has to include one end point 0. This end point 0 is used when the initialization is carried out by the SETUP packet on the occasion the control transfer. In FIG. 19, the transmission from the device starts at T403, because, to the device, the transmission has to be carried out at the USB native rate of 480 Mbps.

The present invention may be arranged in such a manner that the host-side controller is provided on the USB host side and the device-side controller is provided on the USB device side. The host-side controller supplies, to the USB device, a signal supplied form the USB host, while the host-side controller supplies, to the USB host, a signal from the device-side controller. The host-side controller is connected to the USB host via a USB cable. Alternatively, the host-side controller may be connected to a port on the downstream of the USB hub, via a USB cable. The host-side controller may be a part of the USB host or the USB hub. The device-side controller supplies, to the USB device, a signal supplied form the host-side controller, while the device-side controller supplies, to the host-side controller, a signal from the USB device. The device-side controller is connected to the USB device via a USB cable. Alternatively, the device-side controller may be connected to a port on the upstream of the USB hub, via a USB cable. The device-side controller may be a part of the USB host or the USB hub.

When the rate on the communication path between the host-side controller and the device-side controller is identical with or lower than the rate on the USB communication path, the transmission FIFO 2021 may carry out a timing adjustment for repeating a packet to the aforesaid communication path between the host-side controller and the device-side controller. In the present system, the host SM 2032 exchanges packets with the USB host and the device-side controller in accordance with a predetermined rule, on occasions of the IN transaction, OUT transaction, and SETUP transaction.

In the present system, when the host SM 2032 supplies, to the device-side controller 2012, the SETUP packet and the DATA packet having been supplied from the host 2010, the host SM 2032 has not received the ACK packet from the device-side controller 2012. For this reason, the host SM 2032 returns nothing to the host 2010. With this, the host 2010 can recognize that the device 2013 could not properly receive the SETUP packet and the DATA packet, so as not to finish the SETUP transaction.

Upon the receipt of the OUT packet and the DATA packet, the device-side controller 2012 supplies the DATA packet to the USB device only when the DATA packet has completely been supplied from the host-side controller. This is (i) because the packet format of the DATA packet does not include a field indicating the length of the packet, and (ii) for the sake of surely repeating the data, which is supplied from the low-speed communication path, to the USB high-speed communication path, without causing data dropouts. USB 2.0 defines the maximum packet length in each transfer mode as shown in FIG. 7. In the SETUP transaction, the length of the DATA packet immediately after the SETUP packet is determined to be 8 bytes, and an analysis of the packet indicates that it is possible to start the transmission of the DATA packet which is immediately after the SETUP packet, even if the receipt of the DATA packet has not been finished.

The counter 2034 shown in FIG. 40 counts up how many times DATA packets supplied from the host-side controller 2011 are written into the receipt FIFO 2026 of the device-side controller 2012. Even if the value of the counter 2034 has not reach a value corresponding to the maximum packet length (3072 bytes) on the occasion of the isochronous transfer shown in FIG. 7, it is possible to start the transmission to the USB 2.0 communication path as long as the receipt FIFO 2026 does not become EMPTY with the aforesaid value of the counter 2034. Therefore, when the value of the counter 2034 is higher than the aforesaid value with which the receipt FIFO 2026 does not become EMPTY, it is possible to move the transmission timing of the DATA packet ahead by starting the transmission before the finish of the receipt of the DATA packet, so that the overall transfer rate is improved. Also, as described above, the length of the DATA packet immediately after the SETUP packet is fixed to 8 bytes, so that the value of the counter 2034 can be lowered with regard to this DATA packet, so that the overall transfer rate is further improved.

FIG. 39(*a*) shows a packet format of the USB data packet. FIG. 39(*b*) shows a packet format converted for the low-speed communication path, and this packet format is used on the occasion of the transmission from the host-side controller to the device-side controller when the host-side controller receives the DATA packet. In the present system, as shown in FIG. 39(*b*), a CRC_OK field is provided after the CRC 16, of the USB packet. When the DATA packet stored in the device-side controller has no error, the CRC_OK field has a value indicating that the DATA packet has no error. Meanwhile, when the stored DATA packet has an error, the CRC_OK field has a value indicating that the DATA packet has an error. With this, it is possible to notify the device-side controller of the information indicating whether or not the DATA packet stored in the host-side controller is re-transmittable. Therefore, monitoring this CRC_OK field allows the device-side controller to determine whether or not a retransmission request is made to the host-side controller, when it is judged that the received DATA packet includes an error.

The CRC-check circuit 2033 of the device-side controller 2012 can judge whether or not the DATA packet supplied from the host-side controller 2011 includes an error, by calculating the CRC 16 in the DATA packet. The CRC-check circuit discards the DATA packet judged as erroneous, and this packet is not transmitted as the USB packet. With this, the electric power for the transmission is saved, and an unexpected occurrence of an abnormal operation on account of the receipt of the erroneous packet by the USB device is restrained. The CRC-check circuit 2033 of the host-side controller 2011 can judge whether or not the DATA packet supplied from the host 2010 includes an error, by calculating the CRC 16 in the DATA packet. When it is judged that the DATA packet is erroneous, repeating this DATA packet to the low-speed communication path is unnecessary. Therefore, when judged as erroneous, the transmission of the packet is stopped even in the midst of the repeating, so that the decrease of the transfer efficiency of the low-speed communication path is restrained.

The device-side controller 2012 can be arranged as follows. Receiving the SETUP packet and the DATA packet from the host-side controller 2011, the device SM 2042 writes these SETUP packet and DATA packet into the receipt FIFO 2026. This receipt FIFO 2026 have kept a value of the read pointer in advance, before the transmission of the SETUP packet and the DATA packet. After transmitting the SETUP packet and the DATA packet to the USB device, the device SM 2042 judges that a data error occurs on the communication path between the device 2013 and the device-side controller 2012, if the ACK packet is not supplied within a predetermined period of time. In such a case, the value of the read pointer is set to the aforesaid value, and the same SETUP packet and DATA packet are retransmitted. This retransmission is realized by controlling the read pointer of the receipt FIFO 2026. Alternatively, the retransmission may be realized by keeping the start address in, for instance, a RAM. Since the CRC-check circuit 2033 can judge whether or not the received DATA packet is correct, it is possible to exercise such control that the aforesaid retransmission is performed only when the received DATA packet is judged as correct.

The method described in the present embodiment makes it possible to properly perform the SETUP transaction even if the communication rate between the USB host and the USB device is lower than the USB native rate. Furthermore, the transmission timing of the DATA packet is properly controlled by monitoring the data amount in the FIFO, so that the efficiency of the use of communication paths whose rates are identical with or lower than the USB native rate. Also, the CRC-check circuit provided in each of the host-side controller and the deice-side controller realizes an error detection, so that the data communication can be performed in a more stable manner, on account of the retransmission and the like.

Since the speed negotiation circuit is provided, the data communication can be performed at an optimum transfer rate. Moreover, adopting the full-duplex communication improves the efficiency of the use of the communication path. Moreover, using an optical fiber for the low-speed communication path makes it possible to elongate the length of the communication path whose rate is identical with or lower than the USB native rate, causing the range of application to be wider. Moreover, when the low-speed communication path is wireless using an electric wave, the degradation of a connector is prevented, and doing away with the cable improves the convenience. Moreover, when the low-speed communication path is realized in a optical free-space fashion, the degradation of a connector is prevented and high-speed free-space transmission can be performed.

The objective of the present invention can be rephrased as the data transfer in the SETUP transaction under USB 2.0 is properly carried out even if a communication path (e.g. an optical communication path whose transfer rate is 100 Mbps) whose transfer rate is lower than the native rate of USB 2.0 is adopted. It can be said that the following first to eighteenth two-way transmission circuits and a first two-way transmission method are arrangements of the present invention for achieving the aforesaid objective.

That is, the first two-way transmission circuit has an interface which can perform a transfer at a transfer rate identical with or lower than the transfer rate defined in the USB standard, and includes: a host-side controller which is either connected to a port on the downstream side of a USB host or a USB hub or is a part of the USB host or the USB hub; and a device-side controller which is either connected to a port on the upstream side of the USB device or the USB hub or a part of the USB device or the USB hub. This first transmission circuit is arranged in such a manner that, each of the aforesaid controllers includes a FIFO and a state machine, and upon receiving a SETUP packet, the host-side controller immediately repeats the SETUP packet to the device-side controller, and transmits an ACK packet to the USB host if the ACK packet has been supplied from the device-side controller, meanwhile, the device-side controller repeats, to the USB device, a SETUP packet and a DATA packet which have been supplied from the host-side controller, and repeats, to the host-side controller, a packet supplied from the USB device. With this, it is possible to properly carry out the SETUP transaction without taking into account a turn-around time, even if the transfer rate of the communication path between the USB host and the USB device is lower than the transfer rate defined by USB 2.0.

The second two-way transmission circuit is identical with the first two-way transmission circuit, except that the device-side controller starts to transmit the DATA packet to the USB device before the completion of the data receipt, if the amount of data supplied from the host-computer to the receipt FIFO exceeds a predetermined amount. With this, the waiting period until the completion of the receipt of the DATA packet is reduced, so that the transfer efficiency of the bus is improved. The third two-way transmission circuit is identical with the first two-way transmission circuit, except that, in the device-side controller, when an analysis of an error detecting code indicates that a packet supplied from the host-side controller is erroneous, the packet is discarded. With this, the device-side controller can restrain the transmission of an erroneous packet to the USB device, so that the power consumption is reduced and an unexpected occurrence of an abnormal operation of the USB device is restrained.

The fourth two-way transmission circuit is identical with the first two-way transmission circuit, except that, in the host-side controller, when an analysis of an error detecting code indicates that a packet supplied from the USB host is erroneous, the transmission of the packet to the device-side controller is immediately stopped. With this, the decrease of the efficiency of the bus due to the transmission or receipt of an erroneous packet can be restrained. The fifth two-way transmission circuit is identical with the first two-way transmission circuit, except that, in the device-side controller, if an ACK packet is not returned in response to a DATA packet supplied to the USB device, the SETUP packet and the DATA packet are retransmitted to the USB device after a predetermined period of time elapses. With this, it is possible to reduce the time for processing a packet error on the communication path between the USB device and the device-side controller.

The sixth two-way transmission circuit is identical with the fifth two-way transmission circuit, except that the retransmission of the SETUP packet and the DATA packet is carried out only when the DATA packet includes no error. With this, the decrease of the efficiency of the use of the bus due to the retransmission of an erroneous packet to the USB host is restrained. The seventh two-way transmission circuit is identical with the first two-way transmission circuit, except that, in the device-side controller, if a DATA packet supplied from the host-side controller is judged as erroneous, a retransmission request is made to the host-side controller. With this, it is possible to notify the host-side controller of the occurrence of an error in the packet on the communication path between the host-side controller and the device-side controller.

The eighth two-way transmission circuit is identical with the seventh two-way transmission circuit, except that, when the host-side controller receives the retransmission request, a DATA packet is retransmitted therefrom. With this, the retransmission is carried out in response to the packet error occurred on the communication path between the host-side controller and the device-side controller. The ninth two-way transmission circuit is identical with the seventh two-way transmission circuit, except that the retransmission is carried out only when an error-free DATA packet is stored.

With this, the retransmission is not carried out with regard to the packet including an error occurred on the communication path between the USB host and the host-side controller, so that the degradation of the efficiency of the use of the communication path is restrained. The tenth two-way transmission circuit is identical with the seventh two-way transmission circuit, except that a flag is set in a packet format for the communication path whose rate is identical with or lower than the USB native rate, in order to indicate that the packet stored in the device-side controller is error-free. With this, the device-side controller can notify the host-side controller of the retention of an error-free data.

The eleventh two-way transmission circuit is identical with the tenth two-way transmission circuit, except that, when the packet supplied from the host-side controller to the device-side controller is judged as erroneous, the retransmission request is made only when the retention of an error-free DATA packet by the host-side controller is confirmed according to the flag. With this, it is possible to restrain the decrease of the efficiency of the use of the communication path due to the transfer of an erroneous packet.

The twelfth two-way transmission circuit is identical with the first two-way transmission circuit, except that a two-way transmission circuit and a transceiver which supports different transfer rates is further provided, and the speed negotiation with another node is carried out. With this, a packet transfer can be carried out at one transfer rate between a host-side controller and a device-side controller which are able to carry out a transfer at different transfer rates. The thirteenth two-way transmission circuit is identical with the twelfth two-way transmission circuit, except that, when the speed negotiation indicates that a communication can be done at a rate higher than a predetermined transfer rate, the repeat of the packet is carried out only with the modulation. and demodulation, so that the packet control by the state machine and the adjustment of timings of packet transmission to the USB host and the device are not performed. With this, the data transfer under USB 2.0 can be carried out without the decrease of the data transfer rate, if the transfer rate on the communication path is enough to meet the aforesaid maximum turn-around.

The fourteenth two-way transmission circuit is identical with the twelfth two-way transmission circuit, except that, when an analysis of an error rate of the above-mentioned communication path whose rate is identical with or lower than the USB native rate indicates that the error rate is lower than a predetermined error rate, the communication is carried out with a lower transfer rate. With this, when it is judged that the quality of the communication path is bad, the transfer rate is lowered and hence the data transfer is carried out using a high-quality communication path. The Fifteenth two-way transmission circuit is identical with any one of the first to fourteenth two-way transmission circuits, and carries out full-duplex communications. With this, it is possible to eliminate a preamble required in half-duplex communications, so that the efficiency of the use of the communication path is improved.

The sixteenth two-way transmission circuit is identical with any one of the first to fifteenth two-way transmission circuits, and carries out long-distance communications using an optical fiber. With this, the distance between the USB host and the USB device can be elongated, causing the range of application to be wider. The seventeenth two-way transmission circuit is identical with any one of the first to fourteenth two-way transmission circuits, and carries out wireless communications using an electric wave, between the host-side controller and the device-side controller. With this, it is possible to eliminate a cable and hence, for instance, the degradation of a connector is prevented.

The eighteenth two-way transmission circuit is identical with one of the first to fifteenth two-way transmission circuits, and carries out free-space transmission using light, between the host-side controller and the device-side controller. With this, it is possible to eliminate a cable and hence, for instance, the degradation of a connector is prevented. Moreover, a high-speed free-space transmission is realized. The first two-way transmission method is a method for realizing the aforesaid first to eighteenth two-way transmission circuits.

In the USB system described in Embodiment 19, when the host SM 2032 of the host-side controller 2011 receives the ACK packet supplied from the device-side controller 2012 towards the host 2010, the host SM 2032 stores this packet in the receipt FIFO 2026. Subsequently, when the SETUP packet and the DATA packet are retransmitted from the host 2010, the host SM 2032 transmits the stored ACK packet to the host 2010. Thus, the SETUP transaction can be completed even if the communication between the host 2010 and the device 2013 takes time and hence the maximum TA time passes if the ACK packet supplied from the device-side controller 2012 is directly supplied to the host 2010.

According to this USB system, the SETUP transaction can be performed even if a communication path with which a data transfer takes time is adopted.

The present invention described in Embodiment 19 can be used for (i) a USB system which is a communication system for realizing USB communications (data communications under USB standard) between a. host computer (host) and its peripheral device (device), (ii) a host of the USB system, and (iii) a communication controller (host-side controller or device-side controller) provided in the device.

As described above, a communication controller of the present invention acts, when an IN transaction is performed as data communication under USB standard, as a host-side controller that (i) transfers an IN packet, which is supplied from a host device, to a function device side, while (ii) transfers a DATA packet, which is a response to the IN packet, to the host device, the communication controller comprising: receipt acknowledgement means for acknowledging receipt of the IN packet from the host device; storage means for storing the DATA packet supplied from the function device side; data storage acknowledgement means for checking if the DATA packet is stored in the storage means when the receipt acknowledgement means acknowledges the receipt of the IN packet from the host device; and transmission control means for (I) transmitting, to the function device side, the IN packet which is supplied from the host device, and transmitting a NAK packet to the host device, when the data storage acknowledgement means confirms that the DATA packet is not stored, and for (II) transmitting the DATA packet to the host device, when the data storage acknowledgement means confirms that the DATA packet is stored.

The aforesaid communication controller also acts as a function-side controller which (i) transfers a USB-compliant IN packet, which is supplied from a host device side, to a function device, and (ii) transfers the DATA packet, which is a response to the USB-compliant IN packet, to the host device side, when the IN packet is supplied from the host device side, the communication controller holding this IN packet, and when an ACK packet is supplied from the host device side in response to the DATA packet transmitted to the host device side, the communication controller supplying the IN packet, which has been held, to the function device, and supplying the ACK packet to the function device when the DATA packet is supplied from the function device, in response to the IN packet.

Therefore, the function-side controller does not transmit the ACK packet to the function device when an error occurs in the DATA packet on the communication path between the host and function. On this account, abnormal termination of the IN transaction is prevented and stable packet transfer is realized.

The aforesaid communication controller is arranged in such a manner that, a transfer rate for receipt of the IN packet from the host device and for transmission of the DATA packet to the host device is identical with a transfer rate defined by USB standard, while a transfer rate regarding transmission of the IN packet to the function device side and a transfer rate regarding receipt of the DATA packet from the function device side are lower than the transfer rate defined by USB standard, data amount confirming means for confirming an amount of data of the DATA packet at a time of storing the DATA packet in the storage means is additionally provided, the DATA packet being supplied from the function device side, and the transmission control means starts to transmit the DATA packet to the host device, when the amount of data confirmed by the data amount confirming means exceeds a predetermined value.

For this reason, if the value of the storage means will not be EMPTY even if the transfer of the DATA packet to the USB function is started, the transmission of the DATA packet to the USB function can start before the completion of the transmission of the DATA packet from the function device side, even if the transfer rate on the communication path between the host and function is lower than the transfer rate (defined by USB) between the host-side controller and the host device.

This makes it possible to move a timing of the transmission of the DATA packet ahead, so that the overall transfer rate is improved.

The aforesaid communication controller further comprises error analyzing means for analyzing whether or not the DATA packet supplied from the function device side includes an error, when the error analyzing means judges that the DATA packet includes an error, the transmission control means discarding the DATA packet so as not to transfer the DATA packet to the host device.

This makes it possible to reduce amounts of power for the transmission, and it is possible to restrain the occurrence of an abnormal operation on account of the receipt of an erroneous packet by the USB host.

The aforesaid communication controller further comprises error analyzing means for analyzing whether or not the DATA packet supplied from the function device side includes an error, if the error analyzing means makes a judgment that the DATA packet includes an error, the transmission control means terminating transmission of the DATA packet of the host device immediately after the judgment.

The transmission of the DATA packet is stopped even after the start of the transmission, so that the deterioration of the efficiency of the transfer to the low-speed communication path is restrained.

The aforesaid communication controller is arranged in such a manner that, after transmitting the DATA packet to the host device, the transmission control means performs a retransmission process so as to transmit a DATA packet, which is identical with the DATA packet having been transmitted to the host device on a last occasion, to the host device, if, by the receipt acknowledgement means, receipt of the ACK packet is not confirmed while receipt of a next IN packet is confirmed.

Therefore, when a data-error occurs between the host device and the host-side controller in a case that the host-side controller supplies the DATA packet to the host device, the retransmission of the DATA packet can be performed without requiring the function device side to transmit the DATA packet again.

The aforesaid communication controller further comprises error analyzing means for analyzing whether or not the DATA packet supplied from the function device side includes an error, the transmission control means performing the retransmission process only when the error analyzing means confirms that the DATA packet stored in the communication controller includes no error.

Thus, when the communication controller acts as the host-side controller, the retransmission to the host device is performed only when the received DATA packet is judged as correct.

The aforesaid communication controller further comprises: error analyzing means for analyzing whether or not the DATA packet supplied from the function device side includes an error; and retransmission request means for requesting the function device side to retransmit the DATA packet, if the error analyzing means judges that the DATA packet supplied from the function device side includes an error.

Therefore, by the operation above, when an error of the DATA packet occurs on the communication path between the host and function, the host-side controller can notify the function device side of the occurrence of the error.

The aforesaid communication controller also acts as a function-side controller which (i) transfers a USB-compliant IN packet, which is supplied from the host device side, to the function device, while (ii) transfers, to the host device side, the DATA packet which is a response to the IN packet, and when a retransmission request is supplied from the host-side controller, the communication controller carrying out a retransmission process so as to transfer, to the host-side controller, a DATA packet identical with the DATA packet having been supplied to the host-side controller on a last occasion.

Thus, the retransmission process by the function-side controller is realized in line with the retransmission request from the host-side controller.

The aforesaid communication controller further comprises error analyzing means for analyzing whether or not the DATA packet supplied from the function device includes an error, the transmission control means performing the retransmission process only when the error analyzing means confirms that the DATA packet stored in the communication controller includes no error.

Thus, when the communication controller acts as the function-side controller, the retransmission to the host-side controller is performed only when the received DATA packet is judged as correct.

The aforesaid communication controller is arranged in such a manner that, when the error analyzing means confirms that the DATA packet stored in the communication controller includes no error, a flag indicating that the DATA packet has no error is set in a packet format of the DATA packet to be supplied to the host device.

This makes it possible to notify the host device side of whether or not the DATA packet stored in the function-side controller is re-transmittable.

The aforesaid communication controller is arranged in such a manner that, when the error analyzing means confirms that the DATA packet has been supplied from the function-side controller and the DATA packet includes an error, the communication controller carrying out the request of retransmission only when (i) it is confirmed that a flag indicating presence/absence of an error in the DATA packet stored in the function-side controller is set in the received DATA packet, and (ii) it is confirmed by the flag that the function device side stores the DATA packet with no error.

Therefore, when it is judged that the received DATA packet includes an error, the retransmission request to the function-side controller is carried out.

The aforesaid communication controller also acts as a function-side controller which (i) transfers a USB-compliant IN packet, which is supplied from the host device side, to the function device, while (ii) transfers, to the host device side, the DATA packet which is a response to the IN packet, and when a retransmission request is supplied from the host-side controller, the communication controller supplying the IN packet to the function device, and transferring, to the host-side controller, the DATA packet supplied in response to the IN packet.

Thus, the retransmission process by the host-side controller is realized in line with the retransmission request from the host-side controller.

The aforesaid communication controller carries out, before the IN transaction is performed, a transfer rate adjustment so that a rate of a transfer with a communication controller of a communication counterpart is adjusted.

Therefore, it is possible to, on the communication path between the host and function, set a transfer rate (i) at which a communication can be actually carried out and (ii) which is not unnecessarily low.

The aforesaid communication controller is arranged in such a manner that, in the transfer rate adjustment, if it is judged that a communication can be performed at a rate defined by USB standard, a packet supplied to the communication controller of the communication counterpart is subjected to only modulation and demodulation, so as not to be subjected to a timing control of packet transmission.

Therefore, when it is judged that the transfer rate on the communication path between the host and function is enough for the above-mentioned maximum turn-around, the data transfer under USB 2.0 is realized without the drop of the data transfer rate.

The aforesaid communication controller is arranged in such a manner that, if an analysis of an error rate of a communication path to the communication controller of the communication counterpart indicates that the error rate is higher than a predetermined error rate, the transfer rate adjustment is performed so that the rate of the transfer is lowered.

Therefore, if it is judged that the quality of the communication path between the host and function is bad, the transfer rate is lowered, so that the data transfer is performed through a communication path with good quality.

The aforesaid communication controller carries out a full-duplex communication with a communication controller of a communication counterpart.

Therefore, in the communication between the host and function, it is unnecessary to add a preamble to a packet and hence the efficiency of the communication path is improved.

The aforesaid communication controller carries out a communication with a communication controller of a communication counterpart, using an optical-fiber communication path.

This makes it possible to carry out a long-distance transmission between the host and function.

The aforesaid communication controller carries out a communication with a communication controller of a communication counterpart either in a wireless fashion using electric waves or by free-space transmission using light.

Since the communication between the host and function is carried out with no cable, the convenience is enhanced.

As described above, another communication controller of the present invention acts, when an IN transaction is performed as data communication under USB standard, as a function-side controller that (i) transfers a USB-compliant IN packet, which is supplied from a host device, to a function device side, while (ii) transfers a DATA packet, which is a response to the IN packet, to a host device side, when the IN packet is supplied from the host device side, the communication controller holding this IN packet, and when an ACK packet is supplied from the host device side in response to the DATA packet transmitted to the host device side, the communication controller supplying the IN packet, which has been held, to a USB function, and supplying the ACK packet to the function device when the DATA packet is supplied from the function device, in response to the IN packet.

As described above, a further communication controller of the present invention acts, when an IN transaction is performed as data communication under USB standard, as a function-side controller that (i) transfers a USB-compliant IN packet, which is supplied from a host device, to a function device side, while (ii) transfers a DATA packet, which is a response to the IN packet, to a host device side, if a retransmission request is supplied from a host-side controller, the communication controller carrying out a retransmission process so as to transmit, to the host-side controller, a DATA packet identical with the DATA packet transmitted to the host-side controller on a last occasion.

The aforesaid communication controller carries out an analysis so that whether or not the DATA packet supplied from the function device includes an error is judged, and the communication controller carrying out the retransmission process only when the analysis confirms that the DATA packet stored in the communication controller includes no error.

The aforesaid communication controller is arranged in such a manner that, when the analysis confirms that the DATA packet stored in the communication controller includes no error, a flag indicating that the DATA packet has no error is set in a packet format of the DATA packet to be supplied to the host device.

As described above, yet another communication controller of the present invention acts, when an IN transaction is performed as data communication under USB standard, as a function-side controller that (i) transfers a USB-compliant IN packet, which is supplied from a host device side, to a function device, while (ii) transfers a DATA packet, which is a response to the IN packet, to a host device side, when a retransmission request is supplied from the host-side controller, the communication controller supplying (I) the IN packet to the function device and (II) the DATA packet, which is supplied in response to the IN packet, to the host-side controller.

As described above, a communication system of the present invention comprises: a communication controller acting as the above-described host-side controller; and a communication controller acting as a function-side controller that (1) transferring the USB-compliant IN packet, which is supplied from the host device side, to the function device, while (2) transfers the DATA packet, which is a response to the IN packet, to the host device side.

As described above, a communication equipment of the present invention includes the above-described communication controller.

As described above, a communication method of the present invention is characterized by comprising the steps of: when receipt of an IN packet from a host device is confirmed, checking whether or not a DATA packet which will be a response to the IN packet has been supplied; if the DATA packet has been supplied, transmitting the DATA packet to the host device, in response to the received IN packet; and if the DATA packet has not been supplied, transferring the received IN packet to a function device side, and transmitting a NAK packet to the host device.

A packet-based communication system of the present invention causes a computer to perform as the means of the above-mentioned communication controller. Loading this packet-based communication system into a computer system enables the user to use the above-described communication controller.

A storage medium of the present invention stores the aforesaid packet-based communication program. Loading the packet-based communication system stored in the storage medium into a computer system enables the user to use the above-described communication controller.

As described above, a communication controller of the present invention acts, when an OUT transaction is performed as data communication under USB standard, as a host-side controller that (i) transfers an OUT packet and a DATA packet, which are supplied from a host device, to a function device side, while (ii) transfers a handshake packet, which is a response to the OUT packet and the DATA packet, to the host device, the communication controller comprising: receipt acknowledgement means for acknowledging receipt of the OUT packet and the DATA packet from the host device; storage means for storing the handshake packet supplied from the function device side; data storage acknowledgement means for checking if the handshake packet is stored in the storage means when the receipt acknowledgement means acknowledges the receipt of the OUT packet and the DATA packet from the host device; and transmission control means for (I) transmitting a NAK packet a NAK packet to the host device, when the data storage acknowledgement means confirms that the handshake packet is not stored, and for (II) transmitting the handshake packet to the host device, when the data storage acknowledgement means confirms that the handshake packet is stored.

The aforesaid communication controller the communication controller also acts as a function-side controller which (i) transfers USB-compliant OUT packet and DATA packet, which are supplied from a host device side, to a function device, and (ii) transfers the handshake packet, which is a response to the USB-compliant OUT packet and DATA packet, to the host device side, wherein, a transfer rate for receipt of the OUT packet and the DATA packet from a host-side controller and a transfer rate for transmission of the handshake packet to the host-side controller are lower than a transfer rate defined by USB standard, and a transfer rate for transmission of the OUT packet and the DATA packet. to the function device and a transfer rate regarding receipt of the handshake packet from the function device are identical with the transfer rate defined by USB standard, data amount confirming means for confirming amounts of data of the OUT packet and the DATA packet at a time of storing the OUT packet and the DATA packet in the storage means is additionally provided, the OUT packet and the DATA packet being supplied from the host-side controller, and the transmission control means starts to transmit the OUT packet and the DATA packet to the function device, when the amounts of data confirmed by the data amount confirming means exceed a predetermined value.

According to the above, if the value of the storage means will not be EMPTY even if the transfer of the OUT packet and the DATA packet to the host device is started, the transmission of the OUT packet and the DATA packet to the host device can start before the completion of the transmission of the DATA packet and the DATA packet from the host device side, even if the transfer rate on the communication path between the host and function is lower than the transfer rate (defined by USB standard) between the function-side controller and the function device. This makes it possible to move a timing of the transmission of the OUT packet and the DATA packet ahead, so that the overall transfer rate is improved.

The aforesaid communication controller also acts as a function-side controller which (i) transfers USB-compliant OUT packet and DATA packet, which are supplied from a host device side, to a function device, and (ii) transfers the handshake packet, which is a response to the USB-compliant OUT packet and DATA packet, to the host device side, wherein, error analyzing means for analyzing whether or not the DATA packet supplied from the host-side controller includes an error is additionally provided, and when the error analyzing means judges that the DATA packet includes an error, the transmission control means discards the DATA packet so as not to transfer the DATA packet to the function device.

This makes it possible to reduce amounts of power for the transmission, and it is possible to restrain the occurrence of an abnormal operation on account of the receipt of an erroneous packet by the function device.

The aforesaid communication controller further comprises error analyzing means for analyzing whether or not the DATA packet supplied from the host device includes an error, if the error analyzing means makes a judgment that the DATA packet includes an error, the transmission control means terminating transmission of the DATA packet of the host device immediately after the judgment.

The transmission of the DATA packet is stopped even after the start of the transmission, so that the deterioration of the efficiency of the transfer to the low-speed communication path is restrained.

The aforesaid communication controller also acts as a function-side controller which (i) transfers USB-compliant OUT packet and DATA packet, which are supplied from a host device side, to a function device, and (ii) transfers the handshake packet, which is a response to the USB-compliant OUT packet and DATA packet, to the host device side, wherein, after transmitting the DATA packet to the function device, the receipt acknowledgment means checks whether or not the ACK packet is supplied from the function device in response to the DATA packet, and after transmitting the DATA packet to the function device, the transmission control means performs a retransmission process so as to transmit an OUT packet and a DATA packet, which are identical with the OUT packet and the DATA packet having been transmitted to the function device on a last occasion, to the function device, if, by the receipt acknowledgement means, receipt of the ACK packet is not confirmed within a predetermined period of time.

Therefore, when a data error occurs between the function device and the function-side controller in a case that the function-side controller supplies the DATA packet to the function device, the retransmission of the DATA packet can be performed without requiring the host device side to transmit the DATA packet again.

The aforesaid communication controller further comprises: error analyzing means for analyzing whether or not the DATA packet supplied from the host-side controller includes an error, the transmission control means performing the retransmission process only when the error analyzing means confirms that the DATA packet stored in the communication controller includes no error.

Thus, when the communication controller acts as the function-side controller, the retransmission to the function device is performed only when the received DATA packet is judged as correct.

The aforesaid communication controller is arranged in such a manner that, when a PING packet is supplied from the host device, the transmission control means transmits an ACK packet to the host device.

Thus, it is possible to cause the host device to retransmit the OUT packet and the DATA packet.

The aforesaid communication controller further comprises error analyzing means for analyzing whether or not the DATA packet supplied from the host device includes an error, at a time of receiving a PING packet from the host device, if the error analyzing means judges that the supplied DATA packet includes an error or if an ACK packet has been supplied in response to a DATA packet which has previously been transmitted, the communication controller transmitting an ACK packet to the host device, and if neither the error analyzing means judges that the supplied DATA packet includes an error nor the ACK packet has been supplied in response to the DATA packet which has previously been transmitted, the communication controller transmitting a NAK packet to the host device.

Therefore, it is possible to cause the host device to retransmit the OUT packet and the DATA packet to the host device, only when the host-side controller requires, so that the decrease of the efficiency of the communication path between the host device and the host-side controller, which is caused by the DATA packet, is prevented.

The aforesaid communication controller acts as a function-side controller which (i) transfers USB-compliant OUT packet and DATA packet, which are supplied from a host device side, to a function device, and (ii) transfers the handshake packet, which is a response to the USB-compliant OUT packet and DATA packet, to the host device side, and the communication controller further comprising: error analyzing means for analyzing whether or not the DATA packet supplied from the host-side controller includes an error; and retransmission request means for requesting the host-side controller to retransmit the DATA packet, when the error analyzing means judges hat the supplied DATA packet includes an error.

Therefore, when an error occurs in the DATA packet on the communication path between the host and function, the function-side controller can notify the host device side of the occurrence of the error.

The aforesaid communication controller is arranged in such a manner that, if a retransmission request is supplied from a function-side controller, the communication controller carrying out a retransmission process so as to transmit, to the host-side controller, a DATA packet identical with the DATA packet transmitted to the function-side controller on a last occasion.

Thus, the retransmission process by the host-side controller is realized in line with the retransmission request from the function-side controller.

The aforesaid communication controller further comprises: error analyzing means for analyzing whether or not the DATA packet supplied from the host device includes an error, the transmission control means performing the retransmission process only when the error analyzing means confirms that the DATA packet stored in the communication controller includes no error.

Therefore, the retransmission to the function-side controller is carried out only when the received DATA packet is judged as correct.

The aforesaid communication controller is arranged in such a manner that, when the error analyzing means confirms that the DATA packet stored in the communication controller includes no error, a flag indicating that the DATA packet has no error is set in a packet format of the DATA packet to be supplied to the function-side controller.

This makes it possible to notify the function device side of whether or not the DATA packet stored in the host-side controller is re-transmittable.

The aforesaid communication controller is arranged in such a manner that, when the error analyzing means confirms that the DATA packet has been supplied from the host-side controller and the DATA packet includes an error, the request of retransmission is carried out only when (i) it is confirmed that a flag indicating presence/absence of an error in the DATA packet stored in the host-side controller is set in the received DATA packet, and (ii) it is confirmed by the flag that the host-side controller stores the DATA packet with no error.

Therefore, it is possible to request the host-side controller to carry out the retransmission, when it is judged that the received DATA packet includes an error.

The aforesaid communication controller is arranged in such a manner that, when a retransmission request is supplied from the function-side controller and then a PING packet is supplied from the host device, the transmission control means transmits an ACK packet to the host device.

Therefore, when the host-side controller stores the DATA packet with no error, it is possible to cause the host device to retransmit the DATA packet.

The aforesaid communication controller carries out, before the OUT transaction is performed, a transfer rate adjustment so that a rate of a transfer with a communication controller of a communication counterpart is adjusted.

For this reason, it is possible to, on the communication path between the host and function, set a transfer rate (i) at which a communication can be actually carried out and (ii) which is not unnecessarily low.

The aforesaid communication controller is arranged in such a manner that, in the transfer rate adjustment, if it is judged that a communication can be performed at a rate defined by USB standard, a packet supplied to the communication controller of the communication counterpart is subjected to only modulation and demodulation, so as not to be subjected to a timing control of packet transmission.

Therefore, when it is judged that the transfer rate on the communication path between the host and function is enough for the above-mentioned maximum turn-around, the data transfer under USB 2.0 is realized without the drop of the data transfer rate.

The aforesaid communication controller is arranged in such a manner that, if an analysis of an error rate of a communication path to the communication controller of the communication counterpart indicates that the error rate is higher than a predetermined error rate, the transfer rate adjustment is performed so that the rate of the transfer is lowered.

Therefore, if it is judged that the quality of the communication path between the host and function is bad, the transfer rate is lowered, so that the data transfer is performed through a communication path with good quality.

The aforesaid communication controller carries out a full-duplex communication with a communication controller of a communication counterpart.

Therefore, in the communication between the host and function, it is unnecessary to add a preamble to a packet and hence the efficiency of the communication path is improved.

The aforesaid communication controller carries out a communication with a communication controller of a communication counterpart, using an optical-fiber communication path.

This makes it possible to carry out a long-distance transmission between the host and function.

The aforesaid communication controller carries out a communication with a communication controller of a communication counterpart either in a wireless fashion using electric waves or by free-space transmission using light.

Since the communication between the host and function is carried out with no cable, the convenience is enhanced.

As described above, another communication controller acts, when an OUT transaction is performed as data communication under USB standard, as a function-side controller that (i) transfers an OUT packet and a DATA packet, which are supplied from a host device, to a function device, while (ii) transfers a handshake packet, which is a response to the OUT packet and the DATA packet, to a host device side, a transfer rate for transmission to the host device side being lower than a transfer rate defined by USB standard, and a transfer rate regarding transmission to the function device being identical with the transfer rate defined by USB standard, and when receipt of the OUT packet and the DATA packet from the host device side is finished, the communication controller starting transfer of the OUT packet and the DATA packet to the function device.

As described above, a further communication controller acts, when an OUT transaction is performed as data communication under USB standard, as a function-side controller that (i) transfers an OUT packet and a DATA packet, which are supplied from a host device side, to a function device, while (ii) transfers a handshake packet, which is a response to the OUT packet and the DATA packet, to the host device side, a transfer rate regarding transmission to the host device side being lower than a transfer rate defined by USB standard, while a transfer rate regarding transmission to the function device being identical with the transfer rate defined by USB standard, the communication controller further comprising data amount confirming means for confirming amounts of data of the OUT packet and the DATA packet at a time of storing the OUT packet and the DATA packet in the storage means, the OUT packet and the DATA packet being supplied from the host-side controller, and the transmission control means starting to transmit the OUT packet and the DATA packet to the function device, when the amounts of data confirmed by the data amount confirming means exceed a predetermined value.

The aforesaid communication controller is arranged in such a manner that, after transmitting the DATA packet to the function device, the communication controller checking whether or not an ACK packet is returned from the function device, in response to the DATA packet, and if, after transmission of the DATA packet, the receipt acknowledgement means does not acknowledge receipt of the ACK packet within a predetermined period of time, the communication controller performing a retransmission process so as to transmit an OUT packet and a DATA packet, which are identical with the OUT packet and the DATA packet having been transmitted to the function device on a last occasion, to the function device.

The aforesaid communication controller carries out an analysis so as to check whether or not the DATA packet supplied from the host-side controller includes an error, and the communication controller carrying out the retransmission process only when the analysis confirms that the DATA packet stored in the communication controller includes no error.

The aforesaid communication controller carries out an analysis so as to check whether or not the DATA packet supplied from the host device side includes an error, and the communication controller requiring the host-side controller to retransmit the DATA packet, when the analysis confirms that the received DATA packet includes an error.

The aforesaid communication controller is arranged in such a manner that, when the DATA packet is supplied from the host devise side and an error is detected in this DATA packet, the request of retransmission is carried out only when (i) it is confirmed that a flag indicating presence/absence of an error in the DATA packet stored in the host-side controller is set in the DATA packet, and (ii) it is confirmed by the flag that the host-side controller stores the DATA packet with no error.

As described above, a communication system of the present invention comprises: a communication controller acting as the above-described host-side controller; and a communication controller acting as a function-side controller that (1) transferring the USB-compliant IN packet, which is supplied from the host device side, to the function device, while (2) transfers the DATA packet, which is a response to the IN packet, to the host device side.

As described above, a communication equipment of the present invention includes the aforesaid communication controller.

As described above, a communication method of the present invention comprises the steps of: when receipt of an OUT packet and a DATA packet from a host device is confirmed, checking whether or not a handshake packet which will be a response to the OUT packet and the DATA packet has been supplied; if the handshake packet has been supplied, transmitting the handshake packet to the host device, in response to the OUT packet and the DATA packet having been supplied; and if the handshake packet has not been supplied, transferring a NAK packet to the host device.

A packet-based communication system of the present invention causes a computer to perform as the means of the above-mentioned communication controller. Loading this packet-based communication system into a computer system enables the user to use the above-described communication controller.

A storage medium of the present invention stores the aforesaid packet-based communication program. Loading the packet-based communication system stored in the storage medium into a computer system enables the user to use the above-described communication controller.

A host-side controller (present host-side controller) of the present invention is provided in a host of a USB system and relays communications between the host and a device, at a time of performing a SETUP transaction, the host-side controller supplying, to a device side, a SETUP packet and a DATA packet supplied from the host, and storing the SETUP packet and the DATA packet on receipt of an ACK packet which is supplied from the device side towards the host, and the host-side controller comprising a host-side control section which supplies the ACK packet to the host on receipt of the SETUP packet and the DATA packet retransmitted from the host towards the device.

After storing the ACK packet supplied from the device side, the host-side control section may transfer the ACK packet to the host, before the retransmission of the SETUP packet and the DATA packet. Also, after storing the ACK packet supplied from the device side, the host-side control section may avoid the transmission of the ACK packet to the host.

The host-side control section of the present host-side controller preferably checks the presence of an error in the DATA packet, at the time of supplying, to the device side, the SETUP packet and the DATA packet supplied from the host. In this case, moreover, the host-side control section preferably avoids the transmission of the DATA packet if the packet has an error.

This makes it possible to avoid the transmission of an erroneous packet to the device side, so that unnecessary packet transmission can be avoided. Note that, an error of the packet as above can be detected by, for instance, analyzing an error detecting signal (CRC) added to the packet.

A USB system (present system) of the present invention includes a host, a device, the present host-side controller, and a device-side controller which is provided in the device and relays the communications between the host and device.

In the present system, it is preferable that the device-side controller is provided with a device-side control section. At the time of the SETUP transaction, this device-side control section transmits, to the device, the SETUP packet and the DATA packet supplied from the present host-side controller, while the device-side control section transmits, to the present host-side controller, the ACK packet supplied from the device.

The device-side control section may be arranged in such a manner that, when the DATA packet is supplied from the present host-side controller and transferred to the device, the transfer starts after the entirety of the DATA packet is received. This is to prevent the occurrence of dropouts in the transmission to the device, when the communication rate between the controllers is lower than the communication rate between the device-side controller and the device.

The device-side control section may start the transfer of the DATA packet to the device, after a received amount of the DATA packet exceeds a stable received amount. This stable received amount is a received amount of DATA with which the dropouts of the transmission do not occur after the transfer of the DATA packet to the device starts. This arrangement also makes it possible to prevent the aforesaid dropouts of the transmission.

Moreover, in the present system, it is preferable that the device-side control section avoids transferring, to the device, the DATA packet supplied from the present host-side controller, if the DATA packet has an error. With this, the. transmission of an erroneous packet to the device is avoided, so that unnecessary packet transmission is prevented. Note that, an error of the packet as above can be detected by, for instance, analyzing an error detecting signal (CRC) added to the packet.

In the arrangement above, if a supplied packet has an error, the device-side control section preferably discards the packet. The device-side control section basically stores the received packet in a memory in the device-side controller. Discarding the erroneous packet as above makes it possible to save the storage capacity of the memory.

In the SETUP transaction, the device sometimes fails to receive the SETUP packet and the DATA packet. This failure is caused by an error in the packet and troubles related to the transmission and receipt. In such a case, the device does not return the ACK packet which indicates proper receipt of the packet.

On this account, after transmitting the SETUP packet and the DATA packet to the device, the device-side control section preferably retransmits the SETUP packet and the DATA packet to the device if the ACK packet is not supplied within a predetermined period of time.

With this, the retransmission of the packets to the device is realized only with the operation of the device-side controller, without retransmitting the packets by the host and the present host-side controller.

In this case, the device-side control section preferably judges the existence of an error in the DATA packet, before retransmitting the SETUP packet and the DATA packet to the device. If the DATA packet is erroneous, it is preferable that the retransmission of the DATA packet is avoided. With this, unnecessary packet retransmission is prevented.

When the device-side control section judges that the DATA packet supplied from the present host-side controller has an error, the device-side control section preferably requests the present host-side controller to retransmit the DATA packet. In this case, furthermore, the host-side control section of the present host-side controller retransmits the DATA packet in response to the retransmission request from the device-side control section. With this, it is possible to obtain an error-free and proper DATA packet without waiting for the retransmission from the host.

In the aforesaid case, it is preferable that, only when the host-side control section stores an error-free DATA packet, the host-side control section retransmits the DATA packet. This prevents unnecessary packet retransmission.

On the occasion of transferring, to the device-side controller, the DATA packet supplied from the host, the host-side control section may start the transfer after completely receiving the entirety of the DATA packet. This makes it possible to prevent the occurrence of dropouts in the transmission to the device-side controller, when the communication rate between the controllers is lower than the communication rate between the host and the present host-side controller.

When the amount of the received DATA packet exceeds the stable received amount, the host-side control section may start to transfer parts of the DATA packet to the device-side controller, on a first-come, first-served basis. This stable received amount is a received amount of DATA with which the dropouts of the transmission do not occur after the transfer of the DATA packet to the device starts. This arrangement also makes it possible to prevent the aforesaid dropouts of the transmission.

In this case, when the host-side control section finishes the receipt of the entirety of the DATA packet, a part of the DATA packet has already been transferred. At this point, the host-side control section preferably (i) checks the presence of an error in this packet, (ii) adds a flag indicating the result of the check to the end of the DATA packet, and (iii) transmits the flag to the device-side controller.

In this case, the device-side control section judges that, at the stage of the transmission from the host to the present host-side controller, an error has already occurred in the packet with a flag (error flag) indicating the presence of an error. Therefore, it is preferable that the device-side control section does not transfer such packet to the device, and transfers, to the device, only a packet with a flag (non-error flag) indicating the absence of an error. With this, unnecessary packet transmission is avoided.

In the arrangement above, the device-side control section preferably makes, to the present host-side controller, a request of retransmission of the DATA packet, when the DATA packet supplied from the present host-side controller is judged as erroneous but a non-error flag is added to the DATA packet. It is also preferable that the host-side control section retransmits the DATA packet in response to the retransmission request from the device-side control section.

That is to say, when the DATA packet with the non-error flag has an error, the device-side control section judges that an error had not occurred in this packet at the stage of the transmission from the host to the present host-side controller. Therefore, the device-side control section retransmits the DATA packet to the present host-side controller, and hence the device-side control section can obtain an error-free and proper DATA packet without waiting for the retransmission from the host.

In the present system, each of the host-side controller and the device-side controller preferably includes a speed setting section for setting the communication rate between the controllers.

In the arrangement above, when the speed setting section sets the communication rate between the controllers to be higher than a predetermined value, the host-side control section transfers, to the host side, the ACK packet supplied from the device side towards the host, at a time of receiving this ACK packet.

Note that, the aforesaid predetermined value corresponds to a rate more or less identical to a normal rate (a rate in line with the USB standard; about 480 Mbps in HF), with which the -ACK packet can be directly transferred (repeated) to the host within the maximum TA time.

That is, in this case, the ACK packet supplied from the device-side controller is likely to be directly transferred to the host within the maximum TA time, without the retransmission by the host. On this account, the host-side control section can complete the SETUP transaction even if the ACK packet supplied from the device-side controller is directly transferred (repeated) to the host.

In the present system, it is preferable that at least one of the host-side control section and the device-side control section (alternatively, the speed setting section) calculates an error rate regarding transmission and receipt of a packet between the controllers. The error rate (error occurrence rate) is calculated by dividing the number of errors by the number of transmission and receipt. In this case, moreover, the speed setting section preferably lowers the communication rate between the controllers, when the error rate exceeds a predetermined value. With this, a high error rate on account of an unnecessarily high communication rate can be lowered.

In the present system, it is preferable that a method of communications on a communication path between the controllers is a full-duplex communication. This makes it possible to do away with a preamble required in a half-duplex communication, so that the communication efficiency between the controllers can be improved.

Moreover, in the present system, a communication path between the controllers may be made up of an optical cable. This realizes long-distance transmission of packets.

The communications between the controllers may be optical wireless communication or wireless communication using an electric wave. Wireless (free-space) communication is convenient (in terms of, for instance, the degree of freedom of the layout of the controllers) because wiring is unnecessary.

As described above, a communication controller of the present invention relays communications between a host and a device and can act both as a controller on a host side and a controller on a device side, when the communication controller acts as the controller on the host side and a SETUP transaction is performed, the communication controller supplying, to the device side, a SETUP packet and a DATA packet supplied from the host, and storing an ACK packet transmitted from the device side towards the host, at a time of supply of this ACK packet to the communication controller, and the communication controller including a control section which supplies the ACK packet to the host, when the SETUP packet and the DATA packet which are retransmitted from the device side towards the host is supplied to the communication controller.

Furthermore, at a time of supplying, to the device side, the SETUP packet and the DATA packet supplied from the host, the control section preferably judges whether or not the DATA packet has an error. In this case, it is also preferable that the control section avoids transmitting the DATA packet if it is judged that the DATA packet has an error.

This makes it possible to avoid transmitting an erroneous packet to the device side, so that unnecessary packet transmission is prevented. Note that, an error of the packet as above can be detected by, for instance, analyzing an error detecting signal (CRC) added to the packet.

Furthermore, on the occasion of receiving the DATA packet from the host and transferring the same to the device side, the control section may start the transfer after completely receiving the entirety of the DATA packet. This is to prevent the dropouts in the transmission to the device side, that occurs when the communication rate between the controllers is lower than the communication rate between the host and the present communication controller.

Furthermore, when the received amount of the DATA packet exceeds a stable received amount, the host-side control section may start to transmit, to the device-side, parts of the DATA packet supplied from the host, on first-come, first-served basis. This stable received amount is a received amount of DATA with which the dropouts of the transmission do not occur after the transfer of the DATA packet to the device side starts. This arrangement also makes it possible to prevent the aforesaid dropouts of the transmission.

In this case, when the control section finishes the receipt of the entirety of the DATA packet, a part of the DATA packet has already been transferred. At this point, the control section preferably (i) checks the presence of an error in this packet, (ii) adds a flag indicating the result of the check to the end part of the DATA packet, and (iii) transmits the end part with the flag to the device-side controller.

In this case, the device side judges that, at the stage of the transmission from the host to the present communication controller, an error has already occurred in the packet with a flag (error flag) indicating the presence of an error. Therefore, it is preferable that the device side does not transfer such packet to the device, and transfers, to the device, only a packet with a flag (non-error flag) indicating the absence of an error. With this, unnecessary packet transmission is avoided.

Furthermore, when the present communication controller acts as the controller on the device side and the SETUP transaction is performed, the control section supplies, to the device, the SETUP packet and the DATA packet supplied from the host side, and the control section also supplies, to the host side, the ACK packet supplied from the device.

On the occasion of receiving the DATA packet from the host side and transferring the same to the device, the control section may start the transfer after completely receiving the entirety of the DATA packet. This is to prevent the dropouts in the transmission to the device, that occurs when the communication rate between the controllers is lower than the communication rate between the present communication controller and the device.

Moreover, when the present communication controller acts as a controller on the device side and the DATA packet supplied from the host side is transferred to the device, the control section may start to transfer the DATA packet to the device when an amount of the received DATA packet exceeds a stable received amount. This stable received amount is a received amount of DATA with which the dropouts of the transmission do not occur after the transfer of the DATA packet to the device starts. This arrangement also makes it possible to prevent the aforesaid dropouts of the transmission.

When the present communication controller acts as a controller on the device side and the DATA packet supplied from the host side has an error, the control section preferably avoids transmitting this DATA packet to the device. This makes it possible to avoid the transmission of an erroneous packet to the device, so that unnecessary packet transmission is prevented. Note that, an error of the packet as above can be detected by, for instance, analyzing an error detecting signal (CRC) added to the packet.

In this arrangement, it is preferable that, if a received packet has an error, the control section discards this packet. The control section basically stores the received packet in a memory in the present communication controller. Discarding the erroneous packet as above makes it possible to save the storage capacity of the memory.

When the present communication controller acts as a controller on the device side and the SETUP transaction is performed, the receipt of the SETUP packet and the DATA packet sometimes fails. This failure is caused by, for instance, an error occurring in the packet and troubles regarding the transmission and receipt. In such a case, the device does not return the ACK packet which indicates proper receipt of the packets.

Therefore, it is preferable that, after transmitting the SETUP packet and the DATA packet to the device, if the control section cannot receives the ACK packet within a predetermined period of time, the control section retransmits the SETUP packet and the DATA packet to the device.

With this, the retransmission of the packets to the device is realized only with the operation of the present communication controller, without retransmitting the packets by the host and the host-side controller.

In the case above, it is preferable that the control section checks the presence of an error in the DATA packet before retransmitting the SETUP packet and the DATA packet to the device. When the DATA packet has an error, it is preferable that the retransmission of the DATA packet is avoided. This prevents unnecessary packet retransmission.

A packet-based communication method (present communication method), which is for exchanging packets between a host and a device of a USB system, comprises the steps of: at a time of performing a SETUP transaction, (i) transmitting, to a device side, a SETUP packet and a DATA packet supplied from the host; (ii) avoiding transfer of an ACK packet to a host side, the ACK packet being transmitted from the device side towards the host; and (iii) when the SETUP packet and the DATA packet are retransmitted from the host to the device, supplying the ACK packet to the host.

A packet-based communication program of the present invention causes a computer provided in the host of the USB system to execute the steps (i), (ii), and (iii) of the present communication method.

It is possible to easily preserve and distribute the program by storing the program in a computer-readable storage medium.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A communication controller which acts, when an IN transaction is performed as data communication under USB standard, as a host-side controller that (i) transfers an IN packet, which is supplied from a host device, to a function device side, while (ii) transfers a DATA packet, which is a response to the IN packet, to the host device, the communication controller comprising:
receipt acknowledgement means for acknowledging receipt of the IN packet from the host device;
storage means for storing the DATA packet supplied from the function device side;
wherein when another IN packet is supplied from the host device side before receiving from the host side device an ACK packet in response to the DATA packet transmitted to the host device side, the communication controller holding said another IN packet,
data storage acknowledgement means for checking if the DATA packet is stored in the storage means when the receipt acknowledgement means acknowledges the receipt of said another IN packet from the host device; and
transmission control means for (I) transmitting, to the function device side, said another IN packet which is supplied from the host device, and transmitting a NAK packet to the host device, when the data storage acknowledgement means confirms that the DATA packet is not stored, and for (II) transmitting the DATA packet to the host device, when the data storage acknowledgement means confirms that the DATA packet is stored.

2. The communication controller as defined in claim 1, the communication controller also acting as a function-side controller which (i) transfers a USB-compliant IN packet, which is supplied from a host device side, to a function device, and (ii) transfers the DATA packet, which is a response to the USB-compliant IN packet, to the host device side, when the IN packet is supplied from the host device side, the communication controller holding this IN packet, and when an ACK packet is supplied from the host device side in response to the DATA packet transmitted to the host device side, the communication controller supplying the IN packet, which has been held, to the function device, and supplying the ACK packet to the function device when the DATA packet in response to the IN packet is supplied from the function device.

3. The communication controller as defined in claim 1, wherein, a transfer rate for receipt of the IN packet from the host device and for transmission of the DATA packet to the host device is identical with a transfer rate defined by USB standard, while a transfer rate regarding transmission of the IN packet to the function device side and a transfer rate regarding receipt of the DATA packet from the function device side are lower than the transfer rate defined by USB standard, data amount confirming means for confirming an amount of data of the DATA packet at a time of storing the DATA packet in the storage means is additionally provided, the DATA packet being supplied from the function device side, and the transmission control means starts to transmit the DATA packet to the host device, when the amount of data confirmed by the data amount confirming means exceeds a predetermined value.

4. The communication controller as defined in claim 1, further comprising error analyzing means for analyzing whether or not the DATA packet supplied from the function device side includes an error, when the error analyzing means judges that the DATA packet includes an error, the transmission control means discarding the DATA packet so as not to transfer the DATA packet to the host device.

5. The communication controller as defined in claim 1, further comprising error analyzing means for analyzing whether or not the DATA packet supplied from the function device side includes an error, if the error analyzing means makes a judgment that the DATA packet includes an error, the transmission control means terminating transmission of the DATA packet of the host device immediately after the judgment.

6. The communication controller as defined in claim 1, wherein, after transmitting the DATA packet to the host device, the receipt acknowledgment means checks whether or not the ACK packet has been supplied from the host device in response to the DATA packet, and after transmitting the DATA packet to the host device, the transmission control means performs a retransmission process so as to transmit a DATA packet, which is identical with the DATA packet having been transmitted to the host device on a last occasion, to the host device, if, by the receipt acknowledgement means, receipt of the ACK packet is not confirmed while receipt of a next IN packet is confirmed.

7. The communication controller as defined in claim 6, further comprising error analyzing means for analyzing whether or not the DATA packet supplied from the function device side includes an error, the transmission control means performing the retransmission process only when the error analyzing means confirms that the DATA packet stored in the communication controller includes no error.

8. The communication controller as defined in claim 1, further comprising:

error analyzing means for analyzing whether or not the DATA packet supplied from the function device side includes an error; and retransmission request means for requesting the function device side to retransmit the DATA packet, if the error analyzing means judges that the DATA packet supplied from the function device side includes an error.

9. The communication controller as defined in claim 8, when the error analyzing means confirms that the DATA packet has been supplied from the function-side controller and the DATA packet includes an error, the communication controller carrying out the request of retransmission only when (i) it is confirmed that a flag indicating presence/absence of an error in the DATA packet stored in the function-side controller is set in the DATA packet, and (ii) it is confirmed by the flag that the function device side stores the DATA packet with no error.

10. The communication controller as defined in claim 1, the communication controller also acting as a function-side controller which (i) transfers a USB-compliant IN packet, which is supplied from the host device side, to the function device, while (ii) transfers, to the host device side, the DATA packet which is a response to the IN packet, and when a retransmission request is supplied from the host-side controller, the communication controller carrying out a retransmission process so as to transfer, to the host-side controller, a DATA packet identical with the DATA packet having been supplied to the host-side controller on a last occasion.

11. The communication controller as defined in claim 10, further comprising error analyzing means for analyzing whether or not the DATA packet supplied from the function device includes an error, the transmission control means performing the retransmission process only when the error analyzing means confirms that the DATA packet stored in the communication controller includes no error.

12. The communication controller as defined in claim 11, wherein, when the error analyzing means confirms that the DATA packet stored in the communication controller includes no error, a flag indicating that the DATA packet has no error is set in a packet format of the DATA packet to be supplied to the host device.

13. The communication controller as defined in claim 1, the communication controller also acting as a function-side controller which (i) transfers a USB-compliant IN packet, which is supplied from the host device side, to the function device, while (ii) transfers, to the host device side, the DATA packet which is a response to the 114 packet, and when a retransmission request is supplied from the host-side controller, the communication controller supplying the IN packet to the function device, and transferring, to the host-side controller, the DATA packet supplied in response to the IN packet.

14. The communication controller as defined in claim 1, before the IN transaction is performed, the communication controller carrying out a transfer rate adjustment so that a rate of a transfer with a communication controller of a communication counterpart is adjusted.

15. The communication controller as defined in claim 14, wherein, in the transfer rate adjustment, if it is judged that a communication can be performed at a rate defined by USB standard, a packet supplied to the communication controller of the communication counterpart is subjected to only modulation and demodulation, so as not to be subjected to a timing control of packet transmission.

16. The communication controller as defined in claim 14, wherein, if an analysis of an error rate of a communication path to the communication controller of the communication counterpart indicates that the error rate is higher than a predetermined error rate, the transfer rate adjustment is performed so that the rate of the transfer is lowered.

17. The communication controller as defined in claim 1, carrying out a full-duplex communication with a communication controller of a communication counterpart.

18. The communication controller as defined in claim 1, carrying out a communication with a communication controller of a communication counterpart, using an optical-fiber communication path.

19. The communication controller as defined in claim 1, carrying out a communication with a communication controller of a communication counterpart in a wireless fashion using electric waves.

20. The communication controller as defined in claim 1, carrying out a communication with a communication controller of a communication counterpart, by free-space transmission using light.

21. A communication controller which acts, when an IN transaction is performed as data communication under USB standard, as a function-side controller that (i) transfers a USB-compliant IN packet, which is supplied from a host device, to a function device side, while (ii) transfers a DATA packet, which is a response to the IN packet, to a host device side,
   when the IN packet is supplied from the host device side, the communication controller holding this IN packet,
   wherein when another IN packet is supplied from the host device side before receiving from the host side device an ACK packet in response to the DATA packet transmitted to the host device side, the communication controller holding said another IN packet, and
   when an ACK packet is supplied from the host device side in response to the DATA packet transmitted to the host device side, the communication controller supplying said another IN packet, which has been held, to a USB function, and supplying the ACK packet to the function device when the DATA packet is supplied from the function device, in response to said another IN packet.

22. A communication controller which acts, when an IN transaction is performed as data communication under USB standard, as a function-side controller that (i) transfers a USB-compliant IN packet, which is supplied from a host device, to a function device side, while (ii) transfers a DATA packet, which is a response to the IN packet, to a host device side,
   if a retransmission request is supplied from a host-side controller, the communication controller carrying out a retransmission process so as to transmit, to the host-side controller, a DATA packet identical with the DATA packet transmitted to the host-side controller on a last occasion.

23. The communication controller as defined in claim 22, the communication controller carrying out an analysis so that whether or not the DATA packet supplied from the function device includes an error is judged, and the communication controller carrying out the retransmission process only when the analysis confirms that the DATA packet stored in the communication controller includes no error.

24. The communication controller as defined in claim 23, wherein, when the analysis confirms that the DATA packet stored in the communication controller includes no error, a flag indicating that the DATA packet has no error is set in a packet format of the DATA packet to be supplied to the host device.

25. A communication controller which acts, when an IN transaction is performed as data communication under USB standard, as a function-side controller that (i) transfers an IN packet, which is supplied from a host device side, to a function device, while (ii) transfers a DATA packet, which is a response to the IN packet, to a host device side,
   when a retransmission request is supplied from the host-side controller, the communication controller supplying (I) the IN packet to the function device and (II) the DATA packet, which is supplied in response to the IN packet, to the host-side controller.

26. A communication system, comprising:
   a communication controller acting as a host-side controller; and
   a communication controller acting as a function-side controller,
   the communication controller acting as the host-side controller that, when an IN transaction is performed as data communication under USB standard, (i) transfers a USB-compliant IN packet, which is supplied from a host device, to a function device side, while (ii) transfers a DATA packet, which is a response to the IN packet, to a host device side,
   the communication controller acting as the host-side controller including:
   receipt acknowledgement means for acknowledging receipt of the IN packet from the host device;
   storage means for storing the DATA packet supplied from a function device side;
   wherein when another IN packet is supplied from the host device side before receiving from the host side device an ACK packet in response to the DATA packet transmitted to the host device side, the communication controller holding said another IN packet,
   data storage acknowledgement means for checking if the DATA packet is stored in the storage means when the receipt acknowledgement means acknowledges the receipt of said another IN packet from the host device; and
   transmission control means for (I) transmitting, to the function device side, said another IN packet which is supplied from the host device, and transmitting a NAK packet to the host device, when the data storage acknowledgement means confirms that the DATA packet is not stored, and for (II) transmitting the DATA packet to the host device, when the data storage acknowledgement means confirms that the DATA packet is stored,
   the communication controller acting as the function-side controller (1) transferring the USB-compliant IN packet, which is supplied from the host device side, to the function device, while (2) transferring the DATA packet, which is a response to said another IN packet, to the host device side.

27. A communication controller which acts, when an IN transaction is performed as data communication under USB standard, as a host-side controller that (i) transfers a USB-compliant IN packet, which is supplied from a host device, to a function device side, while (ii) transfers a DATA packet, which is a response to the IN packet, to a host device,
   the communication controller comprising:
   receipt acknowledgement means for acknowledging receipt of the IN packet from the host device;

storage means for storing the DATA packet supplied from the function device side;

wherein when another IN packet is supplied from the host device side before receiving from the host side device an ACK packet in response to the DATA packet transmitted to the host device side, the communication controller holding said another IN packet, data storage acknowledgement means for checking if the DATA packet is stored in the storage means when the receipt acknowledgement means acknowledges the receipt of said another IN packet from the host device; and transmission control means for (I) transmitting, to the function device side, said another IN packet which is supplied from the host device, and transmitting a NAK packet to the host device, when the data storage acknowledgement means confirms that the DATA packet is not stored, and for (II) transmitting the DATA packet to the host device, when the data storage acknowledgement means confirms that the DATA packet is stored.

28. A communication equipment, comprising:

a communication controller which acts, when an IN transaction is performed as data communication under USB standard, as a function-side controller that (i) transfers a USB-compliant IN packet, which is supplied from a host device side, to a function device, while (ii) transfers a DATA packet, which is a response to the IN packet, to a host device side, when the IN packet is supplied from the host device side, the communication controller holding this IN packet, wherein when another IN packet is supplied from the host device side before receiving from the host side device an ACK packet in response to the DATA packet transmitted to the host device side, the communication controller holding said another IN packet, and when an ACK packet is supplied from the host device side in response to the DATA packet transmitted to the host device side, the communication controller supplying said another IN packet, which has been held, to a USB function, and supplying the ACK packet to the function device when the DATA packet is supplied from the function device, in response to said another IN packet.

29. A communication equipment, comprising:

a communication controller which acts, when an IN transaction is performed as data communication under USB standard, as a function-side controller that (I) transfers a USB-compliant IN packet, which is supplied from a host device, to a function device, while (ii) transfers a DATA packet, which is a response to the IN packet, to a host device side, if a retransmission request is supplied from a host-side controller, the communication controller carrying out a retransmission process so as to transmit, to the host-side controller, a DATA packet identical with the DATA packet transmitted to the host-side controller on a last occasion.

30. A communication equipment, comprising:

a communication controller which acts, when an IN transaction is performed as data communication under USB standard, as a function-side controller that (i) transfers a USB-compliant IN packet, which is supplied from a host device, to a function device side, while (ii) transfers a DATA packet, which is a response to the IN packet, to a host device side;

when a retransmission request is supplied from a host-side controller, the communication controller supplying (I) the IN packet to the function device and (II) the DATA packet, which is supplied in response to the IN packet, to the host-side controller.

31. A communication method, comprising the steps of:

when receipt of an IN packet from a host device is confirmed, checking whether or not a DATA packet which will be a response to the IN packet has been supplied;

when another IN packet is received from a host device side before receiving from the host side device an ACK packet in response to the DATA packet transmitted to the host device side, holding said another IN packet;

if the DATA packet has been supplied, transmitting the DATA packet to the host device, in response to the received IN packet;

if the DATA packet has not been supplied, transferring said another IN packet to a function device side, and transmitting a NAK packet to the host device, and if the DATA packet has not been supplied and said another IN packet has not been received, transferring the received IN packet to a function device side, and transmitting a NAK packet to the host device.

32. A packet-based communication program which causes a computer to perform as means of a communication controller which acts, when an IN transaction is performed as data communication under USB standard, as a host-side controller that (i) transfers a USB-compliant IN packet, which is supplied from a host device, to a function device side, while (ii) transfers a DATA packet, which is a response to the IN packet, to a host device, the communication controller comprising:

receipt acknowledgement means for acknowledging receipt of the IN packet from the host device;

storage means for storing the DATA packet supplied from the function device side;

wherein when another IN packet is received from a host device side before receiving from the host side device an ACK packet in response to the DATA packet transmitted to the host device side, holding said another IN packet, data storage acknowledgement means for checking if the DATA packet is stored in the storage means when the receipt acknowledgement means acknowledges the receipt of said another IN packet from the host device; and transmission control means for (I) transmitting, to the function device side, said another IN packet which is supplied from the host device, and transmitting a NAK packet to the host device, when the data storage acknowledgement means confirms that the DATA packet is not stored, and for (II) transmitting the DATA packet to the host device, when the data storage acknowledgement means confirms that the DATA packet is stored.

33. A storage medium storing a packet-based communication program which causes a computer to perform as means of a communication controller which acts, when an IN transaction is performed as data communication under USB standard, as a host-side controller that (i) transfers an IN packet, which is supplied from a host device, to a function device side, while (ii) transfers a DATA packet, which is a response to the IN packet, to a host device, the communication controller comprising:

receipt acknowledgement means for acknowledging receipt of the IN packet from the host device;

storage means for storing the DATA packet supplied from the function device side;

wherein when another IN packet is received from a host device side before receiving from the host side device an ACK packet in response to the DATA packet transmitted to the host device side, holding said another IN packet, data storage acknowledgement means for checking if the DATA packet is stored in the storage means when the receipt acknowledgement means acknowledges the receipt of said another IN packet from the host device; and transmission control means for (I) transmitting, to the function device side, said another IN packet which is supplied from the host device, and transmitting a NAK packet to the host device, when the data storage acknowledgement means confirms that the DATA packet is not stored, and for (II) transmitting the DATA packet to the host device, when the data storage acknowledgement means confirms that the DATA packet is stored.

34. A communication controller which acts, when an OUT transaction is performed as data communication under USB standard, as a host-side controller that (i) transfers an OUT packet and a DATA packet, which are supplied from a host device, to a function device side, while (ii) transfers a handshake packet, which is a response to the OUT packet and the DATA packet, to the host device, the communication controller comprising:

receipt acknowledgement means for acknowledging receipt of the OUT packet and the DATA packet from the host device;

storage means for storing the handshake packet supplied from the function device side;

data storage acknowledgement means for checking if the handshake packet is stored in the storage means when the receipt acknowledgement means acknowledges the receipt of the OUT packet and the DATA packet from the host device; and transmission control means for (I) transmitting a NAK packet to the host device, when the data storage acknowledgement means confirms that the handshake packet is not stored, and for (II) transmitting the handshake packet to the host device, when the data storage acknowledgement means confirms that the handshake packet is stored, wherein, the communication controller also acts as a function-side controller which (i) transfers USB-compliant OUT packet and DATA packet, which are supplied from a host device side, to a function device, and (ii) transfers the handshake packet, which is a response to the USB-compliant OUT packet and DATA packet, to the host device side, a transfer rate for receipt of the OUT packet and the DATA packet from a host-side controller and a transfer rate for transmission of the handshake packet to the host-side controller are lower than a transfer rate defined by USB standard, and a transfer rate for transmission of the OUT packet and the DATA packet to the function device and a transfer rate regarding receipt of the handshake packet from the function device are identical with the transfer rate defined by USB standard, data amount confirming means for confirming amounts of data of the OUT packet and the DATA packet at a time of storing the OUT packet and the DATA packet in the storage means is additionally provided, the OUT packet and the DATA packet being supplied from the host-side controller, and the transmission control means starts to transmit the OUT packet and the DATA packet to the function device, when the amounts of data confirmed by the data amount confirming means exceed a predetermined value.

35. The communication controller as defined in claim 34, wherein, the communication controller also acts as a function-side controller which (i) transfers USB-compliant OUT packet and DATA packet, which are supplied from a host device side, to a function device, and (ii) transfers the handshake packet, which is a response to the USB-compliant OUT packet and DATA packet, to the host device side, a transfer rate for receipt of the OUT packet and the DATA packet from a host-side controller and a transfer rate for transmission of the handshake packet to the host-side controller are lower than a transfer rate defined by USB standard, and a transfer rate for transmission of the OUT packet and the DATA packet to the function device and a transfer rate regarding receipt of the handshake packet from the function device are identical with the transfer rate defined by USB standard, data amount confirming means for confirming amounts of data of the OUT packet and the DATA packet at a time of storing the OUT packet and the DATA packet in the storage means is additionally provided, the OUT packet and the DATA packet being supplied from the host-side controller, and the transmission control means starts to transmit the OUT packet and the DATA packet to the function device, when the amounts of data confirmed by the data amount confirming means exceed a predetermined value.

36. The communication controller as defined in claim 34, wherein, the communication controller also acts as a function-side controller which (i) transfers USB-compliant OUT packet and DATA packet, which are supplied from a host device side, to a function device, and (ii) transfers the handshake packet, which is a response to the USB-compliant OUT packet and DATA packet, to the host device side, error analyzing means for analyzing whether or not the DATA packet supplied from the host-side controller includes an error is additionally provided, and when the error analyzing means judges that the DATA packet includes an error, the transmission control means discards the DATA packet so as not to transfer the DATA packet to the function device.

37. The communication controller as defined in claim 34, further comprising error analyzing means for analyzing whether or not the DATA packet supplied from the host device includes an error, if the error analyzing means makes a judgment that the DATA packet includes an error, the transmission control means terminating transmission of the DATA packet to the function-side controller, immediately after the judgment.

38. The communication controller as defined in claim 34, wherein, the communication controller also acts as a function-side controller which (i) transfers USB-compliant OUT packet and DATA packet, which are supplied from a host device side, to a function device, and (ii) transfers the handshake packet, which is a response to the USB-compliant OUT packet and DATA packet, to the host device side, after transmitting the DATA packet to the function device, the receipt acknowledgment means checks whether or not the ACK packet is supplied from the function device in response to the DATA packet, and after transmitting the DATA packet to the function device, the transmission control means performs a retransmission process so as to transmit an OUT packet and a DATA packet, which are identical with the OUT packet and the DATA packet having been transmitted to the function device on a last occasion, to the function device, if, by the receipt acknowledgement means, receipt of the ACK packet is not confirmed within a predetermined period of time.

39. The communication controller as defined in claim 38, further comprising: error analyzing means for analyzing whether or not the DATA packet supplied from the host-side controller includes an error, the transmission control means performing the retransmission process only when the error analyzing means confirms that the DATA packet stored in the communication controller includes no error.

40. The communication controller as defined in claim 34, wherein, when a PING packet is supplied from the host device, the transmission control means transmits an ACK packet to the host device.

41. The communication controller as defined in claim 34, further comprising error analyzing means for analyzing whether or not the DATA packet supplied from the host device includes an error, in a case where a PING packet is supplied from the host device, if the error analyzing means judges that the supplied DATA packet includes an error or if an ACK packet has been supplied in response to a DATA packet which has previously been transmitted, the communication controller transmitting an ACK packet to the host device, and if neither the error analyzing means judges that the supplied DATA packet includes an error nor the ACK packet has been supplied in response to the DATA packet which has previously been transmitted, the communication controller transmitting a NAK packet to the host device.

42. The communication controller as defined in claim 34, the communication controller also acting as a function-side controller which (i) transfers USB-compliant OUT packet and DATA packet, which are supplied from a host device side, to a function device, and (ii) transfers the handshake packet, which is a response to the USB-compliant OUT packet and DATA packet, to the host device side, and the communication controller further comprising:

error analyzing means for analyzing whether or not the DATA packet supplied from the host-side controller includes an error; and retransmission request means for requesting the host-side controller to retransmit the DATA packet, when the error analyzing means judges hat the supplied DATA packet includes an error.

43. The communication controller as defined in claim 42, wherein, when the error analyzing means confirms that the DATA packet has been supplied from the host-side controller and the DATA packet includes an error, the request of retransmission is carried out only when (i) it is confirmed that a flag indicating presence/absence of an error in the DATA packet stored in the host-side controller is set in the received DATA packet, and (ii) it is confirmed by the flag that the host-side controller stores the DATA packet with no error.

44. The communication controller as defined in claim 34, wherein, if a retransmission request is supplied from a function-side controller, the communication controller carrying out a retransmission process so as to transmit, to the function-side controller, a DATA packet identical with the DATA packet transmitted to the function-side controller on a last occasion.

45. The communication controller as defined in claim 44, further comprising: error analyzing means for analyzing whether or not the DATA packet supplied from the host device includes an error, the transmission control means performing the retransmission process only when the error analyzing means confirms that the DATA packet stored in the communication controller includes no error.

46. The communication controller as defined in claim 45, wherein, when the error analyzing means confirms that the DATA packet stored in the communication controller includes no error, a flag indicating that the DATA packet has no error is set in a packet format of the DATA packet to be supplied to the function-side controller.

47. The communication controller as defined in claim 34, wherein, when a retransmission request is supplied from the function-side controller and then a PING packet is supplied from the host device, the transmission control means transmits an ACK packet to the host device.

48. The communication controller as defined in claim 34, before the OUT transaction is performed, the communication controller carrying out a transfer rate adjustment so that a rate of a transfer with a communication controller of a communication counterpart is adjusted.

49. The communication controller as defined in claim 48, wherein, in the transfer rate adjustment, if it is judged that a communication can be performed at a rate defined by USB standard, a packet supplied to the communication controller of the communication counterpart is subjected to only modulation and demodulation, so as not to be subjected to a timing control of packet transmission.

50. The communication controller as defined in claim 48, wherein, if an analysis of an error rate of a communication path to the communication controller of the communication counterpart indicates that the error rate is higher than a predetermined error rate, the transfer rate adjustment is performed so that the rate of the transfer is lowered.

51. The communication controller as defined in claim 34, carrying out a full-duplex communication with a communication controller of a communication counterpart.

52. The communication controller as defined in claim 34, carrying out a communication with a communication controller of a communication counterpart, using an optical-fiber communication path.

53. The communication controller as defined in claim 34, carrying out a communication with a communication controller of a communication counterpart in a wireless fashion using electric waves.

54. The communication controller as defined in claim 34, carrying out a communication with a communication controller of a communication counterpart, by free-space transmission using light.

55. A communication controller which acts, when an OUT transaction is performed as data communication under USB standard, as a function-side controller that (i) transfers an OUT packet and a DATA packet, which are supplied from a host device side, to a function device, while (ii) transfers a handshake packet, which is a response to the OUT packet and the DATA packet, to the host device side, a transfer rate regarding transmission to the host device side being lower than a transfer rate defined by USB standard, while a transfer rate regarding transmission to the function device being identical with the transfer rate defined by USB standard, the communication controller further comprising data amount confirming means for confirming amounts of data of the OUT packet and the DATA packet at a time of storing the OUT packet and the DATA packet in the storage means, the OUT packet and the DATA packet being supplied from the host-side controller, and the transmission control means starting to transmit the OUT packet and the DATA packet to the function device, when the amounts of data confirmed by the data amount confirming means exceed a predetermined value.

56. The communication controller as defined in claim 55, after transmitting the DATA packet to the function device, the communication controller checking whether or not an ACK packet is returned from the function device, in response to the DATA packet, and if, after transmission of the DATA packet, the receipt acknowledgement means does not acknowledge receipt of the ACK packet within a predetermined period of time, the communication controller performing a retransmission process so as to transmit an OUT packet and a DATA packet, which are identical with the OUT packet and the DATA packet having been transmitted to the function device on a last occasion, to the function device.

57. The communication controller as defined in claim 56, the communication controller carrying out an analysis so as to check whether or not the DATA packet supplied from the host-side controller includes an error, and the communication controller carrying out the retransmission process only when the analysis confirms that the DATA packet stored in the communication controller includes no error.

58. The communication controller as defined in claim 55, the communication controller carrying out an analysis so as to check whether or not the DATA packet supplied from the host-side controller includes an error, and the communication controller requiring the host-side controller to retransmit the DATA packet, when the analysis confirms that the received DATA packet includes an error.

59. The communication controller as defined in claim 58, wherein, when the DATA packet is supplied from the host devise side and an error is detected in this DATA packet, the request of retransmission is carried out only when (i) it is confirmed that a flag indicating presence/absence of an error in the DATA packet stored in the host-side controller is set in the received DATA packet, and (ii) it is confirmed by the flag that the host-side controller stores the DATA packet with no error.

60. A communication system, comprising:
    a communication controller acting as a host-side controller; and
    a communication controller acting as a function-side controller,
    the communication controller acting as the host-side controller that, when an OUT transaction is performed as data communication under USB standard, (i) transfers an OUT packet and a DATA packet, which are supplied from a host device, to a function device side, while (ii) transfers a handshake packet, which is a response to the OUT packet and the DATA packet, to a host device,
    the communication controller acting as the host-side controller including:
    receipt acknowledgement means for acknowledging receipt of the OUT packet and the DATA packet from the host device;
    storage means for storing the handshake packet supplied from a function device side;
    data storage acknowledgement means for checking if the handshake packet is stored in the storage means when the receipt acknowledgement means acknowledges the receipt of the OUT packet and the DATA packet from the host device; and
    transmission control means for (I) transmitting a NAK packet to the host device, when the data storage acknowledgement means confirms that the handshake packet is not stored, and for (II) transmitting the handshake packet to the host device, when the data storage acknowledgement means confirms that the handshake packet is stored,
    the communication controller acting as the function-side controller (1) transferring USB-compliant OUT packet and DATA packet, which are supplied from the host device side, to the function device, while (2) transferring the handshake packet, which is a response to the USB-compliant OUT packet and DATA packet, to the host device side,
    wherein, the communication controller also acts as a function-side controller which (i) transfers USB-compliant OUT packet and DATA packet, which are supplied from a host device side, to a function device, and (ii) transfers the handshake packet, which is a response to the USB-compliant OUT racket and DATA packet, to the host device side,
    a transfer rate for receipt of the OUT packet and the DATA packet from a host-side controller and a transfer rate for transmission of the handshake packet to the host-side controller are lower than a transfer rate defined by USB standard, and a transfer rate for transmission of the OUT packet and the DATA packet to the function device and a transfer rate regarding receipt of the handshake packet from the function device are identical with the transfer rate defined by USB standard,
    data amount confirming means for confirming amounts of data of the OUT packet and the DATA packet at a time of storing the OUT packet and the DATA packet in the storage means is additionally provided, the OUT packet and the DATA packet being supplied from the host-side controller, and
    the transmission control means starts to transmit the OUT packet and the DATA packet to the function device, when the amounts of data confirmed by the data amount confirming means exceed a predetermined value.

61. A communication equipment, comprising a communication controller which acts, when an OUT transaction is performed as data communication under USB standard, as a host-side controller that (i) transfers an OUT packet and a DATA packet, which are supplied from a host device, to a function device side, while (ii) transfers a handshake packet, which is a response to the OUT packet and the DATA packet, to the host device,
    the communication controller comprising:
    receipt acknowledgement means for acknowledging receipt of the OUT packet and the DATA packet from the host device;
    storage means for storing the handshake packet supplied from the function device side;
    data storage acknowledgement means for checking if the handshake packet is stored in the storage means when the receipt acknowledgement means acknowledges the receipt of the OUT packet and the DATA packet from the host device; and
    transmission control means for (I) transmitting a NAK packet to the host device, when the data storage acknowledgement means confirms that the handshake packet is not stored, and for (II) transmitting the handshake packet to the host device, when the data storage acknowledgement means confirms that the handshake packet is stored,
    wherein, the communication controller also acts as a function-side controller which (i) transfers USB-compliant OUT packet and DATA packet, which are supplied from a host device side, to a function device, and (ii) transfers the handshake packet, which is a response to the USB-compliant OUT packet and DATA packet, to the host device side, a transfer rate for receipt of the OUT packet and the DATA packet from a host-side controller and a transfer rate for transmission of the handshake packet to the host-side controller are lower than a transfer rate defined by USB standard, and a transfer rate for transmission of the OUT packet and the DATA packet to the function device and a transfer rate regarding receipt of the handshake packet from the function device are identical with the transfer rate defined by USB standard, data amount confirming means for confirming amounts of data of the OUT packet and the DATA packet at a time of storing the OUT packet and the DATA packet in the storage means is additionally provided, the OUT packet and the DATA packet being supplied from the host-side controller, and the transmission control means starts to transmit the OUT packet and the DATA packet to the function device, when the amounts of data confirmed by the data amount confirming means exceed a predetermined value.

62. A communication equipment, comprising a communication controller which acts as a function-side controller which, at a time of performing an OUT transaction as a data communication under USB standard, (i) transfers USB-compliant OUT packet and DATA packet, which are supplied from a host device side, to a function device, and (ii) transfers a handshake packet, which is a response to the USB-compliant OUT packet and DATA packet, to the host device side, a transfer rate regarding transmission to the host device side being lower than a transfer rate defined by USB standard, while a transfer rate regarding transmission to the function device being identical with the transfer rate defined by USB standard, the communication controller including data amount confirming means for confirming amounts of data of the OUT packet and the DATA packet at a time of storing the OUT packet and the DATA packet in the storage means, the OUT packet and the DATA packet being supplied from the host-side controller, and the transmission control means starting to transmit the OUT packet and the DATA packet, when the amounts of data confirmed by the data amount confirming means exceed a predetermined value.

63. A communication method, comprising the steps of:

when receipt of an OUT packet and a DATA packet from a host device is confirmed, checking whether or not a handshake packet which will be a response to the OUT packet and the DATA packet has been supplied;

if the handshake packet has been supplied, transmitting the handshake packet to the host device, in response to the OUT packet and the DATA packet having been supplied; and if the handshake packet has not been supplied, transferring a NAK packet to the host device, transferring USB-compliant OUT packet and DATA packet, which are supplied from a host device side, to a function device, and (ii) transfering the handshake packet, which is a response to the USB-compliant OUT packet and DATA packet, to the host device side, a transfer rate for receipt of the OUT packet and the DATA packet from a host-side controller and a transfer rate for transmission of the handshake packet to the host-side controller are lower than a transfer rate defined by USB standard, and a transfer rate for transmission of the OUT packet and the DATA packet to the function device and a transfer rate regarding receipt of the handshake packet from the function device are identical with the transfer rate defined by USB standard, confirming amounts of data of the OUT packet and the DATA packet at a time of storing the OUT packet and the DATA packet in the storage means is additionally provided, the OUT packet and the DATA packet being supplied from the host-side controller, and transmitting the OUT packet and the DATA packet to the function device, when the amounts of data confirmed by the data amount confirming means exceed a predetermined value.

64. A packet-based communication program which causes a computer to perform as means of a communication controller which acts, when an OUT transaction is performed as data communication under USB standard, as a host-side controller that (i) transfers an OUT packet and a DATA packet, which are supplied from a host device, to a function device side, while (ii) transfers a handshake packet, which is a response to the OUT packet and the DATA packet, to the host device, the communication controller comprising:

receipt acknowledgement means for acknowledging receipt of the OUT packet and the DATA packet from the host device;

storage means for storing the handshake packet supplied from the function device side;

data storage acknowledgement means for checking if the handshake packet is stored in the storage means when the receipt acknowledgement means acknowledges the receipt of the OUT packet and the DATA packet from the host device; and transmission control means for (I) transmitting a NAK packet to the host device, when the data storage acknowledgement means confirms that the handshake packet is not stored, and for (II) transmitting the handshake packet to the host device, when the data storage acknowledgement means confirms that the handshake packet is stored, wherein, the communication controller also acts as a function-side controller which (i) transfers USB-compliant OUT packet and DATA packet, which are supplied from a host device side, to a function device, and (ii) transfers the handshake packet, which is a response to the USB-compliant OUT packet and DATA packet, to the host device side, a transfer rate for receipt of the OUT packet and the DATA packet from a host-side controller and a transfer rate for transmission of the handshake packet to the host-side controller are lower than a transfer rate defined by USB standard, and a transfer rate for transmission of the OUT packet and the DATA packet to the function device and a transfer rate regarding receipt of the handshake packet from the function device are identical with the transfer rate defined by USB standard, data amount confirming means for confirming amounts of data of the OUT packet and the DATA packet at a time of storing the OUT packet and the DATA packet in the storage means is additionally provided, the OUT packet and the DATA packet being supplied from the host-side controller, and the transmission control means starts to transmit the OUT packet and the DATA packet to the function device, when the amounts of data confirmed by the data amount confirming means exceed a predetermined value.

65. A storage medium storing a packet-based communication program which causes a computer to perform as means of a communication controller which acts, when an OUT transaction is performed as data communication under USB standard, as a host-side controller that (i) transfers an OUT packet and a DATA packet, which are supplied from a host device, to a function device side, while (ii) transfers a handshake packet, which is a response to the OUT packet and the DATA packet, to the host device, the communication controller comprising:
receipt acknowledgement means for acknowledging receipt of the OUT packet and the DATA packet from the host device;
storage means for storing the handshake packet supplied from the function device side;
data storage acknowledgement means for checking if the handshake packet is stored in the storage means when the receipt acknowledgement means acknowledges the receipt of the OUT packet and the DATA packet from the host device; and
transmission control means for (I) transmitting a NAK packet to the host device, when the data storage acknowledgement means confirms that the handshake packet is not stored, and for (II) transmitting the handshake packet to the host device, when the data storage acknowledgement means confirms that the handshake packet is stored,
wherein, the communication controller also acts as a function-side controller which (i) transfers USB-compliant OUT packet and DATA packet, which are supplied from a host device side, to a function device, and (ii) transfers the handshake packet, which is a response to the USB-compliant OUT packet and DATA packet, to the host device side,
a transfer rate for receipt of the OUT packet and the DATA packet from a host-side controller and a transfer rate for transmission of the handshake packet to the host-side controller are lower than a transfer rate defined by USB standard, and a transfer rate for transmission of the OUT packet and the DATA packet to the function device and a transfer rate regarding receipt of the handshake packet from the function device are identical with the transfer rate defined by USB standard,
data amount confirming means for confirming amounts of data of the OUT packet and the DATA packet at a time of storing the OUT packet and the DATA packet in the storage means is additionally provided, the OUT packet and the DATA packet being supplied from the host-side controller, and
the transmission control means starts to transmit the OUT packet and the DATA packet to the function device, when the amounts of data confirmed by the data amount confirming means exceed a predetermined value.

66. A host-side controller which is provided in a host of a USB system and relays communications between the host and a device,
at a time of performing a SETUP transaction, the host-side controller supplying, to a device side, a SETUP packet and a DATA packet supplied from the host, and storing the SETUP packet and the DATA packet on receipt of an ACK packet which is supplied from the device side towards the host, and
the host-side controller comprising a host-side control section which supplies the ACK packet to the host on receipt of the SETUP packet and the DATA packet retransmitted from the host towards the device.

67. The host-side controller as defined in claim 66, wherein, when the SETUP packet and the DATA packet supplied from the host are transmitted to the device side, the host-side control section avoid transmitting the DATA packet if it is judged that the DATA packet includes an error.

68. A USB system, comprising:
a host;
a device;
a host-side controller; and
a device-side controller,
the host-side controller being provided in the host of the USB system and relaying communications between the host and the device,
the host-side controller including a host-side control section which, at a time of performing a SETUP transaction, (i) transmits, to a device side, a SETUP packet and a DATA packet supplied from the host, (ii) stores an ACK packet transmitted from the device side towards the host, when the ACK packet is supplied, and (iii) supplies the ACK packet to the host, when the SETUP packet and the DATA packet retransmitted from the host towards the device is supplied, and
the device-side controller being provided in the device and relaying communications between the host and the device.

69. The USB system as defined in claim 68, wherein, the device-side controller supplies, to the device, the SETUP packet and the DATA packet transmitted from the host-side controller, and includes a device-side control section which supplies, to the host-side controller, the ACK packet supplied from the device.

70. The USB system as defined in claim 69, wherein, at a time of receiving the DATA packet supplied from the host-side controller and transferring the DATA packet to the device, the device-side control section starts to transfer the DATA packet to the device when an amount of the received DATA packet exceeds a stable received amount.

71. The USB system as defined in claim 69, wherein, if the DATA packet supplied from the host-side controller has an error, the device-side control section avoids transferring this DATA packet to the device.

72. The USB system as defined in claim 69, wherein, after supplying the SETUP packet and the DATA packet to the device, if the device-side control section cannot receive the ACK packet within a predetermined period of time, the device-side control section retransmits the SETUP packet and the DATA packet to the device.

73. The USB system as defined in claim 72, wherein, before retransmitting the SETUP packet and the DATA packet to the device, the device-side control section judges whether or not the DATA packet has an error, and avoids retransmitting the SETUP packet and the DATA packet if the DATA packet has an error.

74. The USB system as defined in claim 69, wherein, if it is judged that the DATA packet supplied from the host-side controller has an error, the device-side control section supplies, to the host-side controller, a request to retransmit the DATA packet, and
the host-side control section retransmits the DATA packet in response to the request from the device-side control section.

75. The USB system as defined in claim 74, wherein, only when the host-side control section has an error-free DATA packet, the host-side control section retransmits the DATA packet.

76. The USB system as defined in claim 75, wherein, when it is judged that the DATA packet supplied from the host-side controller to the device-side control section has an error but a flag indicating an absence of an error is added to the DATA packet, the device-side control section makes a request to the host-side controller to retransmit the DATA packet, and in response to the request from the device-side controller, the host-side control section retransmits the DATA packet.

77. The USB system as defined in claim 69, wherein, the host-side control section transmits, to the device-side controller, parts of the DATA packet supplied from the host, on first-come, first-served basis, and when the host-side control section receives all parts of the DATA packet, the host-side control section (i) checks whether or not the DATA packet includes an error, (ii) adds, to an end part of the DATA packet, a flag indicating whether or not the DATA packet includes an error, and (iii) supplies the end part with the flag to the device-side controller.

78. The USB system as defined in claim 69, wherein, each of the host-side controller and the device-side controller includes a speed setting section for setting a communication rate between the host-side controller and the device-side controller.

79. The USB system as defined in claim 78, wherein, when the speed setting section sets the communication rate to be higher than a predetermined value, the host-side control section transfers, to the host side, the ACK packet supplied from the device side towards the host, at a time of receiving this ACK packet.

80. The USB system as defined in claim 78, wherein, at least one of the host-side control section and the device-side control section calculates an error rate regarding transmission and receipt of a packet between the controllers, and the speed setting section lowers the communication rate if the error rate exceeds a predetermined value.

81. The USB system as defined in claim 69, wherein, a method of communications on a communication path between the controllers is a full-duplex communication.

82. The USB system as defined in claim 69, wherein, a communication path between the controllers is made up of an optical cable.

83. The USB system as defined in claim 69, wherein, communications between the controllers are performed in an optical wireless fashion.

84. The USB system as defined in claim 69, wherein, communications between the controllers are performed as wireless communications using an electric wave.

85. A communication controller which relays communications between a host and a device and can act both as a controller on a host side and a controller on a device side,
when the communication controller acts as the controller on the host side and a SETUP transaction is performed, the communication controller supplying, to the device side, a SETUP packet and a DATA packet supplied from the host, and storing an ACK packet transmitted from the device side towards the host, at a time of supply of this ACK packet to the communication controller, and
the communication controller including a control section which supplies the ACK packet to the host, when the SETUP packet and the DATA packet which are retransmitted from the device side towards the host is supplied to the communication controller.

86. The communication controller as defined in claim 85, wherein, at a time of supplying, to the device side, the SETUP packet and the DATA packet supplied from the host, the control section avoids transmitting the DATA packet if it is judged that the DATA packet has an error.

87. The communication controller as defined in claim 85, wherein, the control section transmits, to the device side, parts of the DATA packet supplied from the host, on first-come, first-served basis, and when the host-side control section receives all parts of the DATA packet, the control section (i) checks whether or not the DATA packet includes an error, (ii) adds, to an end of the DATA packet, a flag indicating whether or not the DATA packet includes an error, and (iii) supplies the end part with the flag to the device side.

88. The communication controller as defined in claim 85, wherein, when the communication controller acts as the controller on the device side and the SETUP transaction is performed, the control section supplies, to the device, the SETUP packet and the DATA packet supplied from the host side, and supplies, to the host side, the ACK packet supplied from the device.

89. The communication controller as defined in claim 88, wherein, at a time of transferring, to the device, the DATA packet supplied from the host-side, the control section starts to transfer the DATA packet to the device when an amount of the received DATA packet exceeds a stable received amount.

90. The communication controller as defined in claim 88, wherein, the control section avoids transmitting the DATA packet to the device if it is judged that the DATA packet has an error.

91. The communication controller as defined in claim 88, wherein, if the control section cannot receive the ACK packet within a predetermined period of time after transmitting the SETUP packet and the DATA packet to the device, the control section retransmits the SETUP packet and the DATA packet to the device.

92. The communication controller as defined in claim 91, wherein, before retransmitting the SETUP packet and the DATA packet to the device, the control section judges whether or not the DATA packet has an error, and avoids retransmitting the SETUP packet and the DATA packet if the DATA packet has an error.

93. A packet-based communication method for exchanging packets between a host and a device of a USB system, comprising the steps of:
at a time of performing a SETUP transaction,
(i) transmitting, to a device side, a SETUP packet and a DATA packet supplied from the host;
(ii) avoiding transfer of an ACK packet to a host side, the ACK packet being transmitted from the device side towards the host; and
(iii) when the SETUP packet and the DATA packet are retransmitted from the host to the device, supplying the ACK packet to the host.

94. A packet-based communication program which causes a computer provided in a host of an USB system to execute a packet-based communication method for exchanging packets between the host and a device of the USB system,
the method comprising the steps of:
at a time of performing a SETUP transaction,
(i) transmitting, to a device side, a SETUP packet and a DATA packet supplied from the host;
(ii) avoiding transfer of an ACK packet to a host side, the ACK packet being transmitted from the device side towards the host; and
(iii) when the SETUP packet and the DATA packet are retransmitted from the host to the device, supplying the ACK packet to the host.

95. A storage medium, storing a packet-based communication program which causes a computer provided in a host of an USB system to execute a packet-based communication method for exchanging packets between the host and a device of the USB system,
the method comprising the steps of:
at a time of performing a SETUP transaction,
(i) transmitting, to a device side, a SETUP packet and a DATA packet supplied from the host;
(ii) avoiding transfer of an ACK packet to a host side, the ACK packet being transmitted from the device side towards the host; and
(iii) when the SETUP packet and the DATA packet are retransmitted from the host to the device, supplying the ACK packet to the host.

* * * * *